(12) United States Patent
Rovnyak et al.

(10) Patent No.: US 8,190,299 B2
(45) Date of Patent: May 29, 2012

(54) INTEGRATED AND OPTIMIZED DISTRIBUTED GENERATION AND INTERCONNECT SYSTEM CONTROLLER

(76) Inventors: Steven M. Rovnyak, Indianapolis, IN (US); Yaobin Chen, Carmel, IN (US); Yong Sheng, Zionsville, IN (US); Vikram Singh Rajput, Indianapolis, IN (US); Terry Pahls, Anderson, IN (US); Larry George, Greenfield, IN (US); Jeff Malkoff, Noblesville, IN (US); Xiaohui Hu, Indianapolis, IN (US)

( * ) Notice: Subject to any disclaimer, the term of this patent is extended or adjusted under 35 U.S.C. 154(b) by 384 days.

(21) Appl. No.: 12/355,972

(22) Filed: Jan. 19, 2009

(65) Prior Publication Data

US 2011/0166716 A9 Jul. 7, 2011

Related U.S. Application Data

(63) Continuation of application No. PCT/US2007/073900, filed on Jul. 19, 2007.

(60) Provisional application No. 60/807,786, filed on Jul. 19, 2006.

(51) Int. Cl.
*G05D 3/12* (2006.01)
*G01R 21/00* (2006.01)
*G06F 11/00* (2006.01)

(52) U.S. Cl. ............... 700/287; 702/60; 713/340

(58) Field of Classification Search .......... 700/286, 700/287; 702/60; 713/340
See application file for complete search history.

(56) References Cited

U.S. PATENT DOCUMENTS

| | | | | |
|---|---|---|---|---|
| 5,537,327 A | * | 7/1996 | Snow et al. | 700/293 |
| 5,734,575 A | * | 3/1998 | Snow et al. | 700/286 |
| 6,219,623 B1 | * | 4/2001 | Wills | 702/60 |
| 6,453,248 B1 | * | 9/2002 | Hart et al. | 702/58 |
| 6,925,361 B1 | * | 8/2005 | Sinnock | 700/286 |
| 7,342,758 B2 | * | 3/2008 | Liu et al. | 361/62 |

OTHER PUBLICATIONS

Hou,et al., Deterministic High-Impedance Fault Detection and Phase Selection on Ungrounded Distribution System, SEL,2005, TP6225-01, pp. 1-10.*

Hou, et al., Deterministic High-Impedance Fault Detection and Phase Selection on Ungrounded Distribution System, SEL, 2005, TP6225-01, pp. 1-10.

* cited by examiner

*Primary Examiner* — Kakali Chaki
*Assistant Examiner* — Sivalingam Sivanesan
(74) *Attorney, Agent, or Firm* — Matthew R. Schantz; Bingham Greenbaum Doll LLP

(57) ABSTRACT

Systems and methods for designing and controlling distributed generation resources are disclosed. Monolithic or distributed controllers control the power requests sent to each distributed generation resource to achieve optimal efficiency using rule-based and/or fuzzy logic-based control techniques. High-impedance fault (HIF) detection circuitry allows power export to the utility grid in normal operating circumstances, and when an islanding condition is detected, ceases that export within two seconds and prevents further export until the condition is cleared.

9 Claims, 72 Drawing Sheets

INTEGRATED AND OPTIMIZED DISTRIBUTED GENERATION AND INTERCONNECT SYSTEM CONTROLLER

CROSS-REFERENCE TO RELATED APPLICATIONS

This application is a continuation of PCT/US07/73900, having an international filing date of Jul. 19, 2007, which claims priority to U.S. Provisional Patent Application Ser. No. 60/807,786, filed Jul. 19, 2006, now expired.

TECHNICAL FIELD

The present invention relates to distributed power generation systems. More specifically, the present invention relates to systems that control or include a combination of distributed generation resources, one or more loads, and utility grids.

DESCRIPTION

Figure 1:
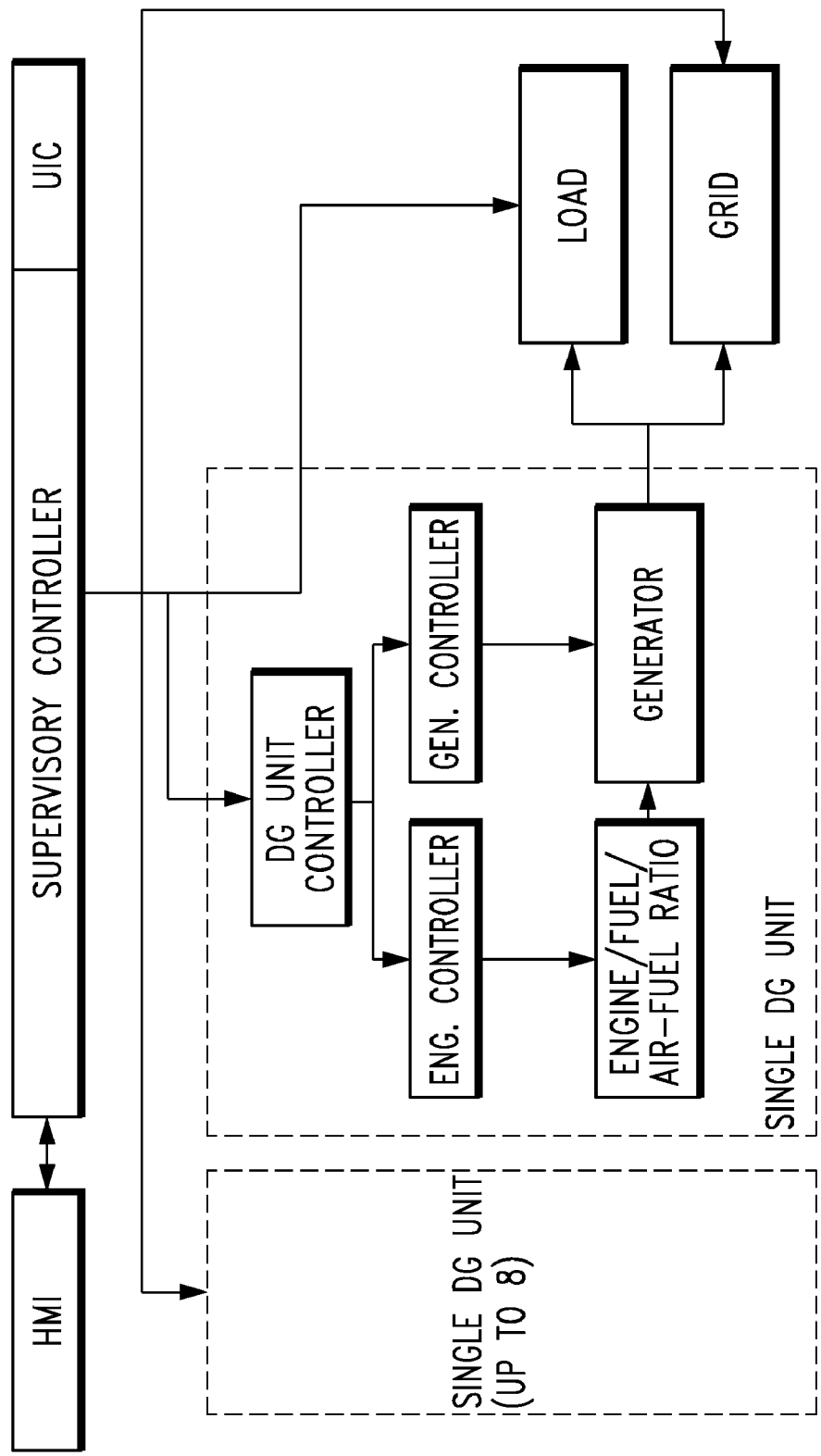
FIG. 1 is a block diagram of the functional components of a DG system controller described herein.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, one embodiment of the present system implements par distribution strategies to improve overall system efficiency. Another embodiment provides an integrated and optimized distributed generation system control (DGSC) module that improves overall power generation performance and lowers the capital cost of distributed generation site installation in many implementations.

IEEE Standard 1547 ("the Standard") provides a nationally recognized set of rules for connecting distributed power generation resources to a utility grid. This standard specifies requirements for voltage regulation, grounding, synchronization, inadvertent energizing, monitoring, protected relaying, power quality, islanding, and verification of compliance with itself. The subsequent IEEE Standard 1547.1 specifies test procedures for establishing and verifying compliance with the requirements of IEEE 1547. Some aspects of these standards will be discussed in further detail below.

Synchronous generators can regulate voltage and supply power to a local load even when they are not connected to the utility grid. DG units operating independently in grid-isolated mode (GIM) can provide primary or backup power when utility service is not available. However, DG facilities with synchronous machines also have the potential to supply voltage and power to a small piece of the utility grid that has been disconnected from the rest of the grid. This phenomenon is called islanding and it should generally be avoided for safety and other reasons. The IEEE 1547 standard requires that the DG detect islanded operation and cease to energize the utility grid within two seconds. The standard allows this requirement to be met using any of various island-detection schemes, as long as the selected method passes a test designed to create the most difficult circumstances for island-detection. That test requires an island to be detected when the DG and a matching load are simultaneously disconnected from the grid. Matching the load and DG output causes minimal frequency change when the grid is disconnected. Some systems currently on the market presently use the simplest technique to satisfy the islanding test, but this approach has an unfortunate drawback. The method simply disconnects the DG from the utility when the power imported from the utility falls below a preset threshold. The unfortunate drawback of this method is that it never allows export of power to the grid. As mentioned above, being able to export power to the grid is important for achieving maximum CHP efficiency. One aspect of the present system includes an island detection scheme that allows power export to the grid.

Proposed anti-islanding methods can be divided into two categories, namely, passive schemes and active schemes. Anti-islanding relays based on passive schemes include rate of change of frequency (ROCOF) relays and vector surge (VS) relays. Passive methods tend to perform poorly when the active power generated by the DG roughly balances the local load. Active methods overcome this limitation by introducing a small perturbation signal into the DG system. When the utility remains connected, the small disturbance caused by the intentional perturbation is not sufficient to trip island-detection relays. However, if the connection to the grid is lost, the response to the perturbation becomes large enough to activate island-detection relays. The challenge of active methods is to keep the perturbation small enough to avoid stability and power quality problems but large enough to cause a rapidly detectable response once the grid is lost.

Some forms of the present system include an optimized controller that allows a system to satisfy the requirements if IEEE 1547 and still export power to the grid with a system that could be used in many different jurisdictions. Built-in regulation features and anti-islanding capability in some embodiments provide operational benefits including more efficient power generation. In addition, the system's ability to export unneeded power to the grid allows distributed generation capacity to be sized by thermal load requirements for more efficient operation. Still further, some embodiments of the system provides significant capital- and installation-cost savings. Some embodiments incorporate relay components into a turn-key controller that eliminates the need for a trained technician to travel to an installation site to program the controller. Factory testing of some embodiments eliminates costly on-site installation delays. Still further, the supervisory control scheme in several embodiments allows users to add distributed power generation modules over time without undue additional engineering effort.

The present disclosure is presented in two parts. The first is directed primarily to a control system that optimizes distributed generation of power by homogeneous and heterogeneous collections of generators. The second part discusses additional aspects of the distributed power generation system.

Part 1—Optimized Controller

The power management system plays a key role in improving the overall system efficiency for multiple distributed generation units. The system performance, such as fuel economy, depends in part on the power management system strategy. The two conventional rule-based power distribution methods used in one existing design are quite simple, and only have been applied to two units. One method is to split the power equally between two identical units, and the other method is that the master unit always run full load, and the slave unit takes the rest of the load. These two conventional methods are not the optimal power distribution strategy.

This Part describes optimal power distribution strategies to improve overall system efficiency. A sequential quadratic programming method will be applied to find the optimal power distribution among multiple units. The optimal power management system is an important control function of the system control. This Part not only describes the optimal strategies for two identical units, but also describes strategies for three identical units, two different units, and three different units. Simulation results show that the disclosed optimal power management system can improve the system efficiency over the certain rule-based power management system.

A challenge to the full deployment of distributed energy is the fact that the electric power grid system is under the authority of hundreds of utilities and regulatory commissions. Developing a secure distributed generation (DG) system of energy production is hindered by the wide variety of technologies to produce power and the various grid suppliers' requirements for power acceptance.

A purpose of the present disclosure is to describe an integrated and optimized DG system controller module that improves the overall power generation performance attributes, and lowers the capital cost of a distributed generation site installation. The proposed system is intended to leverage the newly released IEEE 1547 *Standard for Interconnecting Distributed Resources with Electric Power Systems* that has defined a nationally recognized standard for grid interconnect for DG resources.

The overall DG system controller functional units include a supervisory controller, a DG unit controller, utility interface controller (UIC), and a DG unit protection functions and multiple unit configurations. Based on the operation of the system, the control system can be characterized as a hierarchical control structure with three distinct levels: supervision, coordination, and execution. The supervisory controller, which includes the UIC, is in the supervision level controller. The DG unit controller is in the coordination level. The execution level includes engine, engine control module (ECM), generator, and automatic voltage regulator (AVR) components.

This Part describes optimal power management strategies for multiple DG units, which is a significant function of the system controller. One objective of the optimal power management system (PMS) is to find an optimal way to distribute load power among multiple units to improve system efficiency. In this Part, the optimal PMS of the DG system is described. The optimal rule-based approach, a hybrid fuzzy rule-based PMS will distribute power among multiple DG units, which can optimize the entire system efficiently.

Certain existing power distribution systems are only used for power distribution between two units, and power distribution methods are quite simple. Two conventional methods in the existing art to distribute power between two DG units in industry involve either splitting the power equally between these two identical units, or a load-following method (the master unit always runs full load, and the slave unit takes the rest of the load). These two conventional methods are not optimal power distribution strategies. In this Part, the optimal power distribution strategies are shown to improve the overall system efficiency. The sequential quadratic programming (SQP) method is applied to find the optimal power distribution between multiple units. The theoretical derivation is presented for the problem. Before introducing the optimization, the overall control structure of the DG system is presented. The optimization and implementation of the optimal PMS will be one layer of the system control. This Part develops the optimal strategies for two identical units, for three identical units, for two different units and for three different units.

Optimal rule-based systems and hybrid fuzzy rule-based systems are designed in this disclosure for different configurations. In this Part, the fuzzy logic rules are tuned according to the optimal solution data. The controller for the DG unit is implemented and tested in hardware and software.

1.2. Main Subjects of this Part

Find optimal power distribution among multiple units by using SQP.

Compare optimal PMS with existing power distribution methods.

Show design of rule-based PMS for identical units.

Show design of Hybrid fuzzy rule-based PMS for different units.

1.3. Organization of the Part

In this Part, the preceding issues are organized as follows: Chapter 2 discusses distributed generation systems, system controller architecture, and simulation model development for the DG unit. Chapter 3 describes optimal power management and control strategies, finds optimal load distribution solutions among multiple DG units, and compares optimal strategies with the two conventional methods. Chapter 4 describes two implementation methods, which are rule-based optimal power distribution and hybrid fuzzy rule-based optimal power distribution. In Chapter 4, the implementation results also are analyzed. Finally, Chapter 5 summarizes the teachings of this disclosure.

2. DG System and System Controller Architecture 2.1. Principles of DG

The DG unit in many embodiments can be used as a backup power supply for industry, and it also can sell electricity to the power grid. In one embodiment, a DG unit is an internal combustion engine generating system with a synchronous generator. In other embodiments DG engines are gasoline engines, diesel engines, and natural gas engines. The DG unit discussed in this Part is a natural gas fueled engine driving a synchronous generator that produces 60 Hz three-phase electrical power at 277/480 VAC under ISO standard conditions. Two types of DG units will be discussed in this Part. Their rated output powers are 75 kw and 150 kw, respectively.

Other embodiments will use other energy sources and have other output ratings or other characteristics. In these embodiments, the DG unit can work in grid isolated mode (GIM) or grid parallel mode (GPM) mode. DG units are connected to the local utility power grid in GPM or to the local site distribution bus in GIM.

2.2. DG System Control Architecture

The overall structure of the DG multiple units system is a hierarchical system, which is illustrated in FIG. 1. The DG system controller coordinates the control of one or more DG units as shown in FIG. 1. The system controller is capable of controlling up to 8 parallel DG units that are connected to the local utility grid in GPM or to the local site distribution bus in GIM. In this Part, controlling 2-3 parallel units will be discussed. It can be seen from FIG. 1 that the DG subsystem modules communicate with a supervisory controller. The supervisory controller performs the UIC functions.

There are two types of controllers in this embodiment: the DG unit controllers and the supervisory controller. A DG unit controller controls a single DG unit, while the supervisory controller coordinates the operation of multiple units in a single location. The functions of the supervisory controller are:

Grid synchronization and protection of the DG unit

Human/automatic switch between GPM/GIM

Control of human machine interface (HMI)

Communication among multiple units and external DG gateway

This Part will discuss the supervisory controller. There are two major functions of the supervisory controller that will be mentioned. The first function is controlling the GIM/GPM mode switch. The second is distributing load power among multiple units to maximize the system efficiencies by using a built-in power management system. The power management system will be the focus of this Part and will be discussed in the remaining chapters. Table 2.1 shows the supervisory control functions for the GIM/GPM mode switch. The switch is a logic control.

The DG system can run in GIM or GPM. Each DG unit will be running at either speed control mode or torque control mode according to the situation. The supervisory controller will determine the control mode of each DG unit. Table 2.1 shows the basic rules.

TABLE 2.1

Supervisory control functions for GIM/GPM mode switch (logic control)

| Configuration | GIM | GPM |
|---|---|---|
| Single DG unit | Voltage-regulating speed control | Voltage-following torque control |
| Multiple DG units | Determine master unit. One master unit uses Voltage-regulating speed control, other units use Voltage-following torque control. | All units use Voltage-following torque control. |

Figure 2:
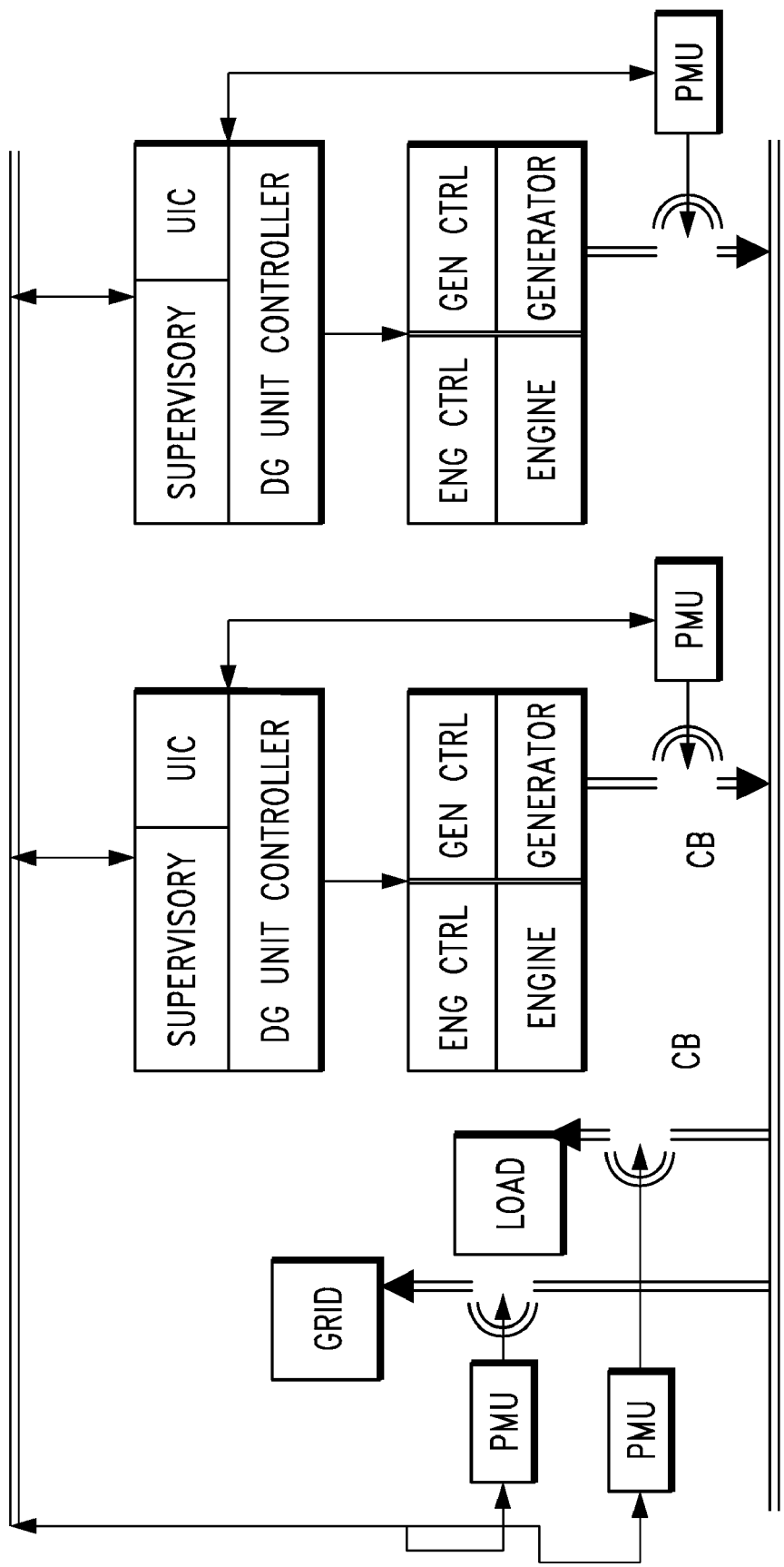
FIG. 2 is a block diagram of the hardware components of a DG system controller described herein.

FIG. 2 shows hardware-oriented block diagram for this embodiment of a DG system. It can be seen from FIG. 2 that each system controller includes a supervisory controller. Then supervisory controller communicates with other units to determine the master unit and slave units, and then determines the load power percentage for each unit when there are multiple units. A Phasor Measurement Unit (PMU) was used to measure the phasor of load power and then control the circuit break.

Additionally, the system controller includes a GIM/GPM switch control, load-following mode control, and UIC and DG unit controller. The GIM/GPM control is a digital logical control used to switch modes between GIM and GPM. The DG supervisory controller and UIC are preferably housed in a single enclosure (being in some cases a unitary housing, and in others a plurality of housings connected detachably or non-detachably by conduit or other substantially sealed passage), though in some embodiments they are in unconnected cases.

A PMS was developed for the DG system controller. The PMS is at the supervisory control level. An objective of the PMS is to manage the power distribution and coordinate among multiple units to improve the system efficiency. The execution level includes the DG unit controller, the engine, and the generator used to perform the specific tasks according to the desired commands generated by the PMS. The PMS accepts the signals from the supervisory controller and determines the splitting power demand to each DG unit controller using predefined strategies. The PMS also converts the load power demand to torque commands, which are sent to the DG unit controller as a load disturbance. There are several ways to distribute power among multiple units. Equal-split load power and load-following methods are used in some systems because they are easy to implement. However, these two methods are not the optimal power distribution methods. In this Part, an optimal power distribution system is described to optimize the entire system efficiency when multiple DG units are used. Chapter 3 characterizes the system efficiency problem and solves it mathematically using the Matlab optimization toolbox. In Chapter 4, the implementations of the optimal power management strategies are shown in Matlab/Simulink. The implementations are rule-based and hybrid fuzzy/rule-based power distribution.

3. Optimal Load Power Distribution Among Multiple Units 3.1. Power Management System Reviews Power management is one of the functions in the supervisory controller. The system performance, such as the fuel economy, depends on the power management strategy.

The PMS is at the supervisory control level. The primary objective of the PMS is to manage the power distribution and coordinate among multiple units to improve system efficiency.

3.1.1. Inputs and Outputs

Figure 3:
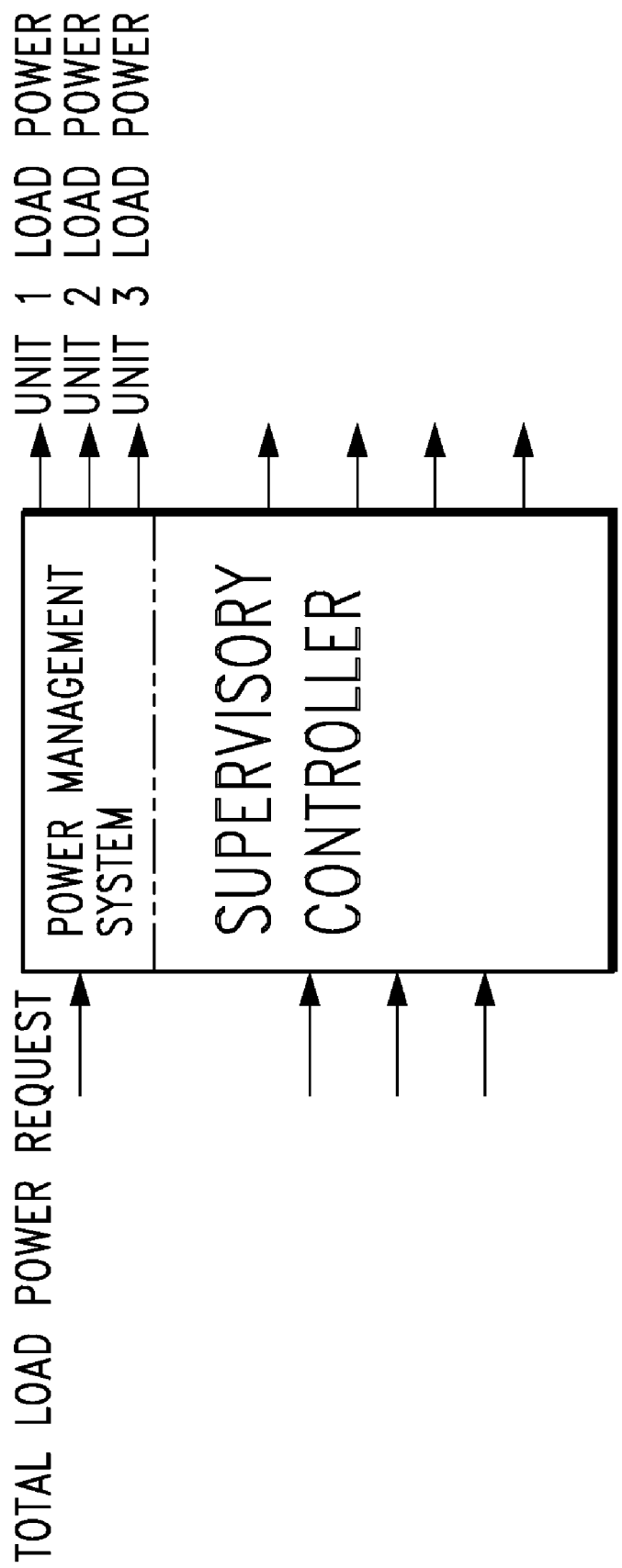
FIG. 3 is a block diagram of a power management system according to the present disclosure.

The inputs and outputs of the PMS module in this embodiment are illustrated in FIG. 3. Its input signal reflects the total required load power. Its outputs are the required load power values for each unit. For example, if there are three units, then the PMS has three output signals. The PMS accepts the signals from the supervisory controller and determines the assignment of power generation to each DG unit controller using predefined strategies. The PMS then converts the load power demand to torque commands, which will be sent to the DG engine controller.

3.1.2. Optimal PMS

Two very simple rule-based methods are used for power distribution among multiple DG units in some existing systems. These two methods were developed on the basis of simple analysis of component efficiencies and these two modes can be switched manually. One method is load-following by a single unit while all the other units are supplying no load or full load. The other method is to split power equally between multiple units.

These rule-based PMSs, although easy to implement, yield far from the optimal system efficiency. Moreover, they cannot determine whether the system efficiency is optimal or not.

There should in fact be an optimal power distribution among multiple DG units that maximizes the system efficiency. An optimal PMS can optimize the system-wide fuel efficiency for multiple units.

There are several approaches to designing an optimal PMS. Math-optimal PMS (such as SQP or dynamic programming (DP)) can achieve the exact optimal efficiency. However, this is often too time-consuming for online calculation. Rule-based PMS is easy to use, but it is practically limited to simple optimization rules; otherwise it will be difficult to obtain the rules, and will be time consuming to apply. Fuzzy PMS is not as precise as math-model based PMS (SQP or DP); however, it is convenient and fast for online implementation. If a look-up table is used, it can be more precise than a fuzzy system if there is sufficient optimal data in the look up table. A comparison among these five PMS design approaches is given in Table 3.1.

TABLE 3.1

Comparison of five PMS design approaches

| Method | Advantages | Disadvantages |
| --- | --- | --- |
| Rule-based | Simple, easy to implement | Intuitive, difficult to obtain exact rules |
| SQP | Well developed nonlinear optimization method | Static optimization |
| DP | Global optimization | Time consuming, the future load profile is needed |
| Fuzzy rule-based | Practical, robust, easy to implement online | Difficult to obtain expert data to design fuzzy rule |
| Look up table | Practical, easy to implement online | Not robust against environmental variations |

3.2. Optimal PMS Design Procedure for DG System

The design procedure preferably begins with formulating the problem, defining a cost function, and then selecting a reliable and state-of-the-art optimization algorithm. The algorithm is preferably applied to minimize the cost function and optimize power distribution among multiple units. Finally, the feasible control rules, summarized from the statistical analysis of the optimal solution, are employed to develop a PMS for online power distribution implementation. The performance of the power management strategy is validated in the DG unit model, described herein. Finding the optimal power distribution will be described in this chapter.

3.3. Introduction to SQP

A cost function was developed that included a set of constraints. The cost function of system efficiency includes distributed load power for each unit, and an efficiency map of each unit. The power distribution was formulated as a constrained nonlinear optimization problem. In the meantime, the system efficiency should be maximized and a set of constraints should be satisfied.

SQP techniques are applied to solve the optimization problem. The optimizer can make well-informed decisions regarding directions of search and step length. The SQP subroutine in the Matlab optimization toolbox performs these steps:

1. Initialize;
2. Calculate the gradient of the cost function given the constraints;
3. Define a positive definite Hessian matrix using the BFGS formula based on the cost function and constraints;
4. Solve the quadratic programming (QP) problem using a modified simplex method;
5. Use linear search and merit function method to determine the new search direction and step size;
6. Check whether the termination criterion is satisfied; if not, then go to step 2.

It can be seen that in this embodiment, at each iteration of the SQP method, a QP sub-problem is solved, and an estimate of the Hessian of the Lagrangian is updated at each iteration using the Broyden-Fletcher-Goldfarb-Shanno (BFGS) Formula. Therefore, the SQP method converts the original optimization problem to a QP problem using the quadratic approximation of the objective function and the constraints. The SQP method closely mimics Newton's method for constrained optimization just as is done for unconstrained optimization. At each major iteration, an approximation is made of the Hessian of the Lagrangian function using a quasi-Newton updating method. This is then used to generate a QP sub-problem whose solution is used to form a search direction for a line search procedure.

3.4. How to Optimize the Problem in Matlab

In the Matlab optimization toolbox, the functions fmincon, fminimax, fgoalattain, and fseminf each use SQP. Among them, fmincon attempts to find a minimum of a constrained nonlinear multivariable function starting at an initial estimate. This is generally referred to as constrained nonlinear optimization or nonlinear programming.

3.5. Initial Value xo

The fmincon function does work properly, but the function fmincon will usually return a local minimizer in the vicinity of the starting point that the user supplies. If the model has more than one local minimizer, then different answers may be obtained for different starting points because the solver may converge to different solutions depending on the starting point. The user, using knowledge about the problem, provides the initial start point. Therefore, one should choose the initial vector xo to be in the feasible set.

If the problem has more than one local minimizer, a common approach is to sample the problem domain and optimize from different initial guesses. Therefore, all the local minimizers should be found and then the global minimum should be searched from those local minimizers.

A second option to increase the chances of finding the global minimizer for a nonlinear function is to run a genetic algorithm (GA), like the GA solver in the Genetic Algorithm and Direct Search Toolbox. However, this algorithm does not admit nonlinear constraints. A third option is to run PATTERNSEARCH solver, which admits nonlinear constraints.

A fourth option is to obtain all the local optimizers of different starting points xo by sampling the domain of the variables. Because the optimal minimizer is not only one point, but rather, a sequence of data points, the problem was divided into several regions. In each region, the problem domain was sampled from different initial guess xo. The global minimizer was then obtained.

3.6. Problem Formulations and Solutions

The optimization problem can be formulated as follows. To maximize system efficiency $f = f(x_i)$; is the same as minimizing $F = 1/f(x_i)$;

Subject to Constraints:

$$x_1 + x_2 + \ldots + x = P_{out};$$

$$0 \leq x_1 \leq c_1;$$

$$0 \leq x_2 \leq c_2;$$

$$0 \leq x_3 \leq c_3;$$

$$\ldots$$

$$0 \leq x_i \leq c_i$$

In the experiments described in this Part, two types of DG units were used. One type is a 75 kw unit; the other is a 150 kw unit. Five different configurations are discussed:

- Two identical 75 kw units.
- Three identical 75 kw units.
- Two different units with one 75 kw and one 150 kw.
- Three different units with two 75 kw and one 150 kw unit.
- Three different units with one 75 kw unit and two 150 kw units.

The system efficiency optimization for each of these five scenarios will be analyzed herein. Each configuration will be formulated with a certain cost function. With each of these cost functions, the SQP method was used to obtain the optimized solutions by using the Matlab optimization toolbox. Two identical 75 kw units will be evaluated first.

3.6.1. Two Identical 75 kw Units
3.6.1.1. Problem Formulation

The total system efficiency is derived as follows:

$$\text{System efficiency} = \frac{\text{Total output power}}{\text{Total input power}}$$

$$= \frac{\text{Total load power request}}{(\text{unit 1 input power} + \text{unit 2 input power})}$$

$$= \frac{\text{Total load power request}}{\left(\frac{\text{unit 1 output power}}{\text{efficiency}} + \frac{\text{unit 2 output power}}{\text{efficiency}}\right)}$$

$$= \frac{P_{total}}{(x_1/\eta(x_1) + x_2/\eta(x_2))};$$

Where, $P_{total}$ is the total load power request, $x_1$ and $x_2$ are the distributed load power for unit 1 and unit 2 respectively; $\eta$ is the efficiency map, which is a curve representing efficiency vs. output power. Original efficiency data was obtained from a company, and the efficiency function q was obtained by curve fitting. For a given $P_{total}$, the above efficiency maximization problem is the same as minimizing the following cost function:

Minimize:

$$F = x_1/\eta(x_1) + x_2/\eta(x_2);$$

$$x_1 + x_2 = P_{total};$$

subject to:

$$0 \leq x_1 \leq 75 \text{ kw};$$

$$0 \leq x_2 \leq 75 \text{ kw}.$$

It is a nonlinear optimization problem with linear constraints. The SQP was used to solve this problem in Matlab. The next subsection shows the optimal efficiency solution.

3.6.1.2. Optimal Solution Results for Two Identical 75 kw Units

Figure 4:
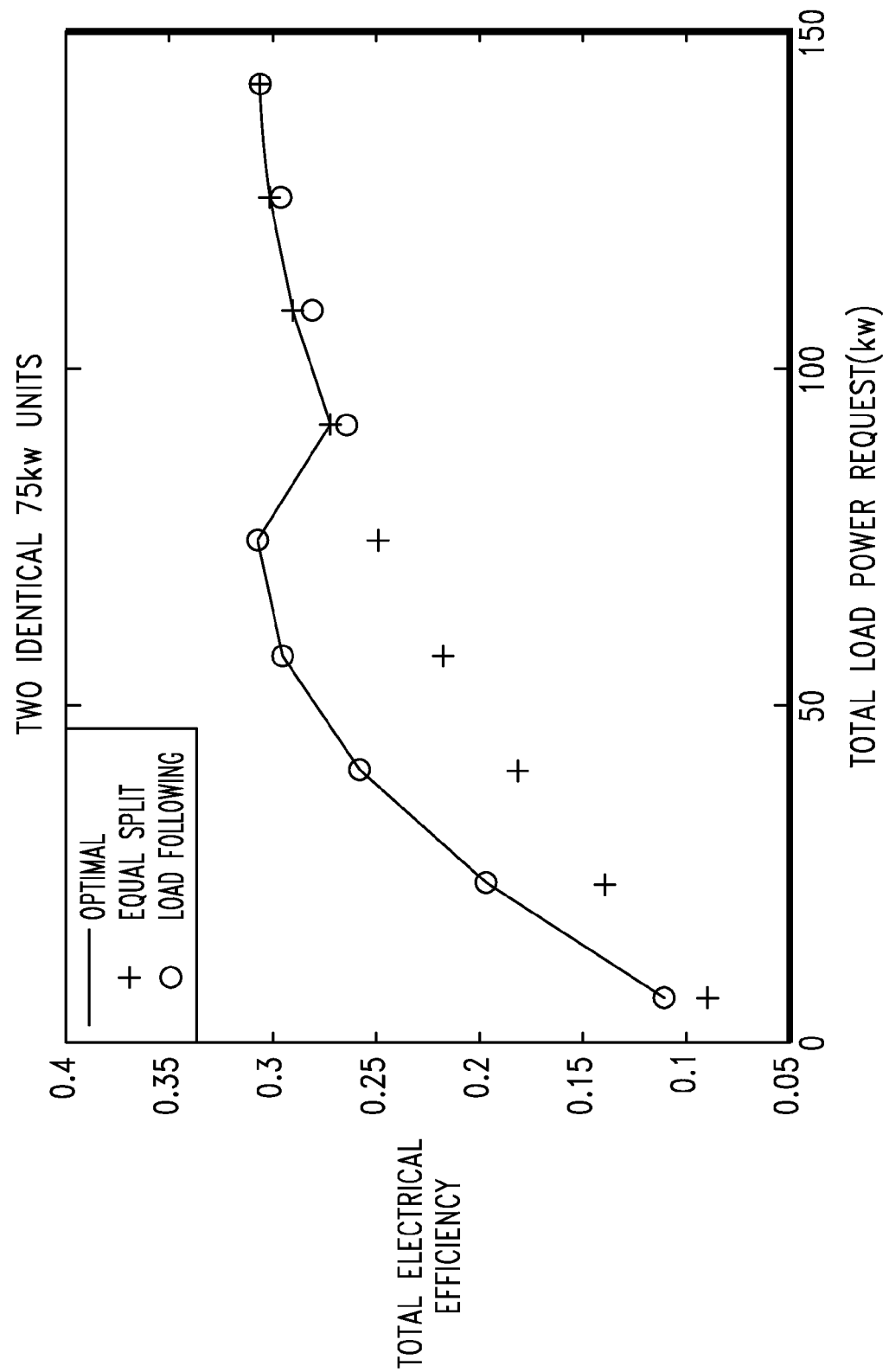
FIG. 4 is a graph of system efficiency versus load power for optimal, rule-based, and load-following power distribution in a system having two 75 kw units.

The optimal solution results are depicted in FIG. 4. The X-axis represents the total load power request, and the Y-axis represents system electrical efficiency. There are three power distribution methods underlying this graph. The first method is the optimal power distribution, which is the continuous line. The second method is the equal split power method, which is represented by the "+" curve, and the third method is the load following method, which is represented by the "o" curve. Load following in this case means one unit runs as the master unit and always takes the load power. When the master unit alone is not enough for the total load power request, then the second unit takes the remaining load power. This continues when there are more than two units. From the graph, we can see that the system efficiency of optimal power distribution has higher performance than that of equal split method or load following method when power is distributed between two 75 kw units.

Figure 5:
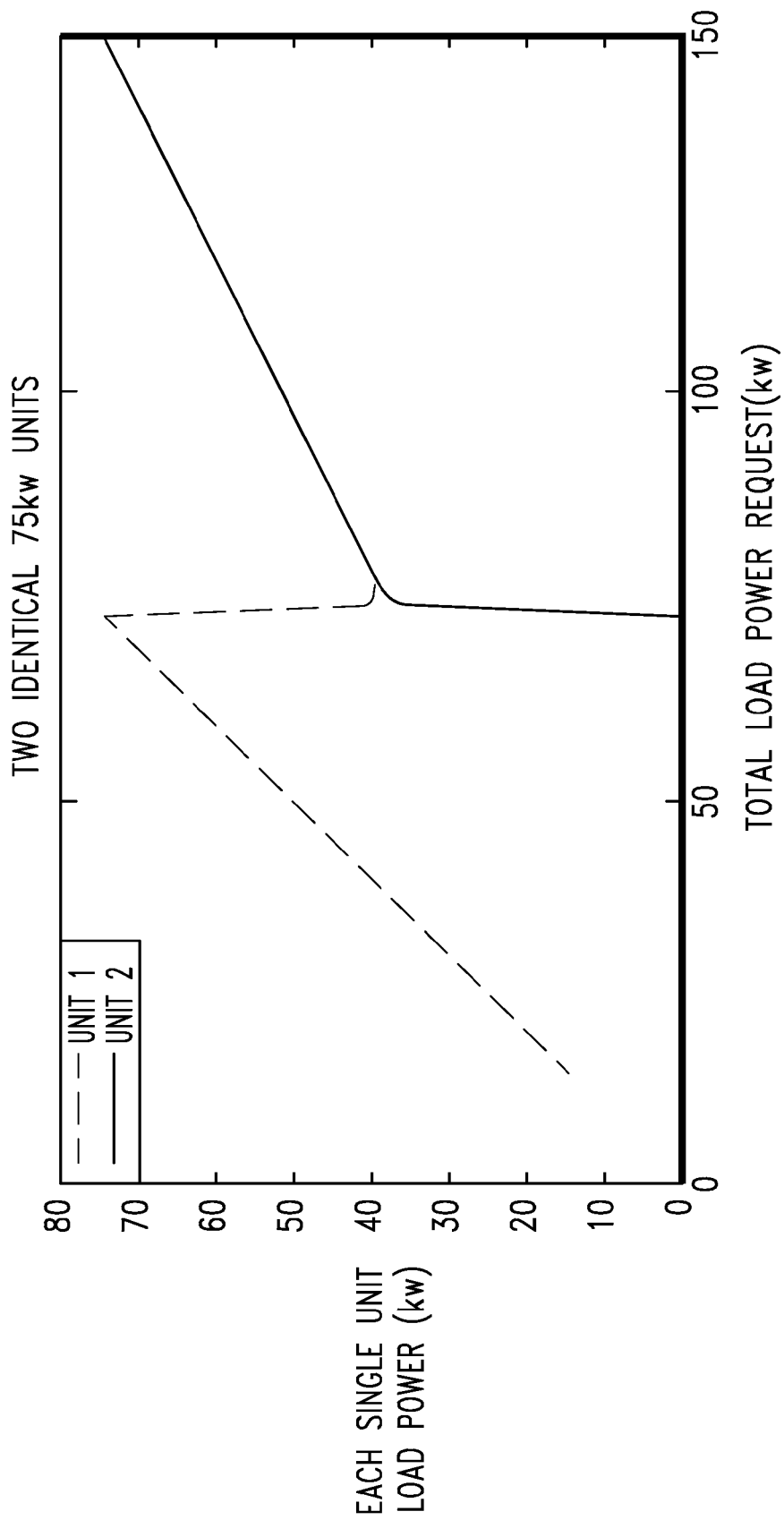
FIG. 5 is a graph of load power output in a system having two 75 kw units.

We also can see that when the total load power request is less than or equal to 75 kw, the optimal efficiency is almost the same as load following mode. When the total load power request is greater than 75 kw, the optimal efficiency is almost the same as the equal split mode. FIG. 5 shows how optimal PMS distributes power between these two 75 kw units.

There is a pattern in the optimal solution. When the total load power request is less than or equal to 75 kw, only unit 1 runs and unit 2 does not run. When the total load power request is greater than 75 kw, the power is split equally between unit 1 and unit 2.

3.6.2. Three Identical 75 kw Units
3.6.2.1. Problem Formulation
The total system efficiency is derived as follows:

$$\text{System efficiency} = P_{total}/(x_1/\eta(x_1) + x_2/\eta(x_2) + x_3/\eta(x_3));$$

Where $x_1$, $x_2$, and $x_3$ are the power generation assignments for unit 1, unit 2, and unit 3, respectively. The above efficiency maximization problem for a given $P_{total}$ is the same as minimizing the following cost function:

Minimize:

$$F = x_1/\eta(x_1) + x_2/\eta(x_2) + x_3/\eta(x_3);$$

$$x_1 + x_2 + x_3 = P_{total};$$

Subject to:

$$0 \leq x_1 \leq 75 \text{ kw};$$

$$0 \leq x_2 \leq 75 \text{ kw};$$

$$0 \leq x_3 \leq 75 \text{ kw};$$

This is a nonlinear optimization problem with linear constraints. The SQP was used to solve it in Matlab.

Figure 6:
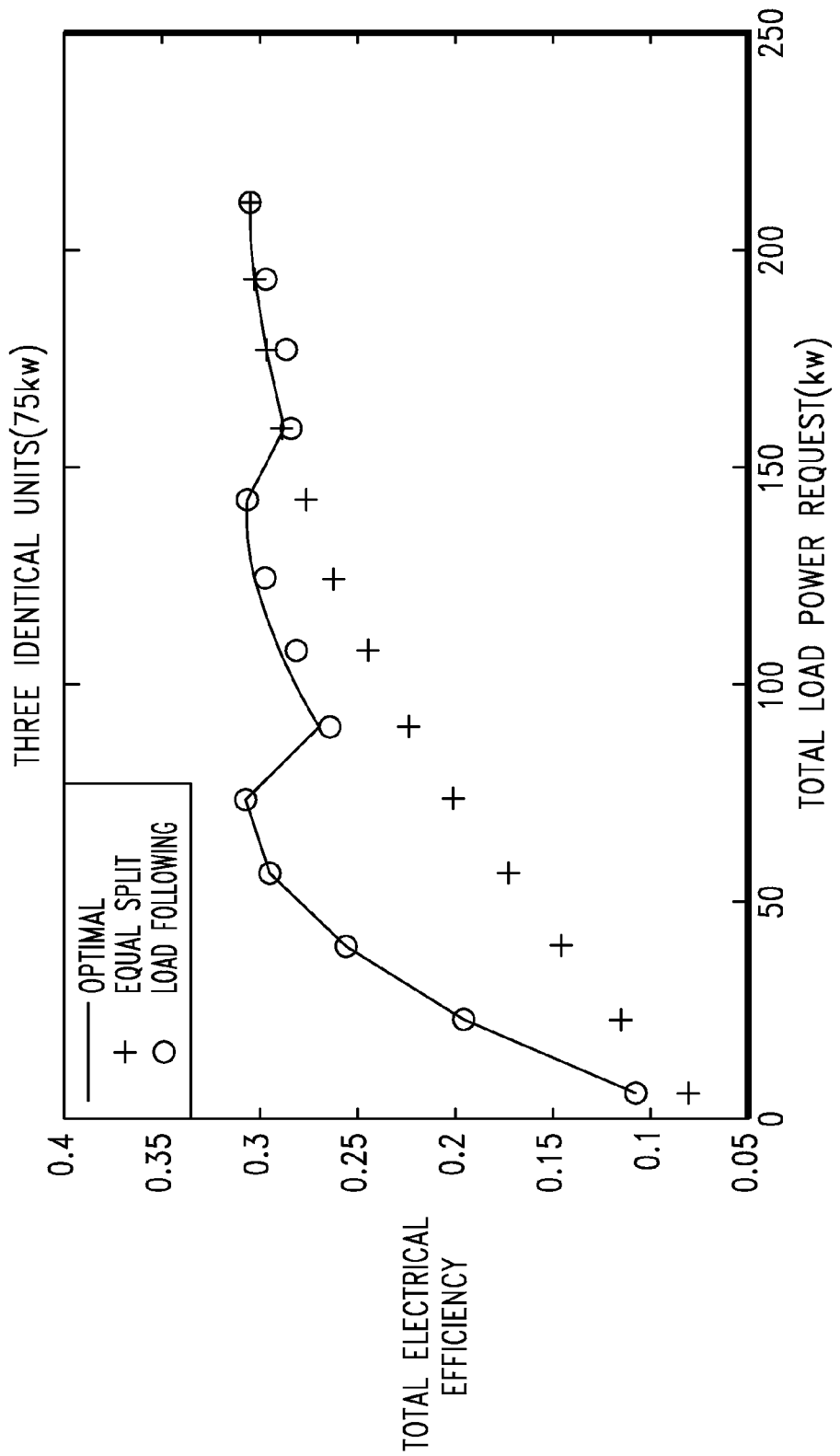
FIG. 6 is a graph of system efficiency versus requested load power for optimal, equal-split and load-following power distribution strategies in a system having two 75 kw units.

3.6.2.2. Optimal Solution Result for Three Identical 75 kw Units
The optimal solution results are depicted in FIG. 6. From the graph, we can see that the system efficiency of optimal power distribution has higher performance than that of the equal split method or the load following method for this configuration.

Figure 7:
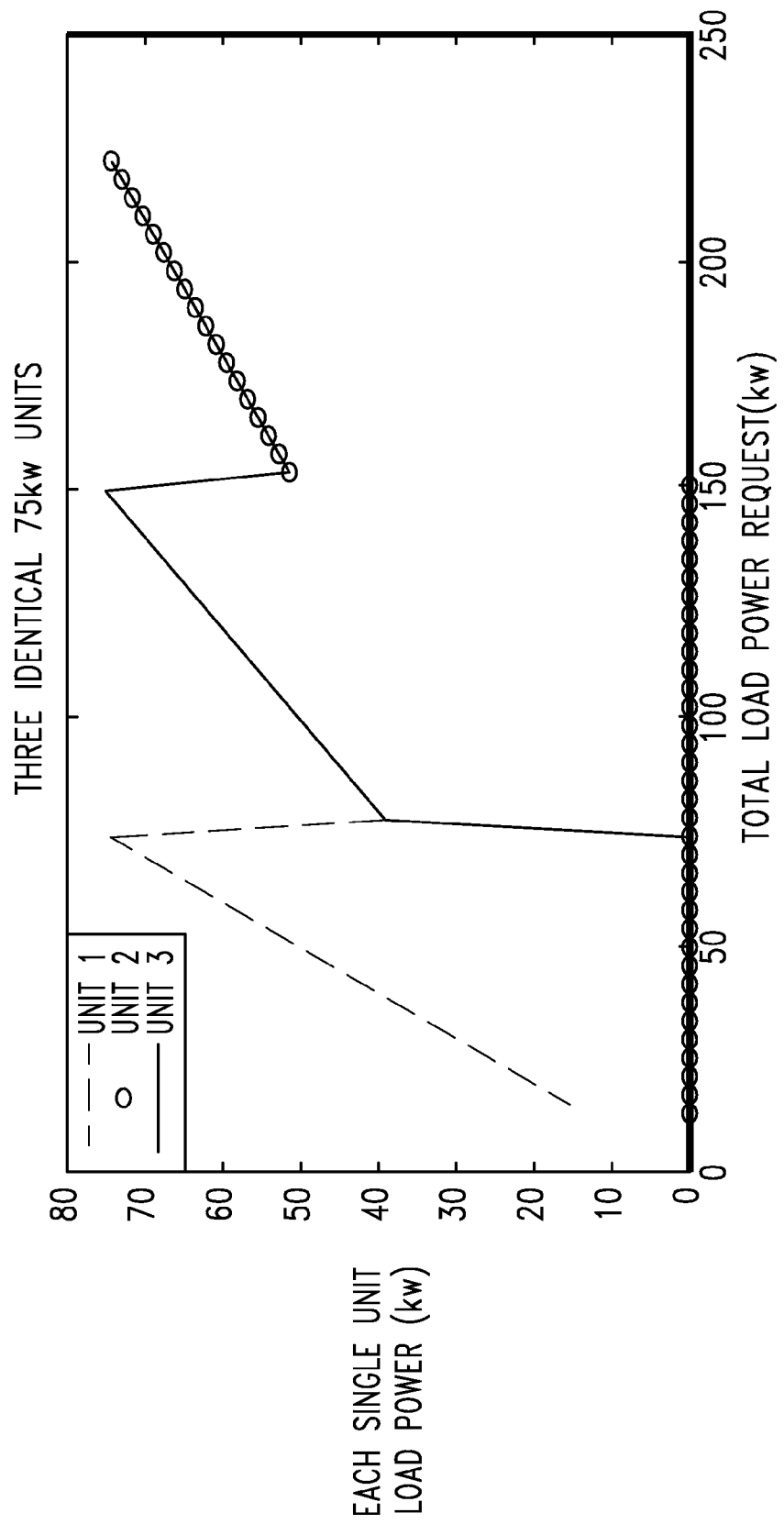
FIG. 7 is a graph of unit load power versus total requested load power for a system of three 75 kw units.

We also can see that when the total load power request is less than or equal to 75 kw, the optimal efficiency is almost the same as the load following mode. When the total load power request is greater than 150 kw, the optimal efficiency is almost the same as the equal split mode. FIG. 7 shows how optimal PMS distributes power among these three 75 kw units.

There is a logical pattern in the optimal solution. When the total load power request is in the interval of [0 75] kw, only unit 1 runs. When the total load power request is in the interval of (75 150] kw, the power is split equally between unit 1 and unit 2, and unit 3 does not run. When the total load power request is in the interval (150 225] kw, the power is split equally among three units, as in equal split mode. Two different units will be evaluated now. When identical units are not used, there is no obvious pattern in some regions.

3.6.3. Two Different Units with One 75 kw Unit and One 150 kw Unit
3.6.3.1. Problem Formulation
The total system efficiency is derived as follows:

$$\text{System efficiency} = P_{total}/x/\eta_1(x_1) + x_2/\eta_2(x_2));$$

Where, $x_i$ is for 75 kw unit, $x_2$ is for 150 kw unit and $\eta_2$ is the efficiency map for 150 kw unit. In this configuration, $\eta_1$ and $\eta_2$ are different functions.

The above efficiency maximization problem for a given $P_{total}$ is the same as minimizing the following cost function:

Minimize:

$$F = x_1/\eta_1(x_1) + x_2/\eta_2(x_2);$$

Subject to:

$$x_1 + x = P_{total};$$

$$0 \leq x_1 \leq 75 \text{ kw};$$

$$0 \leq x_2 \leq 150 \text{ kw}.$$

This is a nonlinear optimization problem with linear constraints. The SQP was used to solve the problem in Matlab.

Figure 8:
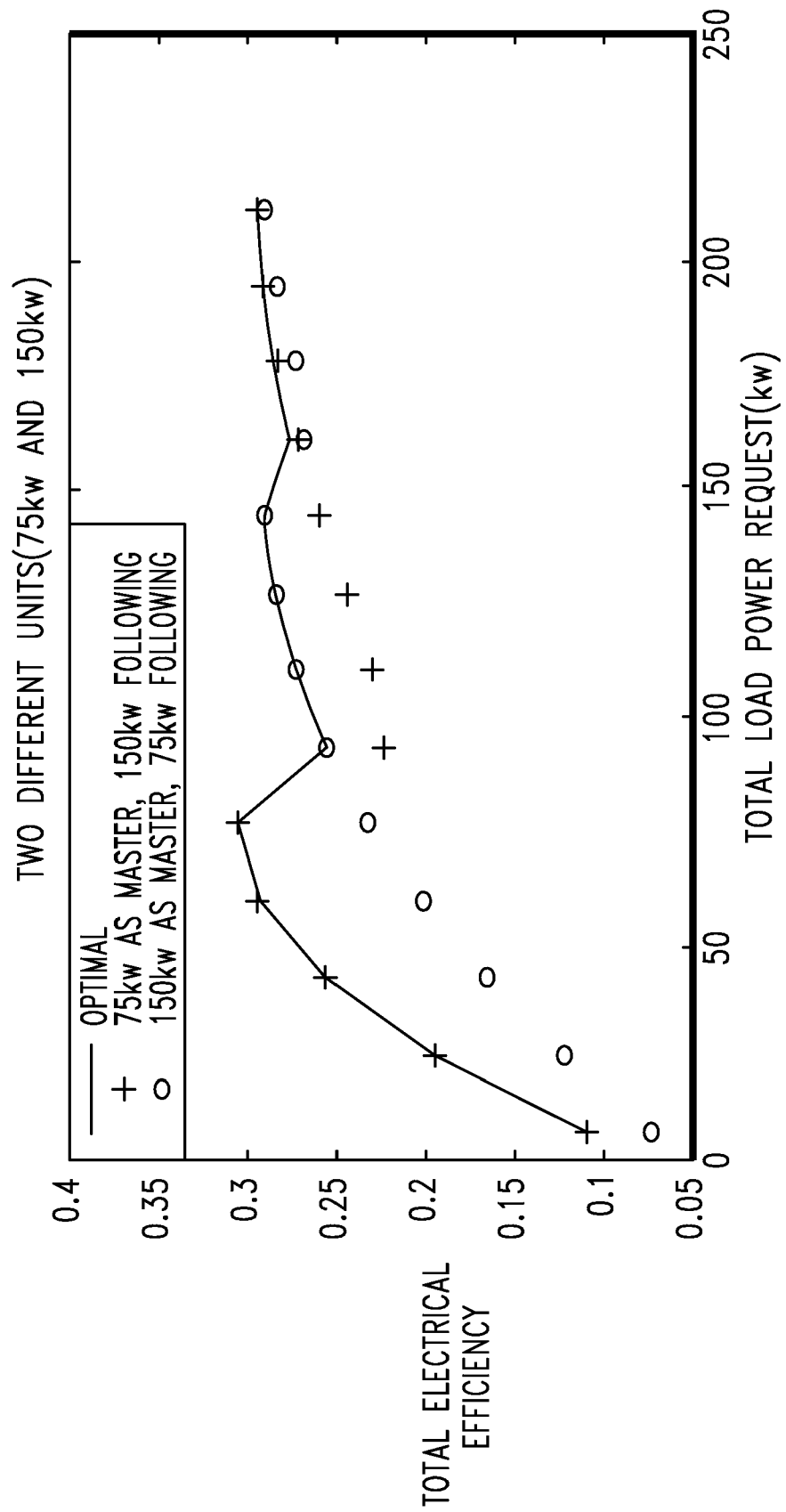
FIG. 8 is a graph of system efficiency versus requested load power for optimal, equal-split and load-following power distribution strategies in a system having one 75 kw unit and one 150 kw unit.

3.6.3.2. Optimal Solution for Two Different Units with One 75 Kw Unit and One 150 Kw Unit
The optimal solution results for this configuration are depicted in FIG. 8. When there are different units, there is no equal split mode, and there are two different load following methods. One method uses the 75 kw unit as the master unit with a 150 kw unit following. The other method uses a 150 kw unit as the master unit with a 75 kw unit following. These two load following methods can result in different system efficiencies. From the graph, we can see that the system efficiency of optimal power distribution has higher performance than that of load following methods when power is distributed between two different units.

Figure 9:
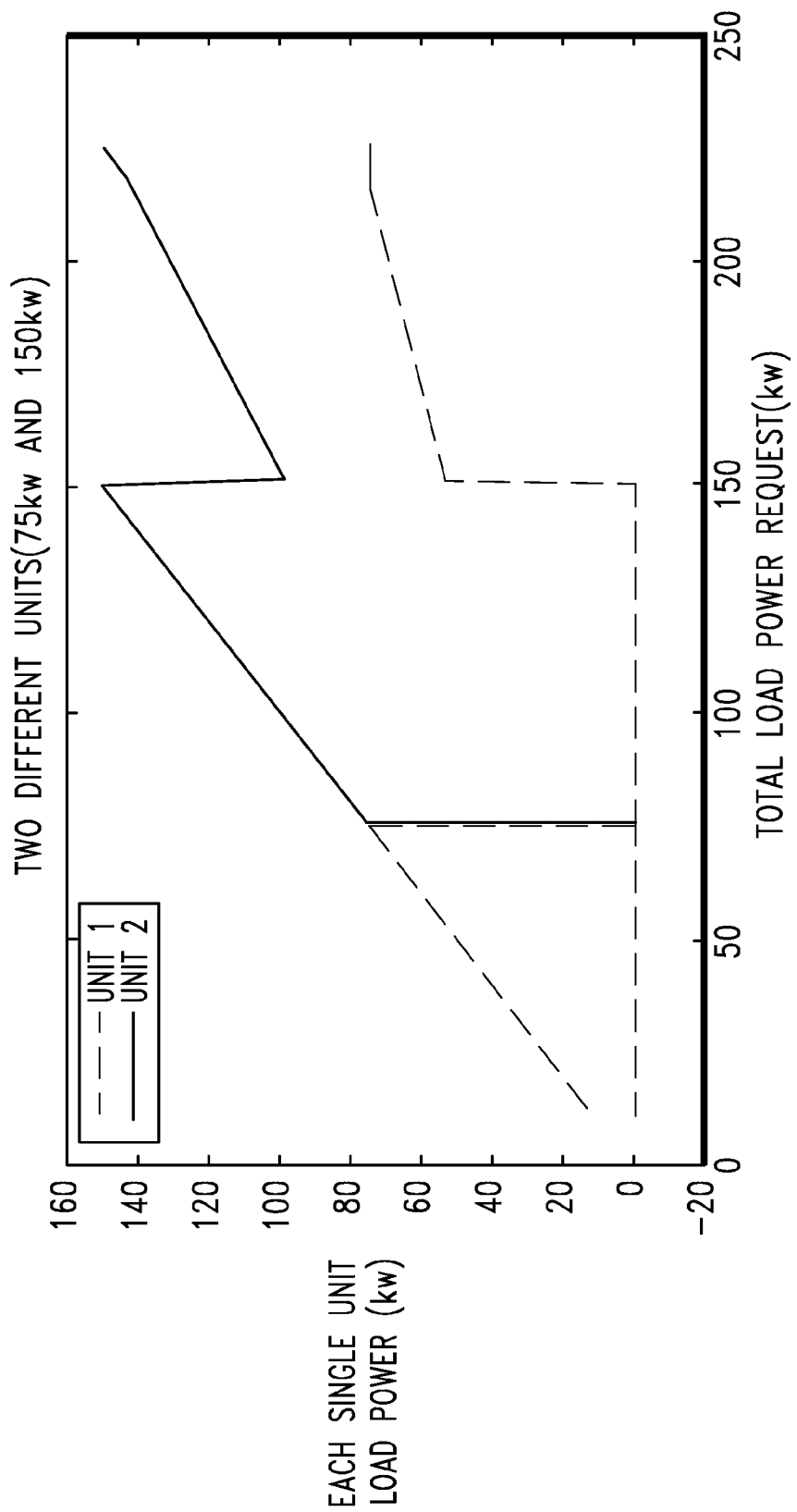
FIG. 9 is a graph of unit load power versus total requested load power for a system of one 75 kw unit and one 150 kw unit.

We also can see that when the total load power request is in the interval of [0 75] kw, the optimal efficiency is almost the same as the first load following mode (75 kw unit as master). When the total load power request is in the interval of (75 150] kw, the optimal efficiency is almost the same as the second load following mode (150 kw unit as master). When the total load power request is in the interval of (150 225] kw, the optimal efficiency is different from either load following mode. FIG. 9 shows how optimal PMS distributes power between these two different units.

There is a pattern in the optimal solution. When the total load power request is in the interval of [0 75] kw, only the 75 kw unit (unit 1) runs. When the total load power request is in the interval of (75 150] kw, only the 150 kw unit runs, and the 75 kw unit does not run. When the total load power request is in the interval of (150 225] kw, then the total load power request is distributed between the 75 kw unit and the 150 kw unit. There is no obvious pattern for $P_{total} > 150$ kw. Because of that, a fuzzy logic controller for online implementation was used in this region.

3.6.4. Three Different Units with Two 75 kw Units and One 150 kw Unit
3.6.4.1. Problem Formulation
The total system efficiency is derived as follows:

$$\text{System efficiency} = P_{total}/(x_1/\eta_1(x_1) + x_2/\eta_1(x_2) + x_3/\eta_2(x_3));$$

Where, $x_1$, $x_2$, and $x_3$ are for one 75 kw unit, the other 75 kw unit, and a 150 kw unit, respectively. The above efficiency maximization problem for a given $P_{total}$ is the same as minimizing the following cost function:

Minimize $$F = (x_1/\eta_1(x_1) + x_2/\eta_1(x_2) + x_3/\eta_2(x_3);$$

Subject to:

$$x_1 + x_2 + x_3 = P_{total};$$

$$0 \leq x_1 \leq 75 \text{ kw};$$

$$0 \leq x_2 \leq 75 \text{ kw};$$

$$0 \leq x_3 \leq 150 \text{ kw}.$$

This is a nonlinear optimization problem with linear constraints. The SQP was used to solve it in Matlab.

Figure 10:
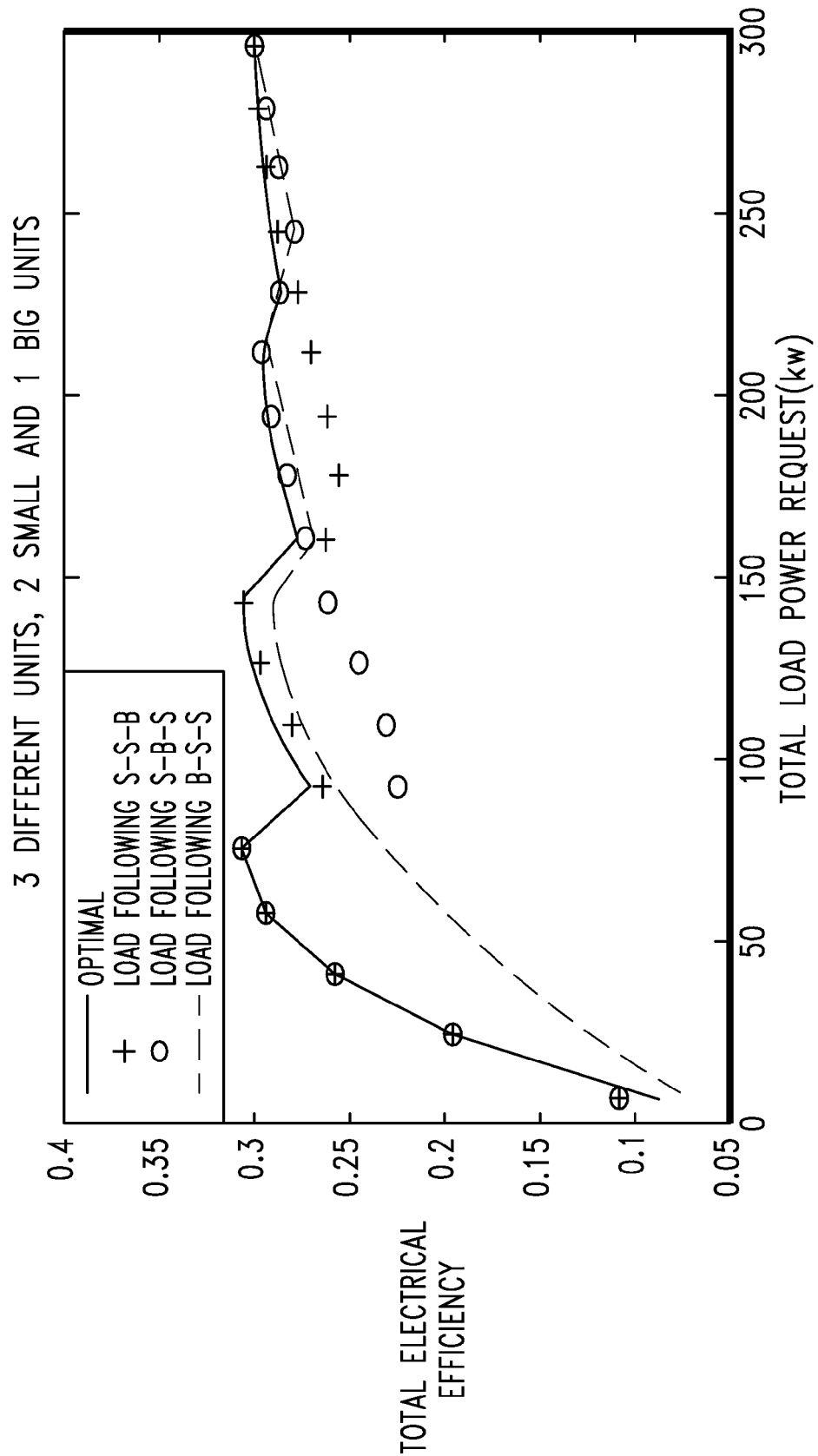
FIG. 10 is a graph of total system efficiency versus total requested load power for a system of two 75 kw units and one 150 kw unit.

The optimal solution results are depicted in FIG. 10. There are three different load following methods for this configuration. One method is S-S-B; "S" indicates the small unit, 75 kw, and "B" indicates the big unit, 150 kw. For S-S-B, 75 kw unit (unit 1) was the master, and the other 75 kw unit (unit 2) follows as the second unit with the 150 kw unit (unit 3) following as the last unit. The other two methods are S-B-S and B-S-S. These three different load following methods can result in different system efficiencies. From the graph, it can be seen that the system efficiency of optimal power distribution has higher performance than that of the three load following methods when load power is distributed among these three different units.

3.6.4.2. Optimal Solution Result

Figure 11:
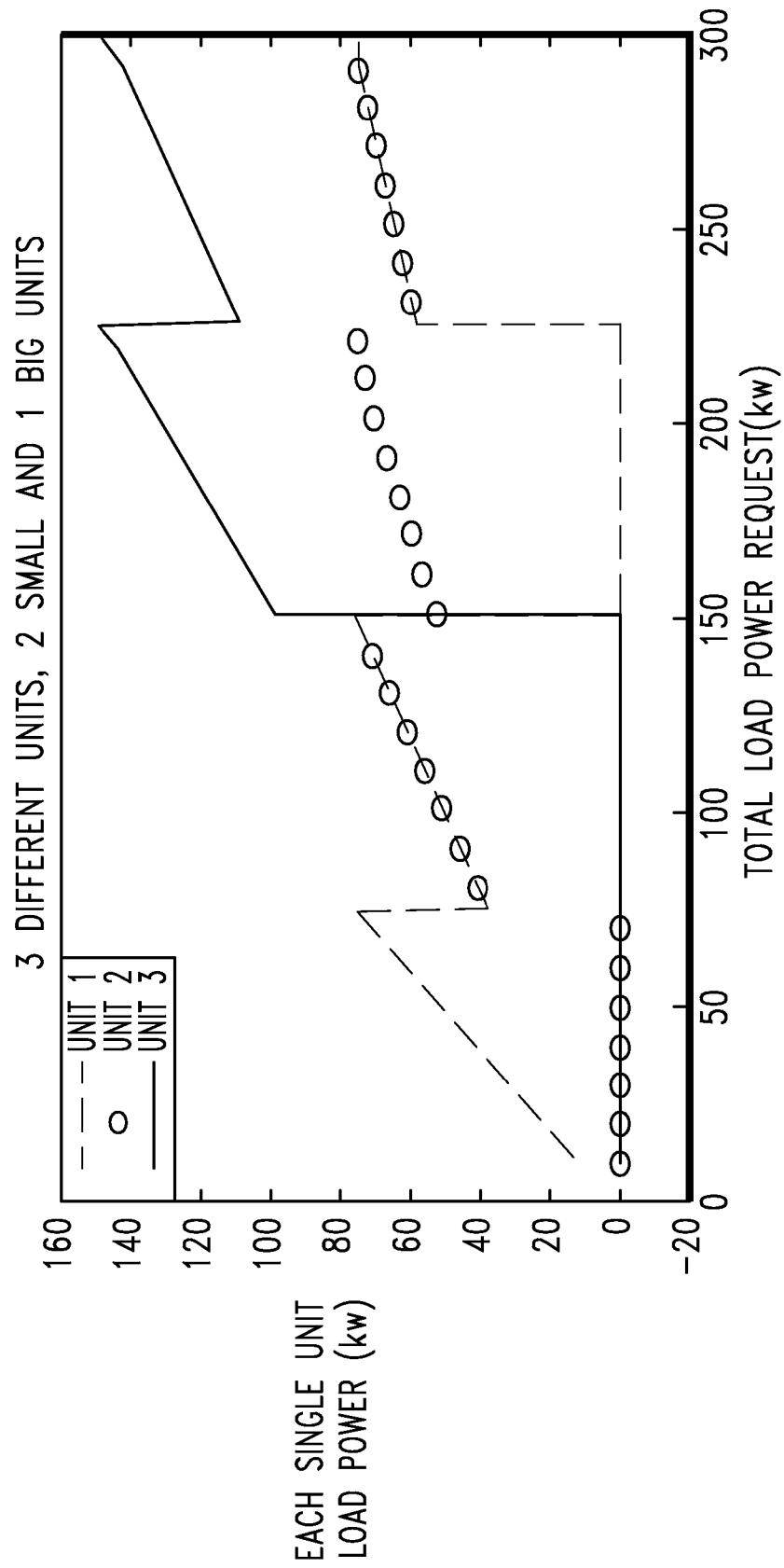
FIG. 11 is a graph of unit load power versus total requested load power for a system of two 75 kw units and one 150 kw unit.

It also can be seen from FIG. 10 that when the total load power request is less than or equal to 75 kw, the optimal system efficiency is almost the same as the system efficiency of the S-S-B and S-B-S load following methods. When the total load power request is in the interval of (75 300] kw, the optimal system efficiency is better than the system efficiency of all load following modes. FIG. 11 shows how optimal PMS distributes power among these three different units.

There is a logical pattern in the optimal solution. When the total load power request is in the interval of [0 75] kw, only the 75 kw unit (unit 1) runs. When the total load power request is in the interval of (75 150] kw, two 75 kw units (unit 1 and unit 2) split the total load power equally and the 150 kw unit (unit 3) does not run. When the total load power request is in the interval of (150 225] kw, one 75 kw unit (unit 1) does not run. The load power is distributed between the other 75 kw unit (unit 2) and the 150 kw unit (unit 3). There is no obvious pattern in this case. Because of that, a fuzzy logic controller for online implementation was used in this region. When the total load power request is in the interval of (225 300] kw, the load power is distributed between two 75 kw units and one 150 kw units. There is no obvious pattern in this case except that the two 75 kw units run at the same load power. Because of that, a fuzzy logic controller for online implementation was used in this region to distribute power between two 75 kw units and one 150 kw unit, and a mathematical rule is used at the same time to allow the two 75 kw units to provide identical output.

3.6.5. Three Different Units with One 75 Kw Unit and Two 150 Kw Units 3.6.5.1. Problem Formulation The total system efficiency for this configuration is derived as follows:

$$\text{System efficiency} = P_{total}/(x_1/\eta_1(x_1) + x_2/\eta_1(x_2) + x_3/\eta_2(x_3));$$

where $x_i$ is for the 75 kw unit, both $x_2$ and $x_3$ are for the 150 kw units. For a given $P_{total}$, the above efficiency maximization problem is the same as minimizing the following cost function:

Minimize:

$$F = (x_1/\eta_1(x_1) + x_2/\eta_2(x_2) + x_3/\eta_2(x_3));$$

$$x_1 + x_2 + x_3 = P_{total};$$

Subject to:

$$0 \leq x_1 \leq 75 \text{ kw};$$

$$0 \leq x_2 \leq 150 \text{ kw};$$

$$0 \leq x_3 \leq 150 \text{ kw}.$$

This is a nonlinear optimization problem with linear constraints. The SQP was used to solve the problem in Matlab.

3.6.5.2. Optimal Solution Results

Figure 12:
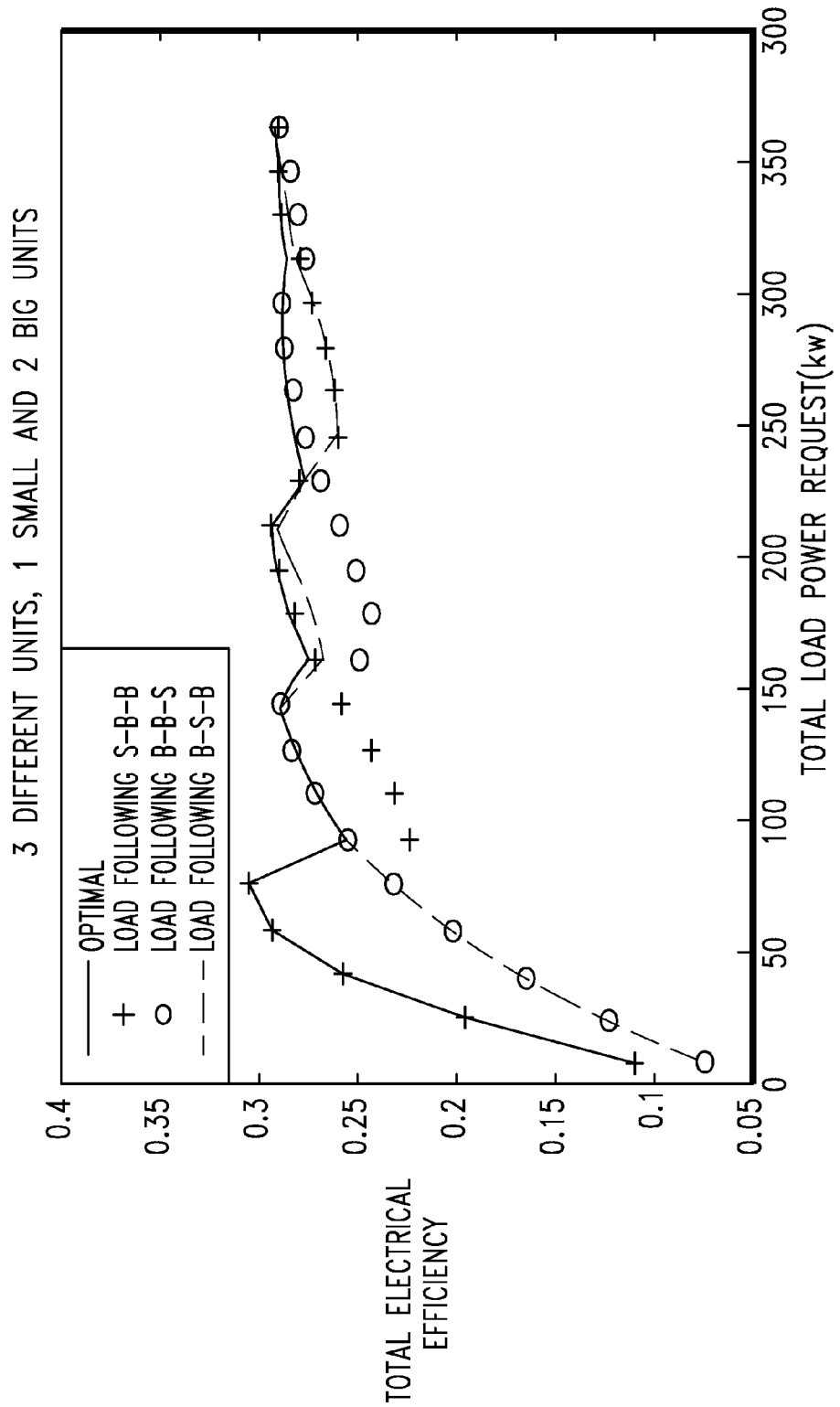
FIG. 12 is a graph of total system efficiency versus total requested load power for a system of two 75 kw units and one 150 kw unit.

The optimal solution results for this configuration are depicted in FIG. 12. There are three different load following methods for this configuration. For the S-B-B method, 75 kw unit (unit 1) was master and the 150 kw unit (unit 2) follows as the second with 150 kw unit (unit 3) following as the last unit. The other two methods are B-B-S and B-S-B. These three different load following methods can result in different system efficiencies. From the graph, it can be seen that the system efficiency of optimal power distribution has higher performance than that of three load following methods when load power is distributed among these three different units.

Figure 13:
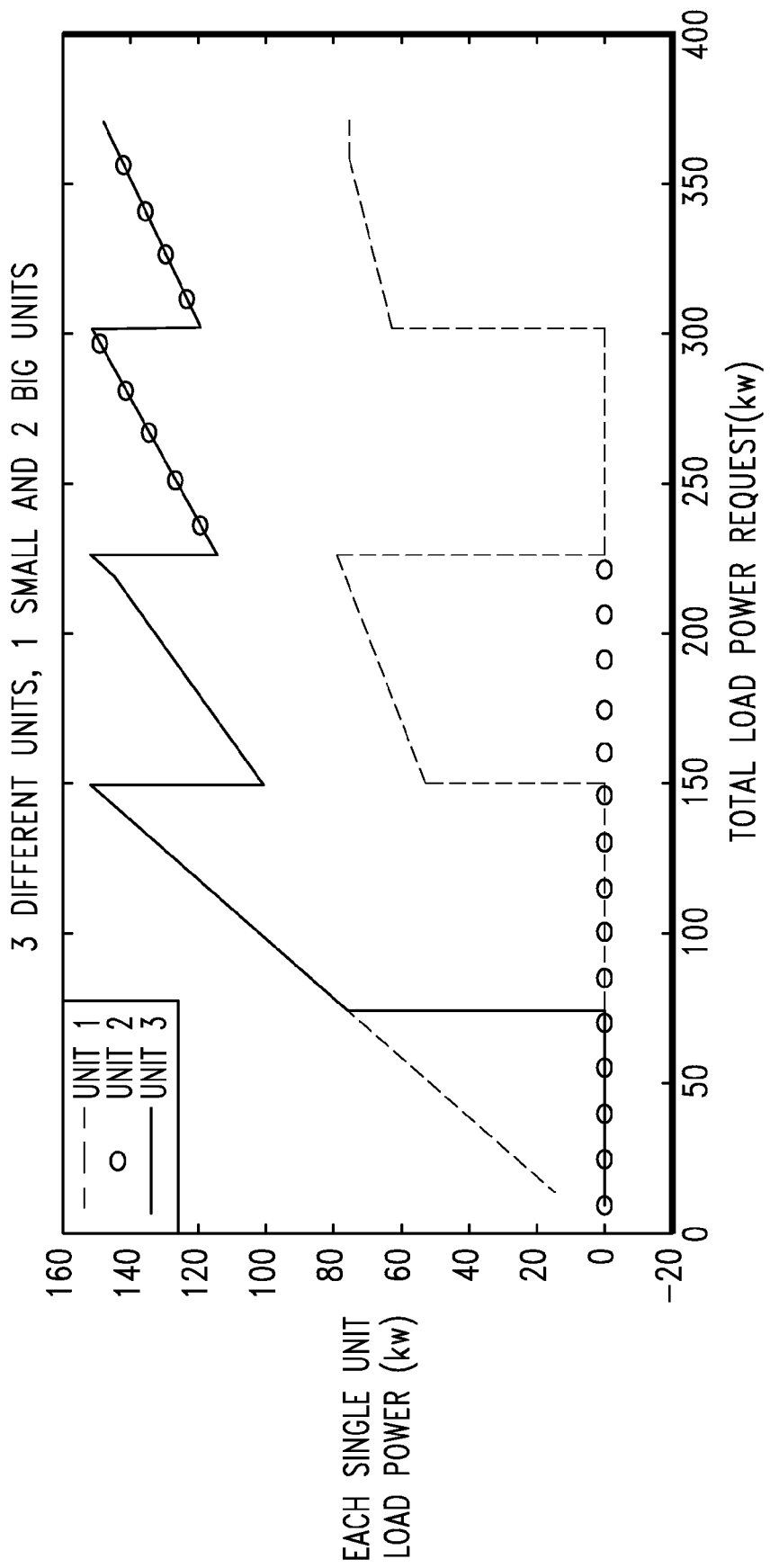
FIG. 13 is a graph of unit load power versus total requested load power for a system of one 75 kw unit and two 150 kw units.

It also can be seen that when the total load power request is less than or equal to 75 kw, the optimal system efficiency is almost the same as the system efficiency of the SB-B load following method. When the total load power request is in the interval of (75 150) kw, the optimal system efficiency is the same as the system efficiency of B-S-B and B-B-S load following methods. When the total load power request is in the interval of (150 375] kw, the optimal system efficiency is better than that of all load following methods. FIG. 13 shows how optimal PMS distributes power among these three different units.

Figure 14:
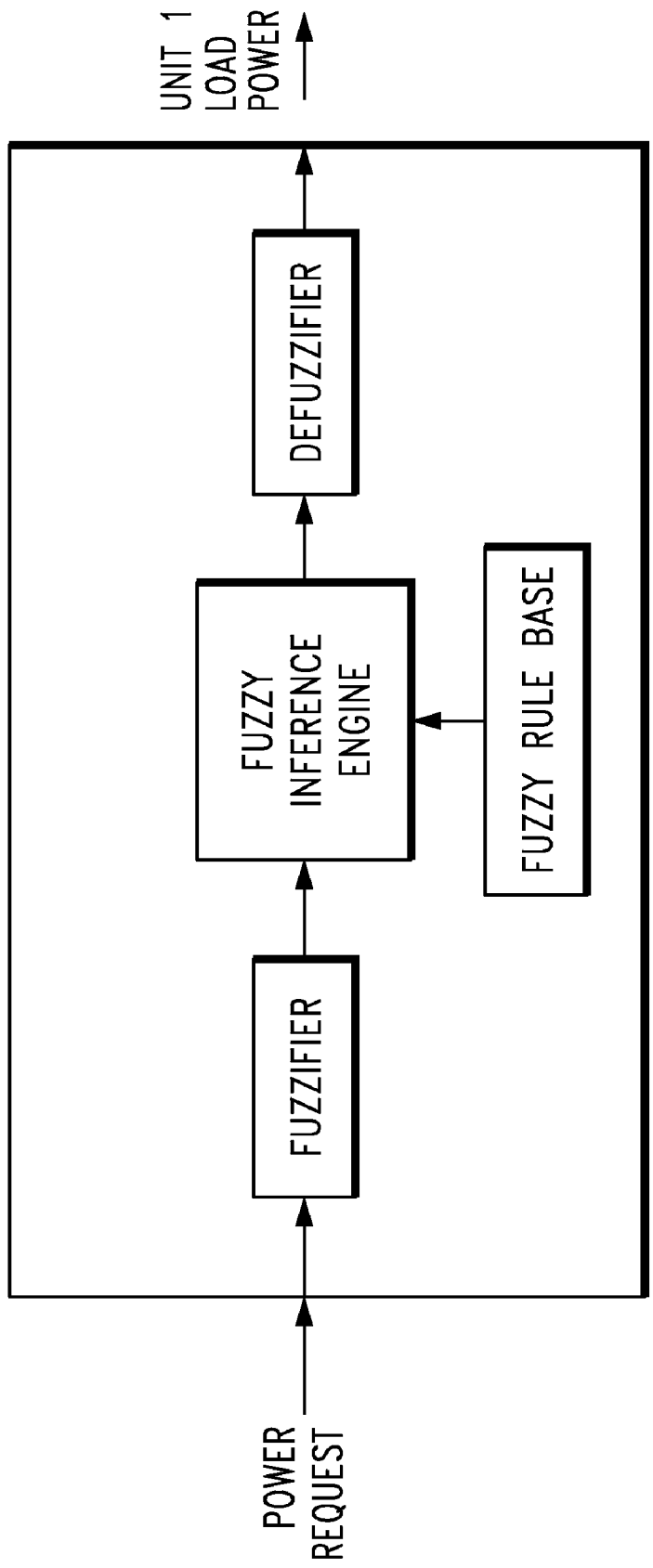
FIG. 14 is a block diagram of a fuzzy controller for use in connection with any DG system.

There is also a pattern in the optimal solution. When the total load power request is in the interval of [0 75] kw, only the 75 kw unit (unit 1) runs. When the total load power request is in the interval of (75 150] kw, only one of the 150 kw units (unit 3) runs and the other units do not run. When the total load power request is in the interval of (150 225] kw, one of the 150 kw units (unit 2) does not run and the load power is distributed between the 75 kw unit (unit 1) and another 150 kw unit (unit 3). There is no obvious pattern in this case. Because of that, the fuzzy logic controller illustrated in FIG. 14 was used in this region for online implementation. When the total load power request is in the interval of (225 300] kw, the 75 kw unit (unit 1) does not run, and the two 150 kw units (unit 2 and unit 3) equally split the total load power. When the total load power request is in the interval of (300 375] kw, the load power is distributed between one 75 kw unit and two 150 kw units, and there is no obvious pattern in this case except that the two 150 kw units run at the same load power. Because of that, a fuzzy logic controller for online implementation was used in this region to distribute power between one 75 kw unit and two 150 kw units, and a mathematical rule is used at the same time to allow the two 150 kw units to provide identical output.

3.7. Result Analysis and Comparison Between Different Configurations 3.7.1. Optimal Results Analysis The simulation results of the above five configurations demonstrated that the proposed optimal PMS improved the system efficiency significantly compared to the current rule-based PMS. The next step is to implement the optimal PMS algorithm in real time.

3.7.2. Optimal PMS Implementation

The optimal PMS have several drawbacks:
1. The SQP algorithm has a complex structure; therefore, more computing power would make the PMS online implementation more feasible.
2. The optimal PMS design is not robust enough against the environmental variations and external disturbances. The efficiency map used in the optimization algorithm was based on a specific temperature and altitude. Therefore, more efficiency and robust PMS should be developed to distribute power among multiple DG units.

In this Part, two methods are developed to implement optimal PMS. They are rule-based PMS and hybrid fuzzy rule-based (rule-based and fuzzy rule-based) PMS. The hybrid fuzzy rule-based PMS combined both crisp logic and fuzzy logic. Table 3.2 shows the control rules summarized from the statistical analysis of the optimal solution and the implementation methods for each configuration.

TABLE 3.2

Comparison of the optimal power distributions
and their implementations for five different configurations

| # | Configuration | $P_{total}$ (kw) | Unit 1 | Unit 2 | Unit 3 | Implementation |
|---|---|---|---|---|---|---|
| 1 | Two identical 75 kw units<br>Unit 1-75 kw<br>Unit 2-75 kw | [0 75]<br>(75 150] | $P_{total}$<br>/2 | 0<br>/2 | N/A<br>N/A | Rule-based |
| 2 | Three identical 75 kw units<br>Unit 1-75 kw<br>Unit 2-75 kw<br>Unit 3-75 kw | [0 75]<br>(75 150]<br>(150 225] | <br>/2<br>/3 | 0<br>/2<br>/3 | 0<br>0<br>/3 | Rule-based |
| 3 | Two different units with<br>one 75 kw unit and one<br>150 kw unit<br>Unit 1-75 kw<br>Unit 2-150 kw | [0 75]<br>(75 150]<br>(150 225] | <br>0<br>x1 | 0<br><br>−x1 | N/A<br>N/A<br>N/A | Hybrid fuzzy<br>rule-based |
| 4 | Three different units with<br>two 75 kw units and one<br>150 kw unit<br>Unit 1-75 kw<br>Unit 2-75 kw<br>Unit 3-150 kw | [0 75]<br>(75 150]<br>(150 225]<br>(225 300] | <br>/2<br>0<br>(−x3)/2 | 0<br>/2<br>x2<br>(−x3)/2 | 0<br>0<br>−x2<br>x3 | Hybrid fuzzy<br>rule-based |
| 5 | Three different units with<br>one 75 kw unit and two<br>150 kw units<br>Unit 1-75 kw<br>Unit 2-150 kw<br>Unit 3-150 kw | [0 75]<br>(75 150]<br>(150 225]<br>(225 300]<br>(300 375] | <br>0<br>x1<br>0<br>x1 | 0<br>0<br>−x1<br>/2<br>(−x1)/2 | 0<br>0<br>0<br>/2<br>(−x1)/2 | Hybrid fuzzy<br>rule-based |

The rule-based PMS is constructed according to the math-optimal result; therefore, the resulting rule-based PMS is exactly the same as the math-optimal PMS. However, the rule-based PMS can only be used for simple optimization rules; otherwise it will be difficult to find exact rules and also will be very time consuming. The fuzzy PMS is not as precise as the rule-based PMS in this case; however, it approximates the math-optimal PMS and is convenient and fast for online implementation.

Based on the analysis of the optimal solution, the rule-based PMS was developed for identical units because there are some obvious patterns in their optimal solutions. And the hybrid fuzzy rule-based PMS were developed for different units because in some regions there are no obvious patterns for different units to split load power. Therefore, fuzzy logic was used in those regions for online implementation.

The implementation result will now be compared with optimal solution and those obtained from current PMS.

4. Implementation of Optimal Power Management System 4.1. Optimal Power Distribution Implementation In Chapter 3, we used SQP to statically optimize the power distribution. The remaining problem is how to implement the PMS online. There are several methods to implement the optimal power distribution online. According to the optimal results, rule-based and fuzzy rule-based implementations are chosen in this Part. The rule-based system is simple and easy to implement. Generally speaking, it is intuitive, but difficult to obtain exact rules, and they apply well only to certain simple systems. Fuzzy rule-based systems, generally speaking, are practical, robust, and easy to implement online, but it is difficult to obtain expert data from which to design fuzzy rules. In this Part, fuzzy rules will be designed according to the optimal results that were obtained in Chapter 3.

4.1.1. Rule-based and Fuzzy Rule-based Implementation for Power Distribution

According to the optimization results, when identical units were used, certain patterns were apparent, and rules can be derived based on these results. The rule-based PMS configurations were thus designed for implementation. However, when different units are used, rule-based PMS is not so easily applied for different ranges of P total in certain regions. The optimal solutions can be divided into several regions. In some regions, the rule-based implementation was designed. In other regions, fuzzy logic was used to implement the power distribution. This hybrid power distribution was used for different units. The power distribution uses crisp logic and a fuzzy logic controller at the same time.

4.1.2. Introduction to Fuzzy Logic Controller 4.1.2.1. Fuzzy Logic System and Fuzzy Logic Controller Scheme Fuzzy logic provides a general description and measurement of a system similar to human reasoning. In fuzzy logic, the truth of any statement is a matter of degree. A membership function is the curve that describes how true a given statement is for a given input value. Fuzzy logic does not use crisp values to describe a system; instead, human reasoning is used. For example, when describing the temperature, crisp values were not used. Instead, we use a "high," "medium," "low," etc. fuzzy logic set. Different temperature values may belong to different fuzzy logic sets with a certain percentage membership. Fuzzy set membership occurs by degree over the range [0, 1]. For example, 100° F. might belong to a set of "high" temperatures, and its membership to the "high" fuzzy set is 0.7, and it may also belong to "medium" at the same time with a membership of 0.2.

Fuzzy logic systems can be used to make decisions or control systems by encoding human reasoning. Therefore a fuzzy logic system can easily be understood and built based on human understanding. Fuzzy logic comprises fuzzy sets, fuzzy set membership functions, fuzzy rules, and fuzzy inference. Fuzzy sets represent non-statistical uncertainty. A membership function is used to represent the fuzzy set membership. Triangle, trapezoid, Gaussian and sigmoid functions are commonly used as fuzzy set membership functions. Fuzzy rules approximate human reasoning, which used to make inferences in fuzzy logic. All the fuzzy rules in a fuzzy system are applied in parallel. The design procedure of the fuzzy logic controller in this Part works as follows.

Define input and output variables of a fuzzy logic controller.

Fuzzify the input and output variables. Define fuzzy sets and fuzzy membership functions for each fuzzy variable.

Determine fuzzy rule set.

Defuzzify the fuzzy outputs to obtain the crisp values for each output variable.

In this Part, the input signal to the fuzzy controller is the total load power request. The output signal is the load power to each single unit (75 kw or 150 kw unit). The diagram below shows the fuzzy logic controller scheme.

4.1.2.2. Design Fuzzy System Using Matlab/Fuzzy Logic Toolbox

In this work, the fuzzy logic toolbox in Matlab was used. Its graphic user interface (GUI) is easy to use to design fuzzy inference system (FIS) structure, fuzzy sets, fuzzy set membership functions, and fuzzy rule set. As long as the fuzzy system was properly designed, the fuzzy system can be represented as a FIS file in the fuzzy toolbox. When designing a fuzzy controller in Matlab/Simulink, the FIS file name must be provided in the fuzzy controller block parameter window, and when running the Simulink model, Simulink recalls the fuzzy system.

4.2. Rule-based and Hybrid Fuzzy Rule-based Implementation for Power Distribution in Matlab/Simulink for Five Different Scenarios According to the optimal power distribution data, rule-based and fuzzy rule-based power distribution implementations are designed in a Matlab/Simulink environment. Simulation results also will be discussed in this section. In this section, the design of the rule-based and fuzzy rule-based power distribution Simulink models of each configuration will be discussed.

The models for every configuration are built according to the optimal power distribution results. The distributed load power signals were sent to each unit through multiport switches. Inside each unit there is a subsystem used to calculate input power and fuel consumption. Finally, the system electrical efficiency was calculated.

4.3. Two Identical 75 Kw Units

Figure 15:
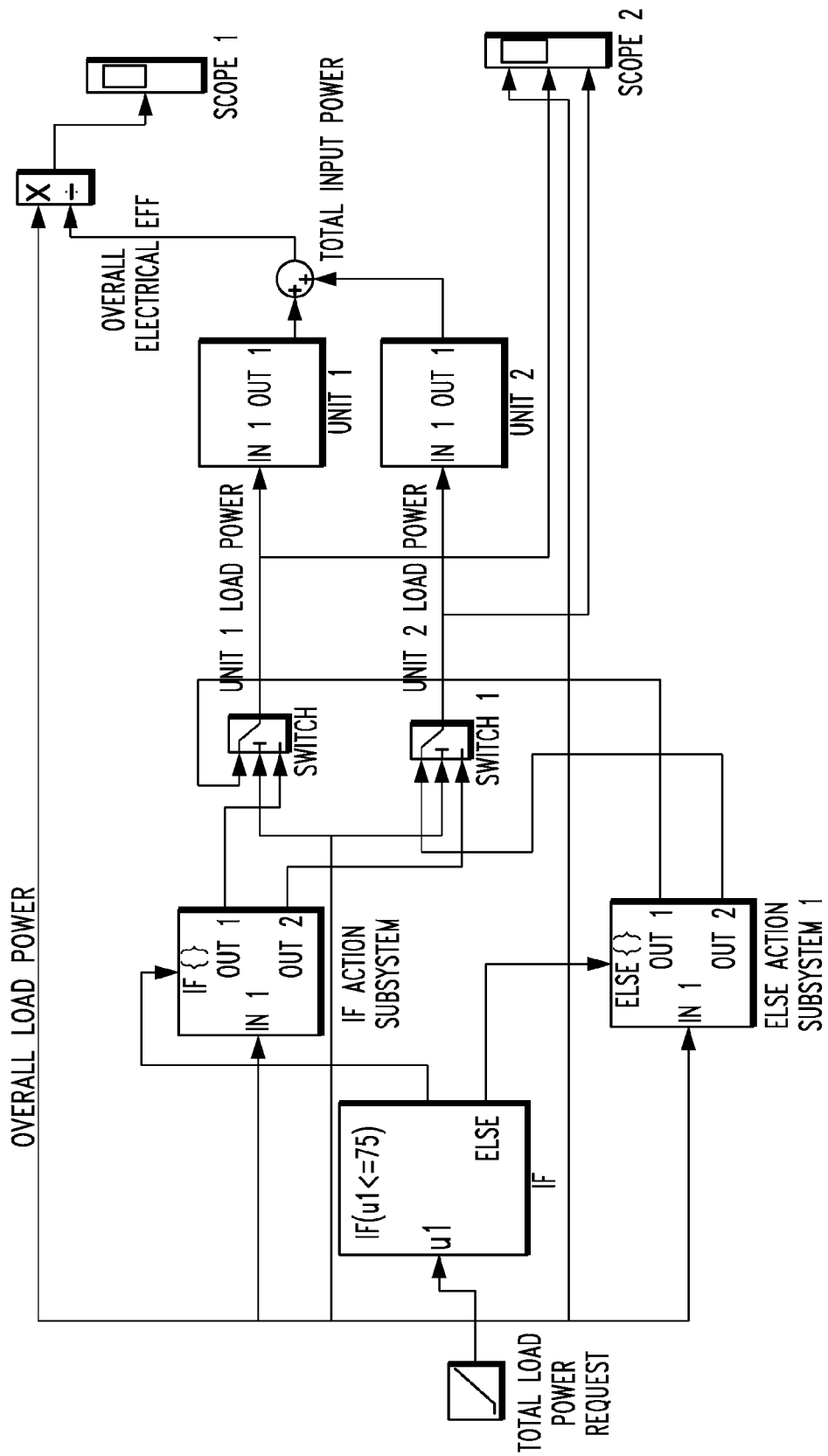
FIG. 15 is a Matlab/Simulink model of a rule-based power distribution implementation for two 75 kw units.
Figure 16:
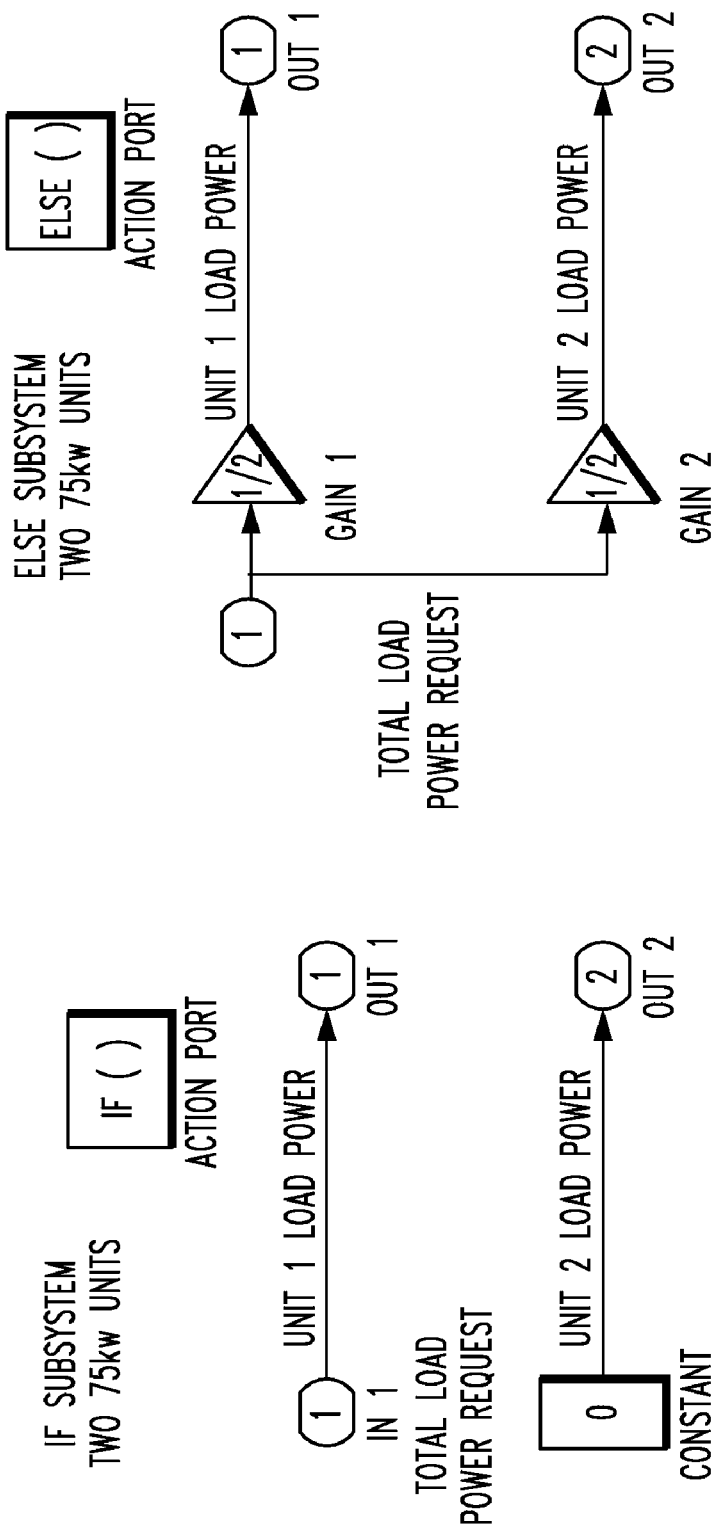
FIGS. 16 (A) and (B) are Matlab/Simulink models of the "IF Action Subsystem" and "ELSE Action Subsystem," respectively, for use in the model of FIG. 15, respectively.

FIG. 15 shows the Simulink model of the rule-based power distribution implementation for two 75 kw units. Conventional logic is used in this model to distribute power between two 75 kw units (unit 1 and unit 2). FIG. 16 shows the IF and ELSE subsystems, which are built according to the rules obtained from the analysis of optimal power distribution data.

4.4. Three Identical 75 kw Units

Figure 17:
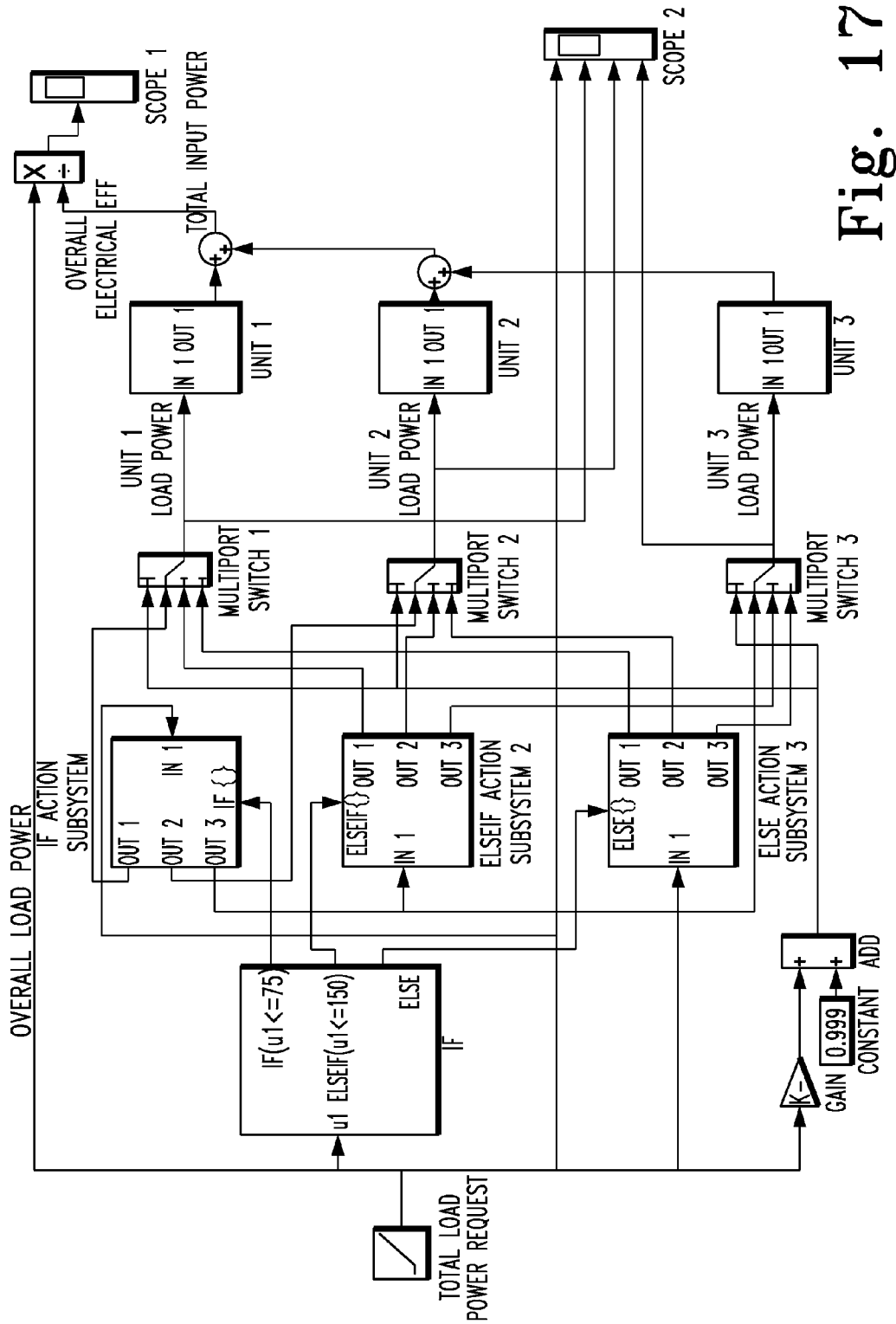
FIG. 17 is a Matlab/Simulink model of a rule-based power distribution implementation for three 75 kw units.
Figure 18:
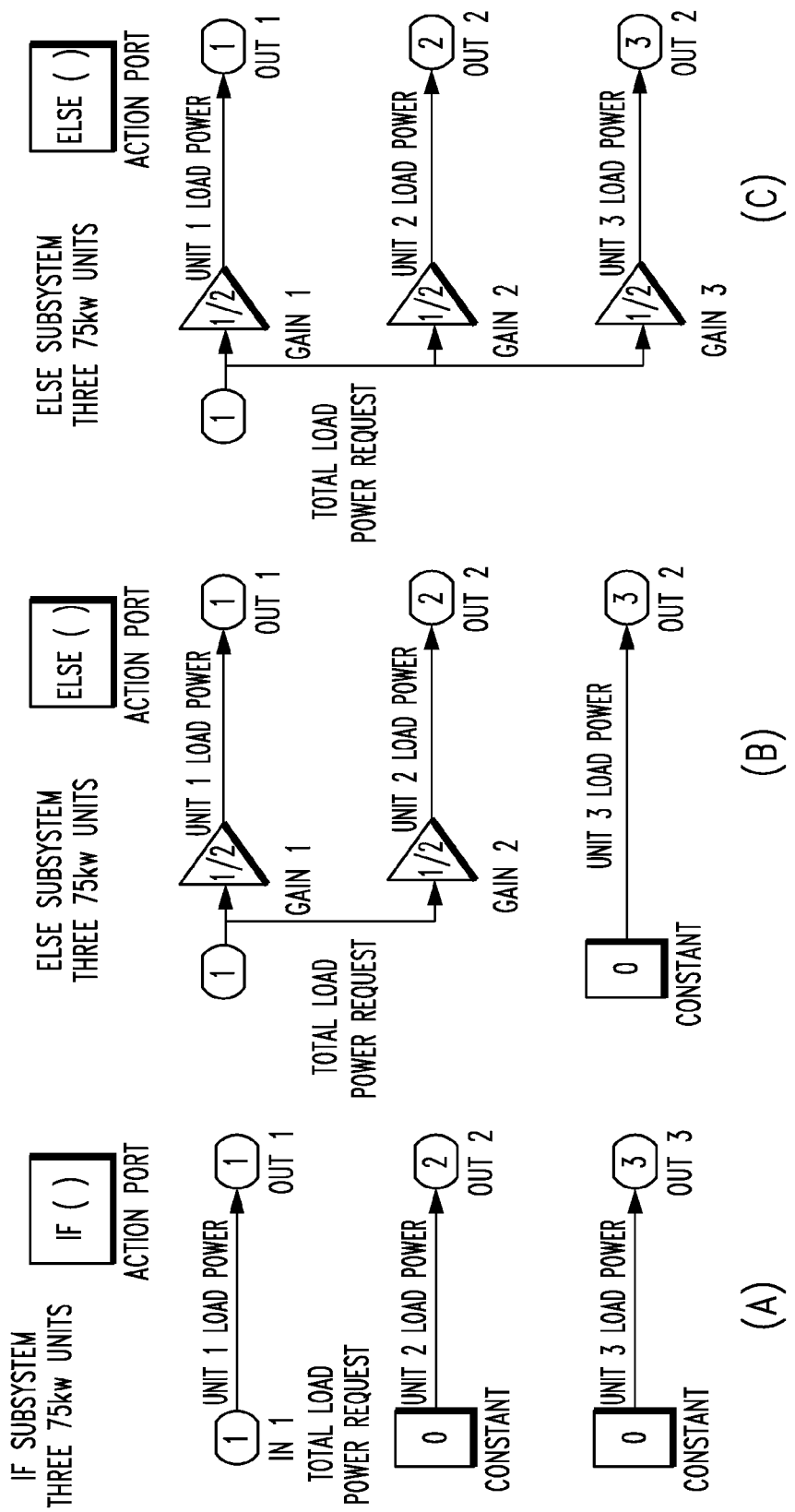
FIGS. 18 (A), (B) and (C) are Matlab/Simulink models of subsystems for use in the "IF Action Subsystem," "ELSEIF Action Subsystem," and "ELSE Action Subsystem" of FIG. 17, respectively.

FIG. 17 shows the Simulink model of the rule-based power distribution implementation for three 75 kw units. Crisp logic is used in this model to distribute power among three 75 kw units (unit 1, unit 2, and unit 3). FIG. 18 shows the IF, ELSEIF, and ELSE subsystems, which are built according to the rules obtained from the analysis of optimal power distribution data.

4.5. Two Different Units with One 75 Kw and One 150 Kw Unit

Figure 19:
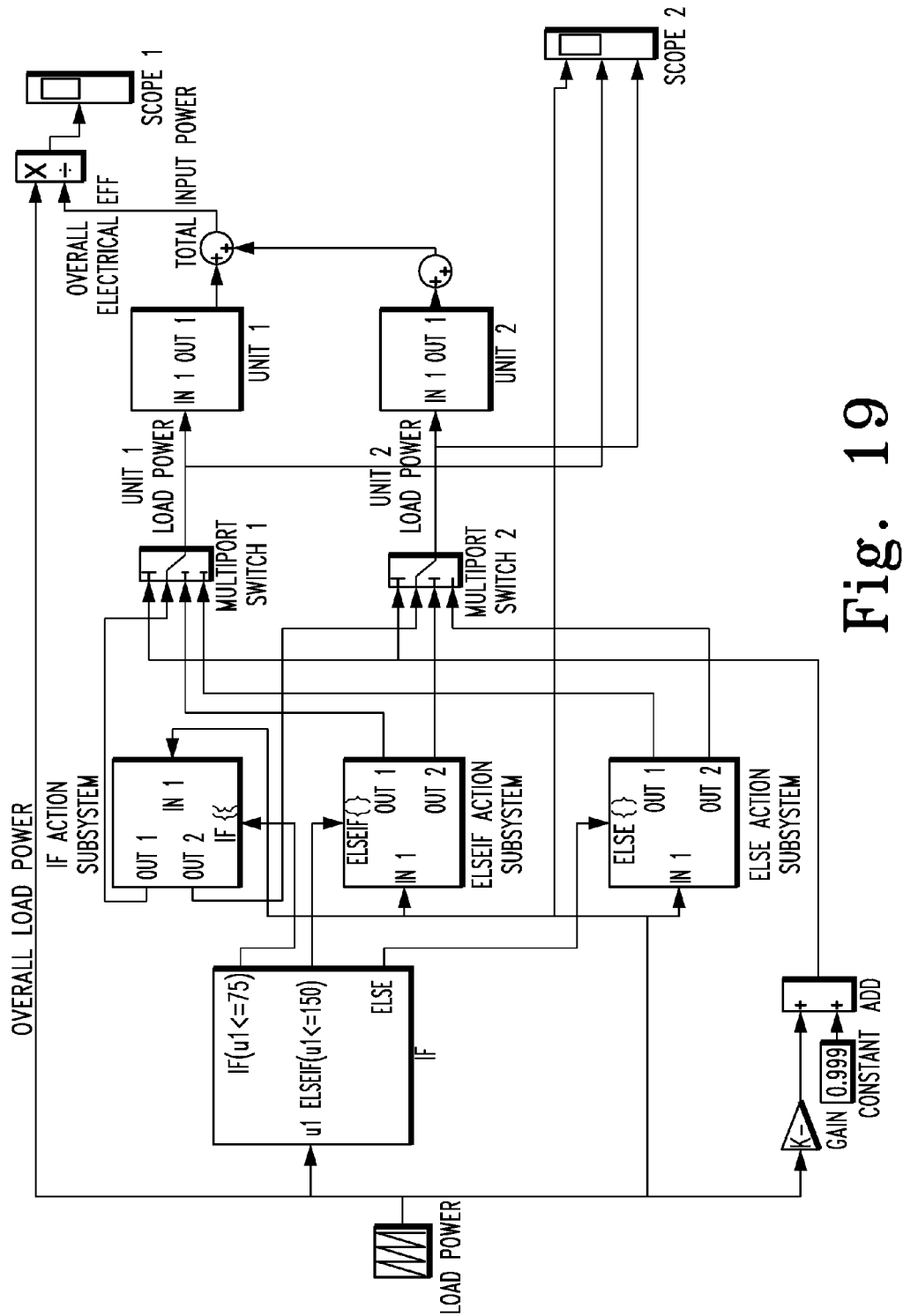
FIG. 19 is a Matlab/Simulink model of a rule-based and fuzzy rule-based power distribution implementation for a system having one 75 kw unit and one 150 kw unit.

FIG. 19 shows the rule-based and fuzzy rule-based power distribution implementation for two different units. Both crisp logic and fuzzy logic are used in this model to distribute power between a 75 kw unit (unit 1) and a 150 kw unit (unit 2).

Figure 20:
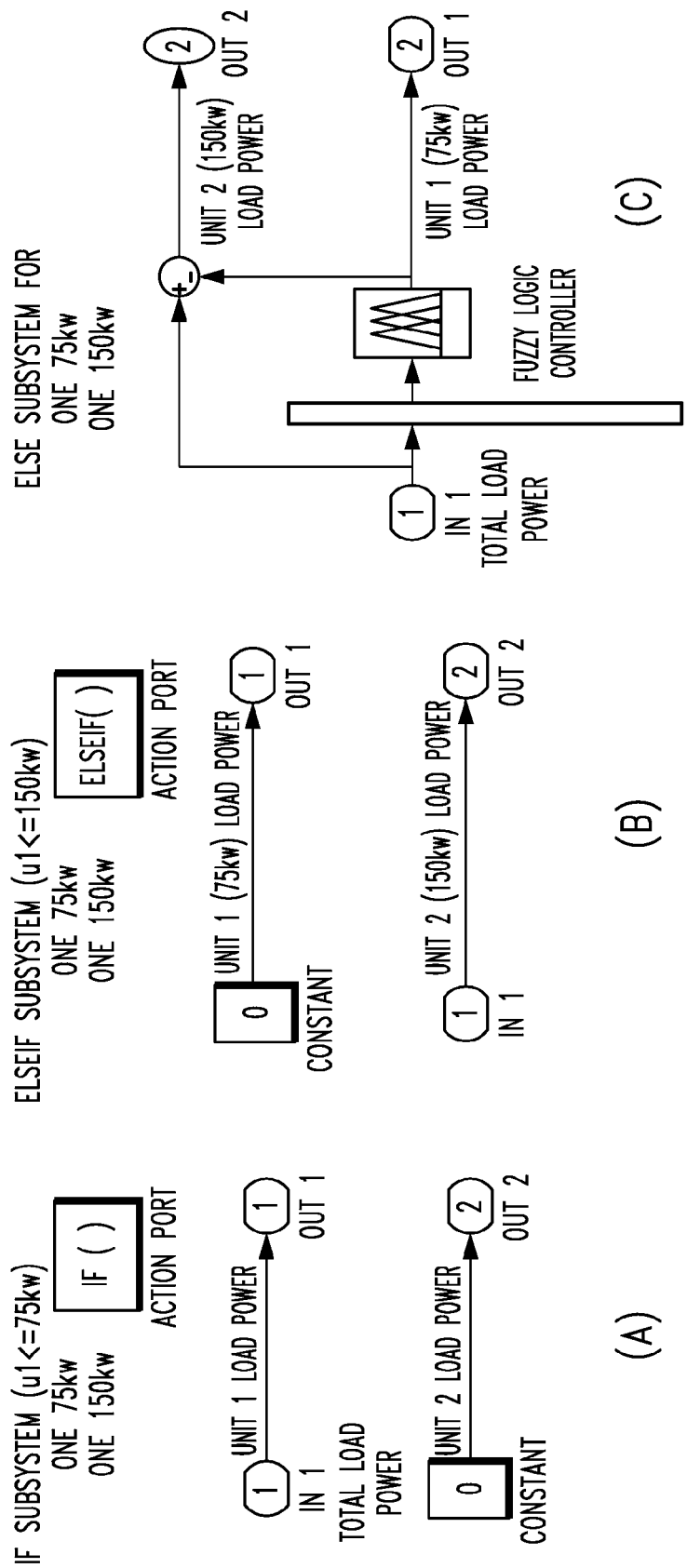
FIGS. 20 (A), (B) and (C) are Matlab/Simulink models of subsystems for use in the "IF Action Subsystem," "ELSEIF Action Subsystem," and "ELSE Action Subsystem" of FIG. 19, respectively.

FIG. 20 shows the IF, ELSEIF, and ELSE subsystems, which are built according to the rules obtained from the analysis of optimal power distribution data. Both IF and ELSE subsystems are rule-based subsystems, but the ELSEIF subsystem is a fuzzy rule-based system. Inside this block is a fuzzy controller. The inputs of the fuzzy controller are the total load power request and heat request. The output signal is the load power for the 75 kw unit (unit 1). The load power for the 150 kw unit (unit 2) is equal to the total load power minus the load power of the 75 kw unit (unit 1). The fuzzy controller in this embodiment can only have an output for either the 75 kw unit (unit 1) or the 150 kw unit (unit 2), and cannot have outputs for each of these two units. If there are two outputs for the fuzzy controller, and when these two outputs are added together, the sum may not equal the total load power request. Because the controller used here applies fuzzy logic, the fuzzy controller may not provide the output values whose sum is exactly equal to the input total load power value.

4.5.1. Fuzzy Logic Controller Design for ELSE Subsystem 4.5.1.1. FIS Structure

Figure 21:
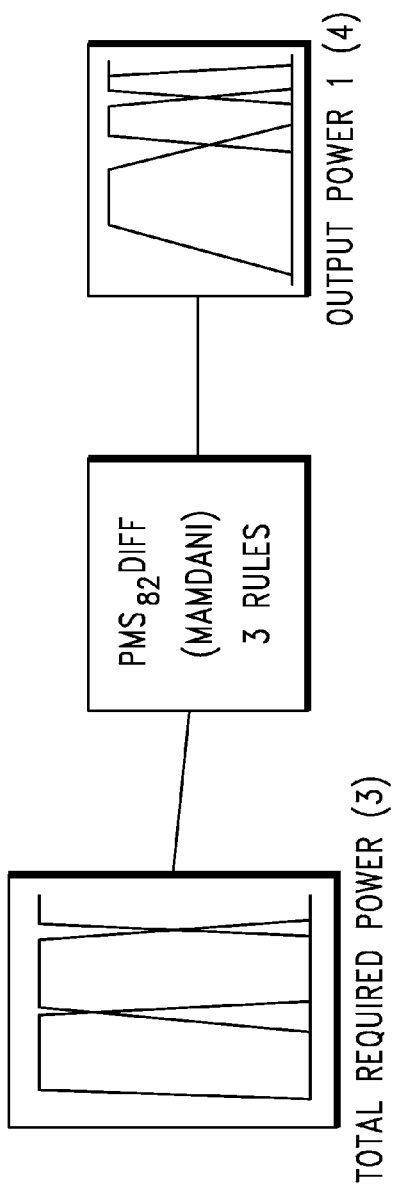
FIG. 21 is a fuzzy logic controller FIS structure for an "ELSE subsystem" in a system having two different distributed generator units.

When designing a fuzzy system, first define the inputs and outputs and their membership functions. Then construct fuzzy rules. The FIS structure represented by the fuzzy toolbox GUI is shown in FIG. 21.

There are one input, one output, and three rules in this FIS structure. Each input and output signal of the fuzzy system is a fuzzy variable, which has several fuzzy sets and their own fuzzy membership functions. The output signal in this case is the load power to the 75 kw unit.

4.5.1.2. Fuzzy Sets and Fuzzy Membership Functions

The fuzzy controllers in this Part have one input and one output as described in the fuzzy controller scheme. Each input and output has a different number of fuzzy sets; for example, for two different units, the fuzzy sets for input and output are:

Total load power request: Three fuzzy sets—H (high), M (medium), L (low)

Unit 1 load power: Four fuzzy sets—H (high), M (medium), OK, L (low)

Figure 22:
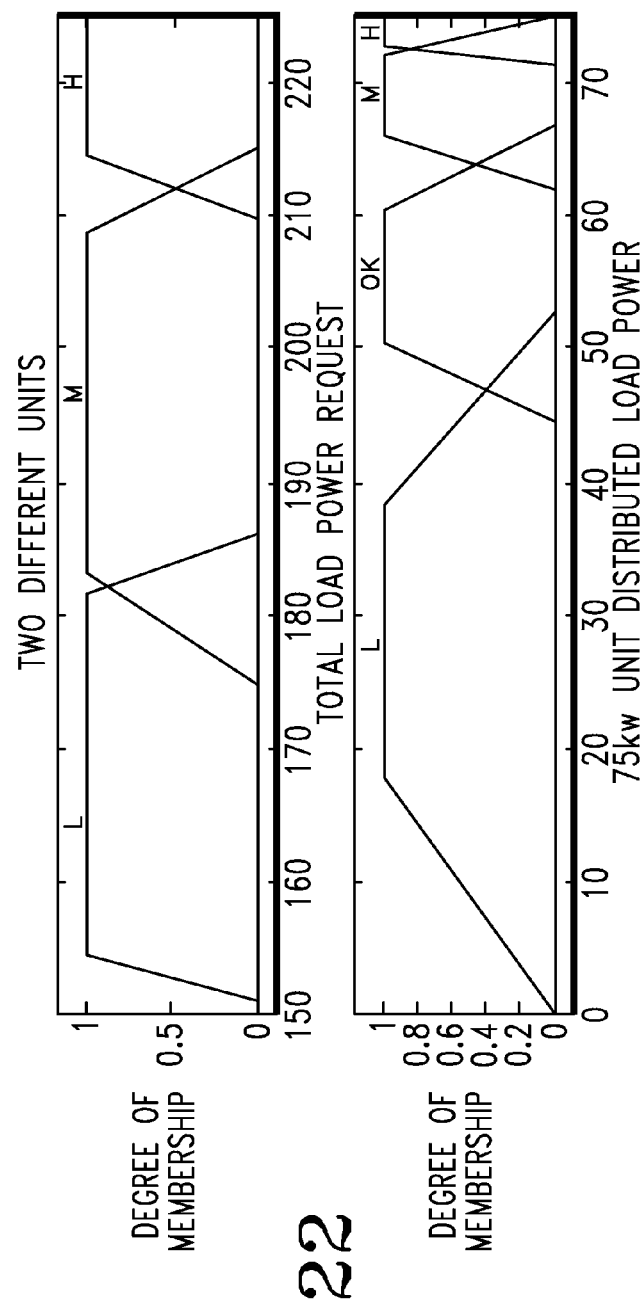
FIG. 22 is a graph of fuzzy set membership functions for an "ELSE subsystem" in a system having two different distributed generator units.

In fuzzy logic, a value can partially belong to a fuzzy set with corresponding membership between 0 and 1. In this Part, trapezoid functions (include left-trapezoid function and right-trapezoid function) and triangle functions are selected as the membership functions. The entire rule set is applied in parallel, and fuzzification and defuzzification methods are used to obtain the output signal from the inputs. FIG. 22 shows the fuzzy sets and membership functions for the configuration of two different units.

4.5.1.3. Fuzzy Rule Set

The fuzzy rule set includes a set of fuzzy if-then rules, which define the fuzzy inference system from the input to output based on the optimal data.

The fuzzy control rule set shown in Table 4.1 is built based on human analysis of the optimal solution in Chapter 3.

TABLE 4.1

| Fuzzy rule set |
|---|
| 1. If (Total_Required_Power is L) then (Output_Power_1 is OK) (1) |
| 2. If (Total_Required_Power is M) then (Output_Power_1 is M) (1) |
| 3. If (Total_Required_Power is H) then (Output_Power_1 is H) (1) |

4.5.1.4. Representation of Fuzzy System (FIS File)

In Matlab/fuzzy logic toolbox, the following method is used to represent a fuzzy system as shown in Table 4.2. This is also the FIS file.

TABLE 4.2

The representation of a fuzzy system in Matlab

[System]
Name='PMS_5_2DIFF'
Type='mamdani'
Version=2.0
NumInputs=1
NumOutputs=1
NumRules=3
AndMethod='min'
OrMethod='max'
ImpMethod='min'
AggMethod='max'
DefuzzMethod='centroid'
[Input1]
Name='Total_Required_Power'
Range=[150 225]
NumMFs=3
MF1='L':'trapmf',[150.9 154.5 181.8 186]
MF2='M':'trapmf',[174.5 182.7 209.1 215.2]
MF3='H':'trapmf',[210 214.6 226.4 239 1]
[Output]
Name='Output_Power_1'
Range=[0 75]
NumMFs=4
MF1='L':'trapmf',[0.5036 17.78 38.14 52.69]
MF2='OK':'trapmf',[44.55 50.5 60.45 66.82]
MF3='H':'trapmf',[71.49 72.67 77.49 80.22]
MF4='M':'trapmf',[61.94 66.12 72.12 75.12]
[Rules]
1, 2 (1) : 1
2, 4 (1) : 1
3, 3 (1) : 1

The first section shows general information about the system, which includes number of inputs, outputs, and rules. The first section also includes fuzzification and defuzzification methods. As the above table shows, there are one input, one output, and three rules. The remaining sections show the information about each input and output fuzzy variable, which include the name, fuzzy sets and their membership functions, and fuzzy rules of each input and output variable. For the membership functions, information about the name, type, and range of each membership function is indicated. For the fuzzy rule set, the above FIS file lists three rules. Each line was encoded from a rule provided in Table 4.1. The first integer represents the input and the second integer represents the output. "1" means membership function 1, which is "L" (low), and "2" means membership function 2, which is "M" (medium) and so on. The number in parentheses is the weight of the rule. The last number is the rule connection. For example, the first line shows: "1, 2 (1): 1," which line represents the first rule listed in Table 4.1. This rule is as follows:

If (Total_Required_Power is L) then (Output Power 1 is OK) (weight 1)

4.6. Three Different Units with Two 75 Kw Units and One 150 Kw Unit

Figure 23:
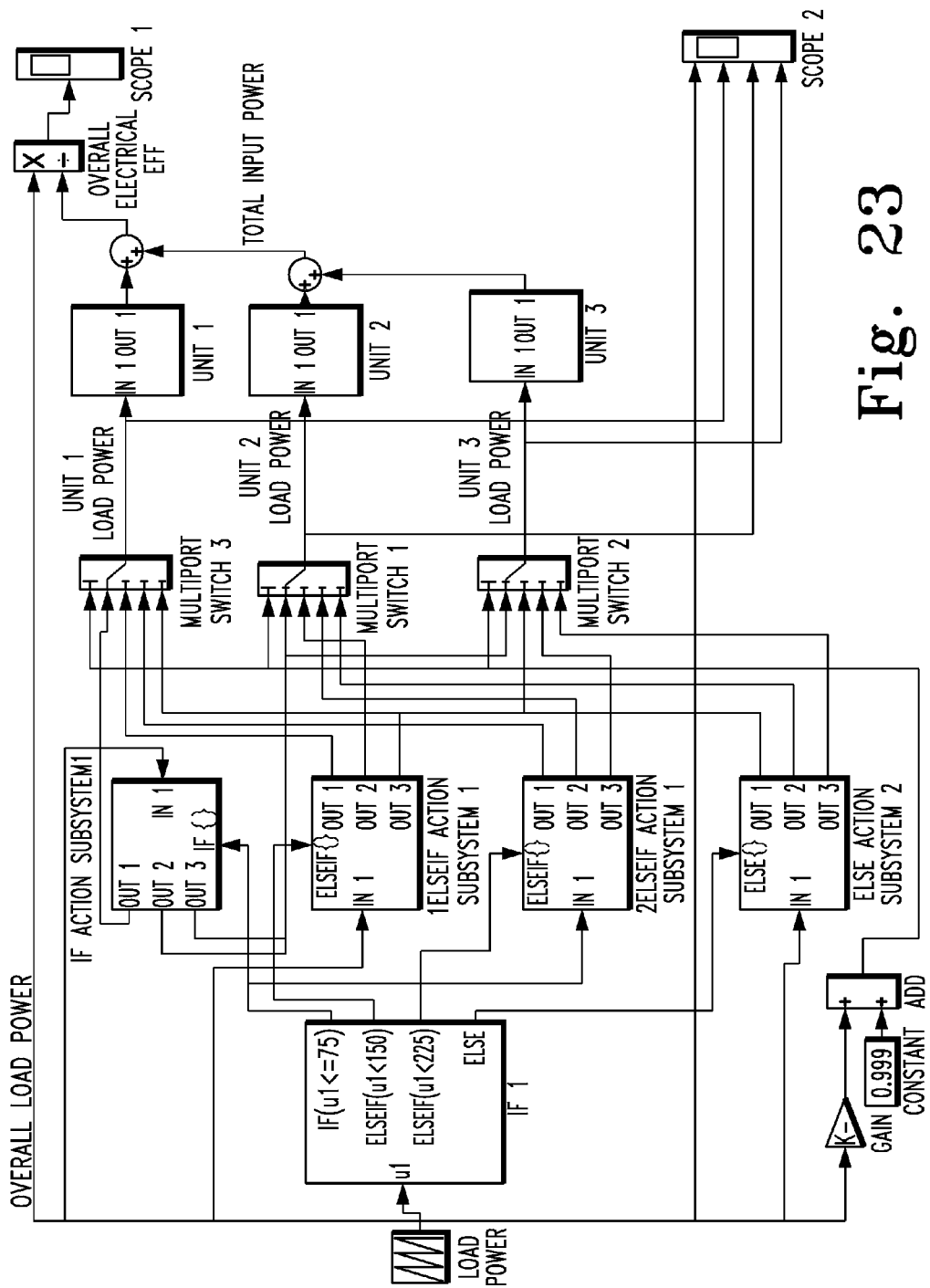
FIG. 23 is a Matlab/Simulink model of a hybrid fuzzy rule-based power distribution implementation for controlling a system having two 75 kw units and one 150 kw unit.

FIG. 23 shows the hybrid fuzzy rule-based power distribution implementation for three different units with two 75 kw units and one 150 kw unit. Both crisp logic and fuzzy logic are used in this model to distribute power among two 75 kw units (unit 1 and unit 2) and a 150 kw unit (unit 3).

Figure 24:
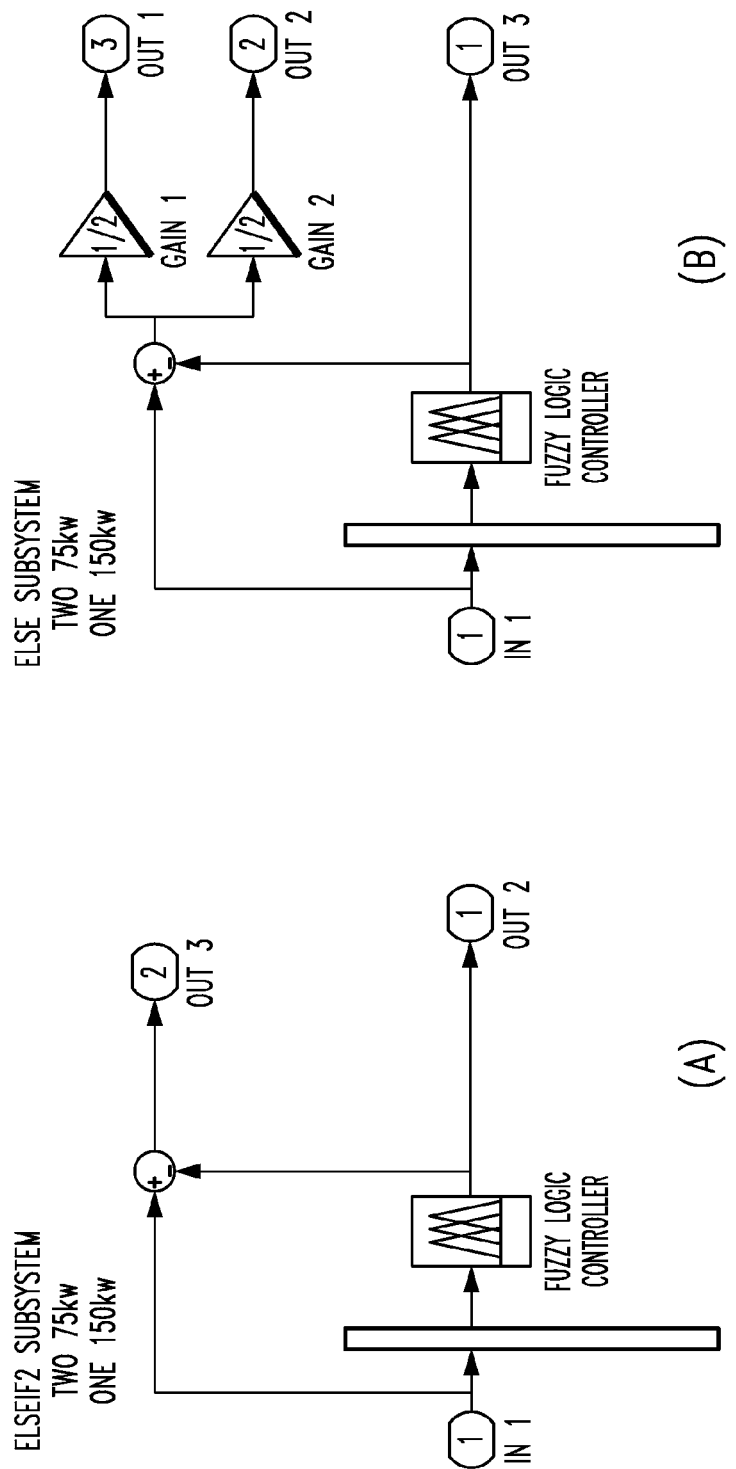
FIGS. 24 (a) and (b) are Matlab/Simulink models of the "2ELSEIF Action Subsystem" and "ELSE Action Subsystem" for use in the model of FIG. 23.

FIG. 24 shows the IF, ELSELF, and ELSE subsystems, which are built according to the rules in Table 4.3. For the ELSEIF2 subsystem, the output signal of the fuzzy controller is the load power for the 75 kw unit (unit 1). The load power for the 150 kw unit (unit 3) is equal to the total load power request minus the load power of the 75 kw unit (unit 1). The other 75 kw unit (unit 2) does not run. For the ELSE subsystem, the output signal of the fuzzy controller is the load power for the 150 kw unit (unit 3). The two 75 kw units (unit 1 and unit 2) equally share the remaining load power.

The fuzzy logic controller in the ELSEIF2 subsystem in FIG. 24 is the same controller as used for two different units, but the fuzzy logic controller in the ELSE subsystem is different.

4.6.1. Fuzzy Logic Controller Design for the ELSE Subsystem

4.6.1.1. FIS Structure

Figure 25:
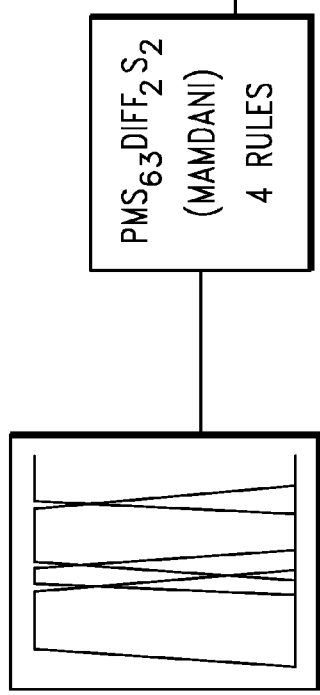
FIG. 25 is a fuzzy logic controller FIS structure for an "ELSE subsystem" in a system having two different distributed generator units as illustrated in FIG. 23.

There are one input, one output, and four rules in the FIS structure illustrated in FIG. 25. The output signal in this case is the load power to the 150 kw unit (unit 3). The output is different from that of the previous fuzzy controller.

4.6.1.2. Fuzzy Sets and Fuzzy Membership Functions

Figure 26:
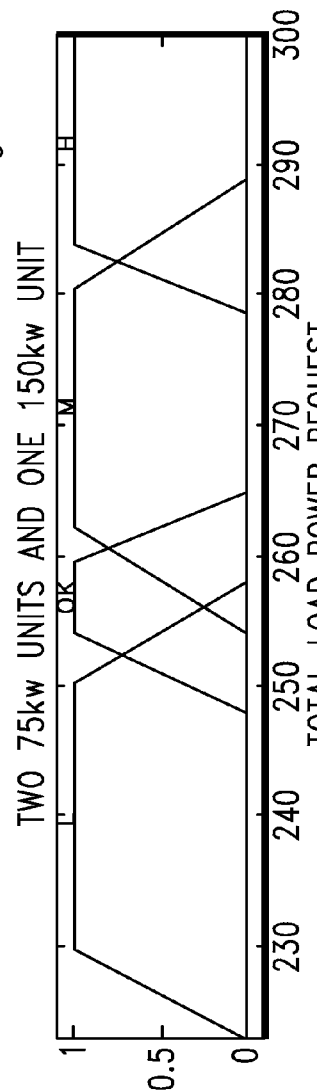
FIG. 26 is a graph of fuzzy set membership functions for an "ELSE subsystem" in a system having two different distributed generator units as illustrated in FIG. 23.
Figure 26:
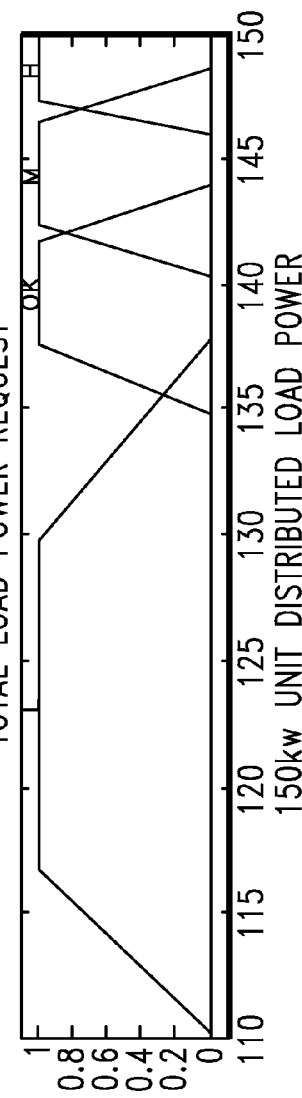

The fuzzy sets for input and output are as illustrated in FIG. 26:

Total load power request: four fuzzy sets—H (high), M (medium), OK, L (low)

Unit 3 load power: four fuzzy sets—H (high), M (medium), OK, L (low)

4.6.1.3. Fuzzy Rule Set

The fuzzy rules for this fuzzy logic controller are shown in Table 4.3.

TABLE 4.3

Fuzzy rule set

1. If (Total_Required_Power is L) then (unit_3 is L) (1)
2. If (Total_Required_Power is M) then (unit_3 is M) (1)
3. If (Total_Required_Power is H) then (unit_3 is H) (1)
4. If (Total_Required_Power is OK) then (unit_3 is OK) (1)

4.7. Three Different Units with One 75 kw Unit and Two 150 kw Units

Figure 27:
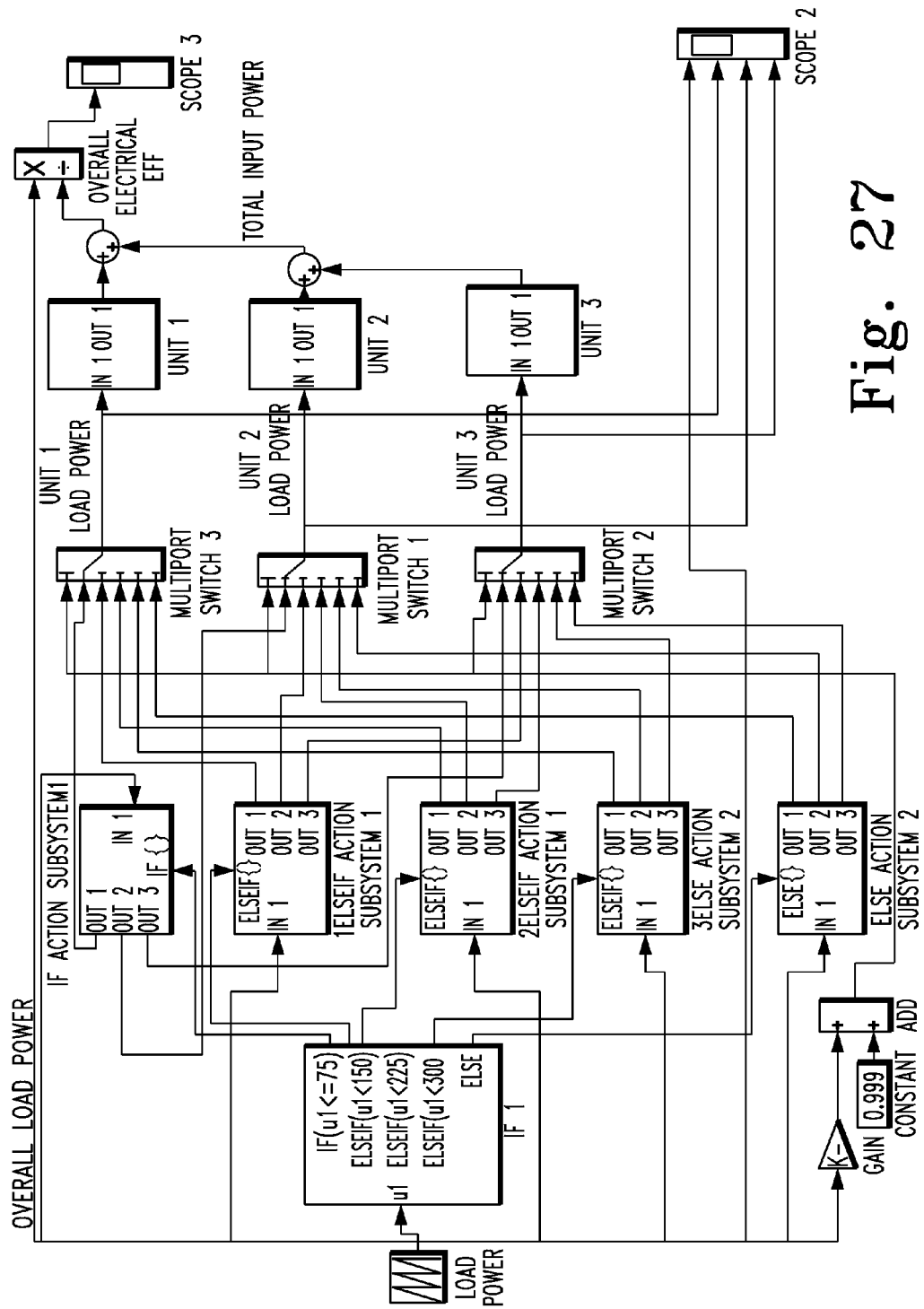
FIG. 27 is a Matlab/Simulink model of a hybrid fuzzy rule-based power distribution implementation for controlling a system with one 75 kw units and two 150 kw unit.

FIG. 27 shows the hybrid fuzzy rule-based power distribution implementation for three different units with one 75 kw unit and two 150 kw units. Both crisp logic and fuzzy logic are used in this model to distribute power among a 75 kw unit (unit 1) and two 150 kw units (unit 2 and unit 3).

Figure 28:
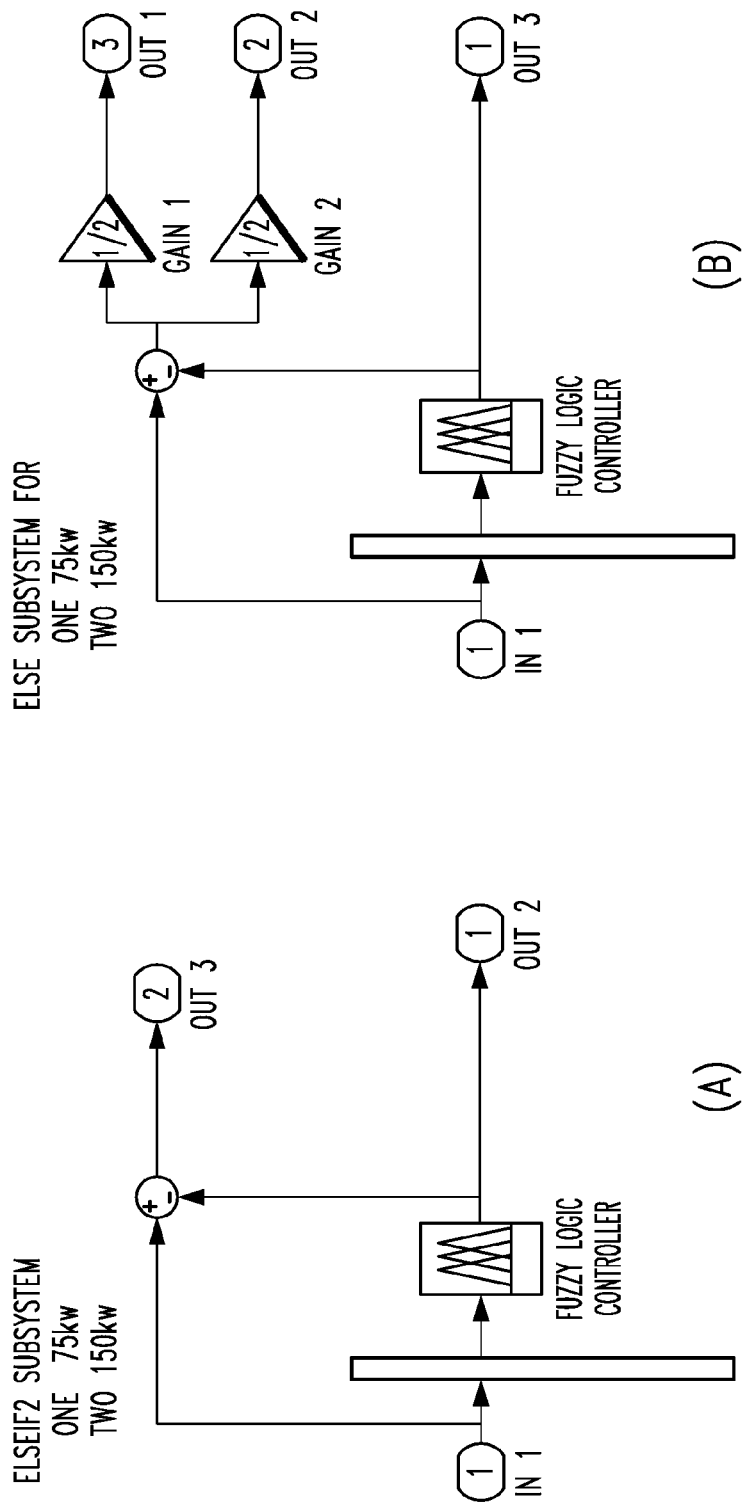
FIGS. 28 (A) and (B) are Matlab/Simulink models of the "2ELSEIF Action Subsystem" and "ELSE Action Subsystem" blocks for use in the model of FIG. 27.

FIG. 28 shows the IF, ELSEIF, and ELSE subsystems, which are built according to the rule obtained from the analysis of optimal power distribution data. For the ELSEIF2 subsystem, the load power for the 150 kw unit (unit 2) is equal to the total load power minus the load power of the 75 kw unit (unit 1). The other 150 kw unit (unit 3) does not run. For the ELSE subsystem, both 150 kw units (unit 2 and unit 3) share the remaining load power request equally.

The fuzzy logic controller in the ELSEIF2 subsystem is the same controller as used for two different units, but the fuzzy logic controller in the ELSE subsystem is different from previous fuzzy controllers. The fuzzy sets, membership functions, and rule set are totally different.

4.7.1. Fuzzy Logic Controller Design for the ELSE Subsystem

4.7.1.1. FIS Structure

Figure 29:
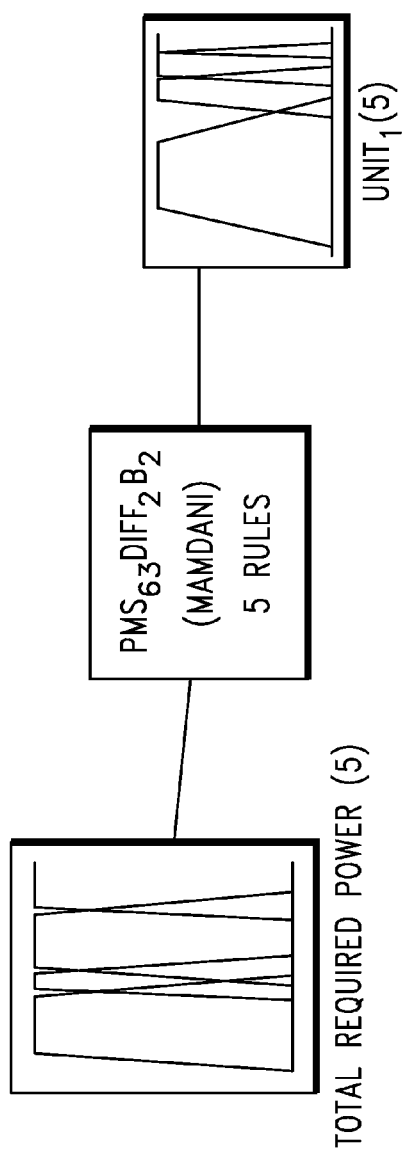
FIG. 29 is a fuzzy logic controller FIS structure for an "ELSE subsystem" in a system having two different distributed generator units as illustrated in FIG. 27.

FIG. 29 shows the FIS structure of the fuzzy controller. There are one input, one output, and 5 rules in this FIS structure. Output signal in this case is the load power request to the 75 kw unit (unit 1).

4.7.1.2. Fuzzy Sets and Fuzzy Membership Functions

Figure 30:
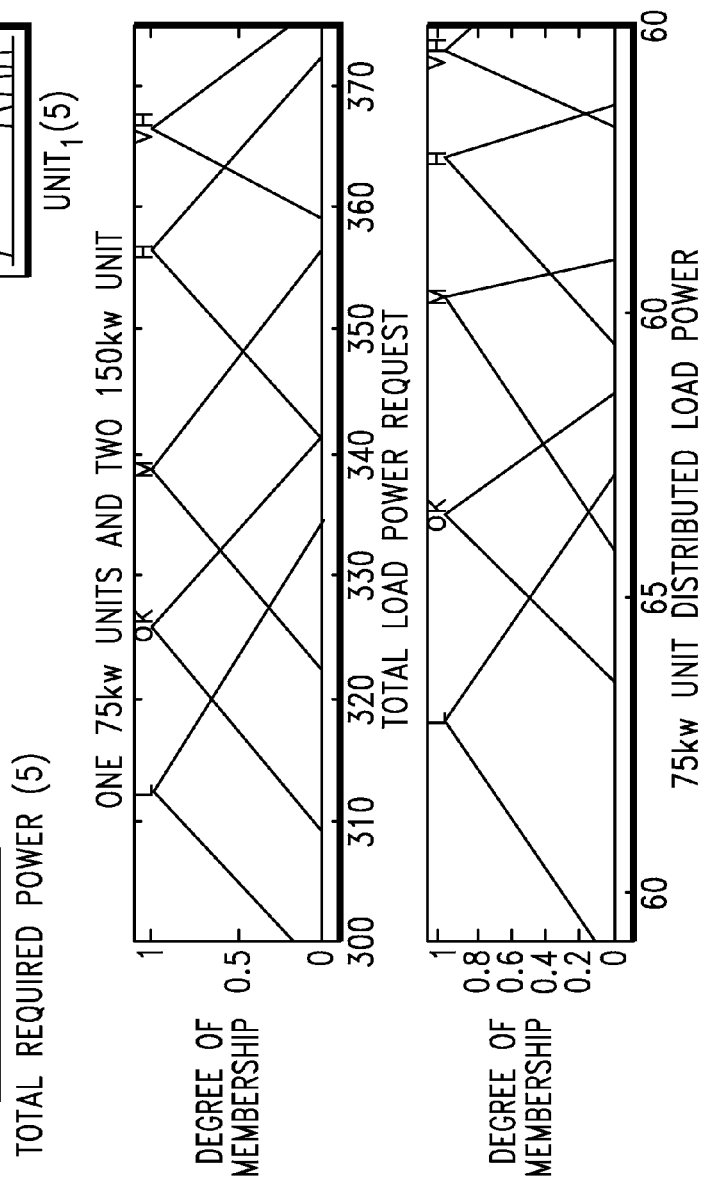
FIG. 30 is a graph of fuzzy set membership functions for an "ELSE subsystem" of two different distributed generator units as illustrated in FIG. 27.

The fuzzy sets for inputs and outputs are as illustrated in FIG. 30:

Total load power request: five fuzzy sets—VH (very high), H (high), M (medium), OK, L (low)

Unit 1 load power: five fuzzy sets—VH (very high), H (high), M (medium), OK, L (low)

4.7.1.3. Fuzzy Rule Set

The fuzzy rules for this fuzzy logic controller are shown in Table 4.4.

TABLE 4.4

Fuzzy rule set

1. If (Total_Required_Power is L) then (unit_1 is L) (1)
2. If (Total_Required_Power is H) than (unit_1 is H) (1)
3. If (Total_Required_Power is M) than (unit_1 is M) (1)
4. If (Total_Required_Power is OK) than (unit_1 is OK) (1)
5. If (Total_Required_Power is VH) then (unit_1 is VH) (1)

4.8. Simulation Results of Rule-based and Hybrid Fuzzy Rule-based Implementations for Power Distribution with Five Different Configurations.

4.8.1. Two Identical 75 kw Units

Figure 31:
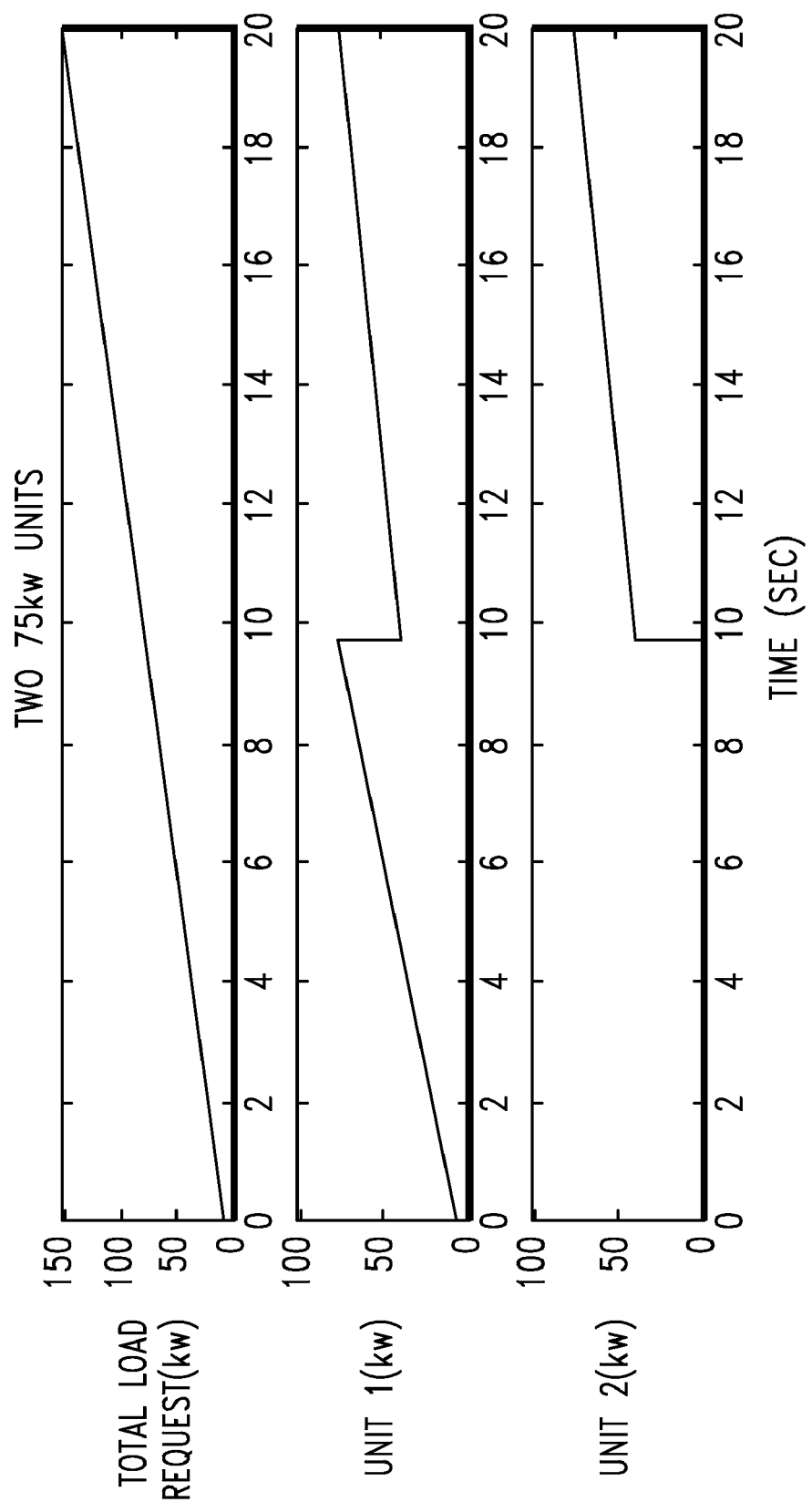
FIG. 31 is a graph of a rule-based controller implementation for managing power distribution from two 75 kw units.

For two identical 75 kw units, FIG. 31 shows the rule-based power distribution implementation design using Matlab/Simulink according to the optimal power distribution result FIG. 31 shows how the PMS splits power between two units.

The first row shows the total load power request, which increases with time as a ramp signal. The second row shows the load power distributed to a 75 kw unit (unit 1). The third row shows the load power distributed to the other 75 kw unit (unit 2). It can be seen that when the total load power request is less than 75 kw, only unit 1 runs and unit 2 does not run. When the total load power request is greater than 75 kw, unit 1 and unit 2 split the load power equally.

Figure 32:
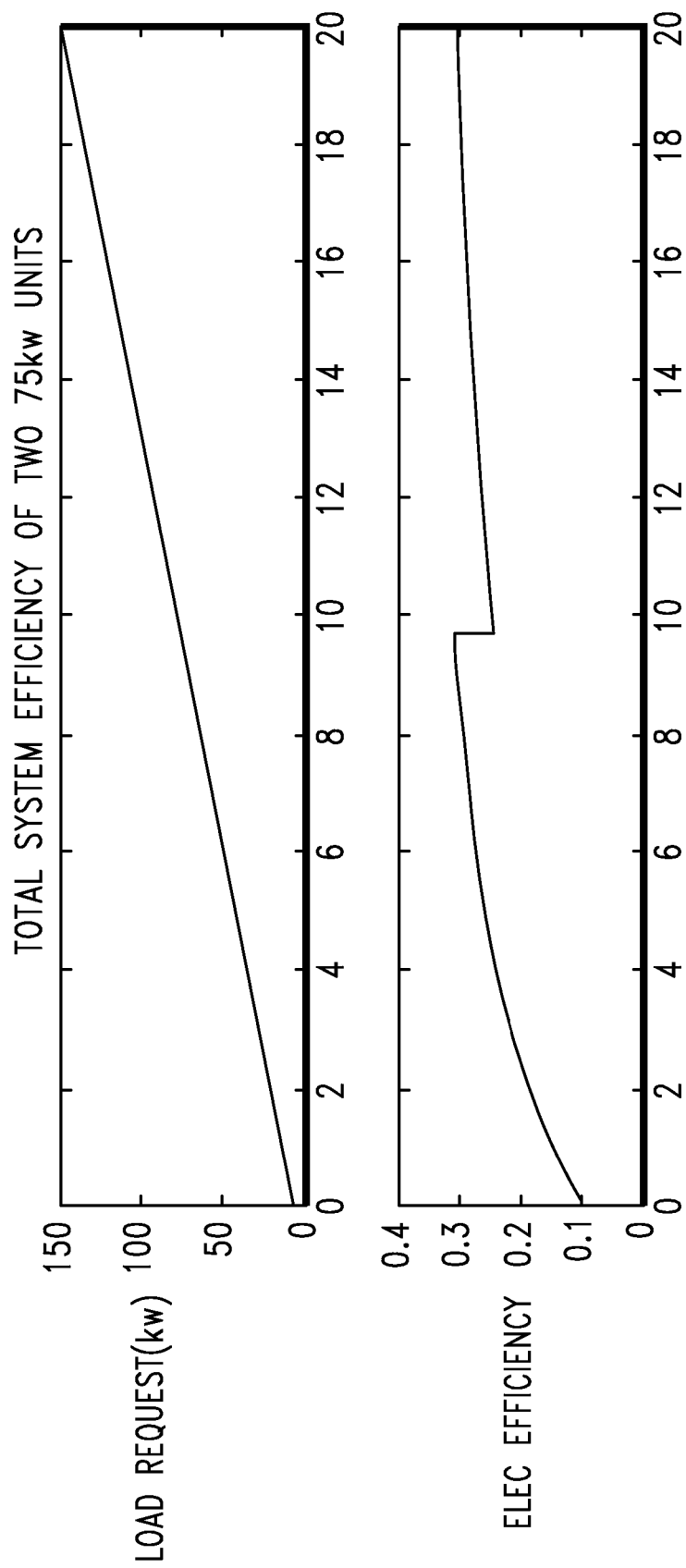
FIG. 32 is a graph of system efficiency of a rule-based implementation according to FIG. 31.

FIG. 32 shows the total electrical efficiency by using this rule-based power management system. The first row shows the total load power request, which increases with time as a ramp signal. The second row shows the total system electrical efficiency. It can be seen that when the total load power request reaches 75 kw, unit 1 ran full load, and the system electrical efficiency achieved its highest point. It is approximately 31%. When the total load power request is 150 kw, both units run full load, and the system electrical efficiency also achieve its highest point.

Figure 33:
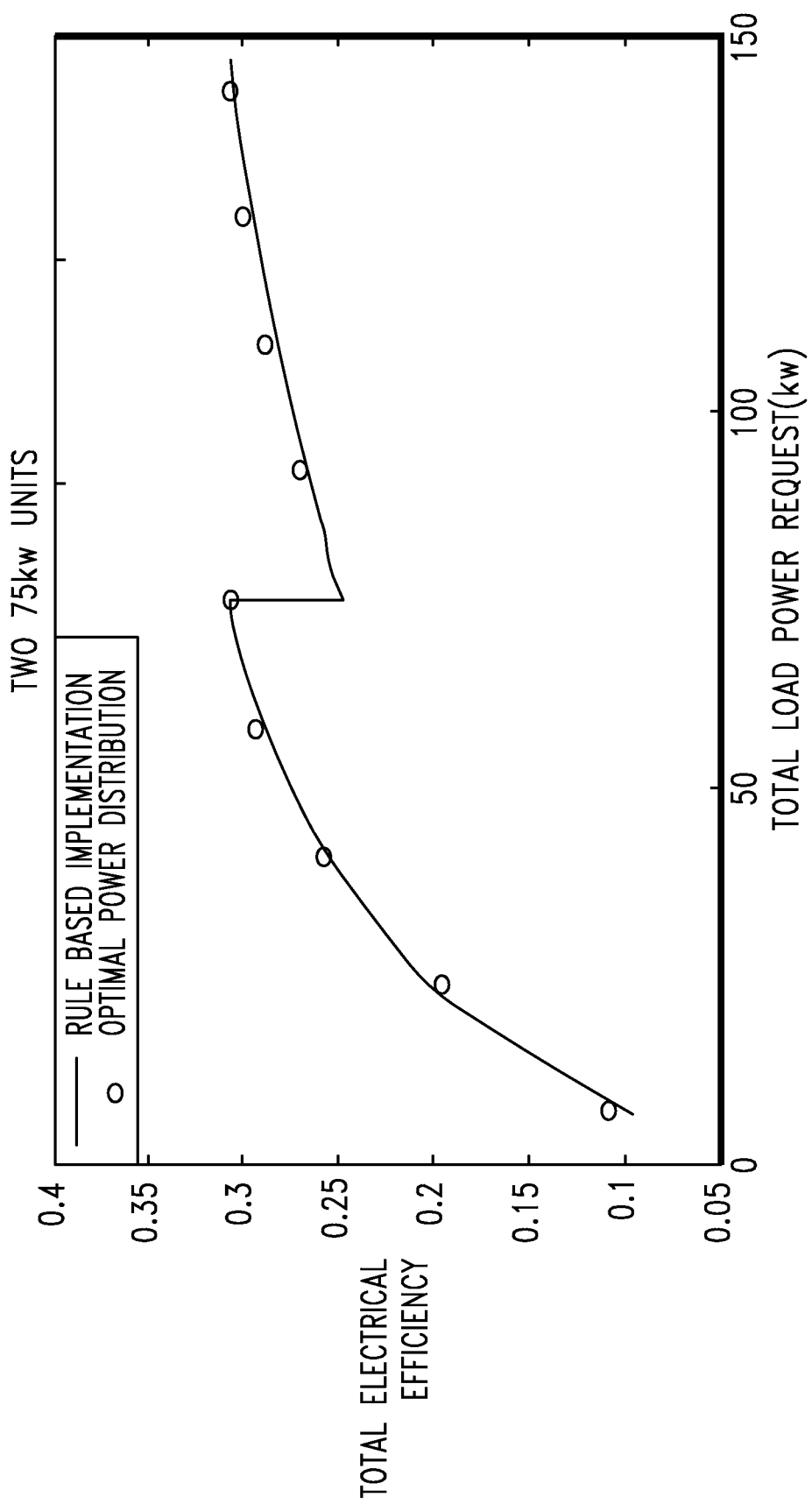
FIG. 33 is a graph of system efficiency for rule-based implementation and optimal power distributions in a system having two 75 kw units.

This system electrical efficiency is satisfactory if compared with the optimal efficiency. This can be seen from FIG. 33. The continuous line indicates the system total efficiency of rule-based implementation for two 75 kw units. The "o" curve indicates the system electrical efficiency of optimal power distribution. It can be seen that the system electrical efficiency of the rule-based implementation is almost exactly the same as that of the optimal power distribution. It is noted that the optimal efficiency is slightly lower than that obtained in the rule-based implementation at a few points due to numerical round off error.

4.8.2. Three Identical 75 kw Units

Figure 35:
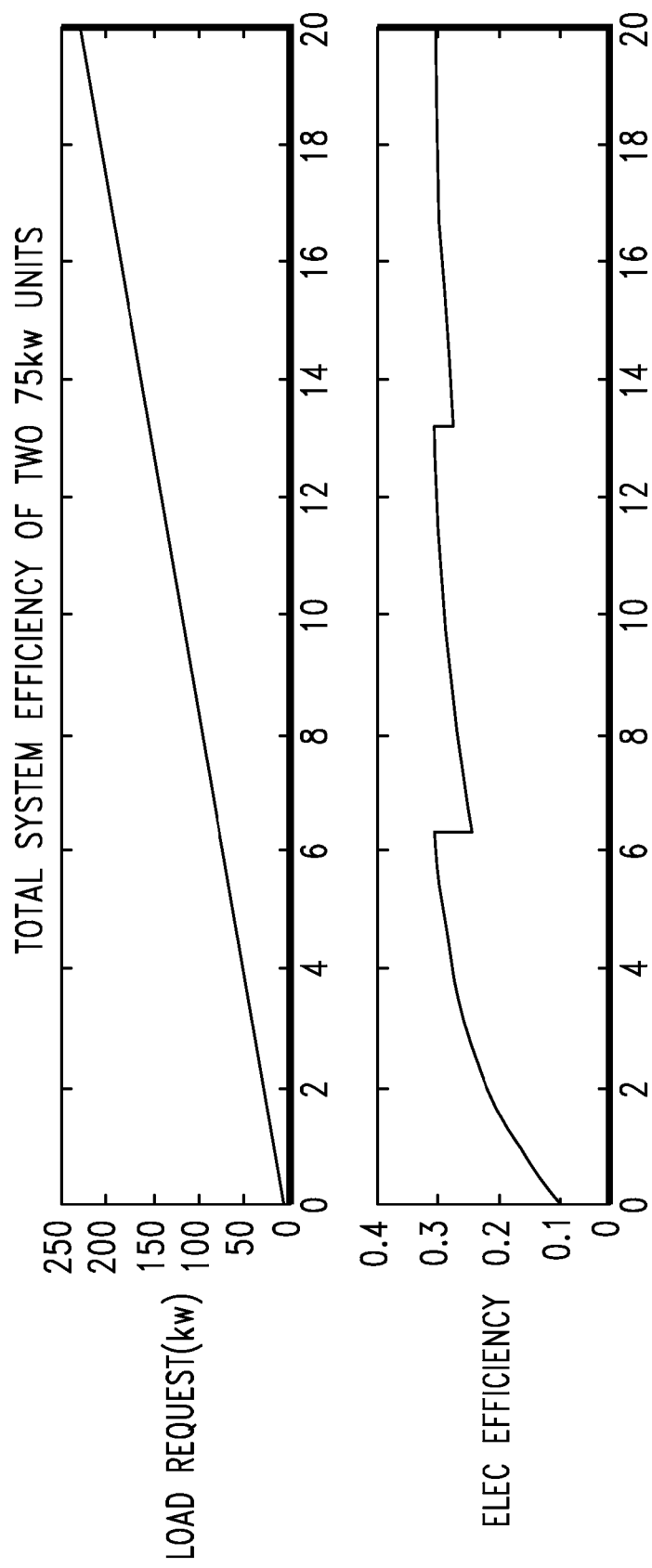
FIG. 35 is a graph of system efficiency of a rule-based controller implementation for use in a system having three 75 kw units.

For three identical 75 kw units, FIG. 35 shows the rule-based performance in a static simulation.

Figure 34:
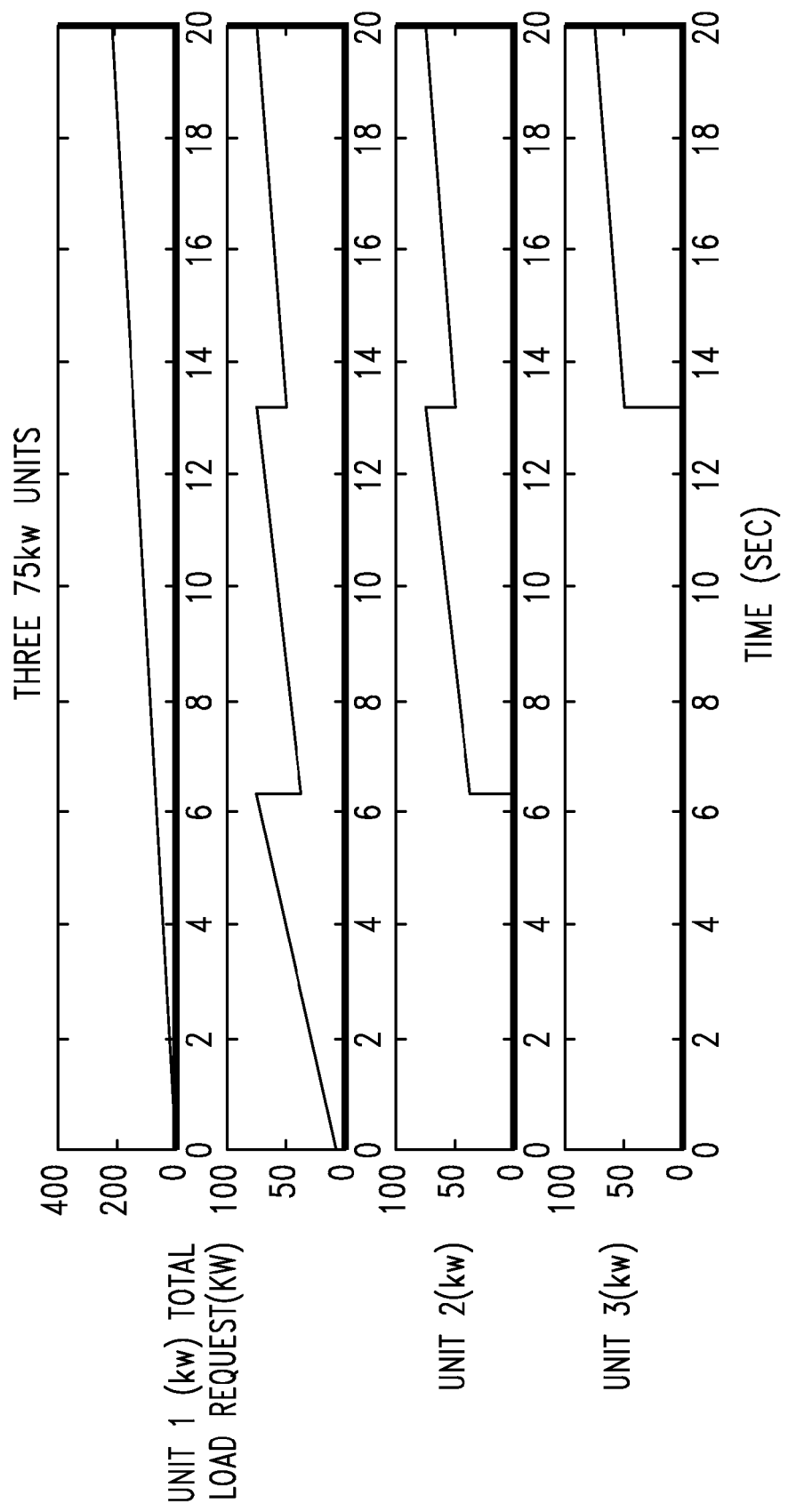
FIG. 34 is a graph of power output distribution in a rule-based controller implementation in a system having three 75 kw units.

FIG. 34 shows how the PMS splits power among three 75 kw units.

It can be seen that when the total load power request is less than 75 kw, only unit 1 runs, and neither unit 2 nor unit 3 run. When the total load power request is greater than 75 kw and less than 150 kw, unit 1 and unit 2 split the load power equally. When the total load power request is greater than 150 kw, three units split power equally.

FIG. 35 shows the total electrical efficiency by using this rule-based power management system. It can be seen that when the total load power request reaches 75 kw, unit 1 ran full load, and the total electrical efficiency achieve its highest point. It is approximately 31%. When the total load power request reaches 150 kw, both unit 1 and unit 2 ran full load, and the system electrical efficiency also achieve its highest point. When the total load power request reaches 225 kw, three units ran full load and the system electrical efficiency also achieve its highest point.

This system electrical efficiency is satisfactory if compared with the optimal efficiency. This can be seen from FIG. 36.

It can be seen that the system electrical efficiency of rule-based implementation is almost the same as that of the optimal power distribution. This is the power distribution for three 75 kw units. Power distribution for two different units with one 75 kw unit and one 150 kw unit will now be evaluated.

4.8.3. Two Different Units with One 75 kw Unit and One 150 kw Unit

Figure 37:
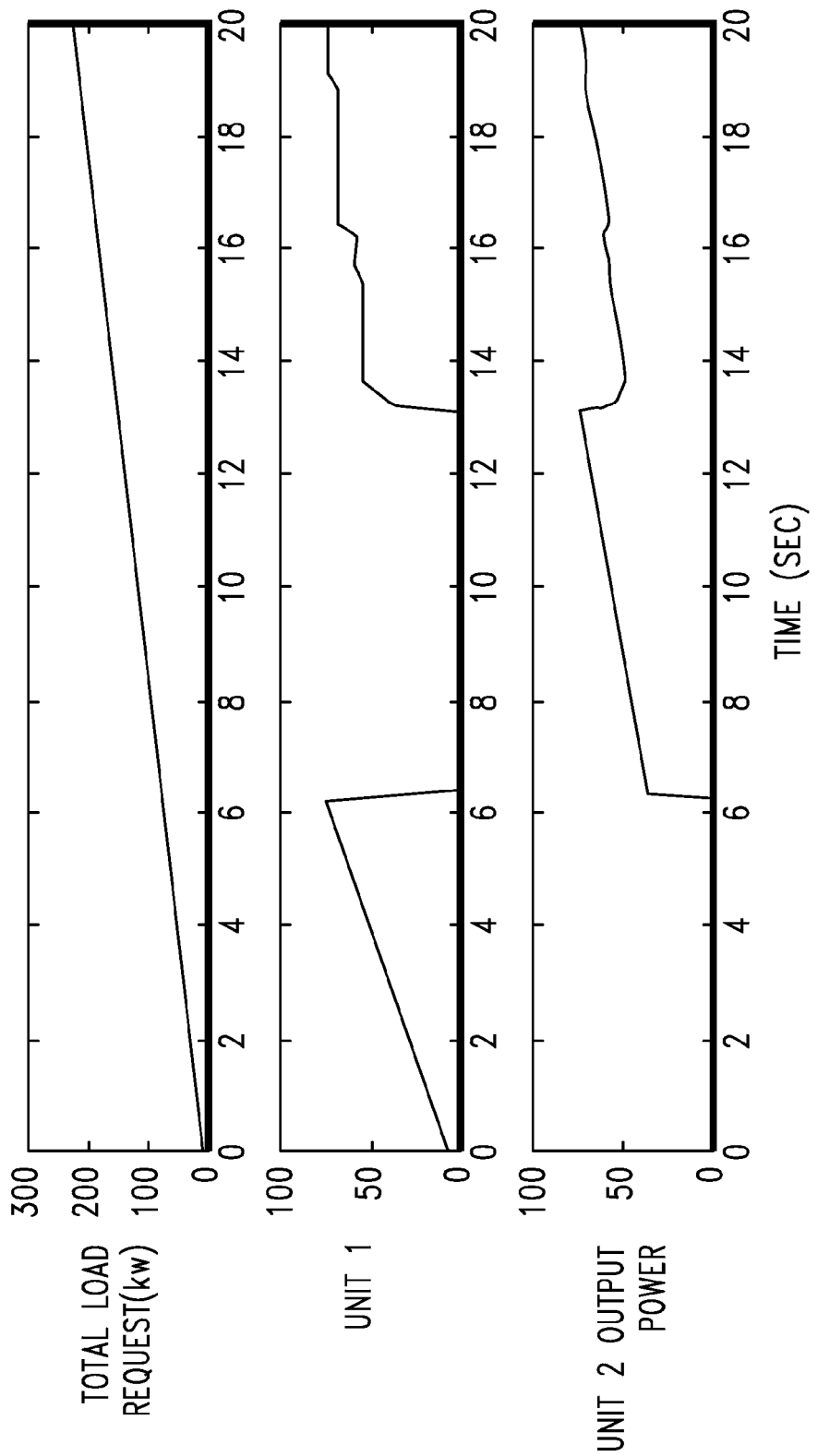
FIG. 37 is a graph of unit power output in a hybrid fuzzy rule-based controller implementation in a system having one 75 kw unit and one 150 kw unit.

For two different units, hybrid fuzzy node-based implementation was used for power distribution in Matlab/Simulink according to the optimal power distribution results. FIG. 37 shows how the PMS split power between two different units.

Figure 38:
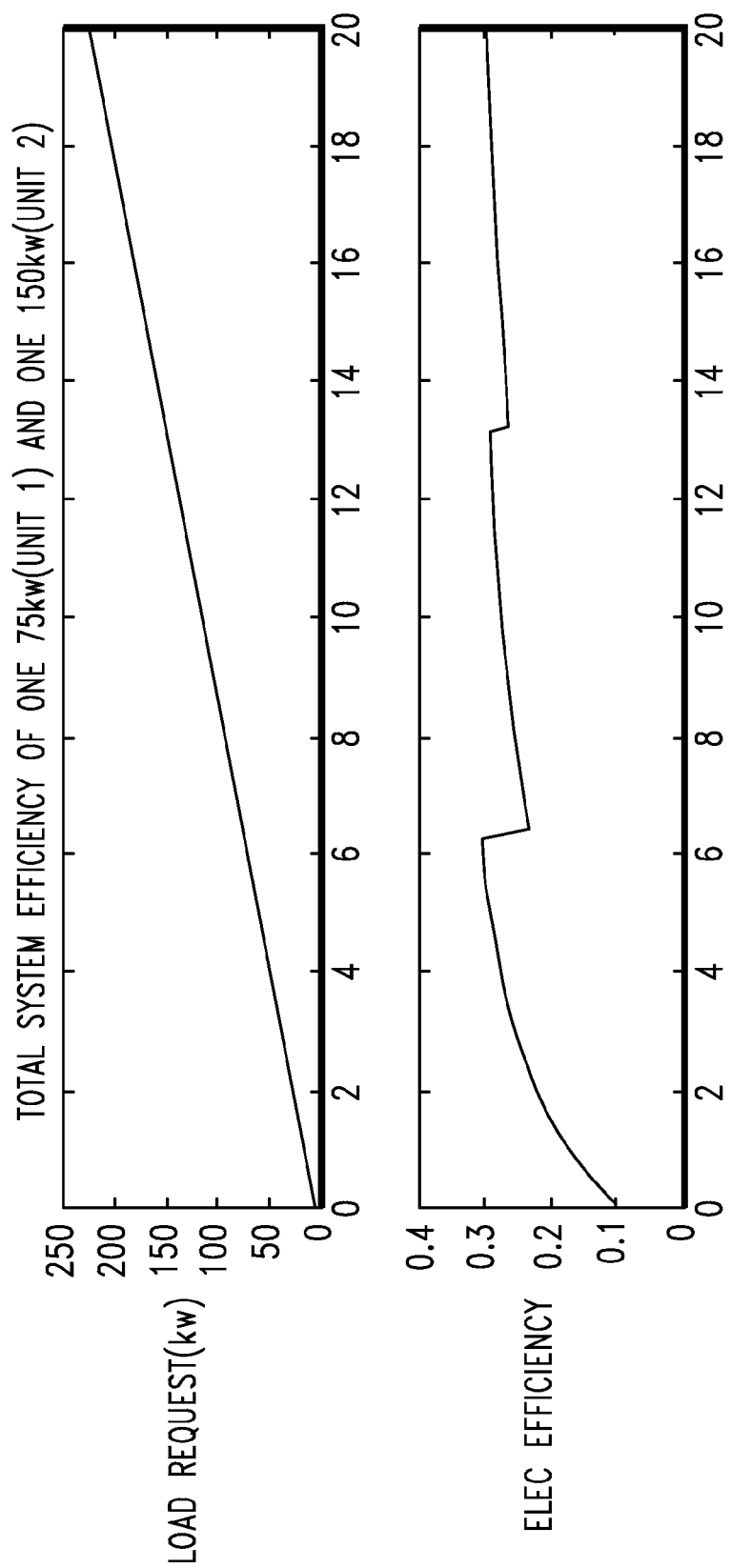
FIG. 38 is a graph of system efficiency for a hybrid fuzzy rule-based controller implementation in a system having one 75 kw unit and one 150 kw unit.

It can be seen from the graph that when the total load power request is less than 75 kw, only the 75 kw unit (unit 1) runs and the 150 kw unit (unit 2) does not run. When the total load power request is greater than 75 kw and less than 150 kw, only the 150 kw unit (unit 2) runs and the 75 kw unit (unit 1) does not run. When the total load power request is greater than 150 kw, the 75 kw unit (unit 1) and the 150 kw unit (unit 2) split the load power corresponding to the fuzzy rules designed to approximate the optimal power distribution. FIG. 38 shows the total electrical efficiency by using this hybrid fuzzy rule-based PMS.

It can be seen that when the total load power request reaches 75 kw, the 75 kw unit (unit 1) ran full load, and the total electrical efficiency achieve its highest point. It is approximately 31%. When the total load power request reaches 150 kw, the 150 kw unit (unit 2) runs full load, and the system electrical efficiency achieve its third highest point. When the total load power request reaches 225 kw, both the 75 kw unit (unit 1) and the 150 kw unit (unit 2) run full load, and the system electrical efficiency achieve its second highest point. Identical units can find two or three identical highest efficiency points. This is not the case for different units because different units have different efficiency maps, and their maximum efficiency and the change of efficiency are different.

Figure 39:
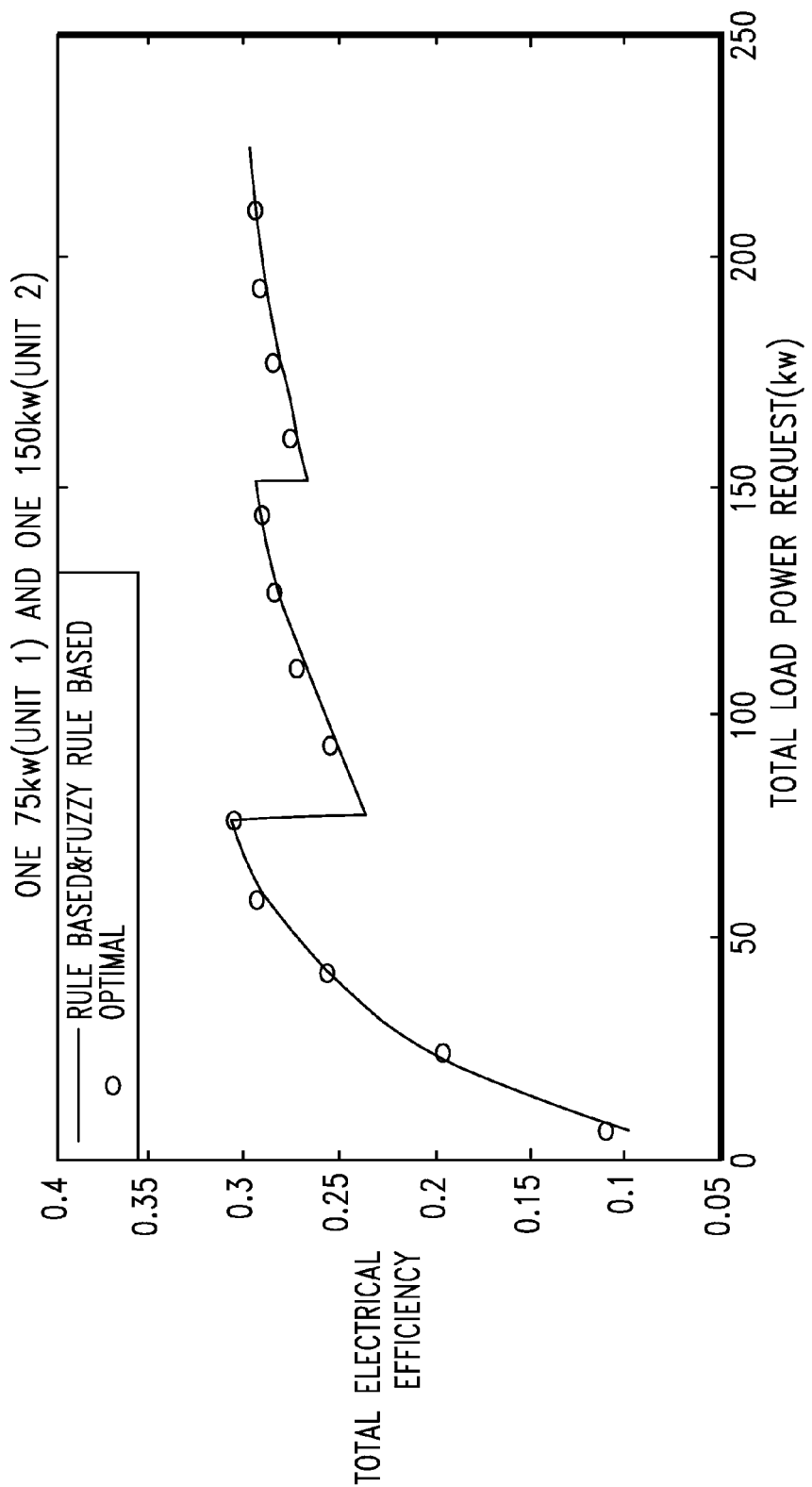
FIG. 39 is a graph of system efficiency under a hybrid fuzzy rule-based implementation and under an optimal power distribution scenario for a system having one 75 kw unit and one 150 kw unit.

This system efficiency is satisfactory if compared with the optimal efficiency. This can be seen from FIG. 39 in the following page.

It can be seen that the system electrical efficiency of hybrid fuzzy rule-based implementation is almost exactly the same as that of optimal power distribution. This is the power distribution for one 75 kw unit and one 150 kw unit. The power distribution for three different units with two 75 kw units (unit 1 and unit 2) and one 150 kw unit (unit 3) will now be evaluated.

4.8.4. Three Different Units with Two 75 kw Units and One 150 kw Unit

Figure 40:
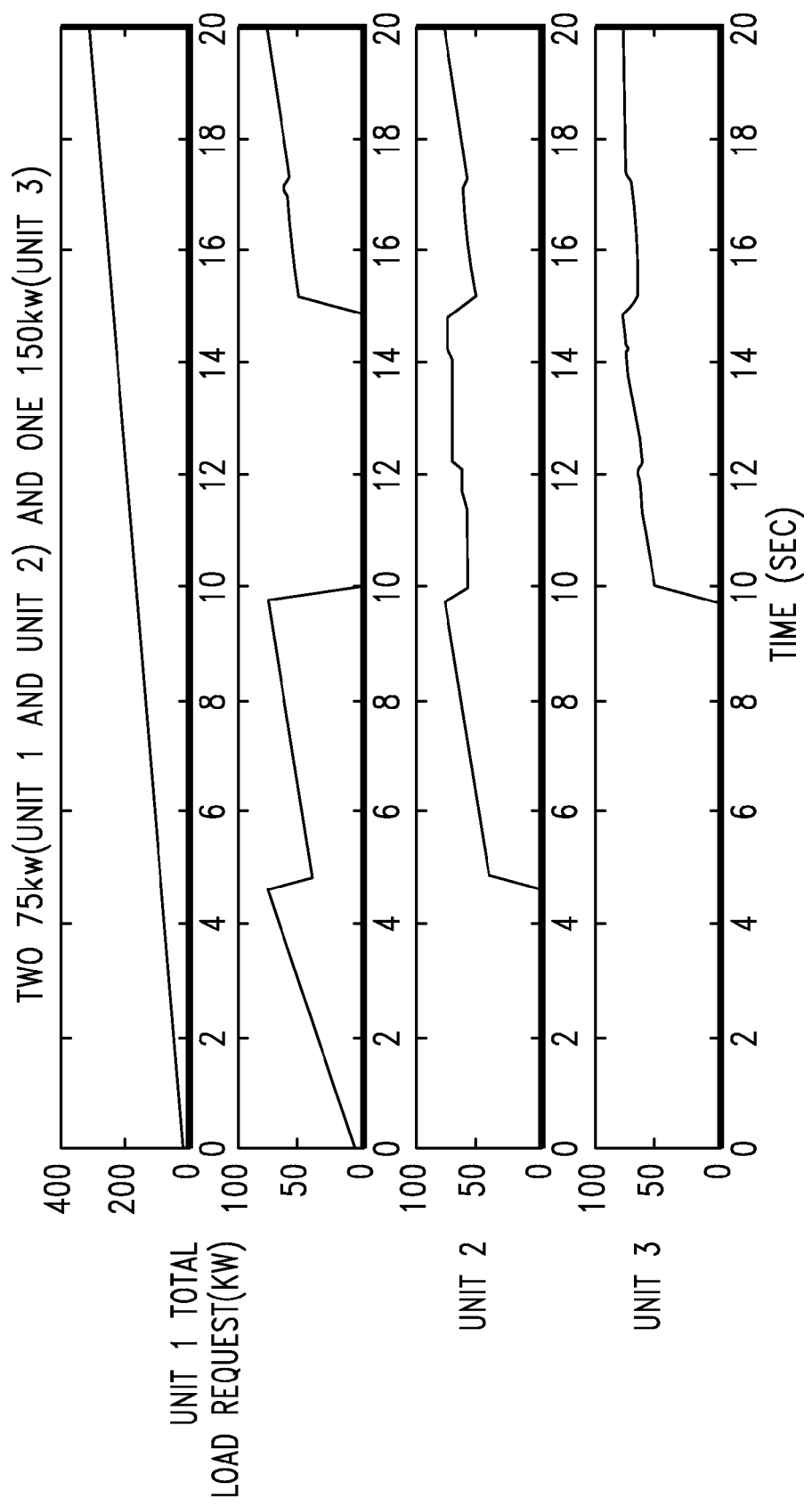
FIG. 40 is a graph of unit power output under a hybrid fuzzy rule-based controller implementation a system having two 75 kw units and one 150 kw unit.

For three different units, hybrid fuzzy rule-based implementation is used for power distribution in Matlab/Simulink according to the optimal power distribution results. FIG. 40 shows how the power management system split power among three different units with two 75 kw units and one 150 kw unit.

Figure 41:
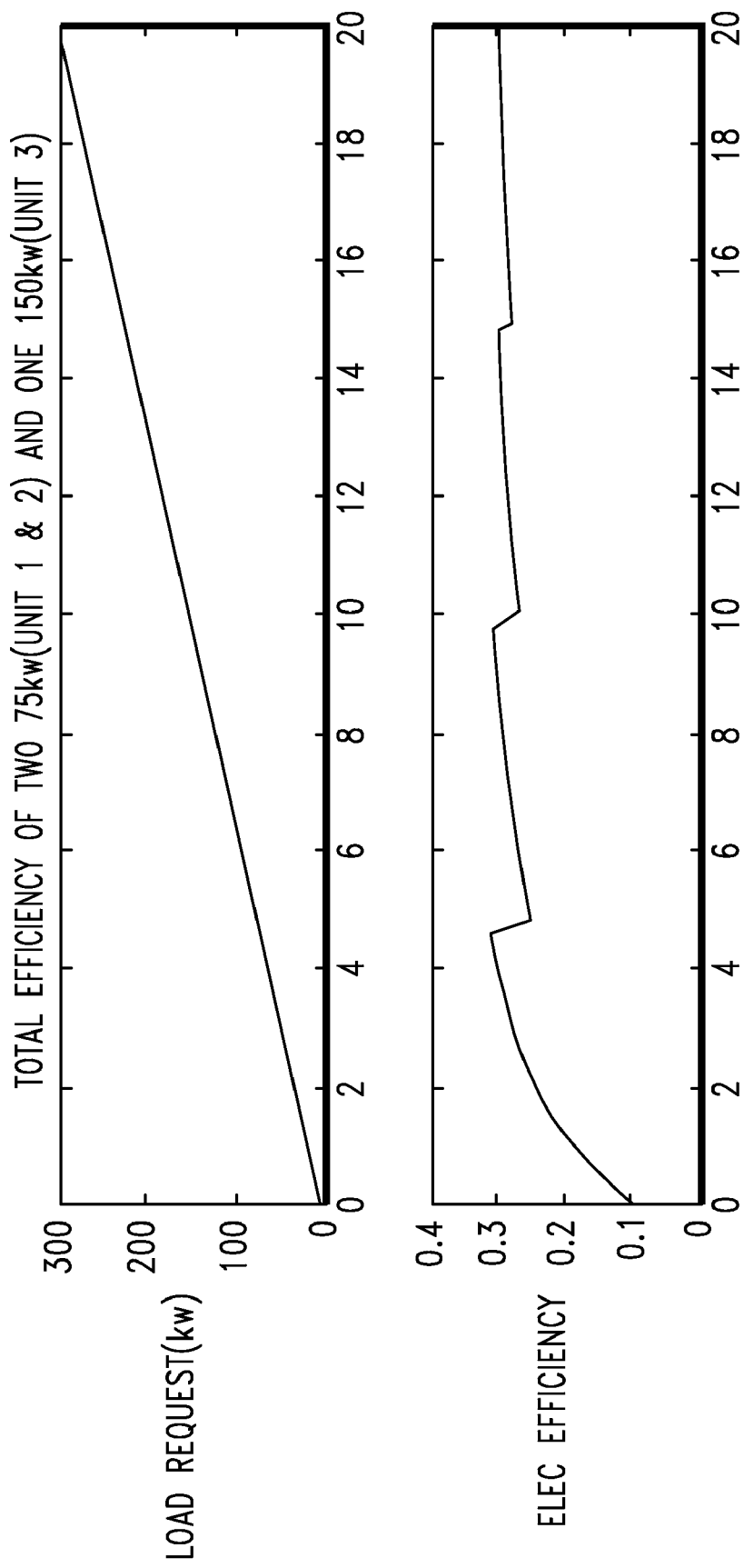
FIG. 41 is a graph of system efficiency in a hybrid fuzzy rule-based controller implementation in a system having two 75 kw units and one 150 kw unit.

It can be seen that when the total load power request is less than 75 kw, only the 75 kw unit (unit 1) runs, and the other 75 kw unit (unit 2) and the 150 kw unit (unit 3) do not run. When the total load power request is greater than 75 kw and less than 150 kw, the two 75 kw units (unit 1 and unit 2) run the same load power and the 150 kw unit (unit 3) does not run. When the total load power request is greater than 150 kw and less than 225 kw, one 75 kw unit (unit 1) does not run, the other 75 kw unit (unit 2) and a 150 kw unit (unit 3) split the total load corresponding to the fuzzy rules designed to approximate the optimal power distribution. When the total load power request is greater than 225 kw, two 75 kw units run identical load power amount, and the power of the 150 kw unit corresponds to the fuzzy rules designed to approximate the optimal power distribution. FIG. 41 shows the total electrical efficiency by using this hybrid fuzzy rule-based power management system.

Figure 36:
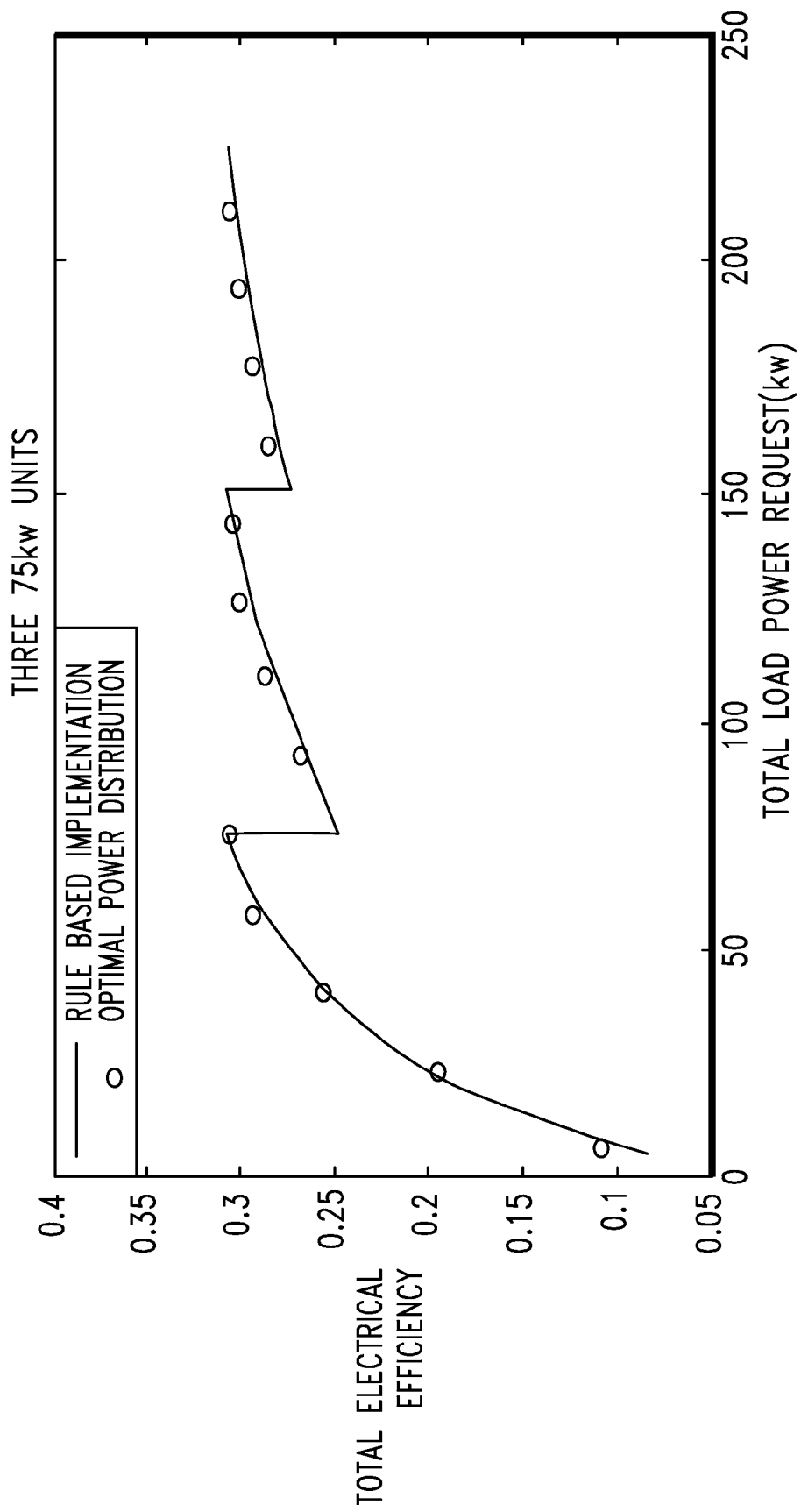
FIG. 36 is a graph of system efficiency in a rule-based controller implementation and an optimal power distribution scenario in a system with three 75 kw units.

It can be seen that when the total load power request reaches 75 kw, the 75 kw unit (unit 1) ran full load, and the system electrical efficiency achieve its highest point. It is approximately 31%. When the total load power request reaches 150 kw, both 75 kw units (unit 1 and unit 2) run full load, and the system electrical efficiency also achieve its highest point. When the total load power request reaches 225 kw, the 75 kw unit (unit 1) does not run, the other 75 kw unit (unit 2) and a 150 kw unit (unit 3) run full load, and the system electrical efficiency achieve its third highest point. When the total load power request reaches 300 kw, all units run full load and the system electrical efficiency achieve its second highest point. For three identical units, there are three identical highest efficiency points as seen in FIG. 36. This is not the case for different units because different units have different efficiency maps, and different units have different maximum efficiency and different change of efficiency.

Figure 42:
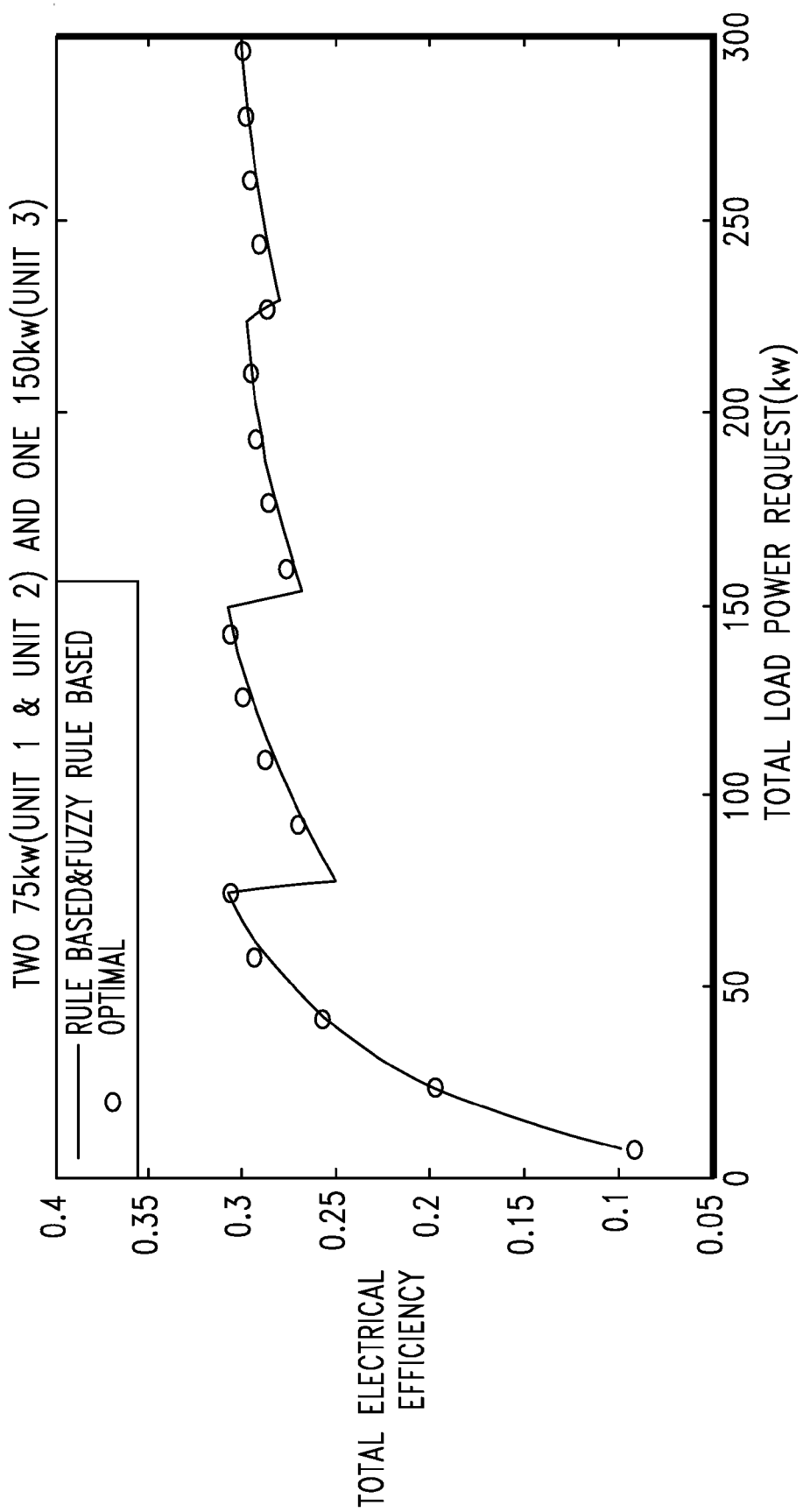
FIG. 42 is a graph of system efficiency under a hybrid fuzzy rule-based controller implementation and the optimal power distribution for two 75 kw units and one 150 kw unit.

This system efficiency curve is satisfactory if compared with the optimal efficiency. This can be seen from FIG. 42.

From the graph, it can be seen that the hybrid fuzzy rule-based implementation approximates the optimal power distribution. This is the power distribution for two 75 kw units and one 150 kw unit. The power distribution for another combination, one 75 kw unit and two 150 kw units, will now be evaluated.

4.8.5. Three Different Units with One 75 kw Unit and Two 150 kw Units

Figure 43:
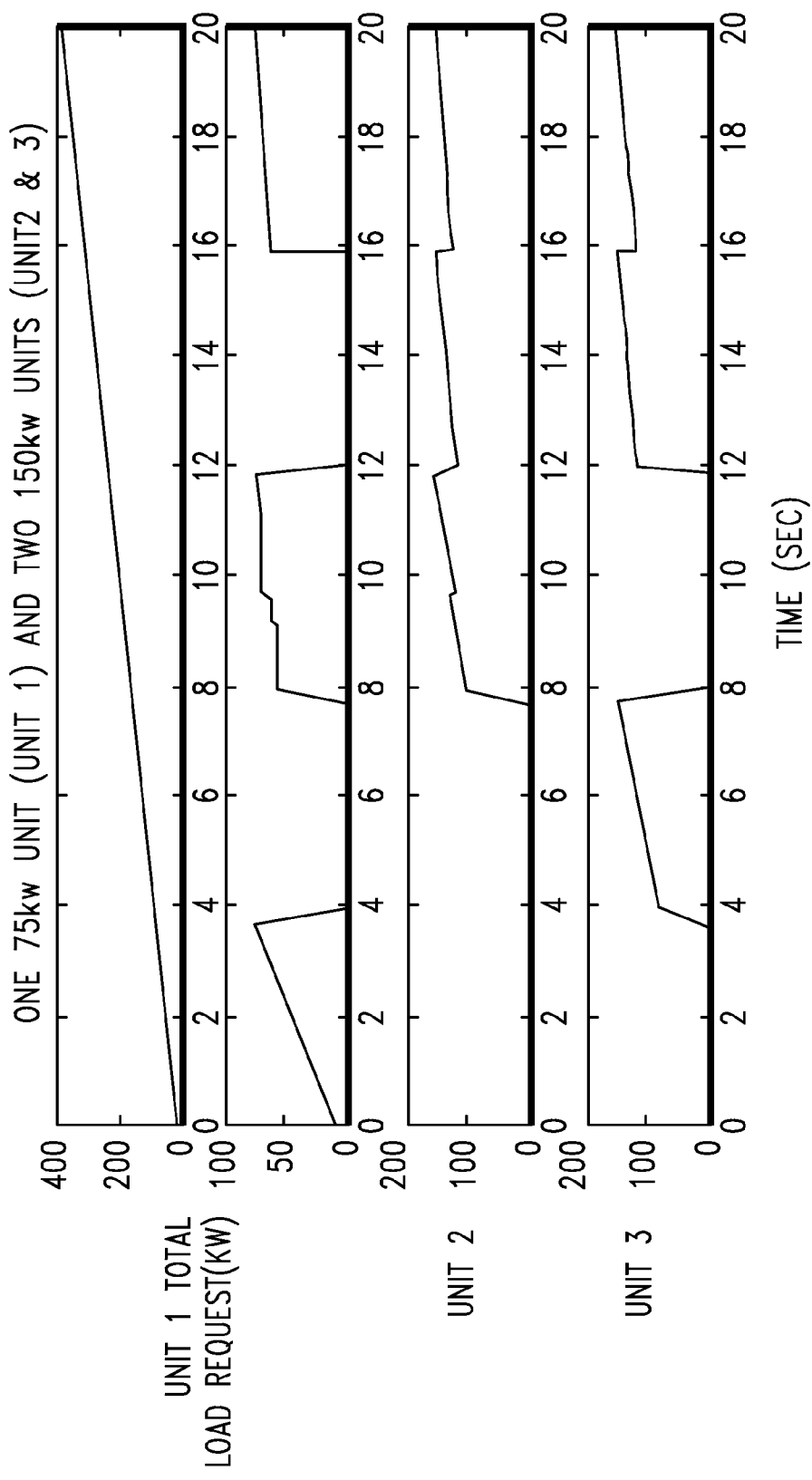
FIG. 43 is a graph of unit power output under a hybrid fuzzy rule-based controller implementation in a system having one 75 kw unit and two 150 kw units.

FIG. 43 shows how the hybrid fuzzy rule-based power management system distributes power among three different units with one 75 kw unit (unit 1) and two 150 kw units (unit 2 and unit 3). All crisp rules and fuzzy rules used here are based on the optimal power distribution data.

Figure 44:
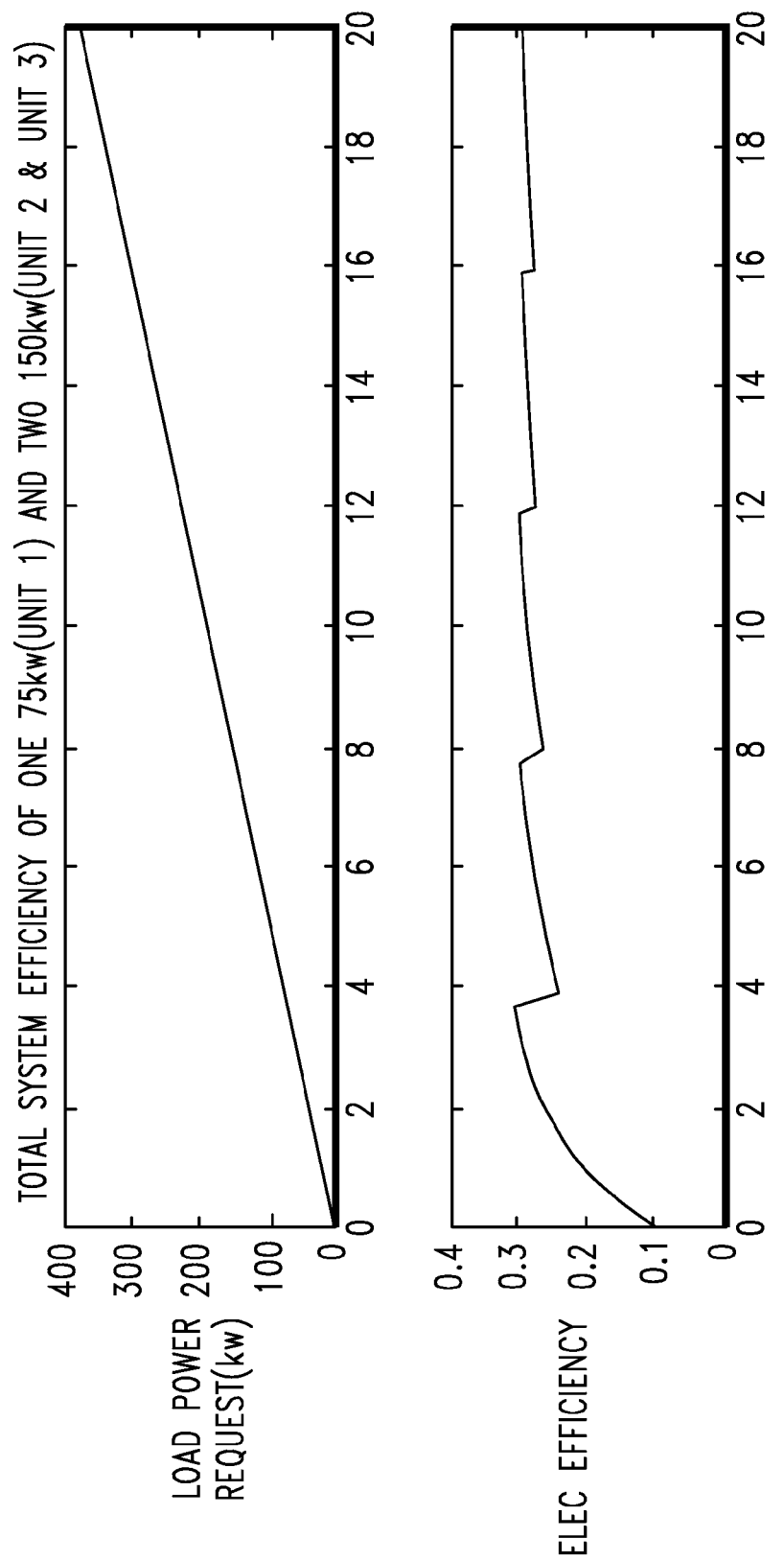
FIG. 44 is a graph of system efficiency under a hybrid fuzzy rule-based controller implementation in a system having one 75 kw unit and two 150 kw units.

From the graph, it can be seen that when the total load power request is less than 75 kw, only the 75 kw unit (unit 1) runs, and neither 150 kw unit (unit 2 and unit 3) runs. When the total load power request is greater than 75 kw and less than 150 kw, only one of the 150 kw units (unit 3) runs, and neither the 75 kw unit (unit 1) nor the other 150 kw unit (unit 2) run. When the total load power request is greater than 150l cw and less than 225 kw, one of the 150 kw units (unit 3) does not run. The 75 kw unit (unit 1) and the other 150 kw unit (unit 2) split the total load corresponding to the fuzzy rules designed to approximate the optimal power distribution. When the total load power request is greater than 225 kw and less than 300 kw, the 75 kw unit (unit 1) does not run, and two 150 kw units (unit 2 and unit 3) equally split the total load power. When the total load power request is greater than 300 kw, two 150 kw units run identical load power amount; the load power is split between one 75 kw unit (unit 1) and the two 150 kw units (unit 2 and unit 3) corresponding to the fuzzy rules designed to approximate the optimal power distribution. FIG. 44 shows the total electrical efficiency by using this hybrid fuzzy rule-based power management system.

It can be seen that when the total load power request reaches 75 kw as shown in FIG. 44, the 75 kw unit (unit 1) runs full load, and the total electrical efficiency achieves its highest point, approximately 31%. When the total load power request reaches 150 kw, one of the 150 kw units (unit 3) runs full load and the system electrical efficiency achieves its fourth highest point. When the total load power request reaches 225 kw, the 75 kw unit (unit 1) and a 150 kw unit (unit 2) runs full load, and the system electrical efficiency achieves its second highest point. When total load power request reaches 300 kw, two 150 kw units (unit 2 and unit 3) run full load and the system electrical efficiency achieves its fourth highest point, which is the same system electrical efficiency as when the total load power request is 150 kw. When the total load power request reaches 375 kw, all units run full load and the system electrical efficiency achieves its third highest point.

The efficiency curve of the hybrid fuzzy rule-based system for one 75 kw unit and two 150 kw units also is satisfactory if compared with the optimal efficiency. It can be seen from FIG. 45.

Figure 45:
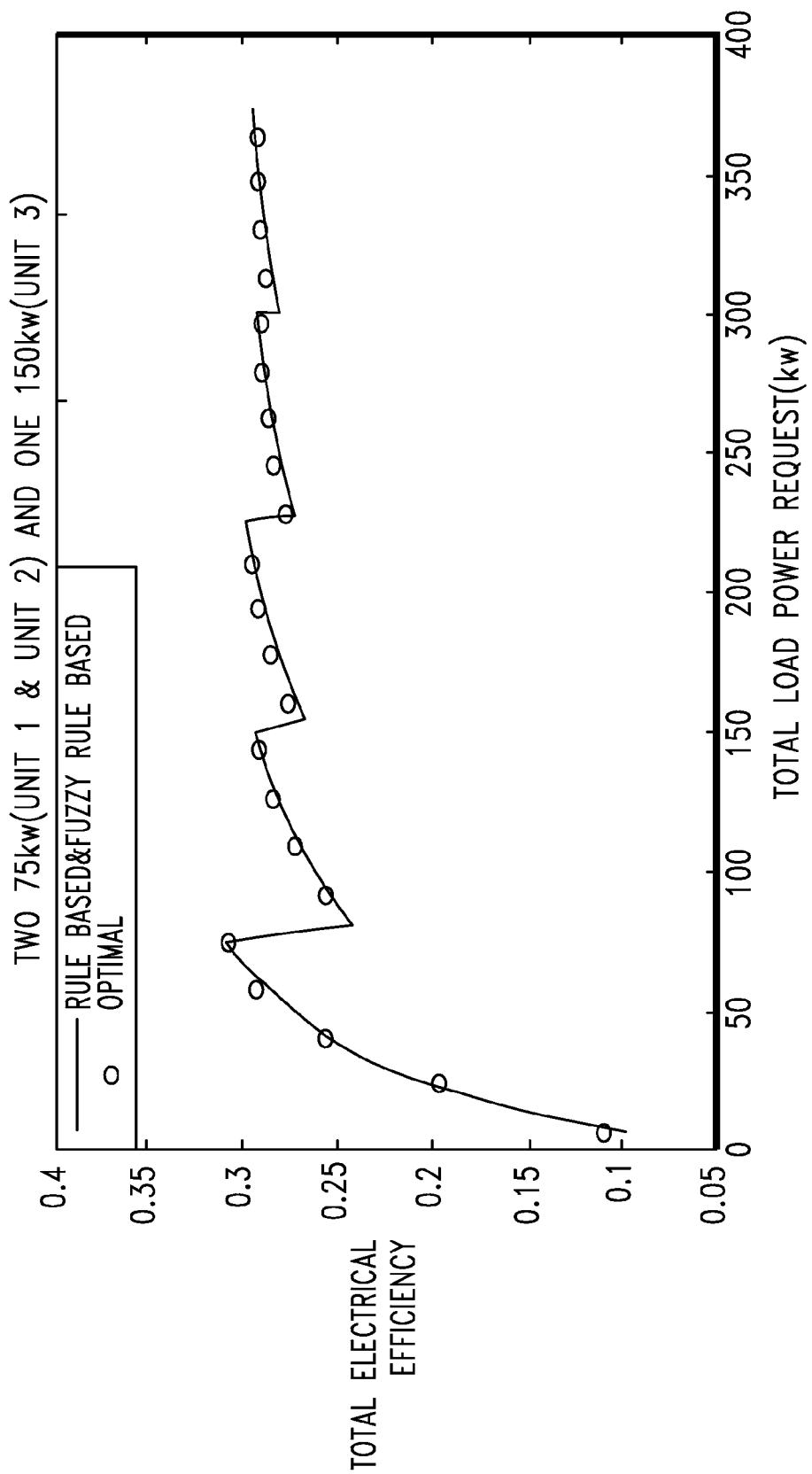
FIG. 45 is a graph of system efficiency under a hybrid fuzzy rule-based controller implementation and optimal power distribution in a system having one 75 kw unit and two 150 kw units.

From FIG. 45, it can be seen that the hybrid fuzzy rule-based implementation approximates the optimal power distribution.

4.9. Analysis of Results

The simulation results of the above five configurations in this chapter demonstrate that the performance of the proposed optimal rule-based and hybrid fuzzy rule-based PMS improve the system efficiency significantly compared to the rule-based PMS. That is currently used by our industry partner. These proposed PMS approximate the optimal results obtained by using the SQP method as described in Chapter 3. They are also easy to implement online.

5. Conclusion and Recommendations 5.1. Conclusion

In this Part, optimal power management strategies were designed for DG system with five configurations. First, SQP was used to find optimal power distribution for each configuration offline. Then the optimal system efficiencies were compared with that of existing power distribution methods. The simulation results shows that the optimal power distribution is much better than the existing power distribution methods. It can improve the system efficiency significantly. However, because of the time typically needed to calculate the optimal solution online by using mathematic methods such as SQP, rule-based and hybrid fuzzy rule-based systems were used to implement the optimal PMS according to the summary of the optimal data. The optimal solution results of some configurations have obvious patterns, around which rule-based PMS were designed. Some other configurations do not have obvious patterns in certain regions. In those cases hybrid fuzzy rule-based PMS were designed. The proposed rule-based and hybrid fuzzy rule-based PMS approximate the optimal power distribution. It is also easy to implement online.

5.2. Recommendations

GA can also be used to optimize the fuzzy systems. Alternatively, other evolutionary techniques such as particle swarm optimization (PSO) also can be used. Those evolutionary techniques can be used to tune fuzzy system parameters such as fuzzy membership functions and fuzzy rules.

The fuzzy system is powerful at exploring complex problems because it can be understood and built easily by engineers according to their experience since a fuzzy system encodes human reasoning. However, fuzzy logic lacks precision. Additionally, when the number of variables of a fuzzy system increases, the possible number of rules increases exponentially, and it will be difficult to design a complete rule set to achieve optimal system performance.

In the future, for the optimization part as described in Chapter 3, a DP also can be used to optimize the power distribution. DP is a global optimization method, and it can find the global optimizer directly. Additionally, engine start up cost can be taken into consideration when defining the system electrical efficiency cost function. For the implementation part as described in Chapter 4, the hybrid fuzzy rule-based systems still can be used to design PMS. However, look up tables also can be used to design the PMS if the environment is stable. The look up table is easy to implement online, though it is not robust against disturbance. In addition, the output of a look up table is generally more precise than the output of a fuzzy system if there is sufficient optimal data in the look up table.

No matter whether look up table or hybrid fuzzy rule-based PMS is used, in the future, it is better to take the site condition into consideration when designing those PMS. Generally speaking, when site conditions change, the engine efficiency map also changes. In this case, the "derate" table of the engine efficiency can be added into the PMS model to calculate the difference in performance based on the actual site conditions. And then to make the implementation results more practical and robust against environmental variation.

APPENDIX A TO PART 1

| Optimization Programs |
|---|
| A1 Two Identical Units |

```
diary eff6.txt
clear all
Pmax=75;
for k=1:35
c(k)=k*2+5;
Aeq=[1 1 ];
beq=c(k);
lb=[0;0];
ub=[75;75];
if c(k)<=Pmax
    y0=c(k)−5;
    else
      y0=c(k)/2+5;%c(k)/2+30 for n=2
end
%for n=2;x0=[10;80];%[10;39];[20;40];[20;80];[30;48];[30;80];[40;60];
[40;70];[40;80]
x0=[y0;c(k)−y0];
%x0=[0;12];
options = optimset('LargeScale';off);
[x,fval]=fmincon(@myfun6,x0,[ ],[ ],Aeq,beq,lb,ub,[ ],options);
x1 (k)=x(1);
x2(k)=x(2);
EFF(k)=c(k)/fval;
end
result=[c' x1' x2' EFT]
diary off
--------------myfunction6
function f = rnyfun6(x)
P=[10 14.7 20 23.3 30 40 50 60 70 80];
eff=[0.117 0.150 0.184 0.200 0.226 0.254 0.274 0.292 0.304 0.311];
n=2;
format long
p=polyfit(P,eff,n);
f=(x(1)/polyval(p,x(1))+x(2)/polyval(p,x(2)));
```

| Optimization Programs |
|---|
| A2 Three Identical Units |

```
diary eff7.txt
Pmax=75;
for k=1:70
c(k)=k*2+5;
Aeq=[1 1 I];
beq=c(k);
lb=[0;0;0];
ub=[Pmax;Pmax;Pmax];
if c(k)<=Pmax
    y1=c(k)−5;
    y2=2;
elseif Pmax<c(k)<=2*Pmax
    y1=c(k)/2+2;
    y2=2;
else
    y 1 =c(k)/3+10;
    y2=c(k)/3+10; end
x0=[y 1 ;y2;c(k)−y1 −y2];
[x,fval]=fmincon(@myfun7,x0,[ ],[ ],Aeq,beq,lb,ub);
x1(k)=x(1);
x2(k)=−x(2);
x3(k)=x(3);
EFF(k)=c(k)/fval;
end
result=[c' x1' x2' x3' EFF']
diary off
----------myfun7----------
function f = myfun7(x)
P=[10 14.7 20 23.3 30 40 50 60 70 80];
eff=[0.117 0.150 0.184 0.200 0.226 0.254 0.274 0.292 0.304 0.311];
n=2;
format long
p=polyfit(P,eff,n);
    f=(x(1)/polyval(p,x(1))+x(2)/polyval(p,x(2))+x(3)/polyval(p,x(3)));
```

| A3 Two different Units |
|---|

```
diary eff8.txt
clear all
Pmax1=75;
Pmax2=150;
for k=1:215
c(k)=k*1+10;
Aeq=[1 1 ];
beq = c(k) ;
lb=[0;0;0];
ub=[Pmaxl;Pmax2];
if c(k)<=PmaxI
    y0=c(k)−5;%or c(k)/2;if change to c(k)/4,the result will change
elseif c(k)<=Pmax2
    y0=2;%or 12
else
    y0=c(k)/4;%or c(k)/3,or c(k)/3+40,c(k)/2
end
x0=[y0;c(k)−y0];
[x,fval]=fmincon(@myfun8,x0,[ ],[ ],Aeq,beq,lb,ub);
xl (k)=x(1);
x2(k)=x(2);
EFF(k)=c(k)/fval;
end
result=[c' x1' x2' EFF']
diary off
-------------myfun8
function f= myfun8(x)
P=[10 14.7 20 23.3 30 40 50 60 70 80];
eff[ 0.117 0.150 0.184 0.200 0.226 0.254 0.274 0.292 0.304 0.311];
P2=[20 30 40 60 80 90 100 120 140 150];
eff2=[0.1029 0.14 0.1699 0.2130 0.2410 0.2502 0.2605 0.279 0.2906 0.293];
n=2;
format long
p=polyfit(P,eff,n);
q=polyfit(P2,eff2,n);
f=(x(1)/polyval(p,x(1))+x(2)/polyval(q,x(2)));
```

| Optimization Programs |
|---|
| A4 Three Different Units with Two 75kw Units and One 150 kw Unit |
| ```
diary eff9.txt
Pmax1=75;
Pmax2=150;
for k=1:290
c(k)=k*1+10;
Aeq=[1 1 1];
beq=c(k);
lb=[0;0;0];
ub=[Pmax1;Pmax1;Pmax2];
if c(k)<=Pmax1
y1=c(k)-5;
y2=2;
elseif c(k)<=Pmax2
y1=c(k)/2+2;
y2=c(k)/2+2;
elseif c(k)<=Pmax2+Pmax1
y1=2;
y2=c(k)13+10;
else
y1=c(k)/4;
y2=c(k)/4;
end
x0=[y;y2;c(k)-y1-y2];
[x fval]=fmincon(@myfim9,x0,0,[ ],Aer bbeq,lb,ub);
x1(k)=x(1);
x2(k)=x(2);
x3(k)=x(3);
EFF(k)=c(k)/fval;
end
result=[c' x1' x2' x3' EFF']
diary off
-------------myfun9-------------------
function f = myfun9(x)
P=[ 10 14.7 20 23.3 30 40 50 60 70 80];
eff=[ 0.117 0.150 0.184 0.200 0.226 0.254 0.274 0.292 0.304 0.311];
P2=[ 20 30 40 60 80 90 100 120 140 150];
eff2=[ 0.1029 0.14 0.1699 0.2130 0.2410 0.2502 0.2605
0.279 0.2906 0.293];
n=2;
format long
p=polyfit(P,eff,n);
q=polyfit(P2,eff2,n);
f=(x(1)/polyval(p,x(1))+x(2)/polyval(p,x(2))+x(3)/polyval(q,x(3)));
``` |
| A5 Three Different Units with One 75 kw Unit and Two 150 kw Units |
| ```
diary eff10.txt
clear all
Pmax1=75;
Pmax2=150;
for k=1:360
c(k)=k*1+10;
Aeq=[1 1 1];
beq=c(k);
lb=[0;0;0];
ub=[Pmax1;Pmax2;Pmax2];
if c(k)<=Pmax1
y1=c(k)-5;
y2=2;
elseif c(k)<=Pmax2
y1=2
y2=2;
elseif c(k)<=Pmax2+Pmax1
y1=c(k)/3;
y2=2;
elseif c(k)<=2*Pmax2
y1=2;
y2=c(k)/2;
else
y1=c(k)/5;
y2=c(k)/2;%or y2=2*c(k)/5
end
x0=[y1 ; y2; e(k)-y1-y2] ;
[x,fval]=fmincon(@myfun10, x0, [ ], [ ],Aeq,be q, lb,ub);
x1(k)=x(1);
x2(k)=x(2);
x3(k) =x(3);
``` |

| Optimization Programs |
|---|
| ```
EFF(k)=e(k)/fval;
end
result=[c' x1' x2' x3' EPP]
diary off
       myfun10
function f = myfun10(x)
P=[ 10 14.7 20 23.3 30 40 50 60 70 80];
eff=[ 0.117 0.150 0.184 0.200 0.226 0.254 0.274 0.292 0.304 0.311];
P2=[ 20 30 40 60 80 90 100 120 140 150];
eff2=[ 0.1029 0.14 0.1699 0.2130 0.2410 0.2502 0.2605 0.279
0.2906 0.293];
n=2;
format long
p=polyfit(P,eff,n);
q=polyfit(P2,eff2,n);
f=(x(1)/polyval(p,x(1))+x(2)/polyval(q,x(2))+x(3)/polyval(q,x(3)))
``` |

APPENDIX B TO PART 1

| FIS Files |
|---|
| B1 FIS of ELSE subsystem for Three Different Units with Two 75 kw Units and One 150 kw Unit |
| ```
[System]
Name=13MS_5_3DIFF_25_2'
Type--'mamdatur
Version=2.0
NumInputs=1
NumOutputs=1
NumRules=4
AndMethod='rrin'
OrMethod='max'
ImpMethod='min'
AggMethod-'max.
DefuzzMethod='centroid'
[Input1]
Name-'Total_Required_Power.
Range-[223 300]
NumMFs=4
MF1=1.2:1rapmf,[223 230 250.1944444444-44 258]
MF2='M'I'trapmf,f254 262 280.342592592593 289]
MF3=Th'Crapmf,[278.6 283.8 301A 314.6]
MF4----'01C:trapmf,[248 254259.564814814815 265
[Output1]
Name--'unit 3'
Range=[110 150]
NumMFs=4
MF1=1;:lrapmf,[110.2 116.8 129.9 137.9]
MF2='M'ftrapmf,[140.3 142.3 146.5 148.8]
MF3-11'..'trapmf,[146.1 1473 150 162.6]
MF4-'0K'ftrapmf,[134.7 137.6 141.8 144]
[Rules]
1, 1 (1): 1
2, 2 (1): 1
3, 3 (1): 1
4, 4 (1): 1
``` |
| B2 FIS of ELSE subsystem for Three Different Units with One 75 kw Unit and Two 150 kw Units |
| ```
[System]
Name='PIV1S_5_3D1FF_2B_2'
Type='mamdani'
Version=2.0
NumInputs=I
NumOutputs=1
NumRules=5
AndMethod-='min*
OrMethod='max'
ImpMethod='min'
AggMethod='max'
DefuzzMethod='centroid.
``` |

-continued

FIS Files

```
[Inputl]
Name='Total Required_Power'
Range=[300 375]
NumMFs=5
MF1='12:'trimf,[297.7 312.3 334.5]
MF2='El'Atimf,[341.1 356.6 372.9]
MF3='MYtrimf,[322.3 338.6 356.8]
MF4=bk'ftrimf,[309.1 3253 341.4]
MF5=VI-1*:*trimf,[359.1 366.6 376.8]
[Outputl]
Name='unit_1'
Range=[59 75]
NumMFs=5
MF1='H'ftrirnf,[69.42 72.71 73.63]
MF2=TH':trimf,[73.2 74.54 77.18]
MF3&L':'trimf,[58.52 62.88 67.2]
MF4='M'Arimf,[65.85 70.3 70.92]
MF5='0K'ftrimf',[63.57 66.45 68.6]
[Rules]
1, 3 (1) : 1
2, 1 (I) : 1
3, 4 (1): 1
4, 5 (I): 1
5, 2 (1) 10
```

Part 2—System Description

1. Introduction

One object of this design is to provide an integrated and optimized Distributed Generation System Control (DGSC) module that improves the overall power generation performance attributes and lowers the capital cost of a distributed generation site installation. The described embodiment leverages the IEEE 1547 "Standard for Interconnecting Distributed Resources with Electric Power Systems" ("Standard" herein) that has defined a nationally recognized standard for grid interconnect for distributed generation (DG) resources.

2. Top Level System Controller Description 2.1. Scope

This section outlines the characteristics of one embodiment of a top level system control of internal combustion engine generating system production units. Other types of generators and further variations of the specific design choices described herein will occur to those skilled in this technology area without undue experimentation based on this disclosure.

2.2. Applicable Documents 2.2.1. Standards

Commercial production components of the system may be selected to comply with the relevant aspects of IEEE 1547 and other standards listed below.

Figure 46:
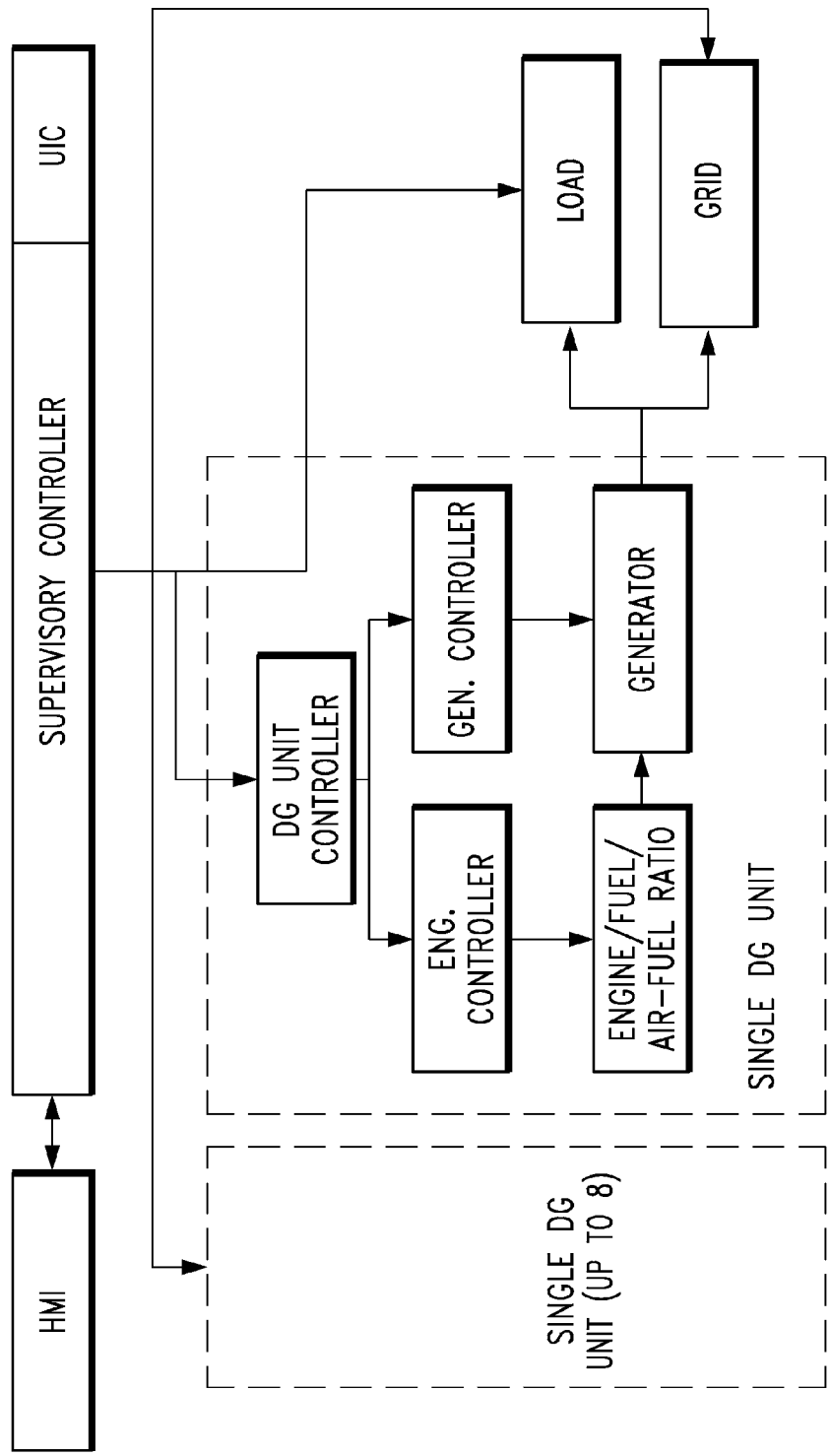
FIG. 46 is a block diagram of the functional components of a distributed generator system controller in one embodiment of the present invention.

IEEE P1547 Standard for Distributed Resources Interconnected with Electric Power System
  IEEE 519 IEEE Recommended Practices and Requirements for Harmonic Control in Electric Power Systems
  UL 508C Standard for Power Conversion Equipment
  UL 2200 Stationary Engine Generators Assemblies
  NFPA 70 National Electric Code 2.2.2. Acronyms
  DG Distributed Generator
  DGSC Distributed Generator System Controller
  HMI Human Machine Interface
  GPM Grid Parallel Mode of operation
  GIM Grid Isolated Mode of operation
  I/O Input/Output
  ISO International Organization for Standardization
  UIC Utility Interface Controller 2.3. System Overview 2.3.1. System Definition A DG unit is an internal combustion engine generating system with a synchronous generator. The DG system controller coordinates the control of one or more DG units as shown in FIG. 46. With the addition of hardware modules, the system controller shall be capable of controlling up to 8 parallel DG units that are connected to the local utility grid in GPM or to the local site distribution bus in GIM. The demonstration prototype will be capable of controlling 2 parallel units. Researchers will investigate the possibility of including DG units with induction generators.

2.3.2. DG Unit Description

The DG unit is a natural gas fueled engine driving a synchronous generator that produces 60 Hz three-phase electrical power at 277/480 VAC under ISO standard conditions. The rated output of each DG unit will be within the range 75-200 kW.

2.3.3 Software Coding

The preferred programming language for system control functions is C or C++, though many other computing languages would also be appropriate. Exceptions in various embodiments include relaying functions written in assembly language and monitoring software written with Microsoft Visual Basic.

2.3.4 Controller Structure and Communication

Each DG unit may include a subsystem control module. There are two main variations of the control structure presently under consideration.

Structure A involves DG subsystem modules communicating with a supervisory controller. The supervisory controller will perform the UIC functions as shown in FIG. 47.

Figure 47:
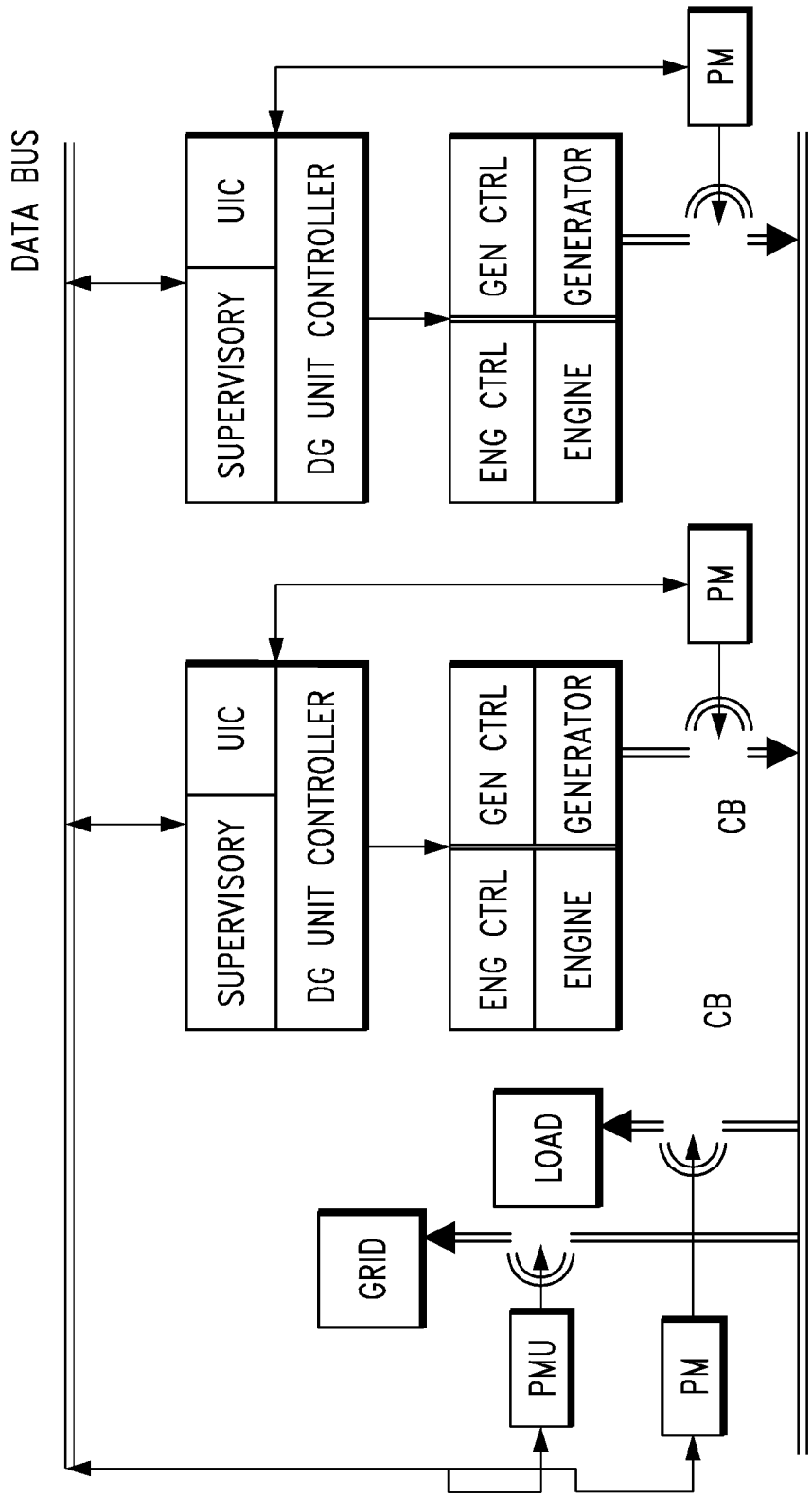
FIG. 47 is a block diagram of the hardware components of a distributed generator system controller in one embodiment of the present invention.

Structure B involves DG subsystem modules communicating with each other and one module will assume the supervisory (i.e. master) control function. There will be an automatic procedure for determining which machine serves as the master. The user will also be able to specify a priority list for selecting the master unit. Within structure B there are two variants:

Structure B.1 has a separate UIC, somewhat similar to FIG. 47.

Structure B.2 incorporates UIC capabilities into every subsystem module.

Regardless of the structure, in these embodiments every subsystem module and any separate supervisory controller or UIC will be connected to a CAN bus network.

Regardless of the structure, in these embodiments every subsystem module and any separate supervisory controller or UIC will have an HMI.

Regardless of the structure, a password protected TCP/IP interface will allow a local or remote operator to monitor performance of the DG system and individual units. The TCP/IP interface will also allow the operator to upload and download system and individual unit control specification parameters interactively and in .xml file format.

There may also be dedicated analog and digital signal channels in addition to the CAN bus.

2.3.5 Control of Electrical Connections

Each DG unit shall be equipped with a motorized circuit breaker to interface with the site load bus. The DG system controller will also control the utility tie circuit breaker. The DG unit breaker and utility breaker control shall be governed according to the IEEE 1547 standard. Each DG unit shall be equipped with a fuel solenoid shutoff valve. The DG system controller will control the turning on and off of an additional fuel solenoid shutoff valve.

2.3.6 Import/Export Control

The generator set shall include provisions for controlling the amount of power that is imported from or exported to the utility grid.

TABLE 2-1

General characteristics of DG unit
General characteristics

| | |
|---|---|
| Rated Output Power of Each DG Unit: | 75 kW < $P_{rated}$ < 200 kW |
| AC Output Voltage: | 3-phase, 277/480 VAC |
| Output Frequency: | 60 Hz |
| Maximum Number of Units: | 8 DG units |
| Net Electric Efficiency at ISO at 75% Load | 28% |
| Base System Output for Pricing Purposes | 480 V/60 Hz |
| Power Factor Capability | >0.8 |
| Standard for Grid Interconnection | IEEE 1547 |

2.4. DG System Controller Interface Descriptions

2.4.1 Human Machine Interface

Each DG unit and any supervisory controller in this embodiment is equipped with a Human Machine Interface (HMI) device to provide a local operator control panel, parameter settings, system indicators, visual alarm or shutdown information, and emergency power off. The HMI devices shall be able to display the following information: generator voltage and current, frequency, DG output in kw and kvar, oil pressure, water temperature, synchronization status, total kilowatt hours, and alarm history.

2.4.2. List of I/O for System Controller

Input switches in the preferred system controller include a run with load switch, mode selection switch (automatic mode or test mode), emergency stop switch, voltage raise/lower switch, and speed raise/lower switch. Utility switches include a "Utility source circuit breaker Aux in" input switch, "Utility source circuit breaker open/close" input switch, a "Utility/bus PT input" switch, a "Local bus PT disconnect," and a "Mains PT disconnect" switch.

The generator portion of the system controller in this embodiment includes these inputs: "Generator circuit breaker Aux in," "Generator circuit breaker open/close," "Generator CT," and "Generator PT." Outputs are included for voltage bias and a Generator On/off Switch.

Engine-related I/O in this embodiment includes inputs for Engine warning, Engine fault, MPU pickup, Idle/rated speed, and Engine crank, as well as outputs for Speed bias, Fuel shutoff valve, and Engine On/off Switch.

2.5. Summary of System Functions

2.5.1 Summary of System Controller Functions

The system controller (DGSC) in the present embodiment provides several functions. At the system level, the DGSC provides grid synchronization and protection of the DG Unit, Regulation in GPM and GIM, and a human/automatic switch between GPM/GIM. Internally, the DGSC provides control of power to ENI auxiliary loads, provides gas shutoff valve control, monitors utility voltage, and implements lower-voltage power supply control. Further, the DGSC adds communication functionality in controlling the HMI, communicating with an external DG gateway, and controlling import and export of power.

2.5.2. Summary of UIC Functions

The UIC in the present embodiment complies with the IEEE 1547 Standard for Interconnecting Distributed Resources with Electric Power Systems.

2.5.3 Summary of DG Unit Protection Functions

The DG units in the present embodiment include current limit protection, emergency power shutdown, protective power shutdown, warning indications, generator over/under voltage indications, generator over/under frequency indications, anti-islanding protection, loss of mains detection, loss of generator excitation, speed/frequency mismatch protection, reverse power protection, and short circuit protection.

2.6 Mode of Operations and Regulations

2.6.1 Single Unit Configurations

Single units in the present embodiment may operate in GIM (voltage-regulating speed control mode) or GPM (voltage-following torque control mode).

2.6.2 Multiple Unit Configurations

Likewise, multiple-unit configurations of the present embodiment can also operate in GIM or GPM. In GIM, one unit uses voltage-regulating speed control, while other units use voltage-following torque control. In GPM, all units use voltage-following torque control.

2.6.3 Loss of Utility Power

In the event of a utility power outage, the DG system automatically disconnects from the utility and continues to provide power to the load. If the engines are not operating at the time of the outage, they start automatically, disconnect from the utility, and provide power to the load. Upon return of the utility power, the DG system synchronizes to the utility grid, reconnects to the utility, and continues as instructed prior to the outage.

2.6.4 Starting Parallel Units

In multi-unit operation, when a start command is sent to the DGSC, all units start and operate parallel to each other, then to the utility grid as needed to supply the load.

2.6.5. 50/60 Hz Operation

The DG system is capable of operating at either 60 Hz or 50 Hz with a gearbox changes and appropriate electrical component changes.

2.6.6. Automatic and Manual/Test Modes

The DG system controller is capable of operating in either Manual/Test Mode or Automatic Mode.

2.6.7. Regulation in Grid Isolated Mode (GIM)

The total harmonic distortion of the DG system electrical output is less than 5% at no load. The DG system controller is capable of regulating the output voltage within a maximum range of +/−0.5% of nominal voltage in GIM (per ANSI84.1B). The DG system controller is capable of maintaining a maximum output voltage deviation of +20% to −25% given a 25% load pickup or a 100% load rejection in GIM. The frequency operating range of DG system in GIM is defined as +/−3% for 50 Hz or 60 Hz systems.

2.6.8 Regulation in Grid Parallel Mode (GPM)

The DGSC includes provisions for controlling the amount of power that is imported from or exported to the utility grid. The DGSC complies with the IEEE 1547 Standard for Interconnecting Distributed Resources with Electric Power Systems.

3. Modeling Overview

An integrated system model for the present embodiment was developed and validated in Matlab/Simulink. The modeling of the system included four major parts: engine, generator, load/grid, and system controller. Models for each individual component were developed and all of them were integrated into a system model.

3.1. Engine and Engine Control Module (ECM)

Figure 48:
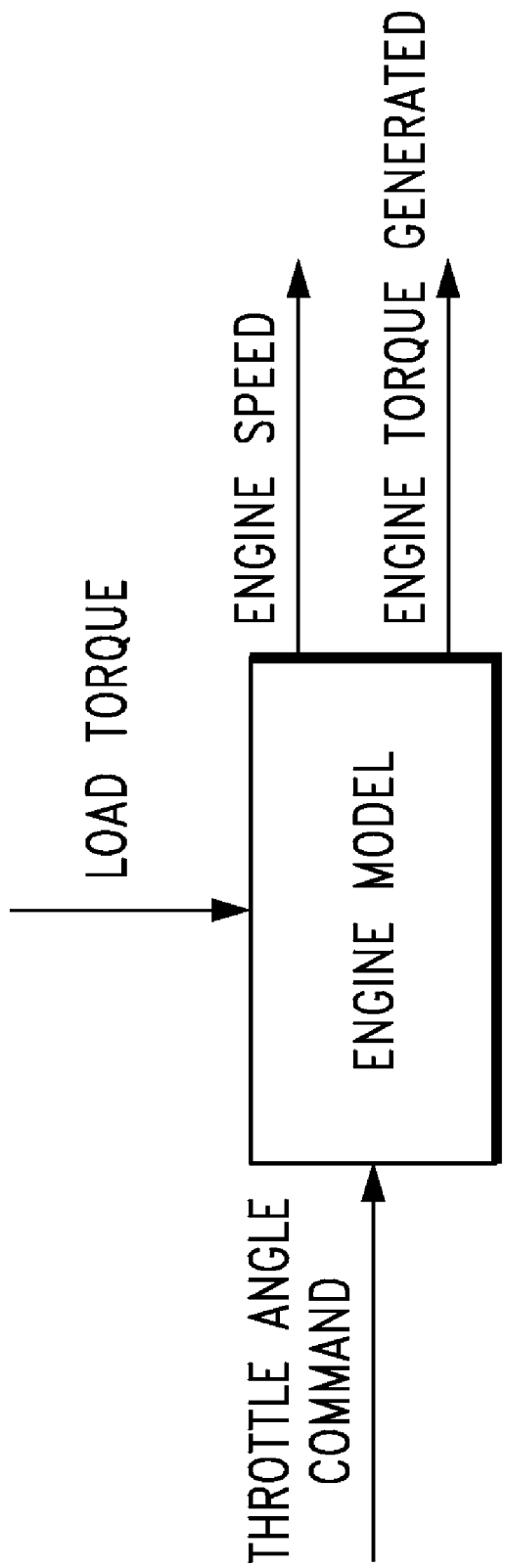
FIG. 48 is a block diagram illustrating inputs and outputs to and from an engine in a distributed generator in one illustrated embodiment.

The engine model in this embodiment is a simplified inertia model based on the simple engine model illustrated in FIG. 48. The input parameter is the throttle angle command. The output parameter is engine torque generated and actual engine speed. The engine load torque is regarded as a disturbance to the engine system.

Figure 49:
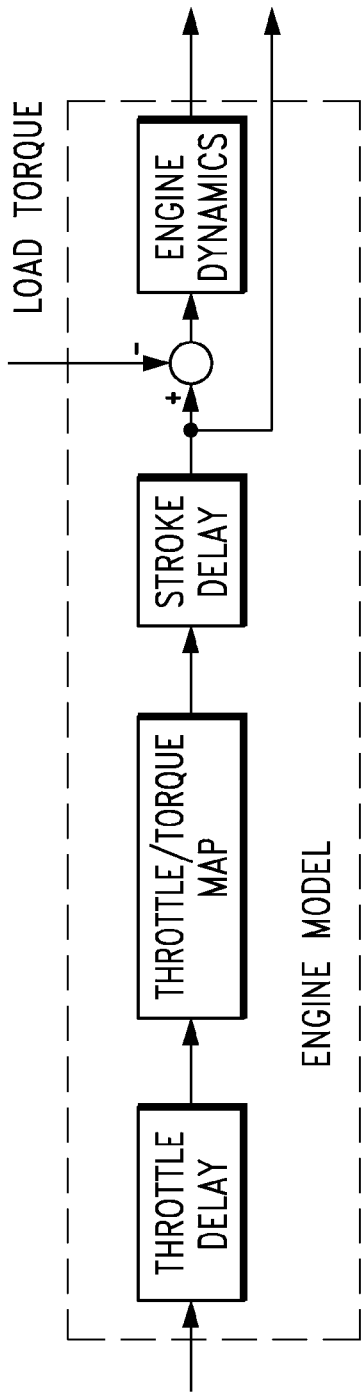
FIG. 49 is a block diagram of a quasi-static engine model.

A quasi-static engine model (shown in FIG. 49) was applied in the simulation of the DG system because the engine operates at an approximately constant speed (e.g., at 1800 rpm).

The engine control module (ECM) is an independent control executing all of the engine management functions, including fuel/air ratio, governor, ignition and health monitoring. In the case of original engine speed closed-loop control, only a PID (or PI) feedback control was considered to maintain desired engine speed by controlling the engine throttle angle. It should be emphasized that the engine speed fluctuation should be kept to a minimum in order to achieve an expected grid frequency.

Figure 50:
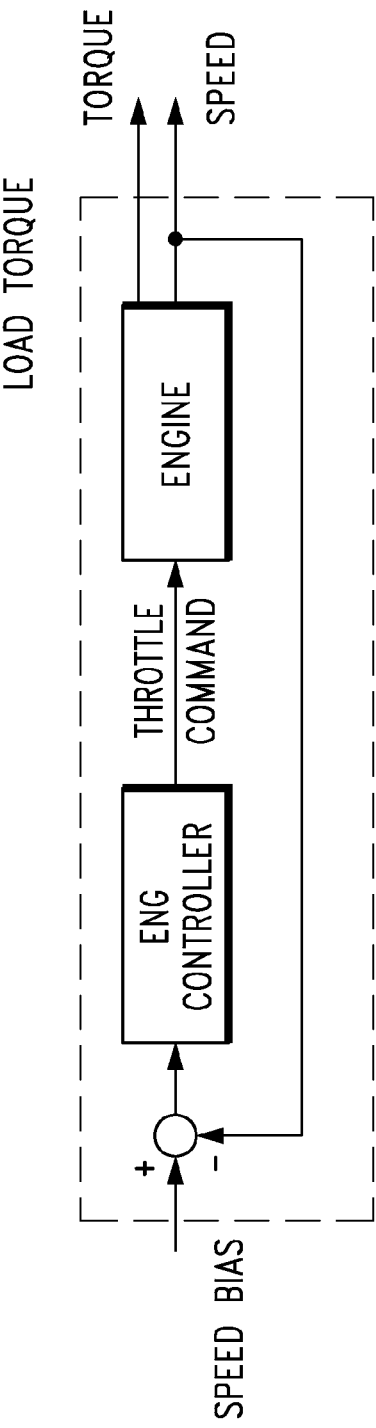
FIG. 50 is a block diagram of an engine speed feedback control for use in various embodiments of the disclosed system.

FIG. 50 shows a block diagram of the engine speed feedback control. By controlling the engine throttle angle, the engine speed can maintain a set point. For example, if the load torque increases suddenly for some reason, the engine speed will drop. Via feedback and PID controller, an engine speed drop will cause increase of the throttle angle. Therefore, more engine torque will be generated to make the engine speed return to a set point.

It should be noted that when engine is running at torque control mode, the output speed is not determined by the engine itself. The output speed will follow the speed in the grid. The system controller will monitor the output power and adjust the speed bias command to control the system.

Figure 51:
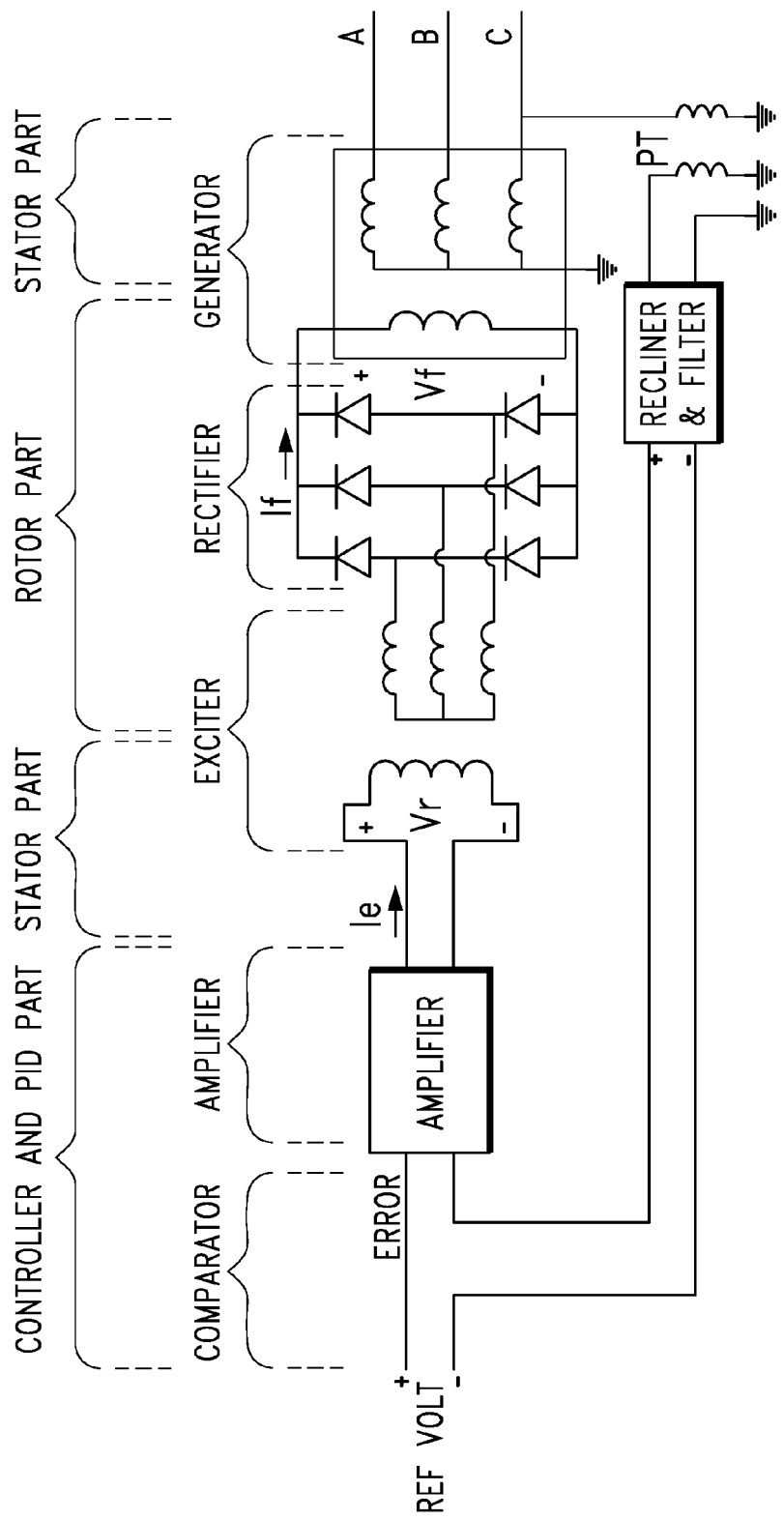
FIG. 51 is a schematic diagram of a generator system.

3.2. Automatic Voltage Regulator (AVR) and Generator Module 3.2.1. Introduction to the AVR The controller will send a command signal to the AVR to regulate the voltage. Because the present embodiment uses a brushless generator, the AVR cannot control the field voltage ($V_f$) directly. The field voltage ($V_f$) will be controlled through the exciter part. Therefore, the controller will control the exciter voltage ($V_r$) instead of the field voltage ($V_f$). The process of controlling voltage in the AVR starts from receiving the signal from controller and changing that signal to the exciter voltage ($V_r$). The exciter voltage ($V_r$) creates flux, which in this step, the process still happens in stator part, and this flux will create the field voltage from the rectifier, which is in the rotor part. The process of the system is shown in FIG. 51.

Figure 52:
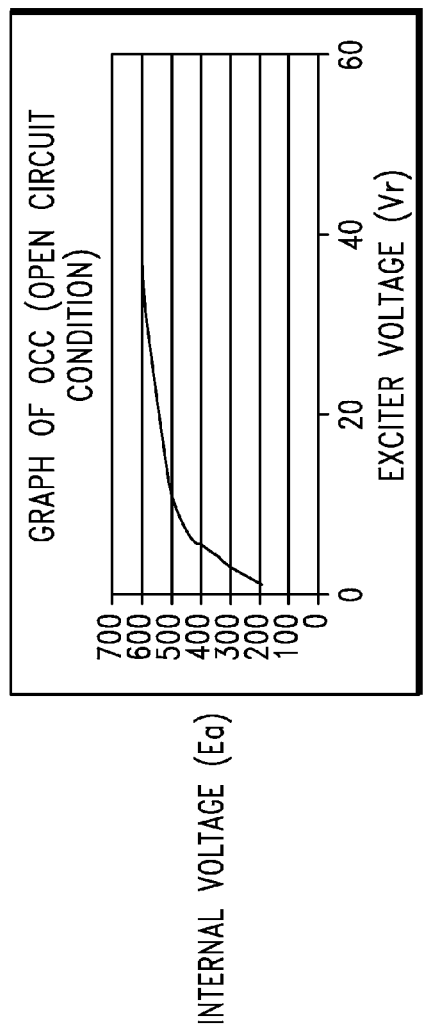
FIG. 52 is a graph of internal voltage to excitor voltage under an open circuit condition (OCC).
Figure 53:
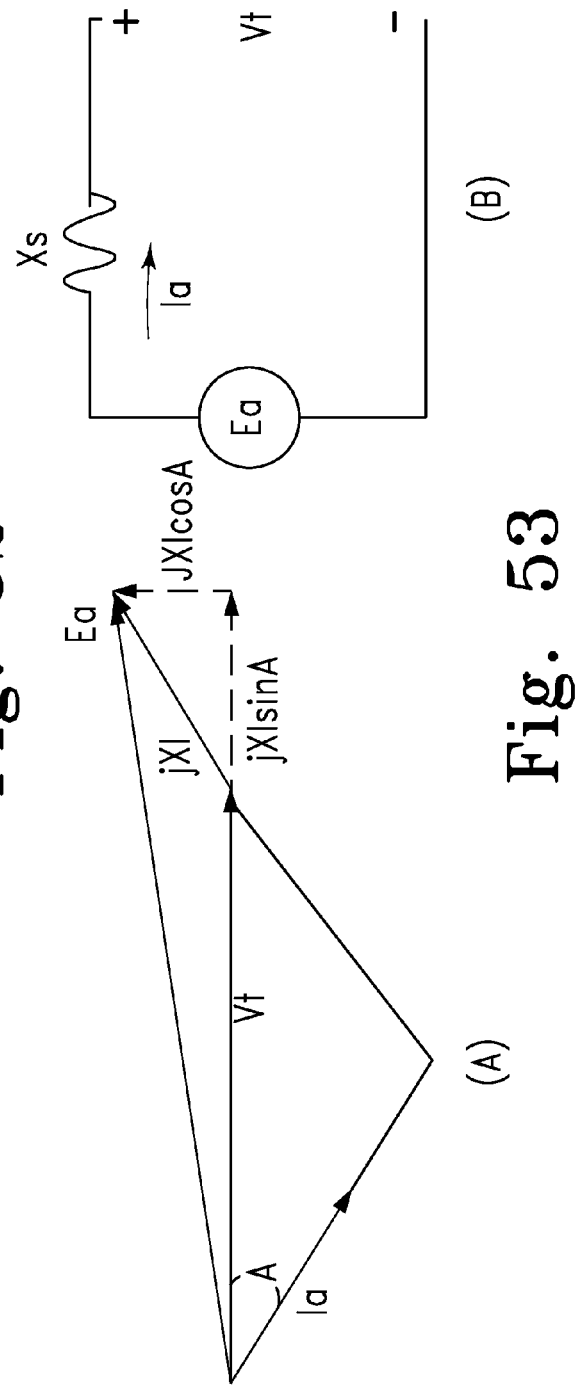
FIGS. 53 (A) and (B) are a phasor and a schematic diagram of terminal voltage as used herein.

In the next step, we simplify the above system by using the relationship between the AVR and Generator in which we know as the graph of OCC (Open Circuit Condition). The relationship illustrated in FIG. 52 helps us to translate from exciter voltage ($V_r$) to internal voltage (Ea). Below, we show the simulation results from this graph. After that, we can calculate the terminal voltage (Vt) from the relationship between the output power, the armature reactance and the internal voltage assuming the power factor (PF) equals to 1. The formulas used to calculate the terminal voltage are derived from the phasor and schematic diagrams in FIG. 53:

$$P = \frac{3V_t E_a \sin\delta}{X_s}$$

$$V_t = E_a \cos\delta - jX_s I_a \sin\theta$$

3.2.2. AVR Model

Figure 54:
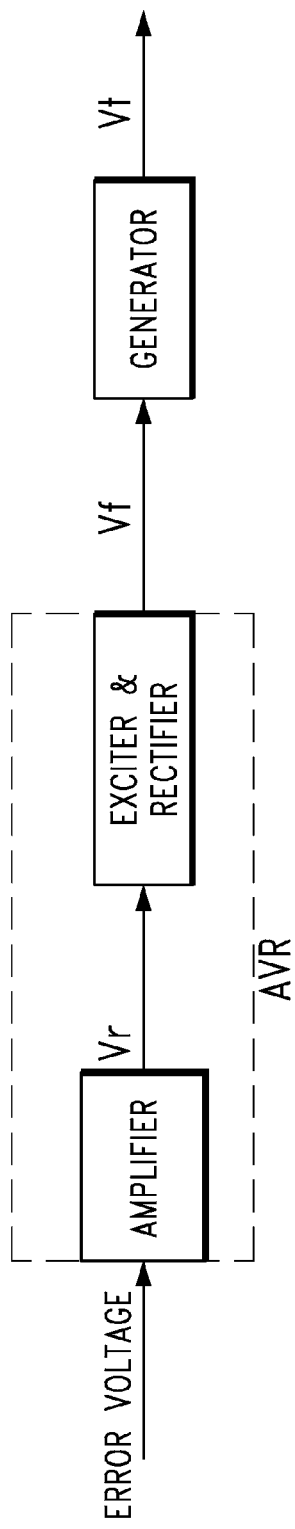
FIG. 54 is a block diagram of a generator system including certain control signals as used in various embodiments of the disclosed system.

We use the relationship above to generate the Simulink block diagram. As illustrated in FIG. 54, the input to the AVR is the error voltage signal from the controller. The output of the AVR and the input of the generator are the exciter voltage. And the output of the generator is the terminal voltage ($V_t$).

Instead of using the exciter and rectifier, we will use graph of OCC (Open Circuit Condition) to build the relationship. Then, we use close loop control with PID to build the model below.

Figure 55:
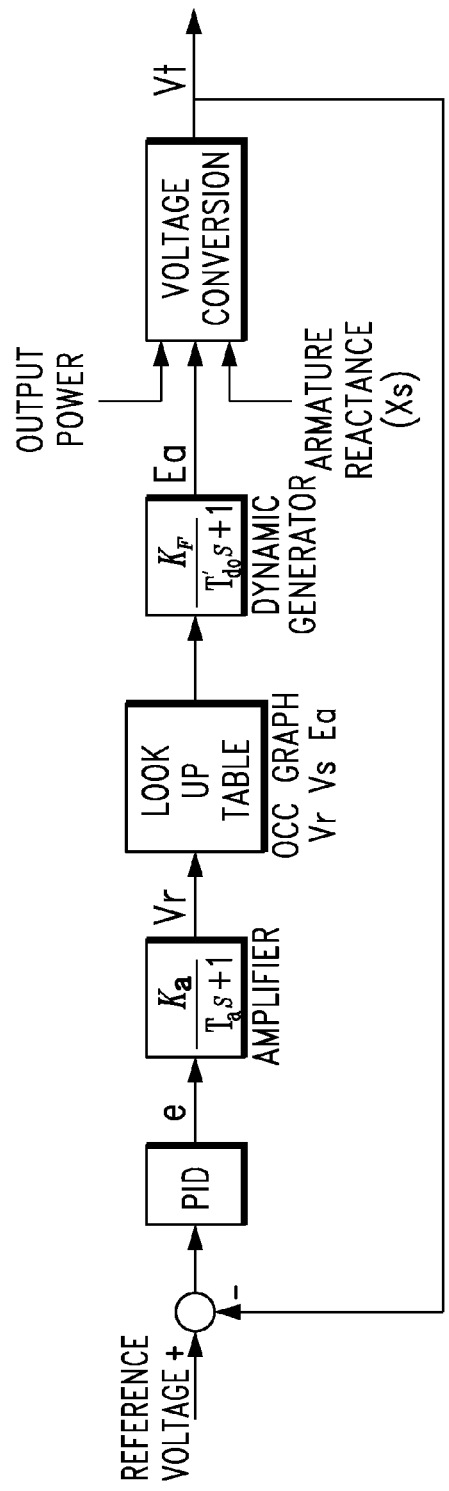
FIG. 55 is a block diagram of an AVR and generator module for use some embodiments of the disclosed system.

In the example embodiment, the model of FIG. 55 takes 480V as the reference input value. After simulation with the step function of output power signal, we get the steady-state output at 480V also.

3.2.3. Simulation Results

Figure 56:
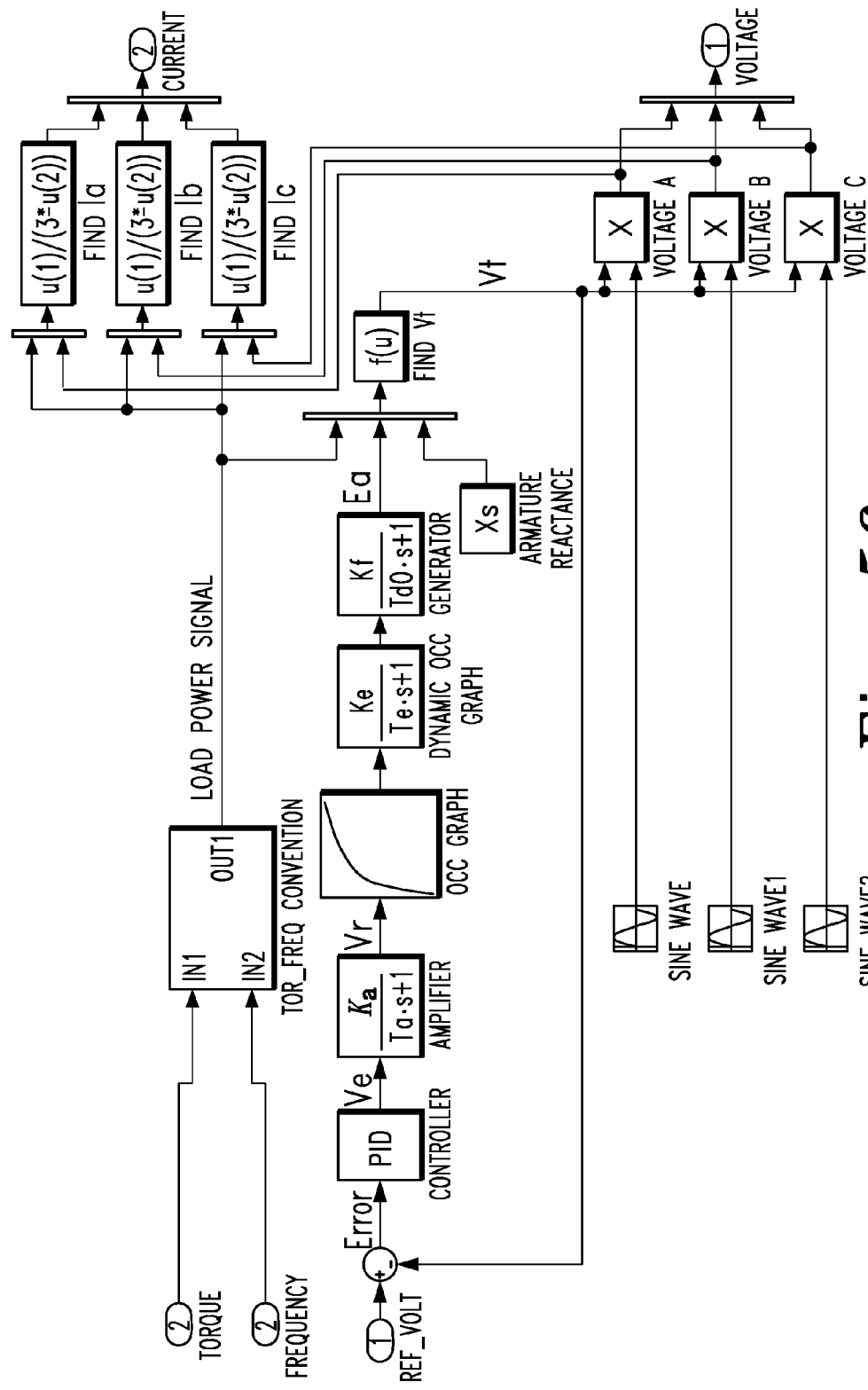
FIG. 56 is a Simulink diagram of the AVR and generator module shown in FIG. 55.

The model that is shown in FIG. 56 is the AVR model by Matlab/Simulink program. This model is based on the model from FIG. 55.

Figure 57:
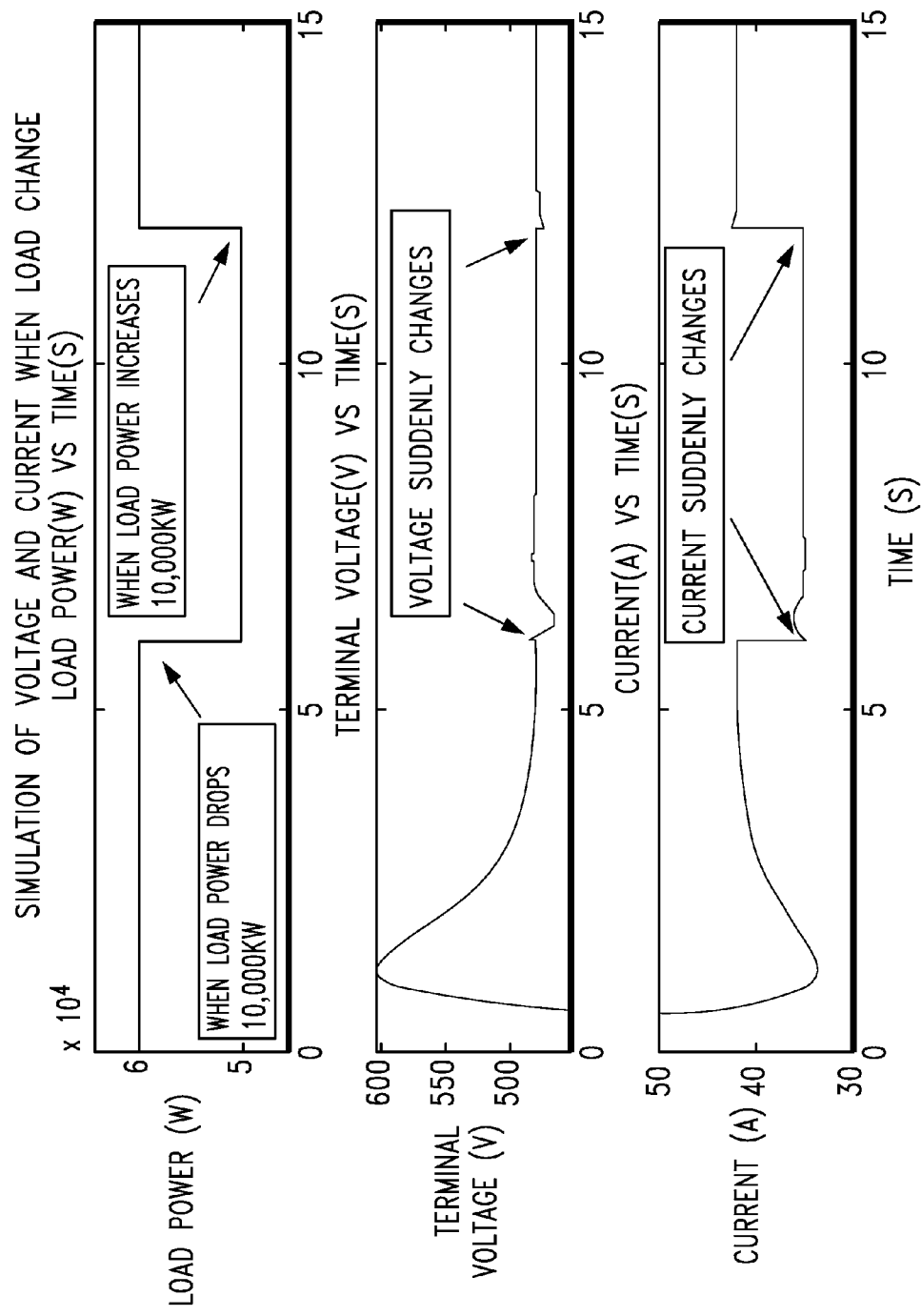
FIG. 57 is a graph of power, voltage, and current in a simulated system during a load change event.
Figure 58:
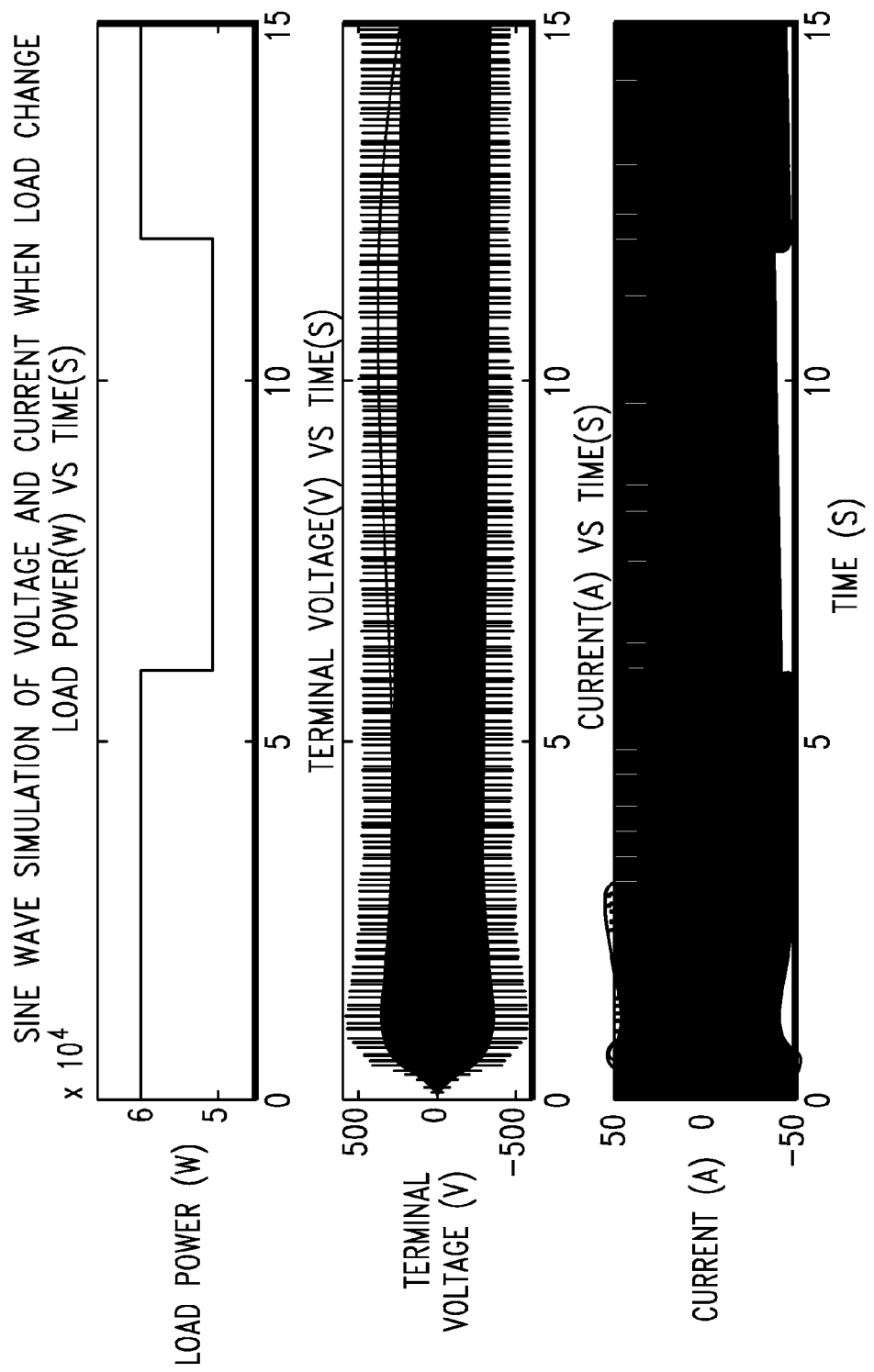
FIG. 58 is a graph of power, voltage, and current in a sine wave simulation during a load change event.

The simulation results are shown in FIGS. 57 and 58. These figures illustrate the same data, but FIG. 55 is plotted with frequency 60 Hz. FIGS. 57-58 each include 3 graphs: Load Power (kw) vs. Time (s), Terminal Voltage (V) vs. Time (s) and Current (A) vs. Time (s).

For this simulation, we look closely at the effect of the terminal voltage (Vt) and current when the load power changes. We assume that the load power drops from 60 KW to 50 KW and suddenly increases from 50 KW to 60 KW at 6 and 12 seconds, respectively. And the figures show the changes of both voltage and current graphs.

3.3. System Controller Model

The list of system I/O for the system controller in this embodiment appears in Section 2.4 of this Part. The list of system functions appears in Section 3.3.2. In this example embodiment, most of those functions are implemented in a state machine.

3.3.1. PARAMETERS for the system controller

The parameters provided to the system controller in the present embodiment include: DG unit auxiliary load parameters, maximum current, maximum voltage, maximum engine speed, maximum load, maximum power, and maximum generator frequency.

3.3.2. System Function

There are two types of controllers in the system: DG Unit Controllers and one or more Supervisory Controllers. The former control a single DG unit while the latter coordinate the operation of multiple units in a single location or portion of a DG system.

DG Unit Controllers regulate the engine in GPM and GIM, control power to ENI auxiliary loads, control the gas shutoff valve, monitor utility voltage, control the lower voltage power supply, provide current limit protection, control emergency power shutdown and protective power shutdown, generate warning indications, detect and indicate generator over/under voltage and generator over/under frequency conditions, provide anti-islanding protection and loss of mains detection, detect and indicate loss of generator excitation and speed/frequency mismatch, provide reverse power protection, detect and indicate short circuit conditions, and control the unit's import and export of power.

The Supervisory Controller controls grid synchronization and protection of the DG Unit, provides a human/automatic switch between GPM/GIM, controls the HMI, and communicates with an external DG Gateway. The UIC Controller complies with the IEEE 1547 Standard for Interconnecting Distributed Resources with Electric Power Systems.

3.3.3. GPM/GIM Mode Regulation

The DG system can run at GIM mode or GPM mode. Each DG unit will be running at either speed control mode or torque control mode according to the situation. The supervisory controller will determine the control mode of each DG unit. The basic rules are as follows

TABLE 3-1

Control mode rules in GIM and GPM mode

|  | GIM | GPM |
|---|---|---|
| Single DG unit | speed control | torque control |
| Multiple DG units | one master unit uses speed control, other units use voltage-following torque control | all units use torque control |

When running in speed control mode, the DG unit controller will send out constant speed bias commands to the Engine Control Module (ECM). The constant speed bias will be 1800 rpm (translated from 60 Hz frequency). The DG unit controller also sends out constant voltage bias commands to the Automatic Voltage Regulator (AVR).

When running in torque control mode, DG unit controller will monitor the output power of DG unit and adjust the speed bias command to control the output torque. The speed bias command sent to the ECM would change the output torque instead of the speed of the engine. The engine speed will follow the grid speed automatically. DG unit controller also sends out voltage bias commands, which are the same as the grid voltage, to the Automatic Voltage Regulator (AVR).

3.3.4. Feed-Forward Controller in GIM Mode

It can be seen from FIG. 50 that, by controlling the engine throttle angle, the engine speed can be maintained at a set point. For example, if the load torque increases suddenly for some reason, the engine speed will drop. Via feedback and PID controller, an engine speed drop will cause an increase of the throttle angle. Therefore, more engine torque will be generated to make the engine speed return to a set point.

Figure 59:
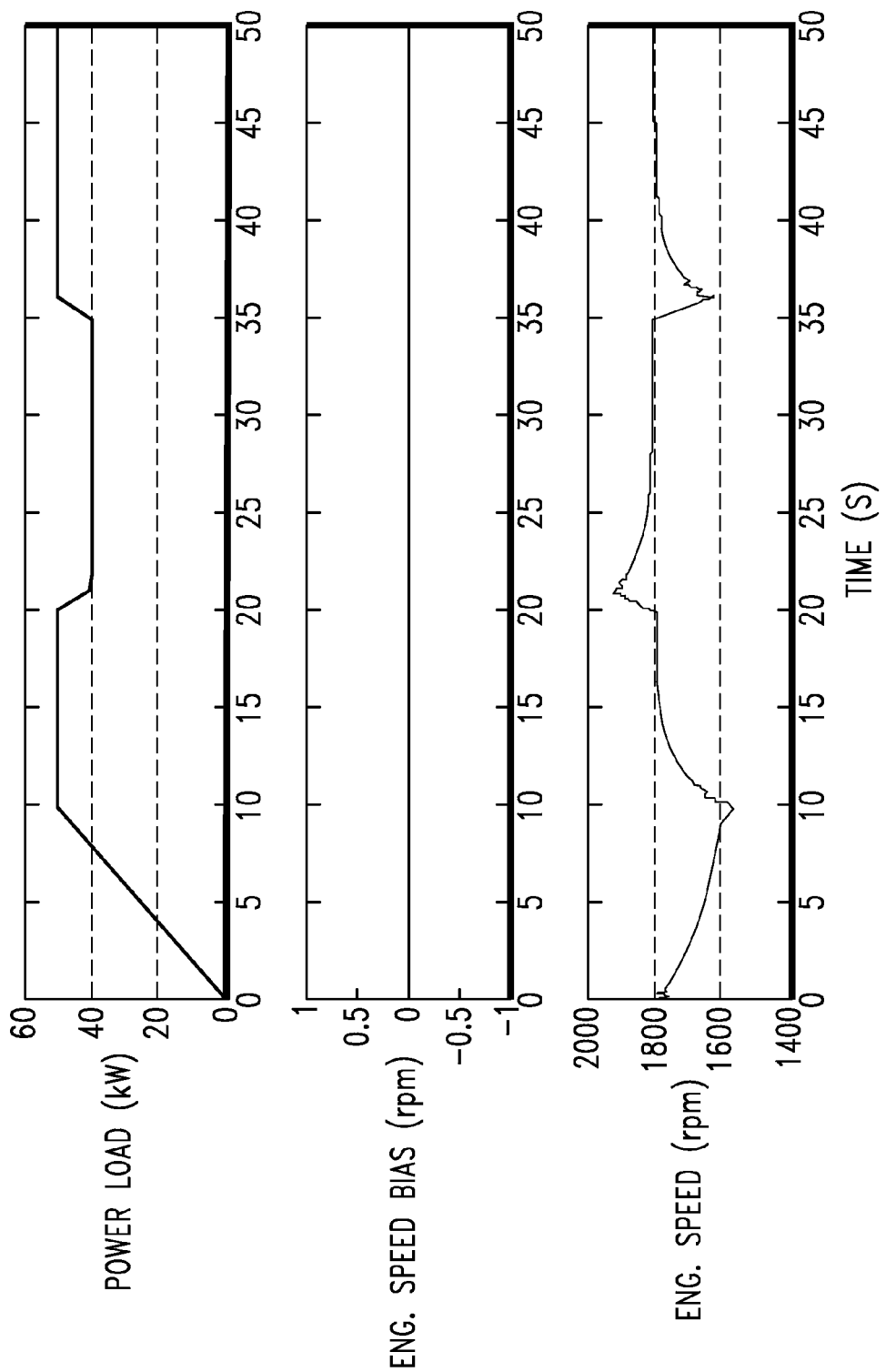
FIG. 59 is a graph of power, engine speed bias, and engine speed in a simulation of an engine speed feedback control (GIM) of one example system.

It can be also seen from the FIG. 50 that the engine speed definitely drops when the load torque increases suddenly no matter how the PID controller was designed. That is, an engine speed bias was sensed firstly, and then the PID controller takes effect to maintain the engine speed. The simulation results (as shown in FIG. 59) prove that the engine speed is subject to the changing load torques when only a feedback control is used.

Combined feed-forward plus feedback control is proposed to reduce the effect of the measurable disturbance (such as load torque) on the engine speed output. In the most ideal situation, feed-forward control can entirely eliminate the effect of the measurable disturbance on the engine speed output. Even when there are modeling errors, feed-forward control can often reduce the effect of the measurable disturbance on the output better than that achievable by feedback control alone.

Figure 60:
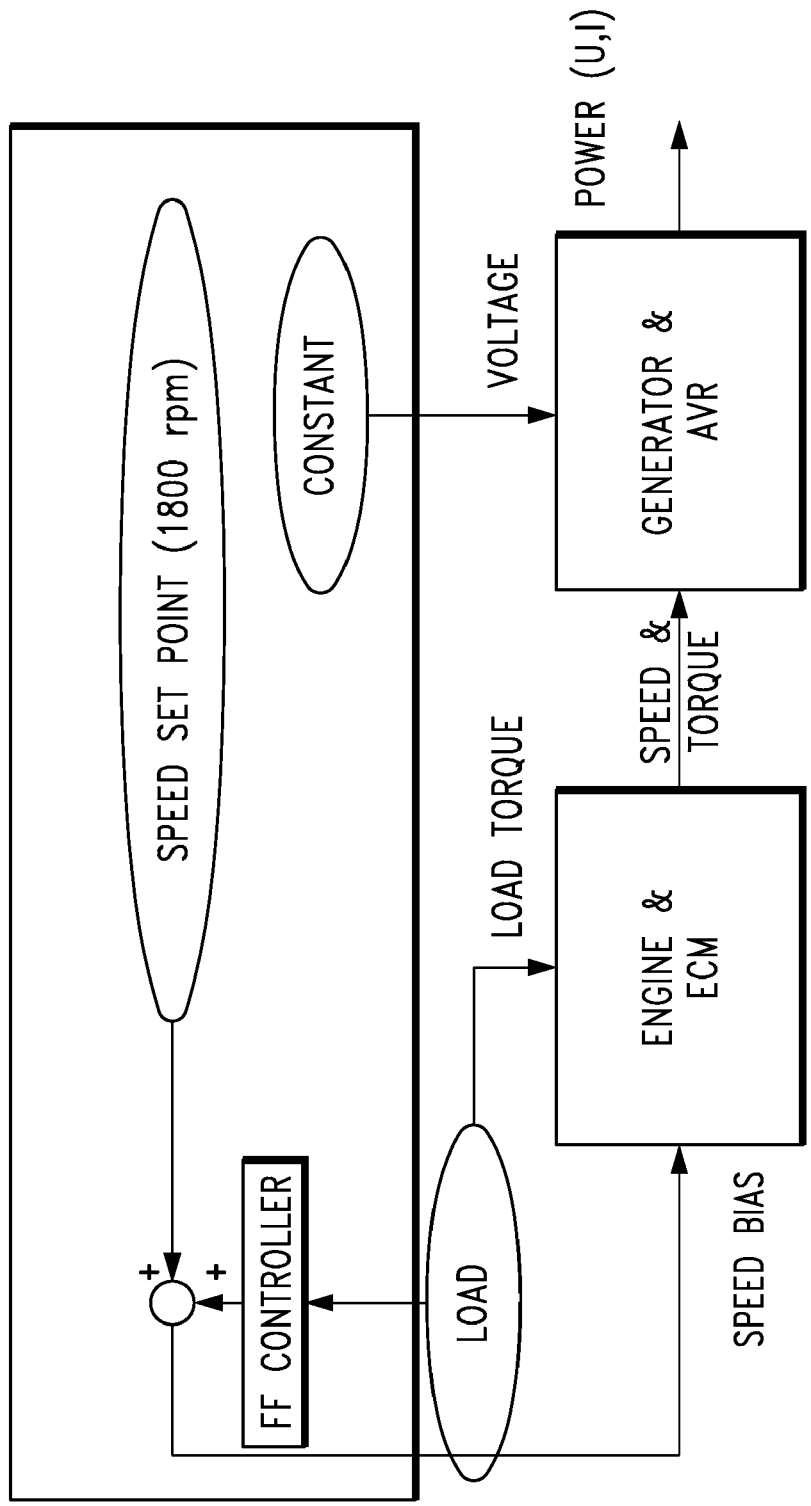
FIG. 60 is a block diagram of the engine speed feedforward plus feedback control (GIM) in some embodiments of the disclosed system.

In the DG system, the engine load torque can be calculated based on the local consumed power and the amount of power that is imported from or exported to the utility grid. FIG. 60 gives the block diagram of a feed-forward plus feedback engine speed control system considering the engine torque is a measurable disturbance.

In FIG. 60, the load torque can be calculated by the summary of various load powers. Therefore, the engine load torque can be regarded as a measurable signal, rather than a disturbance signal.

Figure 61:
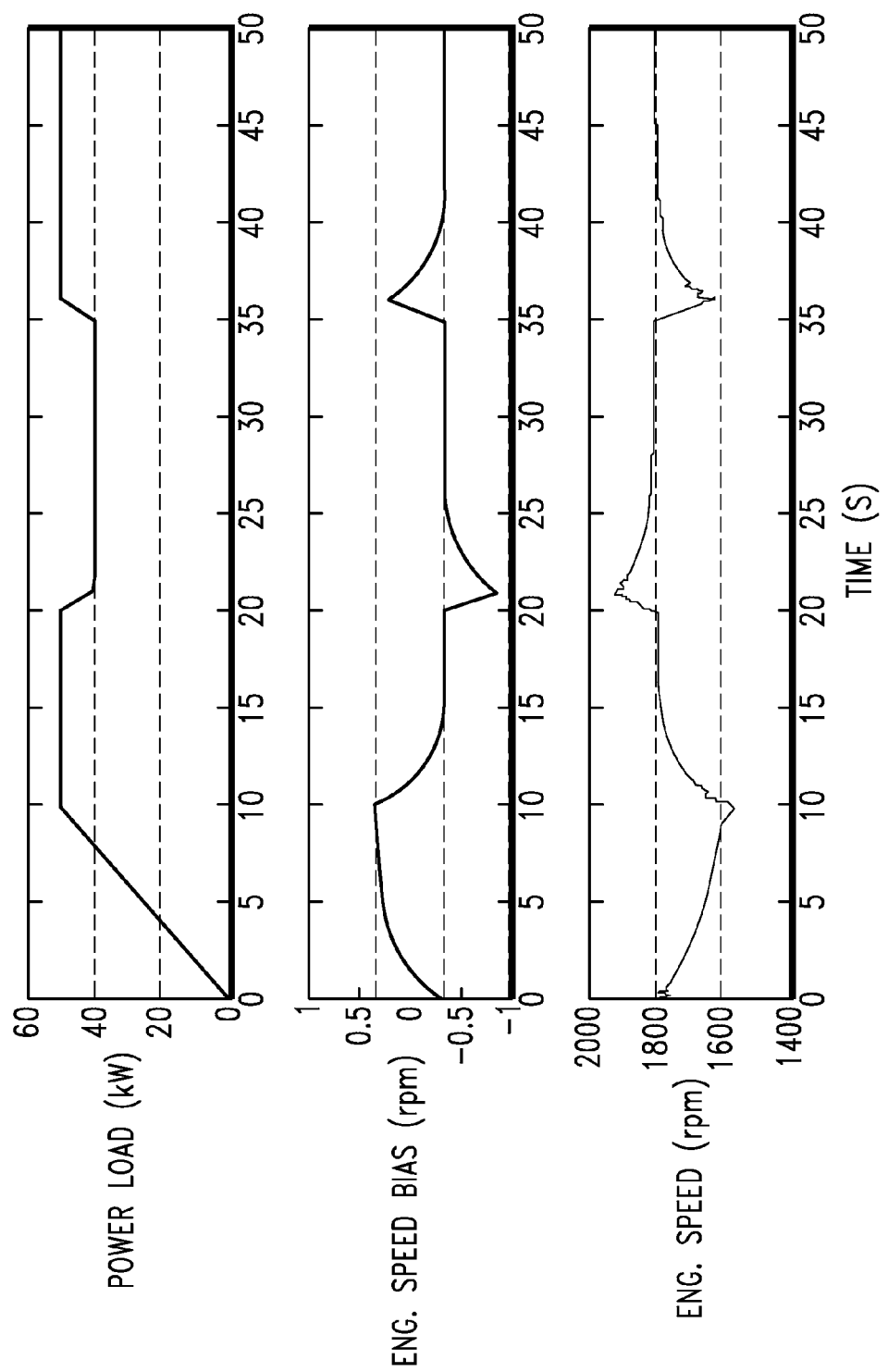
FIG. 61 is a graph of power, engine speed bias, and engine speed signals in a simulation of the control illustrated in FIG. 60.

FIG. 61 gives the simulation results of the feed-forward plus feedback engine control system. It can be seen that feed-forward control is able to rapidly suppress the changes of the engine load torque. For example, if the load torque increases suddenly for some reason, the feed-forward control goes into action and the throttle angle will increase immediately even without engine speed drop. The engine speed is robust against the changing engine load torque. Therefore, the engine speed fluctuation is little subject to the changing engine load torque via feed-forward control.

3.3.5. Engine Control in GPM Mode

When considering the problem of frequency control of interconnected areas, we assume that the utility grid is an infinite power pool. That is, the generator cannot change the grid frequency. The following block diagram gives the power flows among the generator, various loads and tie-line and also gives the phasor diagram for the generator and utility grid.

Figure 62:
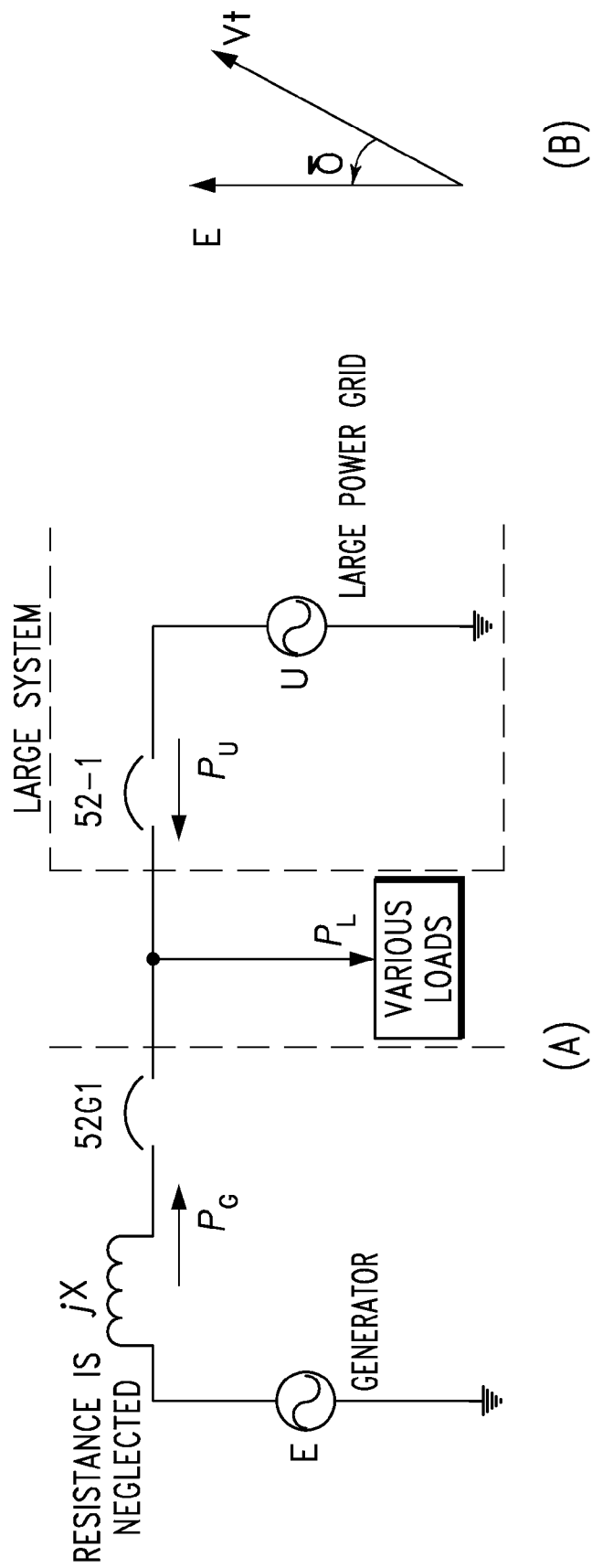
FIGS. 62 (A) and (B) are a schematic diagram and phasor diagram, respectively, of power flow among a generator, loads, and tie-line in some embodiments of the disclosed system.

In FIG. 62, we can obtain the formula for the real (not including reactive) generator power, as follows:

$$P_G = P_L - P_U = \frac{|E||Vt|}{X}\sin\delta$$

where the angle δ is the phase angle between the generator emf E and the utility voltage Vt. Here the power angle δ is defined positive when E leads Vt; $P_G$, $P_L$, $P_U$, are the real power of the generator, various loads and utility grid respectively.

In the present embodiments, before the generator is connected with the grid, the two are synchronized. Synchronization can take place if the following conditions are all satisfied:
1. The generator and grid frequencies are equal.
2. The phase sequence of the generator matches that of the grid.
3. The generator emf E and the grid voltage U are of equal magnitude.
4. E and U have equal phase.

If and only if all these conditions are satisfied, the voltage across the circuit breaker 52G1 and 52-1 is zero. At this time, the generator can be smoothly "locked" onto the grid by closing the circuit breakers.

Once the synchronous generator is synchronized onto the grid network, its speed will always synchronize with the grid frequency as long as the grid power is large enough. That is, the speed of the engine coupling with the generator cannot be changed either.

It can be observed that the magnitude and direction of the power flow of the machine will be determined according to the power angle δ. In reality, the power angle δ is controlled by means of the engine torque (or engine power). If the engine produces more power than consumed by various loads, the rest of the power will flow to the grid.

Figure 63:
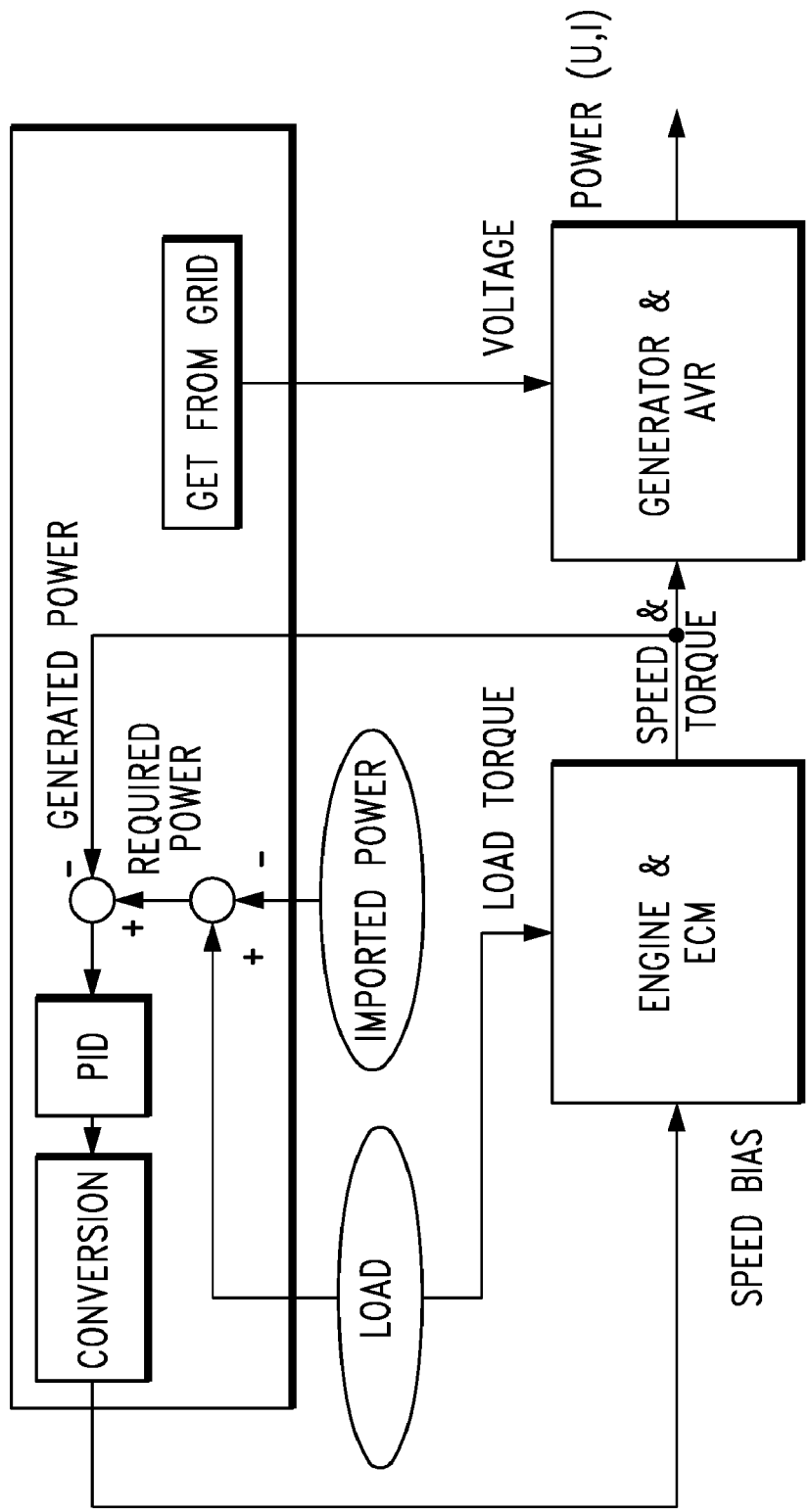
FIG. 63 is a block diagram of a feedback control system for maintaining a minimum power level from the grid.

To sum up, when DG units are interconnected with the grid, though the engine speed cannot be changed by the throttle, the throttle can still control the engine torque (or engine power) so as to control the power flow between the generator and the tie-line. FIG. 63 gives the block diagram of the feed-forward control for maintaining a minimum import power from the grid.

The engine speed controller (inner PID) accepts an engine speed bias as an input, but the engine speed is completely determined by the grid. So if we set the engine speed bias equal to 5 rpm and the synchronous engine speed is actually 1800 rpm, then engine speed controller might tell the engine we want to run at 1805 rpm. Then the engine would try harder, thus increasing power, but would still turn at grid synchronous speed 1800 rpm.

The outer PID controller monitors the grid power (or generator output power minus load power) in load-following mode to determine the engine speed bias sent to the engine speed controller (inner PID). As mentioned above, the inner PID can control the engine torque (or engine power) output, thus controlling the amount of the power imported from the grid indirectly.

Figure 64:
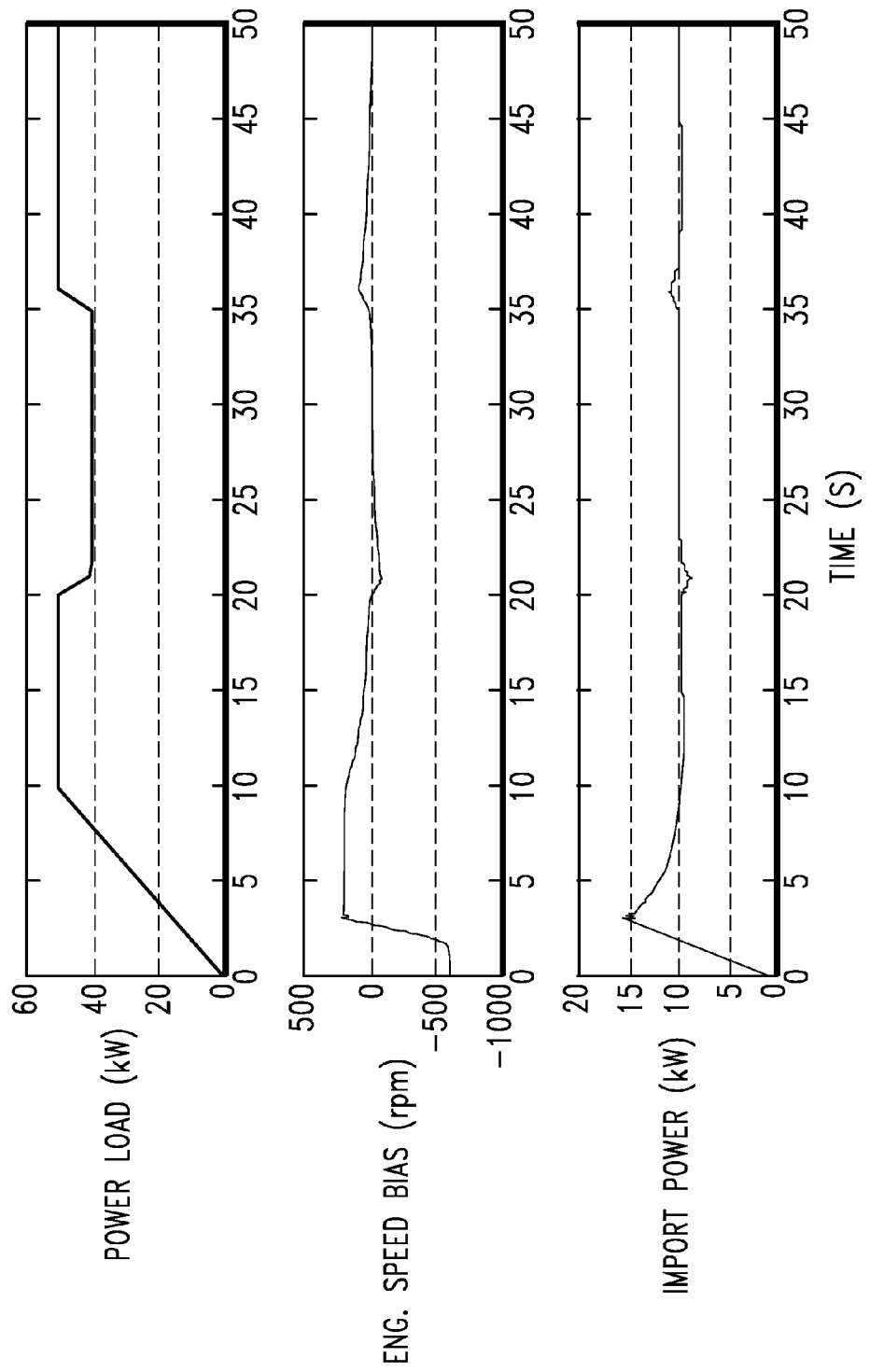
FIG. 64 is a graph of simulation results from a controller in load-following mode (GPM).

Assuming the minimum import power in the utility contract is 10 kW, the simulation results (shown in FIG. 64) show how the outer PID controller works to maintain 10 kW import power.

3.4. Load/Grid Module

The grid is modeled as a voltage source and impedance, while the load is modeled as an impedance. The input parameters for the load/grid are the impedance of the grid, the working voltage of the grid, the maximum voltage of the grid, and the impedance of the load.

3.5. Islanding Detection

The dynamic model of a DG connected to the grid resembles that of a network containing one small generator connected by a distribution line to a much larger generator. The small generator represents the DG and the large generator represents the grid. All the synchronous generators in a power system operate in lock step synchronism because the AC voltage results in synchronization of torques between the machines. Therefore, all machines in an interconnection have nearly identical average frequencies. However, there can still be differences in the instantaneous frequencies of interconnected machines. The present islanding-detection scheme uses the fact that deviations in frequency caused by a deliberate perturbation signal are much smaller when a DG is connected to the grid than when it is in an island.

Figure 65:
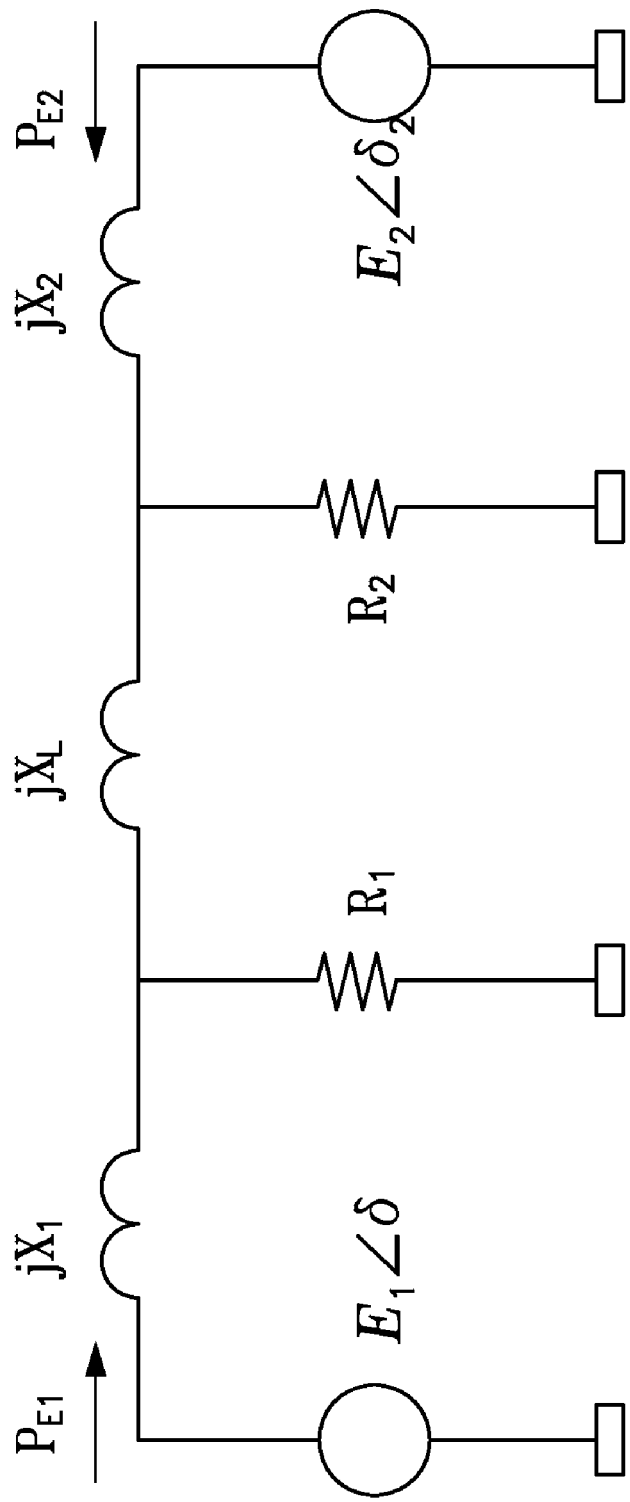
FIG. 65 is a schematic diagram of a classical model of two generators with matching loads connected by a distribution line.

The circuit diagram in FIG. 65 shows the classical model of two synchronous generators connected by a distribution line. The voltage source in series with reactance $jx_2$ on the right hand side represents the DG unit synchronous generator. Resistance $R_2$ represents a load that matches the DG real power output. The corresponding elements on the left hand side of the diagram represent a generator having 100 times the inertia of the DG along with its matching load. Reactance $jx_L$ represents a power distribution line. Islanding is simulated by disconnecting the distribution line.

Figure 66:
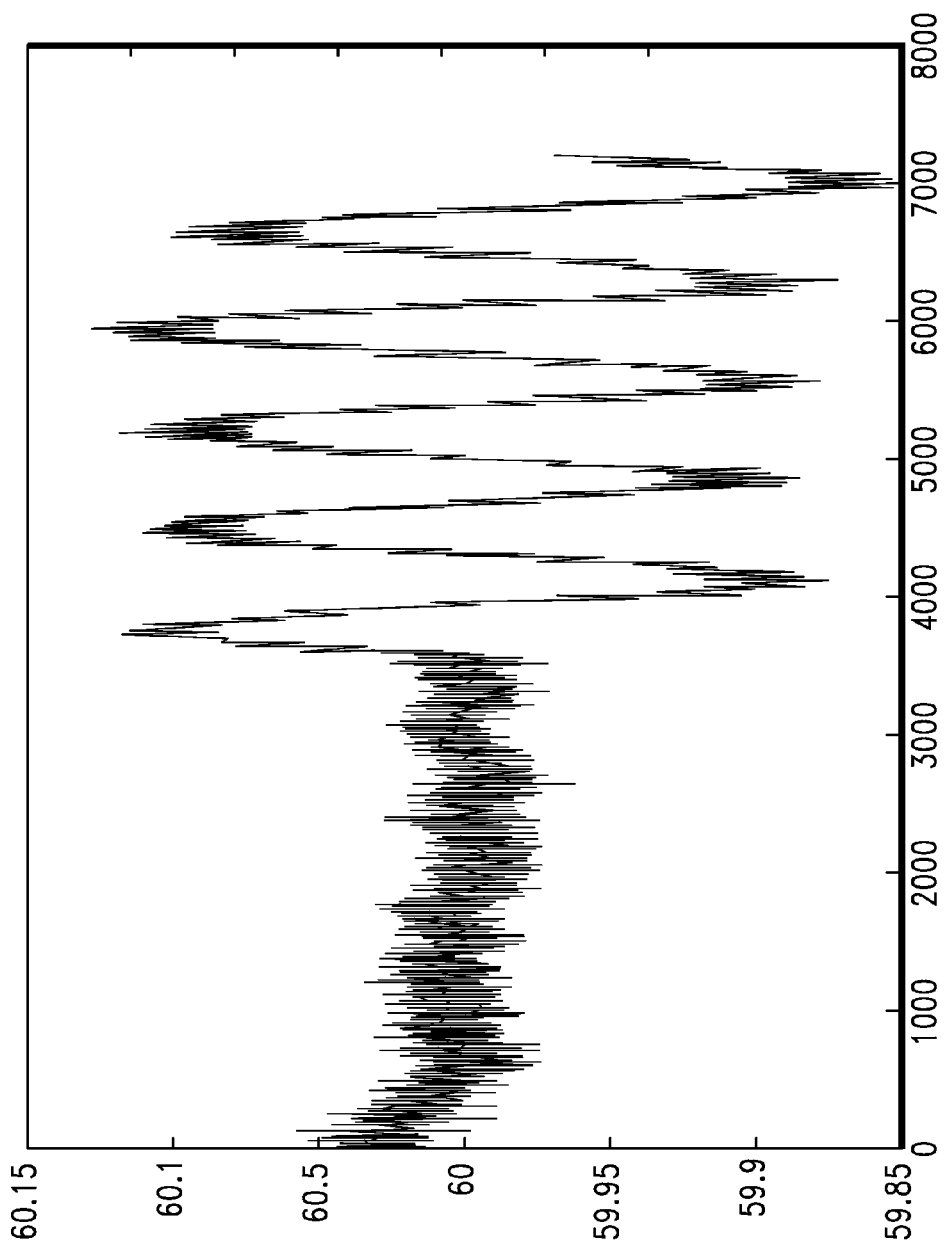
FIG. 66 is a graph of simulated frequency measurements from a DG unit before and after an islanding event.

FIG. 66 shows simulated frequency measurements from the DG unit before and after the distribution line is disconnected. A 1 Hz perturbation signal is superimposed on the DG unit's throttle signal during the entire simulation. The perturbation signal produces a 1% variation of the DG mechanical input power. The horizontal axis indicates measurement samples that have a frequency of 720 Hz. Disconnection of the distribution line occurs after 5 seconds (3600 samples). Measurement noise has been simulated by adding actual frequency data from a PMU. Frequency deviations caused by the perturbation signal are almost completely obscured by noise before the DG and its matching load become an island. The 1 Hz frequency deviation is easily observed after the distribution line between the two machines is removed.

Figure 67:
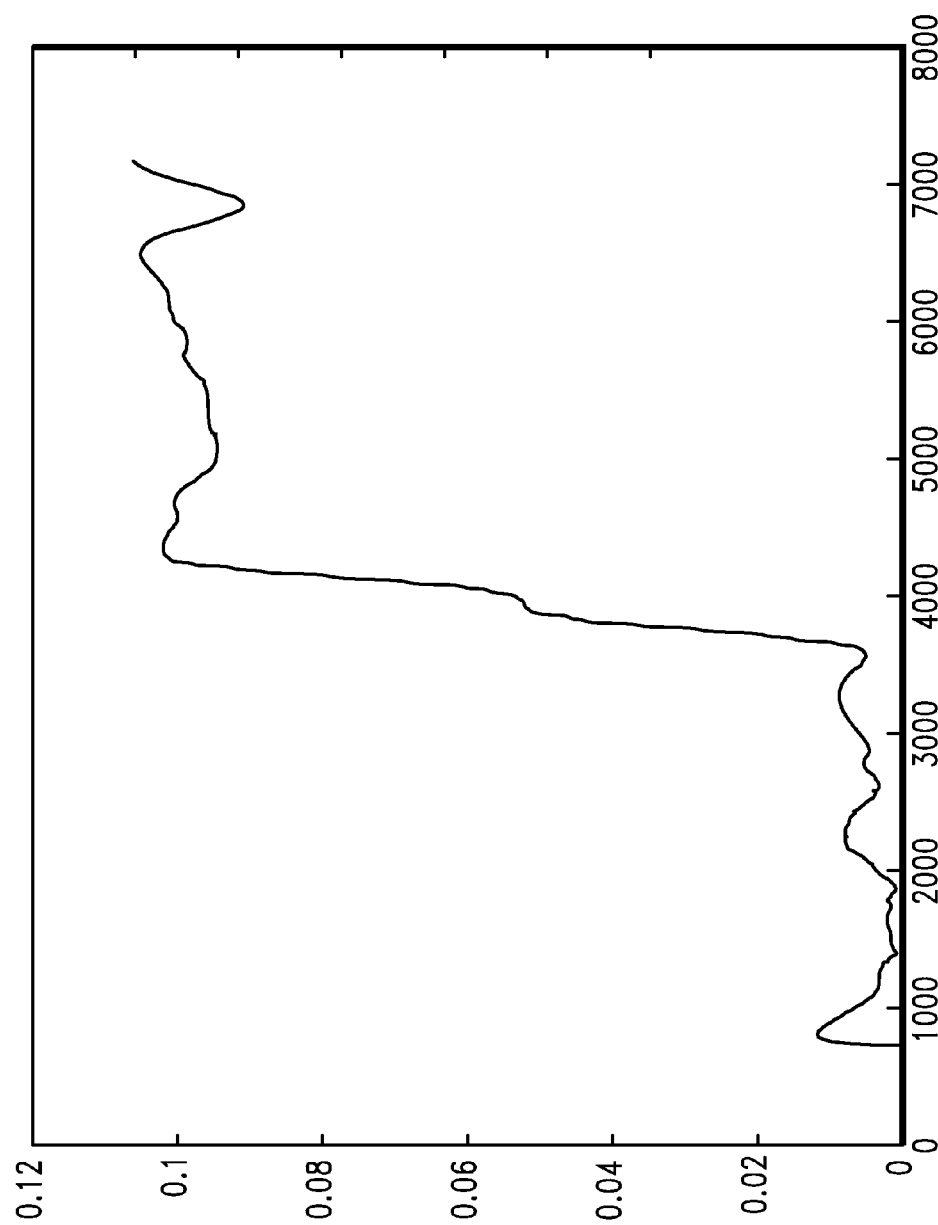
FIG. 67 is a graph of the magnitude of the 1 Hz component of the DG signal shown in FIG. 66.

FIG. 67 shows the magnitude of the 1 Hz component of the signal in FIG. 66. This simulation shows that a simple threshold test of this magnitude should work as the islanding detection algorithm.

After the DGSC has been modified to inject a 1 Hz perturbation signal into the throttle of a synchronous DG unit, experimentation, simulations and analysis can be carried out to determine appropriate thresholds for the algorithm. Research on such details of the algorithm will proceed in parallel with most of the engineering tasks. Ultimately, the supervisory controller will be programmed to determine an appropriate setting for the threshold test depending on the number and type of DG units connected in parallel. The island-detection scheme will be validated in the test cells at I Power according to the IEEE 1547 conformance test procedures. Possible additional variations in an island configuration, such as off-site DG units connected to the same feeder, will be studied in simulation to determine whether any additional logic is required.

4. Utility Interface Controller (UIC)

IEEE Standard 1547, "Standard for Interconnecting Distributed Resources with Electric Power Systems", provides for the first time a nationally recognized set of rules for connecting distributed generation (DG) resources to a utility grid. This standard has the potential to be used by federal legislators, by state public utilities commissions, and by over 3000 utilities in formulating technical requirements for grid interconnection of DG. This standard specifies requirements for synchronization, protective relaying, and switching coordination that were formerly determined on a utility-by-utility basis.

There is a large amount of redundancy between the basic functions used in DG operation and those required for compliance with the IEEE 1547 standard. Both require and/or can be partially met through the proper use of over/under voltage relays, over/under frequency relays, fault current detection relays, and synchronization check relays. The following section summarizes aspects of the UIC specification for use in many embodiments of this system.

4.1. Partial Summary of IEEE 1547 Standard

4.1.1 Synchronization

The Standard states that the DR must synchronize with the EPS without causing a voltage magnitude fluctuation at the Point of Common Coupling (PCC) greater than ±5% of the operating voltage. PCC is defined as "the electrical connecting point or interface between the utility distribution system and the customer's or user's electrical distribution system."

The output of the DR and the input of the EPS at the PCC have substantially the same voltage magnitude, the same frequency, and the same phase angle. IEEE Standard 1547 requires that the difference between the voltage of the distributed generator and the EPS not be more than 10%, the difference between their frequencies not exceed 0.3%, and the difference between their phase angles not exceed 20°. Only if these conditions are satisfied can the distributed generator be connected into the electric power system. The following table illustrates the requirements of the Standard.

TABLE 4-1

| IEEE 1547 Requirements and conditions | | | |
|---|---|---|---|
| Aggregate Rating of DR Units (kVA) | Frequency Difference ($\Delta f$, Hz) | Voltage Difference ($\Delta V$, %) | Phase Angle Difference ($\Delta \phi$, °) |
| 0-500 | 0.3 | 10 | 20 |
| 500-1,500 | 0.2 | 5 | 15 |
| 1,500-10,000 | 0.1 | 3 | 10 |

In order to adhere to this requirement, we can use relays to estimate the magnitudes and phase angles of the voltages, and frequencies on the DR side and the EPS side. It can then be checked if the differences between the estimations are within the ranges mentioned above. If they exceed the mentioned values then the DR will not be connected to the EPS. In order to ensure that the distributed resource will synchronize with the EPS with a voltage fluctuation limited to ±5% of the operating voltage, we can carry out the test by connecting the DR to the EPS a couple of times and checking if the voltage fluctuation is within ±5% of the operating voltage.

4.1.2. Inadvertent Energizing of Area EPS

The Standard states that the distributed resource must not connect to the PCC if the Area EPS is in the de-energizing state. It also states that the distributed resource must not connect to the PCC until the voltage of the EPS is in the range of 106V-132V and the frequency is in the range of 59.3 Hz to 60.5 Hz. After the EPS has regained the normal voltage and frequency, the Standard requires that the distributed resource wait for up to 5 minutes before it reconnects to the EPS. The following table illustrates this requirement and conditions.

TABLE 4-2

EPS status and conditions

| Whether the DR is connected to the PCC | EPS Status and Conditions |
|---|---|
| Not connected | EPS in a deenergized state. |
| Connected | EPS in a normal state: 106 V < V < 132 V and 59.3 Hz < f < 60.5 Hz. |
| Not connected | EPS in an abnormal state: V ≦ 106 V or V ≧ 132 V or f ≦ 59.3 Hz or f ≧ 60.5 Hz |
| Connected with a 5-minute delay | EPS recovered from an abnormal state to a normal one. |

This requirement may be satisfied by each time checking the voltage magnitude and frequency of the EPS after the occurrence of an outage. We can then compare these values obtained with the above mentioned threshold limits. If they are within the limits then wait for 5 minutes and then check again the voltage and frequency values. If they are still within the limits then close the circuit breaker between the DR and the EPS else keep the circuit breaker open and carry out the same procedure until the condition is satisfied.

4.1.3. Voltage Disturbances

The standard states that the protective functions of the interconnection system must measure the fundamental frequency component of the phase to phase or the phase to neutral voltage. If the measured quantity is less than/equal to 106V or greater than/equal to 132V then the distributed resource must stop energizing the EPS within the clearing times as indicated in the table below.

TABLE 4-3

Voltage clearing times per IEEE 1547

| Voltage range (V) | Clearing times (sec) |
|---|---|
| V < 60 | 0.16 |
| 60 < V < 106 | 2 |
| 132 < V < 144 | 1 |
| 144 < V | 0.16 |

Voltage disturbances bring about a change in the voltage of the power system. Relays can be used to check the voltage at the PCC. Whenever the voltage goes beyond the limits mentioned, the Standard requires that the relays disconnect the DR from the EPS within the respective clearing times as mentioned in the table above.

4.1.4. Frequency Disturbances

The Standard states that the protective functions of the interconnection system must measure the frequency. If the measured frequency goes out of the normal range (59.3 Hz<f<60.5 Hz) then the distributed resource must stop energizing the EPS within the clearing times as indicated in the table below.

TABLE 4-4

Frequency disturbances requirements

| DR Size | EPS Frequency | DR "Cease to Energize" Time |
|---|---|---|
| ≦30 kW | >60.5 Hz | .16 sec. |
|  | <59.3 Hz | .16 sec. |
| >30 kw | >60.5 Hz | .16 sec. |
|  | 59.3-57.0 Hz | Time Delayed |
|  | <57.0 Hz | .16 sec. |

Frequency disturbances bring about a change in the frequency of the power system. Over-/under-frequency relays can be used to check the frequency at the PCC. Whenever the frequency goes beyond the limits mentioned, the relays must disconnect the DR from the EPS within the respective clearing times as mentioned in the table above. Note that DR units with a total capacity larger than 30 kW can have an impact on distribution system security. Thus, the IEEE 1547 requirement leaves this question to the Area EPS operator who specifies the frequency setting and time delay for under-frequency trips down to 57 Hz.

4.1.5. Disconnection of Faults

The Standard states that the distributed resource must disconnect from the area EPS for faults on the area EPS it is connected to. It requires the DR to have a current based protection and a ground fault protection suitable for detection of area EPS faults.

Figure 68:
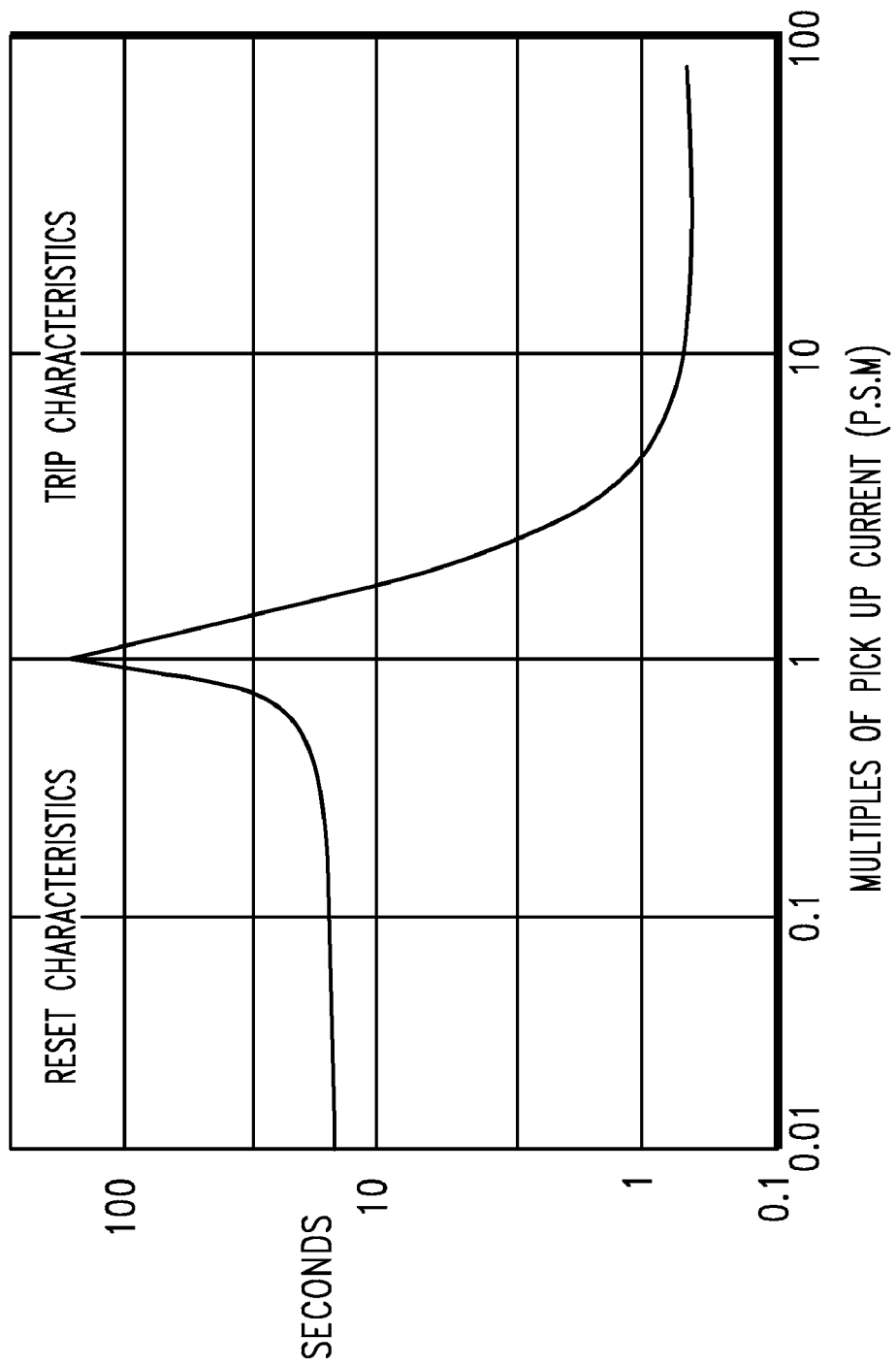
FIG. 68 is a graph of the trip and reset characteristics of an over-current relay for use in the disclosed system.

To provide current based protection, over current relays following the inverse definite minimum type (I.D.M.T.) characteristics will be used. The trip and reset characteristics of the over current relay is as shown in FIG. 68.

The time taken by the relay to operate depends on the torque, which in turn varies with respect to the current in the relay coil. The more torque, the less time taken by the relay to operate. Hence the relay is said to have inverse time characteristics.

In order to emulate an induction-type over-current relay, the various phenomena occurring in an induction disk of the electromagnetic relay can be represented in terms of mathematical equations. The equations used to simulate the trip and reset characteristics are as follows:

$$T_r = TD(R/|M^2-1) \quad \text{--------------------} \rightarrow \text{for } 0 < M < 1 \text{---}$$
$$\rightarrow \text{Reset characteristic}$$

$$T_r = TD(A/(M^P-C)+B)+K \quad \text{---------------} \rightarrow \text{for}$$
$$M > 1 \text{--------} \rightarrow \text{Trip Characteristic}$$

Where:
M=Multiple of PICKUP setting (0 to 40)
$T_t$=Time to trip when M≧1
$T_r$=Time to reset if relay is set for integrating reset when M<1. Otherwise, reset is 50 milliseconds or less
TD=TIME DIAL setting (0.0 to 9.9)
A, B, C, p, K=Constants for the particular curve
R=Constant defining the reset time.

4.1.6. Implementation Using Matlab Code

The source code is attached in Appendix A.

4.2. Phasor Estimation Methods

In phasor estimation we want to find the fundamental frequency sinusoid that best represents a set of measurement samples. We can estimate phasors using either least squares or orthogonal projection methods. Both methods give the same result when orthogonal vectors are used to represent the sample data. The orthogonal projection method is perhaps more intuitive and is explained in more detail below.

4.2.1. Orthogonal Projection Method

The orthogonal projection of a vector V onto the span of $\{V_1, V_2\}$ is given by $$V_{est} = \frac{<V, V_1>V_1}{\|V_1\|^2} + \frac{<V, V_2>V_2}{\|V_2\|^2}$$

where $<\ >$ represents inner product of vectors. Orthogonal projection gives closest vector in the span of $\{V_1, V_2\}$ to V.

With K samples of data per fundamental frequency period, we use the following vectors $$V_1(L) = [\cos((L-K+1)\theta) \cos((L-K+2)\theta) \ldots \cos(L\theta)]$$

$$V_2(L) = [\sin((L-K+1)\theta) \sin((L-K+2)\theta) \ldots \sin(L\theta)]$$

to approximate the most recent vector of samples $$V(L) = [y_{L-K+1} y_{L-K+2} \ldots y_L]$$

where $\theta = 2\pi/K = \omega_0 \Delta t$, $\omega_0$ is the nominal fundamental frequency, and $\Delta t$ is the sampling interval. Then $$V_{est}(L) = [A\cos((L-K+1)\theta+\phi) A\cos((L-K+2)\theta+\phi) \ldots A\cos(L\theta+\phi)]$$

is the best fundamental frequency sinusoidal approximation to the vector of samples, where the following expressions correspond with the most recent window of measurements:

$$A = \sqrt{Y_c^2 + Y_s^2},$$

$$\varphi = \tan^{-1}\left(-\frac{Y_s}{Y_c}\right) + 0.5\pi(1 - \text{sign}(Y_c))$$

$$Y_c = \frac{<V, V_1>}{\|V_1\|^2},$$

$$Y_s = \frac{<V, V_2>}{\|V_2\|^2}.$$

Therefore $Ae^{j\Phi}(L)$ is the phasor estimate for the signal after sample L is received. The calculation is equivalent to the Discrete Fourier Transform with an assumed fundamental frequency equal to the nominal power system frequency $\omega_0$. The actual power system frequency can be estimated from the rate of rotation of the calculated phasors:

$$f(L) = [\phi(L) - \phi(L-1)]/(2\pi\Delta T)$$

Averaging a few successive f(L) estimates is sufficient for filtering out the noise that is amplified by the derivative calculation.

4.2.2 Recursive Calculation of Phasors

Recursive forms of Fourier algorithms are used to reduce the number of calculations compared with the non-recursive Fourier algorithm. For a full-cycle window ($Kf = 2\pi$):

$$\hat{Y}_c^{(new)} = \hat{Y}_c^{(old)} + [y_{new} - y_{old}] \cos(L\theta)$$

$$\hat{Y}_s^{(new)} = \hat{Y}_c^{(old)} + [y_{new} - y_{old}] \sin(L\theta)$$

where $y_{new}$ is the newest sample corresponding to L and $y_{old}$ is the oldest sample corresponding to a full cycle earlier.

4.2.3. Least Squares Formulation and the Transient Monitor Function

When the data window spans the instant of fault inception, the results obtained from almost any algorithm are unreliable as the data contains both pre-fault and post-fault samples. The least squares formulation of the sinusoidal estimate is convenient for calculating the error between the samples and the estimate. The sample values corresponding to the phasor estimate can be calculated as:

$$\hat{y}(L) = S(S^T S)^{-1} S^T y(L)$$

where S is a matrix with two columns: $V_1(L)^T$ and $V_2(L)^T$. The reason L is not shown in the expression involving S is that the matrix S $(S^T S)^{-1} S^T$ turns out to be independent of L. The residual error vector is calculated as:

$$r(L) = \hat{y}(L) - y(L) = [S(S^T S)^{-1} S^T - I]y(L) = My(L)$$

The sum of the absolute values of the elements of r(L) is defined as the transient monitor function. A recursive calculation can also be derived for the residual error vector.

4.3. Application of Symmetrical Component Calculations

A fault causes unbalanced current and voltages in the phases of a polyphase circuit. Three unbalanced phasors of a three-phase system can be resolved into three balanced system of phasors and are called symmetrical components of unsymmetrical phasors. The balanced sets of components are:

1. Positive-sequence components consisting of three phasors equal in magnitude, displaced from each other by 120° in phase and having the same phase sequence as original phasors.
2. Negative-sequence components consisting of three phasors equal in magnitude, displaced from each other by 120° in phase and having the phase sequence opposite to that of original phasors.
3. Zero-sequence components consisting of three phasors equal in magnitude and with zero displacement from each other.

$$V_a = V_a^{(0)} + V_a^{(1)} + V_a^{(2)}$$

$$V_b = V_b^{(0)} + V_b^{(1)} + V_b^{(2)}$$

$$V_c = V_c^{(0)} + V_c^{(1)} + V_c^{(2)}$$

In matrix form: ($a = 1\angle 120°$)

$$\begin{bmatrix} V_a \\ V_b \\ V_c \end{bmatrix} = \begin{bmatrix} 1 & 1 & 1 \\ 1 & a^2 & a \\ 1 & a & a^2 \end{bmatrix} \begin{bmatrix} V_a^{(0)} \\ V_a^{(1)} \\ V_a^{(2)} \end{bmatrix}$$

$$= A \begin{bmatrix} V_a^{(0)} \\ V_a^{(1)} \\ V_a^{(2)} \end{bmatrix}$$

In matrix form:

$$\begin{bmatrix} V_a^{(0)} \\ V_a^{(1)} \\ V_a^{(2)} \end{bmatrix} = \frac{1}{3} \begin{bmatrix} 1 & 1 & 1 \\ 1 & a & a^2 \\ 1 & a^2 & a \end{bmatrix} \begin{bmatrix} V_a \\ V_b \\ V_c \end{bmatrix}$$

$$= A^{-1} \begin{bmatrix} V_a \\ V_b \\ V_c \end{bmatrix}$$

Zero sequence components are never present in line voltages regardless of the degree of unbalance because the sum of line-to-line voltage phasors in a three-phase system is always zero.

Line currents into a delta connected circuit have no zero-sequence currents. For a delta circuit:

$$I_a^{(1)} = (1-a)I_{ab}^{(1)}$$

$$I_a^{(2)} = (1-a^2)I_{ab}^{(2)}$$

Line-to-line voltages in a star connected circuit have no zero-sequence components. For a star circuit:

$$V_{ab}^{(1)} = (1-a^2)V_{an}^{(1)}$$

$$V_{ab}^{(2)} = (1-a)V_{an}^{(2)}$$

In the absence of a neutral connection, zero-sequence currents are not present. Also, there cannot be any positive or negative sequence currents in the connections from neutral to ground.

Sequence networks are developed for various components of a power system like transmission line, transformer or synchronous machine based on these symmetrical components.

4.3.1. SCDFT: Symmetrical Component Discrete Fourier Transform

The computational burden associated with the computation of the symmetrical components can be greatly reduced by the choice of sampling frequency. If the sampling frequencies that correspond to θ=30°, 60°, or 120° are used then the DFT and the symmetrical component calculation can be effectively combined. If θ=30° and $\Delta y_L = [y_{new} - y_{old}]$ (for full cycle algorithm) we can produce full-cycle SCFDT with these expressions:

$$Y_{oc}^{(L+1)} = Y_{oc}^{(L)} + (\Delta y_{a,L} + \Delta y_{b,L} + \Delta y_{c,L})\cos(L\theta)$$

$$Y_{os}^{(L+1)} = Y_{os}^{(L)} + (\Delta y_{a,L} + \Delta y_{b,L} + \Delta y_{c,L})\sin(L\theta)$$

$$Y_{1c}^{(L+1)} = Y_{1c}^{(L)} + \Delta y_{a,L}\cos(L\theta) + \Delta y_{b,L}\cos(L-4)\theta + \Delta y_{c,L}\cos(L+4)\theta$$

$$Y_{1s}^{(L+1)} = Y_{1s}^{(L)} + \Delta y_{a,L}\sin(L\theta) + \Delta y_{b,L}\sin(L-4)\theta + \Delta y_{c,L}\sin(L+4)\theta$$

$$Y_{2c}^{(L+1)} = Y_{2c}^{(L)} + \Delta y_{a,L}\cos(L\theta) + \Delta y_{b,L}\cos(L+4)\theta + \Delta y_{c,L}\cos(L-4)\theta$$

$$Y_{2s}^{(L+1)} = Y_{2s}^{(L)} + \Delta y_{a,L}\sin(L\theta) + \Delta y_{b,L}\sin(L+4)\theta + \Delta y_{c,L}\sin(L-4)\theta$$

4.3.2 Power in Terms of Symmetrical Components

The total complex power (in volt-amperes) flowing into a three-phase circuit through the lines a, b and c is:

$$S_{3\Phi} = P + jQ = V_a I_a^* + V_b I_b^* + V_c I_c^* = 3V_a^{(0)}I_a^{(0)*} + 3V_a^{(1)}I_a^{(1)*} + 3V_a^{(2)}I_a^{(2)*}$$

The transformation of a-b-c voltages and currents to symmetrical components is power-invariant.

4.3.3 Symmetrical Component Distance Relay

Figure 69:
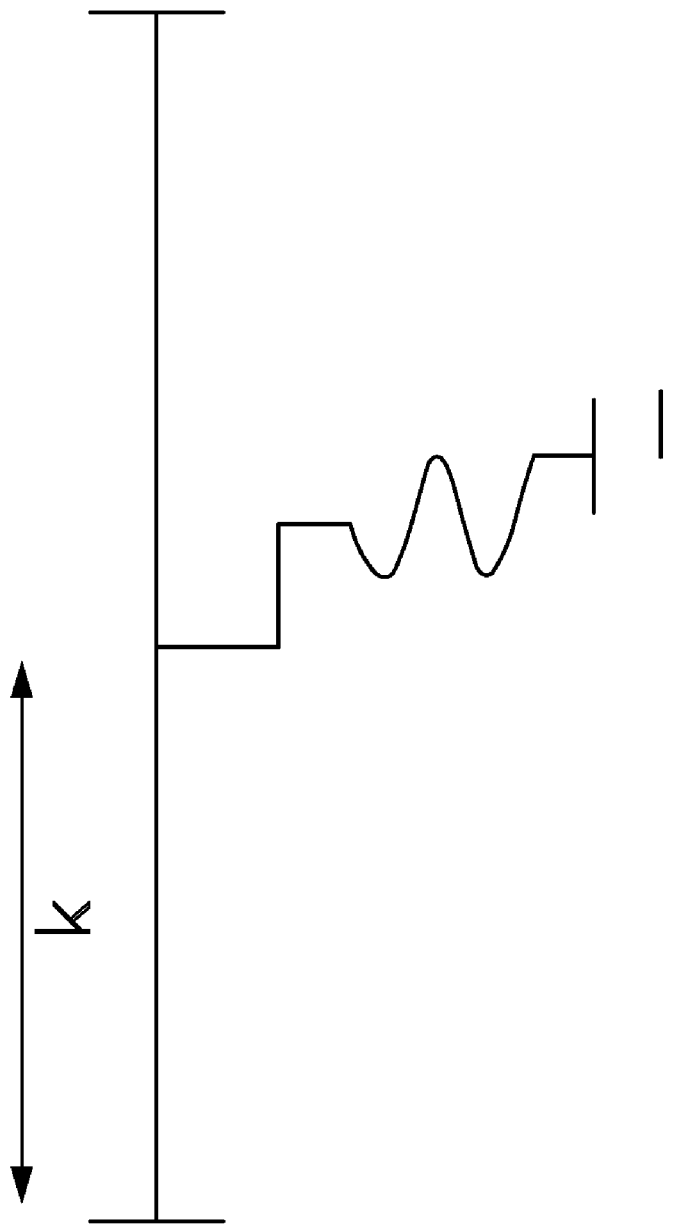
FIG. 69 is a schematic diagram of a transmission line in a fault condition.

The use of phasor calculations permits the use of symmetrical components in the detection of fault type and distance. For all possible fault types a general expression for the fractional distance to the fault is:

$$k = \frac{k_1 + k_2 k_2' + k_0 k_0'}{1 + k_0' + k_2' + k_1}$$

where all the quantities k (see FIG. 69) can be calculated from the symmetrical components of the voltage and current phasors at one end of the transmission line.

4.4. UIC Algorithm Development 4.4.1. Problem Description

Figure 70:
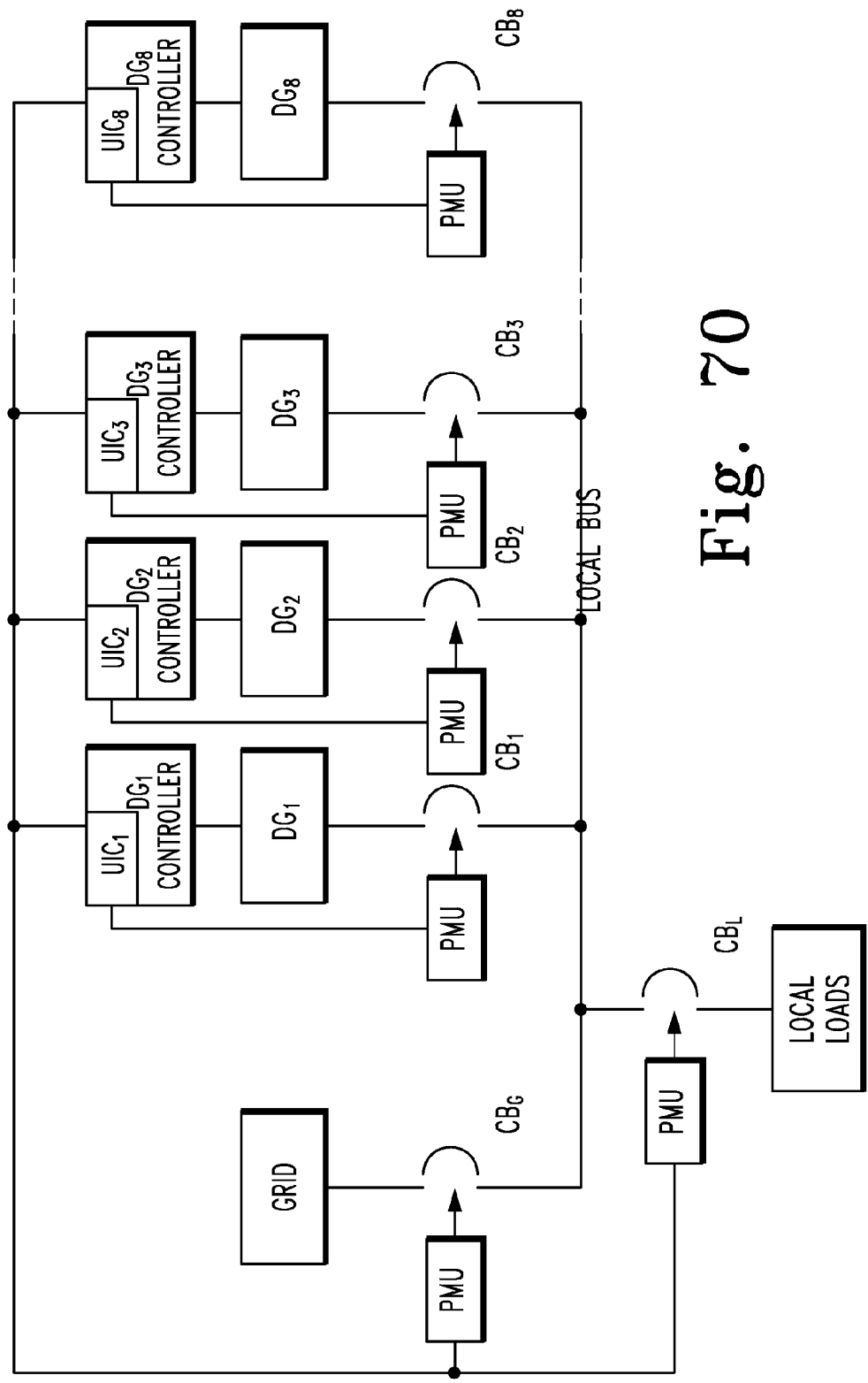
FIG. 70 is a block diagram showing GENSETs and UICs as implemented in one embodiment of the disclosed system.

The schematic in FIG. 70 shows a typical structure of Gensets and UICs. Up to 8 distributed generation Gensets each via a circuit breaker (CB) are connected to a local bus. The functionality of a UIC is implemented in two modules, namely, Phasor Measure Unit (PMU) module and Main Utility Interface Controller (Main UIC or simply UIC) module.

Each CB in this embodiment is equipped with a PMU that implements the following functions:
  Checking the status of the CB, e.g., determining if the CB is open or closed;
  Sampling 3-phase currents flowing in the CB;
  Sampling 3-phase voltages on both terminal sides;
  Calculating current and voltage phasors;
  Calculating frequencies on both terminal sides;
  Buffering calculation results;
  Communicating with Main UICs and sending results to them.

The Main UIC, an integrated part of the DG Genset controller, is helpful in many embodiments that are designed to satisfy the requirements of IEEE 1547. In the present embodiment, it implements the following two kinds of functions:

Slave functions:
  Communicating with PMUs and retrieving current phasors, voltage phasors, frequencies, and CB statuses;
  Sending commands to break/make the CB that is directly connected to the Genset controlled by its integrated DG controller; and
  Receiving commands from the UIC performed as the master and executing the commands;

Master functions:
  Communicating with PMUs and retrieving current phasors, voltage phasors, frequencies, and CB statuses;
  Sending commands to break/make the CB that is directly connected to the Genset controlled by its integrated DG controller;
  Sending commands to other UICs performed as slaves;
  Performing under-/over-voltage protection;
  Performing under-/over-frequency protection;
  Performing fault detection and protection;
  Timing synchronization and changing operation mode from isolated to parallel;
  Detecting loss of synchronism and changing operation mode from parallel to isolated;
  Performing other relaying functions required by IEEE 1547.

The communication protocol among Main UICs and PMUs is a CAN bus.

4.4.2. Inputs and Outputs

Input signals to UIC include the following:
  3-phase currents, provided by Current Transformers (CTs), flowing through each CB;
  3-phase voltages, provided by Potential Transformers (PTs), appearing on both terminal sides of each CB;
  Status of each CB.

Output signals from UIC include the following:
  Break/Make signals to CBs;
  Values need to be sent the human machine interface (HMI) or human computer interface (HCI) including currents, voltages, frequencies, etc.

4.4.3. Programming Languages

Algorithms run on PMUs will be coded in PIC assembly language. Algorithms run on Main UICs will be coded in high level programming language, such as C, Matlab, etc.

4.4.4. Logic Flow

Figure 71:
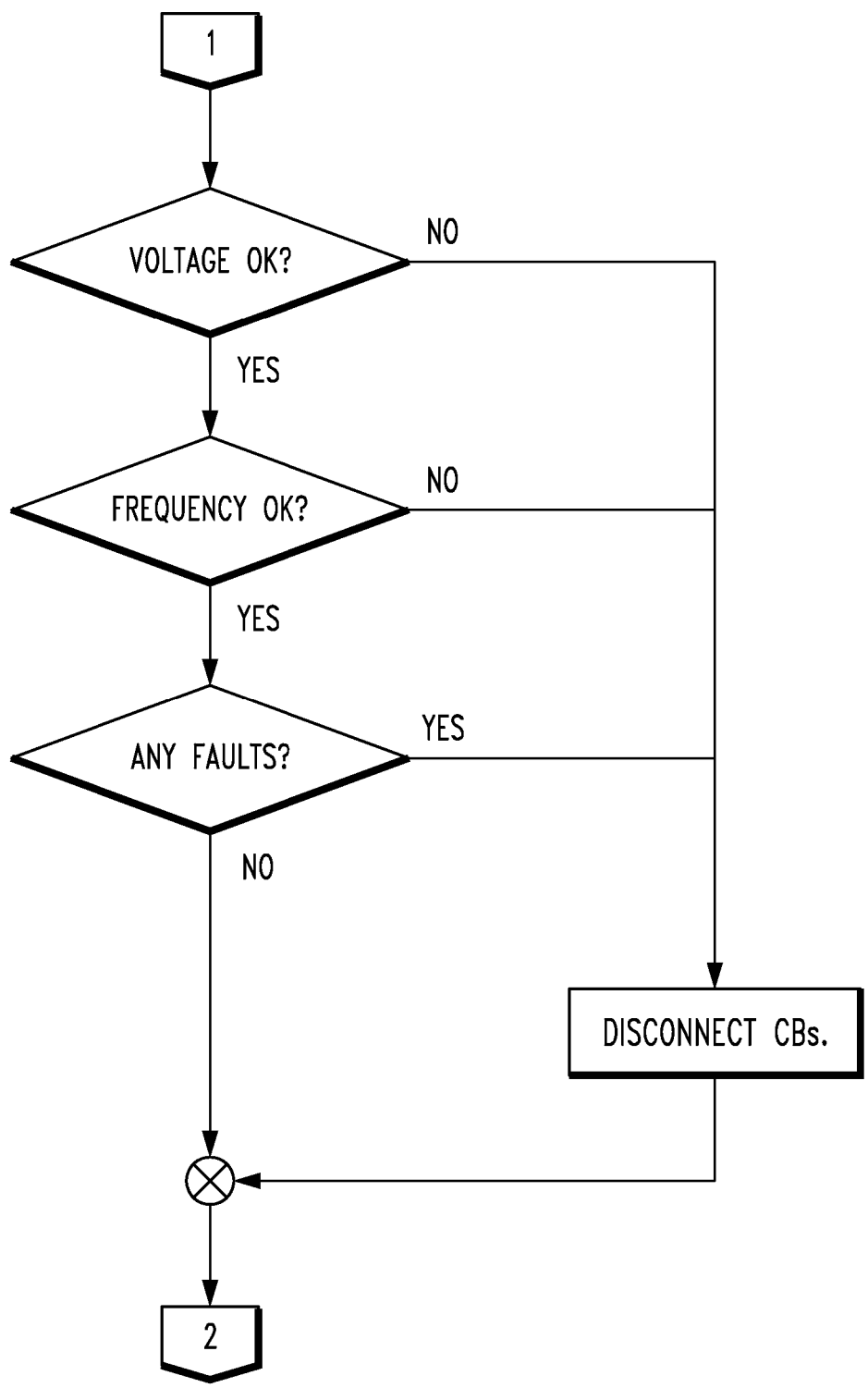
FIG. 71 is a flowchart illustrating error-handling logic in the controller in certain embodiments of the disclosed system.

The PMU's main logic flow is illustrated in the flowchart in FIG. 71.

5. Prototype Design

5.1. System Controller Design

Figure 72:
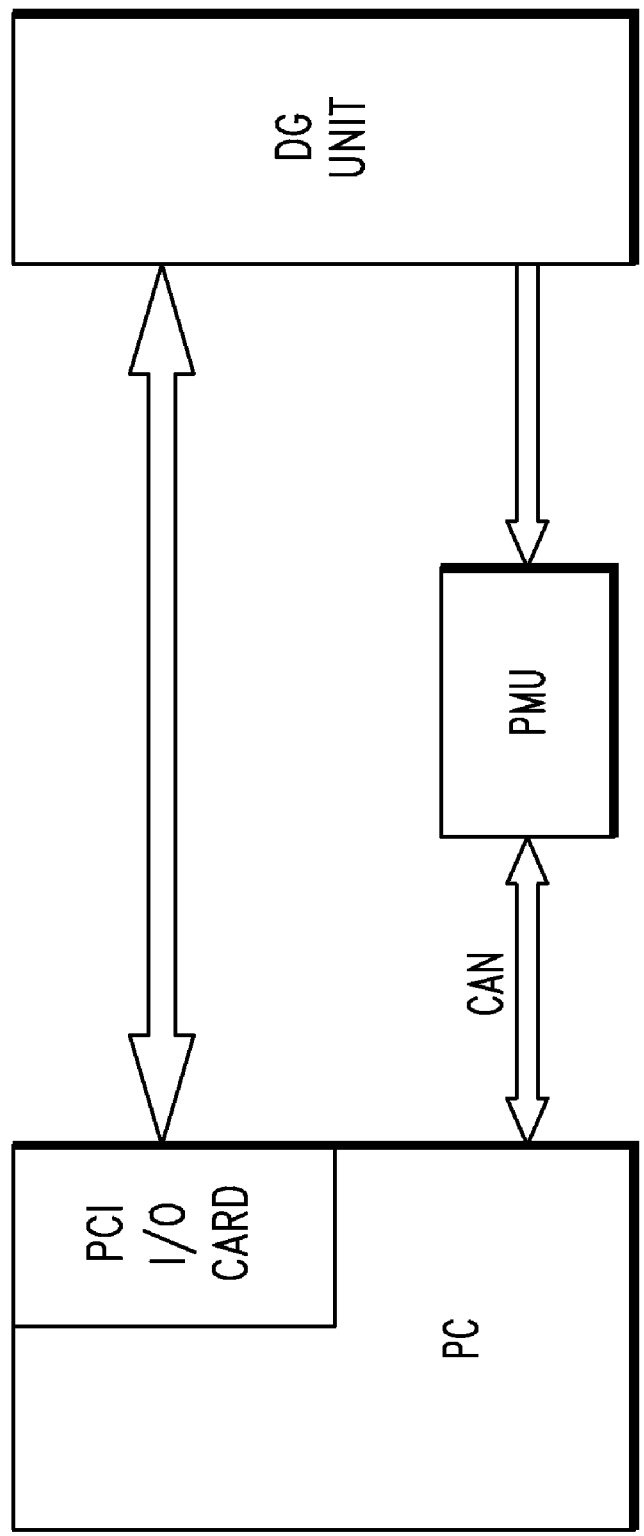
FIG. 72 is a block diagram of a PC-based controller implementation of the current system.

Illustrated in context as a block diagram in FIG. 72, the controller system consists of a number of PMUs (Phasor Measurement Unit) and a mainstream desktop computer with a PCI CAN card and a PCI I/O card. The PC will be the workhorse of the controller that undertakes all computing tasks of UIC (Utility Interface Controller) and the system controller. A PMU acts as a digital sensor that measures 3-phase currents or voltages. The PCI CAN card has two ports. One port is for local communications with PMUs in the same DG unit. The other is for communications between DG units as well as communications between DG unit and PMUs at Common Coupling Point (CCP). The PCI I/O card takes care of all other local inputs, such as oil pressure, and outputs, such as speed bias to Engine Control Module (ECM).

This exemplary embodiment of the hardware includes: 3.0 GHz, Pentium 4 processor with 800 MHz front side bus; 1 GB DDR2 RAM; 300 GB, 7200 rpm, 8 MB buffer SATA hard drive; 16×, double layer DVD±R/RW drive; 4 available PCI slots; 1 serial port, 1 parallel port, and 1 LAN port; 2 USB ports; Integrated audio and video; and 19-inch digital LCD. The PC's software in this embodiment includes: MS Windows XP Professional with SP2; MS Visual Studio .NET; and the Math Works Matlab with Simulink and an appropriate collection of toolboxes as will occur to those skilled in the art. Example PC hardware systems include DELL OPTIPLEX GX520 and the HP Compaq Business Desktop 5000 series.

CAN Cards in this embodiment use a PCI interface, provide 2 separate ports for data exchange, and a Windows DLL library. For example, the Advantech PCI-1680U-A: 2-Port CAN Interface Universal PCI Communication Card with Isolation works well.

The I/O Cards in this embodiment preferably have the following characteristics: A/D sampling rate of 720 samples per second per channel; A/D sampling resolution of 12-bit A/D converter; 3 A/D input channels; 16 digital input channels; 12 digital output channels; D/A resolution of 12-bit D/A converter; 2 D/A output channels; and a corresponding Windows DLL library. In various embodiments, these I/O Cards include Advantech PCI-1710-B 100 KS/s, 12-bit High-gain PCI-bus Multifunction DAS Card; Advantech PCLD-8710-A Wiring Terminal Board for PCI-1710/1710HG; and/or Advantech PCL-10168 68-Pin SCSI Cable, 1 m.

The connection between EGCP-2's Inputs and Outputs and the PC-Based Controller's Inputs and Outputs in this embodiment as follows:

TABLE 5-1

PC-based solution wiring diagram

| EGCP-2 | | | | PC-Based Controller | |
|---|---|---|---|---|---|
| I/O | A/D | Description | Location | Counterpart | # of units |
| I | A | Input Power | 1-2 | N/A | |
| I | A | PT Inputs | 40-48 | PMUs + CAN card port | 4 + 1 |
| I | A | CT Inputs | 89-94 | PMUs + CAN card port | 2 + 1 |
| I | A | MPU (Speed) | 70-72 | A/D channel on I/O card | 1 |
| I | A | Process | 86-88 | N/A | |
| I | A | Coolant Temp | 66-67 | A/D channel on I/O card | 1 |
| I | A | Oil Pressure | 68-69 | A/D channel on I/O card | 1 |
| O | A | Speed Bias | 73-75 | D/A channel on I/O card | 1 |
| O | A | Voltage Bias | 37-39 | D/A channel on I/O card | 1 |
| I | D | Discrete Inputs | 49-65 | Digital input channel | 16 |
| O | D | Relay Outputs | 5-35 | Digital output channel | 12 |

TABLE 5-1-continued

PC-based solution wiring diagram

| EGCP-2 | | | | PC-Based Controller | |
|---|---|---|---|---|---|
| I/O | A/D | Description | Location | Counterpart | # of units |
| I/O | D | RS-485 | 76-80 | CAN card port | 1 |
| I/O | D | RS-422 | 81-85 | N/A | |

5.2. System Controller Design

5.2.1 System Structure

The system controller includes following function modules
- Supervisory control functions
- DG Unit control functions
- UIC Control functions
- Local protection functions
- User Interface The system platform is Microsoft Windows XP Professional. The software development platform is Microsoft Visual .Net. The main programming language is C++.

The major control system runs on an event driven mechanism, wherein each module communicates with others through the event engine. The advantage of the approach is
- Minimize global variables to improve system reliability
- Modularize each sub system and make whole system scalable
- Easy for debugging Due to the time constraints, the UIC module will run on an interrupt based module. The interrupt will activate 720 times per second, it will receive data from PMU and check whether they satisfy IEEE 1547. In case of emergency, an emergency handling module will be called to control the DG unit directly, otherwise, event information will be sent to the event engine.

Figure 73:
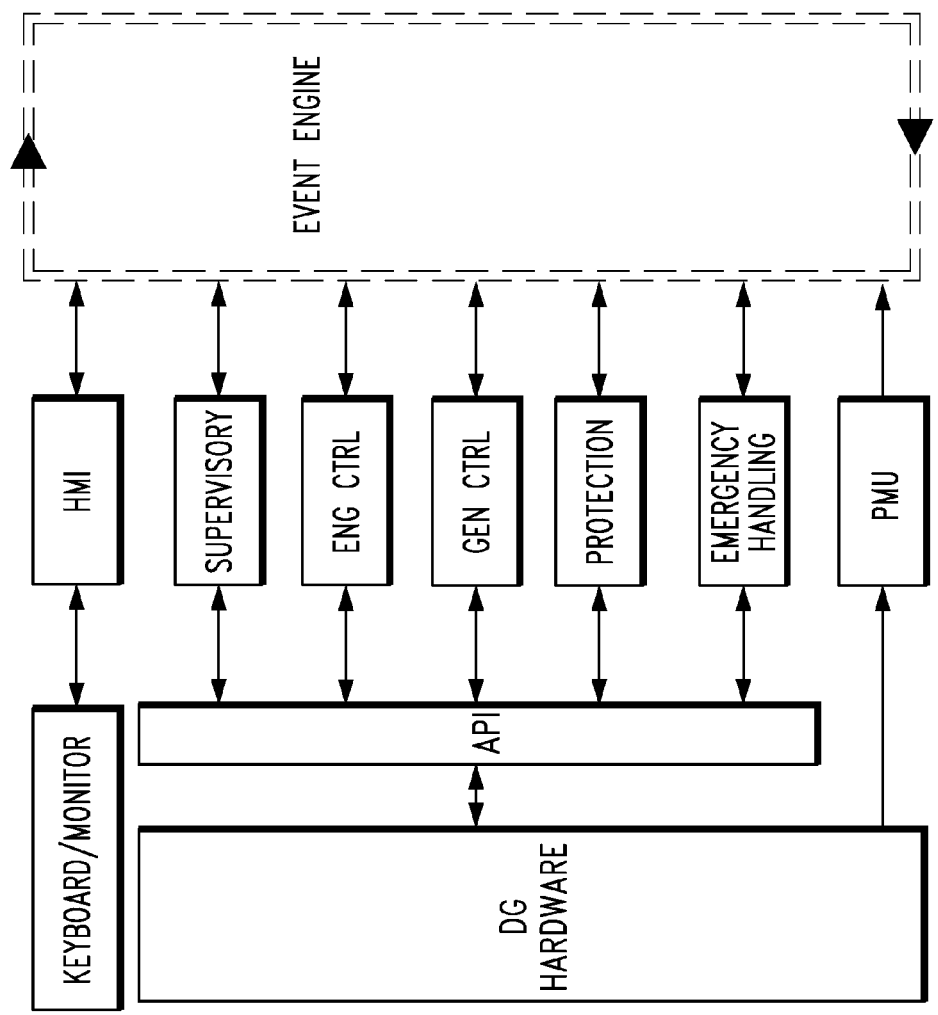
FIG. 73 is a block diagram of functional components in the system shown in FIG. 72.

As shown in FIG. 73, there are several major functional blocks in the main system controller of the present embodiment: an event engine, HMI, supervisory control, engine control, generator control, local protection, and I/O card API. These functional blocks will control part of the hardware through the API to get inputs and send output information. These functional blocks communicate with each other by sending events and receiving events from the event engine.

5.2.2 The Structure of the Event Engine and Sub Module

As mentioned before, different functional blocks communicate with each other through events. Following is a definition of the event.

```
struct sysEvent
{
    unsigned short sysPriority;
    unsigned short sysObjectFrom;
    unsigned short sysObjectTo;
    unsigned short sysCommand;
    union
    {
        struct
        {
            int iHigh;
            int iLow;
        } Integer;
        long longInfo;
        float floatInfo;
    } message;
};
```

The event engine is a FIFO event queue. Each module can push events to the queue, and the engine will send the events to every module to check.

```
class sysEventQueue
{
    protected:
        static sysEvent eventQueue[MAX_EVENTS];
        static int sysQueueHead, sysQueueTail;
    public:
        sysEventQueue ( );
        ~sysEventQueue ( );
        static void putEvent (sysEvent event);
        static void replaceEvent (sysEvent event)
            { eventQueue[sysQueueTail] = event; }
        static void getEvent (sysEvent& event);
        static int isEmpty ( );
};
```

Each submodule will be a class inherited from the class of sysObject. The major module in the class is the handleEvent function, the function that will execute normal monitor functions and communicate with other modules by sending events to the event engine and handling events from the engine.

```
class sysObject
{
    Private:
        unsigned short objectType;
        unsigned short objectID;
    public:
        sysObject ( ) { };
        ~sysObject ( ) { };
        virtual void handleEvent (sysEvent& event) { }
        virtual void clearEvent (sysEvent& event)
            { event.sysCommand = evNothing; }
        virtual void pushEvent (sysEvent& event)
            {
                sysEventQueue::putEvent (event);
                clearEvent (event);
            }
};
```

5.3. Phasor Measurement Unit (PMU) Development 5.3.1 Hardware

Figure 77:
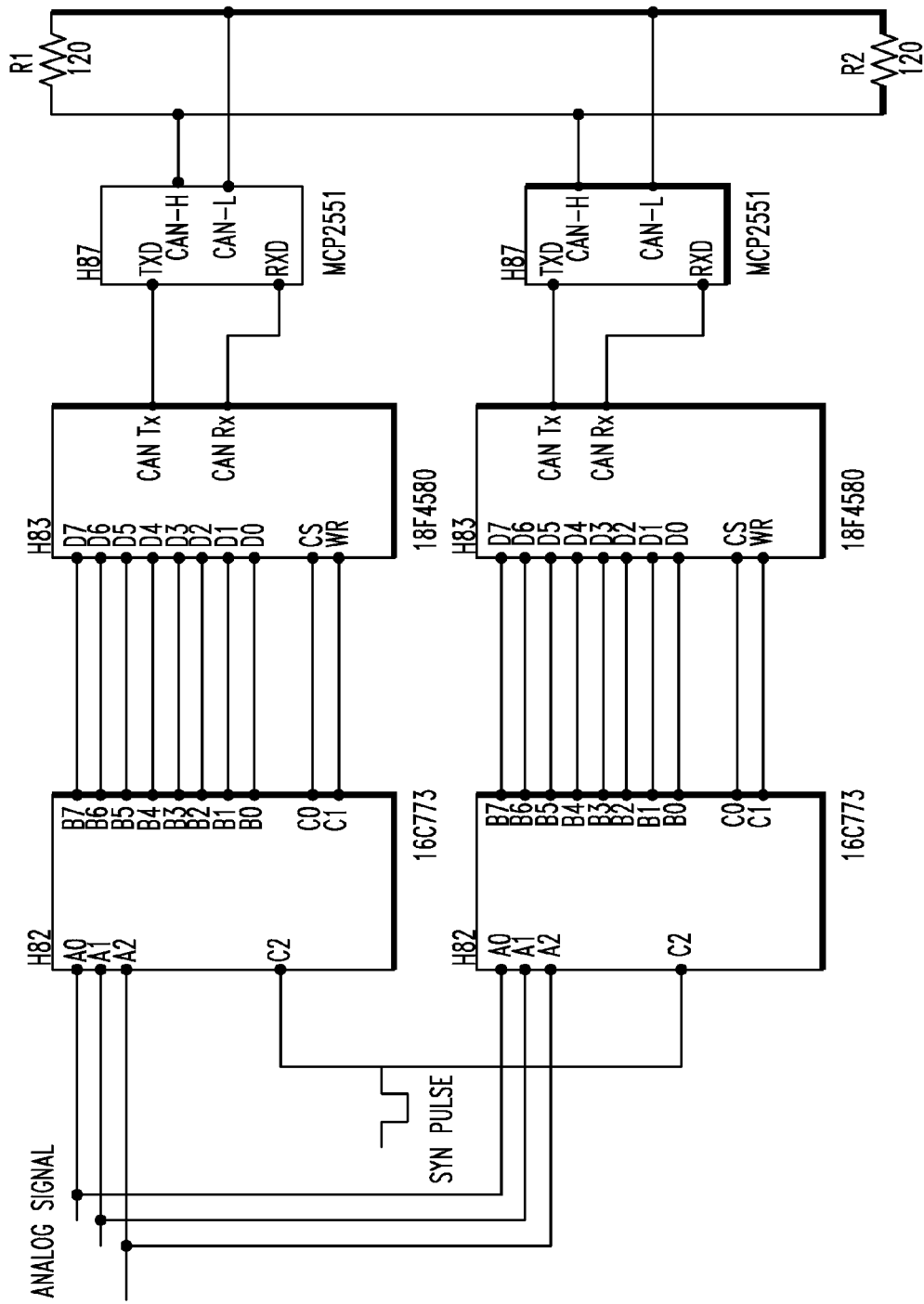
FIG. 77 is a schematic diagram of a phasor measurement unit (PMU) according to one embodiment of the disclosed system.

The Phasor Measurement Unit (PMU) acts as an interface that converts the standard substation measurements into digital measurements that can be processed by the controller. To attain a higher rate of data transmission between the PMU and the controller, a CAN bus will be the media connecting them. The circuit diagram is as shown in FIG. 77.

Figure 74:
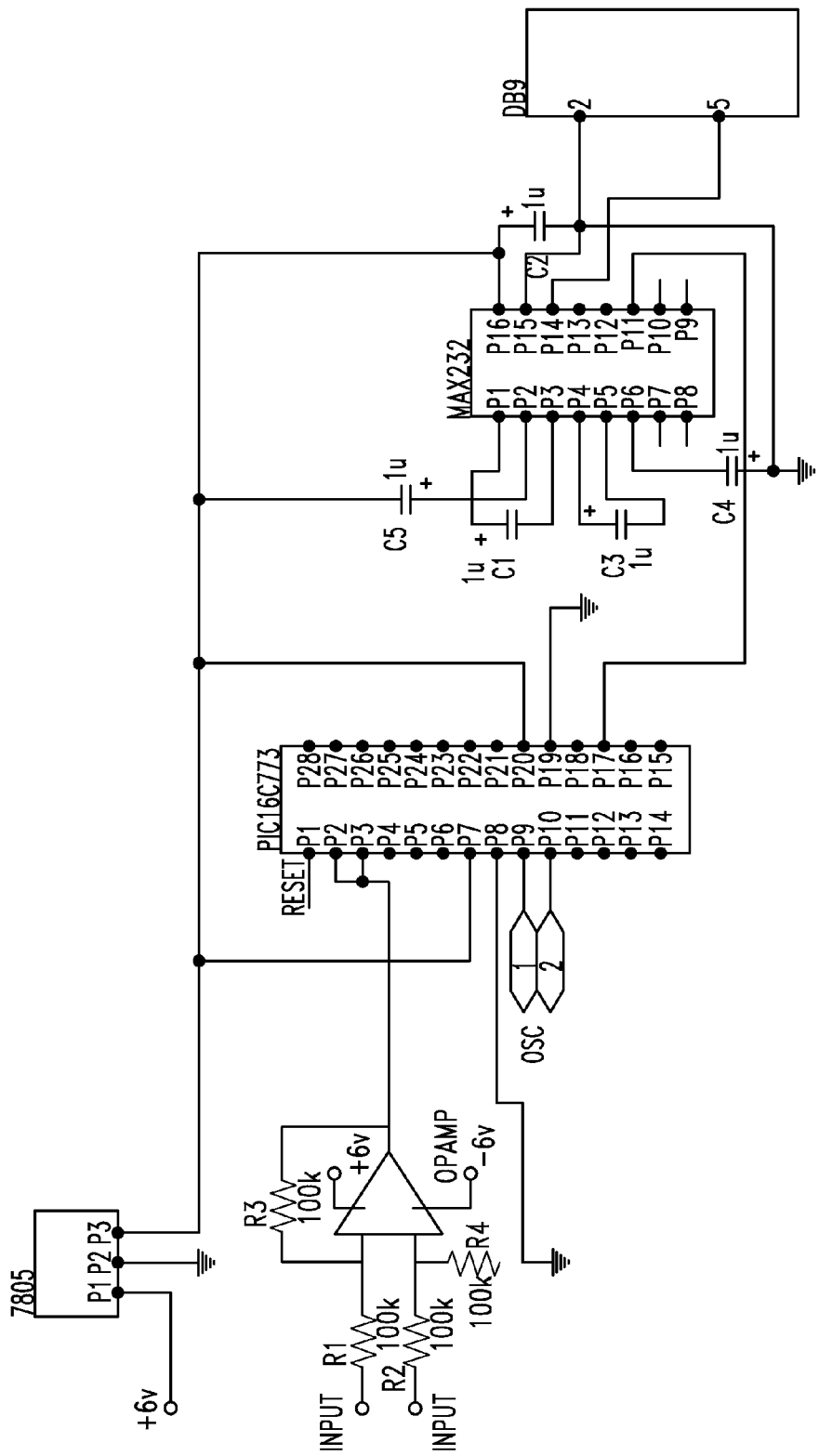
FIG. 74 is a circuit diagram of a PMU for use in the system shown in FIG. 72.

The PMU control software was developed using assembly language and implemented in a PIC16C773 chip, which is shown in FIG. 74. Specifications of this exemplary PMU include:

Sampling rate: 720 samples per second per channel.
Sampling resolution: 3 channel 12-bit A/D converters.
4K-Byte program memory and 256-Byte data memory.
2 Timers except watchdog timer.
1 CAN port.

5.3.2. Testing of Prototype PMU

Figure 75:
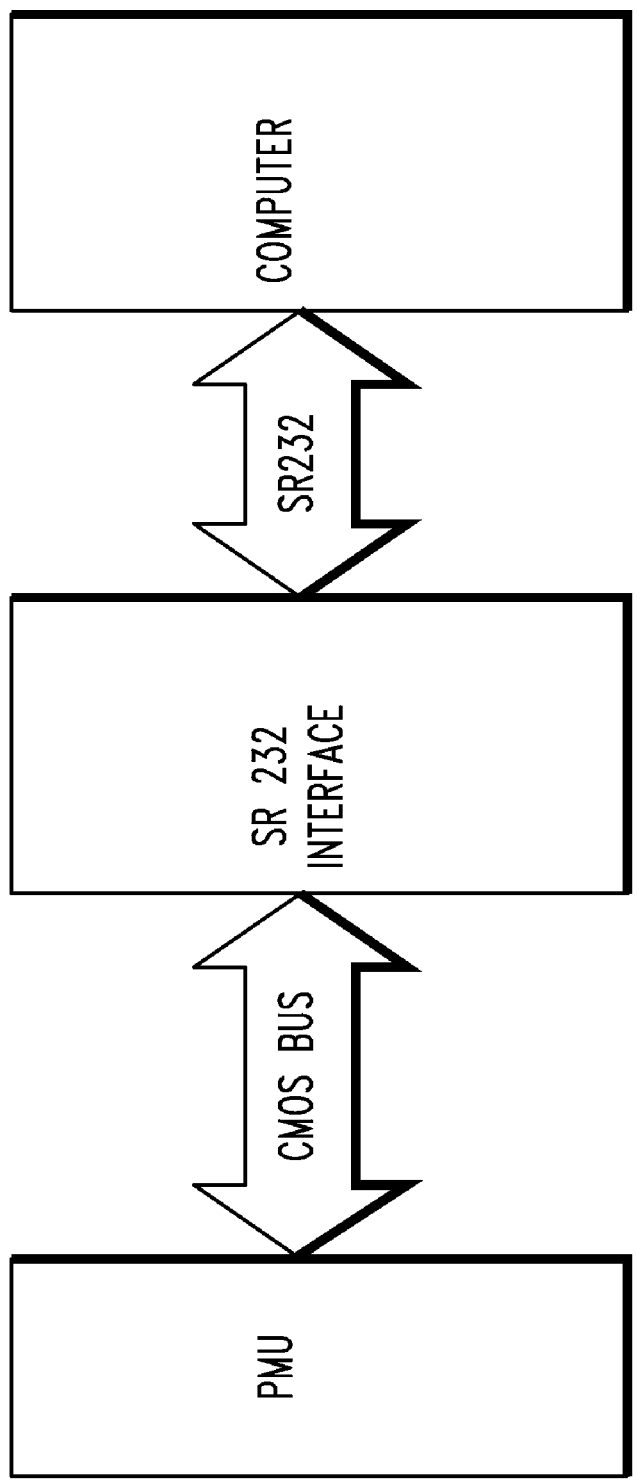
FIG. 75 is a block diagram of communication channels in a subsystem of the system shown in FIG. 72.

An SR 232 interface was developed to test the functionality of Phasor Measurement Unit (PMU). It includes an SP232 chip and four 0.1° F. capacitors. The purpose of introducing the interface into the test is to convert the CMOS outputs into the correct SR 232 signals. Thus, the computer can poll the outputs of PMU via its serial port. To poll data using a computer via its serial port is only a method to do testing. Some embodiments of the PMU do not include serial communication capabilities, implementing CAN communication instead. A block diagram of this subsystem is shown in FIG. 75.

5.3.3. PMU Software Re-Development

The PMU algorithm in one embodiment included a flaw, in that it did not consider accumulated errors caused by truncations and iterations. The new algorithm does its calculations recursively, which causes the accumulated errors, and non-recursively at the same time. After each cycle, the non-recursive results are copied to replace the recursive ones, thereby eliminating accumulated errors while still keeping the efficiency of the old algorithm.

5.3.4 Converting Coefficients into Phasors and Frequencies

The outputs of PMU are sine and cosine coefficients. More calculations based on these coefficients are needed to yield phasors and frequencies. In various embodiments, this conversion is implemented using a Visual Basic program or using C++ consistent. The code for one embodiment is provided in Appendix B.

Figure 76:
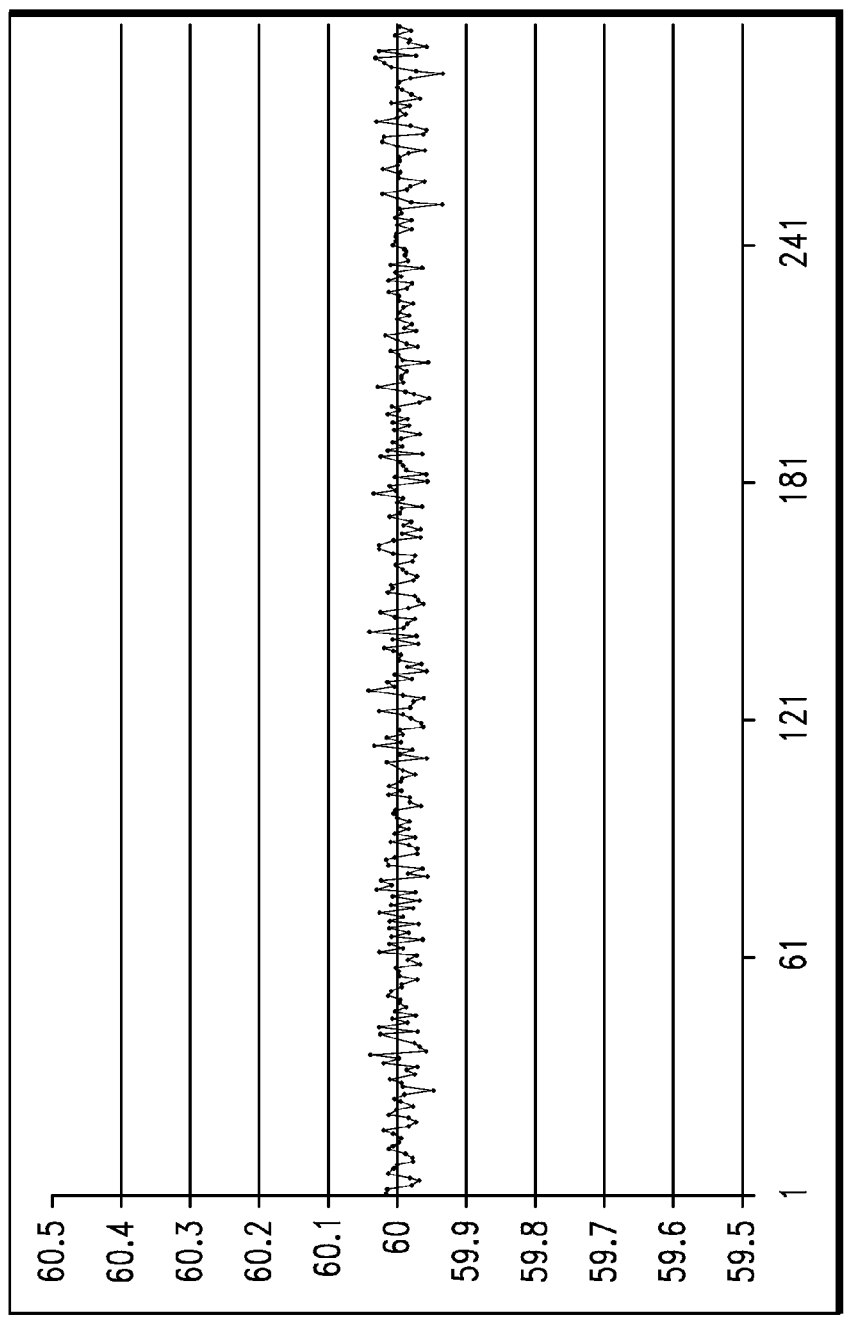
FIG. 76 is a graph of results obtained from a phasor calculation program for use in one embodiment of the disclosed system.

A diagram showing the frequencies vs. time is shown in FIG. 76. The average of frequencies is very close to 60 Hz.

6. Additional Improvements 6.1. System Controller 6.1.1. Summary

The following activities have been accomplished:
Tested digital analog I/O board
Developed protection module and implemented PLC function in VC++
Developed engine/generator control module in VC++
Developed DG unit control function in VC++
Developing system controller user interface in C++

6.1.2. Protection and PLC Function

Some protection functions were implemented in a PLC module in some embodiments because sufficiently low-level access to the system controller was unavailable. In another embodiment those functions were implemented in and will be incorporated into a new controller. The code for the PLC is attached in Appendix F.

6.1.3. Engine and Generator Controller

Following is an example of a method of calculating.
To calculate Voltage Bias

```
percent_ref = 10;       // +/- 10% of reference voltage
volt_range = 9;         // +/- 9 Vdc of voltage bias
ref_voltage = 480;      // normal voltage 480 Vac
detected_volt = 0;      // initial value
-----------------------------
volt_bias = 0;
max_volt = 0;
min_volt = 0;
```

Find limits of volt $$\text{max\_volt} = \frac{(100 + \text{percent\_ref})}{100} \times \text{ref\_voltage}$$

$$\text{min\_volt} = \frac{(100 - \text{percent\_ref})}{100} \times \text{ref\_voltage}$$

If (min_volt ≦ detected_volt ≦ max_volt)

$$\text{volt\_bias} = \frac{(\text{detected\_volt} - \text{ref\_voltage})}{\text{ref\_voltage}} \times \text{percent\_ref} \times \text{volt\_range}$$

Elseif (detected_volt < min_volt)

-continued $$\text{volt\_bias} = \frac{(\text{min\_volt} - \text{ref\_voltage})}{\text{ref\_voltage}} \times \text{percent\_ref} \times \text{volt\_range}$$

Else $$\text{volt\_bias} = \frac{(\text{max\_volt} - \text{ref\_voltage})}{\text{ref\_voltage}} \times \text{percent\_ref} \times \text{volt\_range}$$

End
Return    volt_bias

To Calculate Speed Bias

The Throttle Position Sensor (TPS) provides a voltage signal that changes relative to the position of the throttle valve. Signal voltage will vary from less than 1.0 volt at idle to about 4.6 volts at wide open throttle (WOT). The TPS signal is an input used by the ECM for fuel control and for many of the ECM-controlled outputs.

```
kp = 1;                        // proportional gain
ki = 15;                       // Integral gain
imin = -100;                   // minimum value before multiplying ki
imax = 100;                    // maximum value before multiplying ki
kd = 0;                        // derivative gain
max_power = 85000;
min_power = 0;
speed_range = 4;
        // speed range and offset show speed bias from 0.5 to 4.5
offset = 0.5;
needed_power = 0;              // needed power from power management
present_power = 0;             // power that this generator is producing
freq = 60;                     // frequency
rad_speed = 0;                 // omega rad/sec
ref_torque = 10;
feed_back_torque = 0;
error = 0;
pterm = 0.1;
istate = 0;
iterm = 0;
dterm = 0;
old_error = 0;
pid_result = 0;
instant_power = 0;
speed_bias = 0.5;
if (needed_power == 0)
        speed_bias = 0.5
else
        rad_speed = freq × 3.14159
```

$$\text{ref\_torque} = \frac{\text{needed\_power}}{\text{rad\_speed}}$$

$$\text{feed\_back\_torque} = \frac{\text{present\_power}}{\text{rad\_speed}}$$

```
// PID Control
        error = ref_torque - feed_back_torque
        //Calculate Proposition term
        pterm = kp × error;
        //Calculate Integral term
        if (istate > imax)
                istate = imax;
        if (istate < imin)
                istate = imin;
                iterm = ki * istate;
// some papers use iterm = ki * (istate + error)
// Calculate Derivative term
        dterm = kd * (error - old_error)
// Remember old data
        old_error = error;
        istate = istate + error;
```

```
// PID output
pid_result = pterm + iterm + dterm;
//Calculate Power for Throttle position need
instant_power = (ref_torque + pid_result) × rad_speed;
// Check for security
If (instant_power > max_power)
                instant_power = max_power;
        if (instant power < min_power)
                instant_power = min_power;
//Calculate Speed Bias
```

$$\text{speed\_bias} = \frac{\text{instant\_power}}{\text{max\_power}} \times \text{speed\_range} + \text{offset}$$

End
Return Speed_bias 6.1.4. Updated System Controller Schematics

The functional diagram of a system controller in FIG. 73 has also been applied in a second embodiment. There are seven major functional blocks in this main system controller: event manager, HMI, supervisory control, engine control, generator control, local protection, and I/O card API. These functional blocks control part of the hardware through the API to get inputs and send output information. These functional blocks communicate with each other by sending events to and receiving events from the event manager. The UIC communicates with the event manager through an event loop or an interrupt.

A test unit was placed in a test cell. A computer controller was connected to the unit through the digital and analog I/O card. Testing included three major tasks: I/O connection testing, functional module testing, and integrated system testing. I/O connection testing checked each input signal and each output signal to make sure that they were correctly connected and respond properly. Functional module testing tested each software module described in the previous section and performed functions as designed. Integrated system testing tested the system as a whole.

6.2. Utility Interface 6.2.1. Summary

The following research and development activities have been undertaken:

Tested the stability/reliability of PMU by running it continuously for approximately 50 days.
Developed CAN communication.
Revised PMU Assembly code for the CAN communication.
Programmed UIC functions in VC++.
Compared compliance of existing technology with IEEE 1574
Refined and tested the UIC functions.
Constructed a PMU unit.
Developed HIF detection technology 6.2.2. Test of the Stability and Reliability of a Prototype PMU Overview Since the PMU units will be running continuously for months once put into use in practice, a prototype PMU had been put online to test its stability and reliability. The data the PMU acquired were transmitted to a PC via SR 232 communication. A VB program running on the PC converted data into meaningful variables with time stamps and recorded them on the hard drive.

Test Results

Analyzing a small portion of the recorded frequencies showed that there were no frequencies that were apparently absurd. This initial result indicated that the PMU worked properly during the test. It also indicated that the PMU assembly code is stable and reliable.

6.2.3. Development of CAN Communication

Overview

In this embodiment, the Phasor Measurement Unit (PMU) acts as an interface that converts the standard substation measurements into digital measurements that can be processed by the controller. To attain a higher rate of data transmission between the PMU and the controller, a CAN bus is used as the media connecting them.

Schematics

Figure 78:
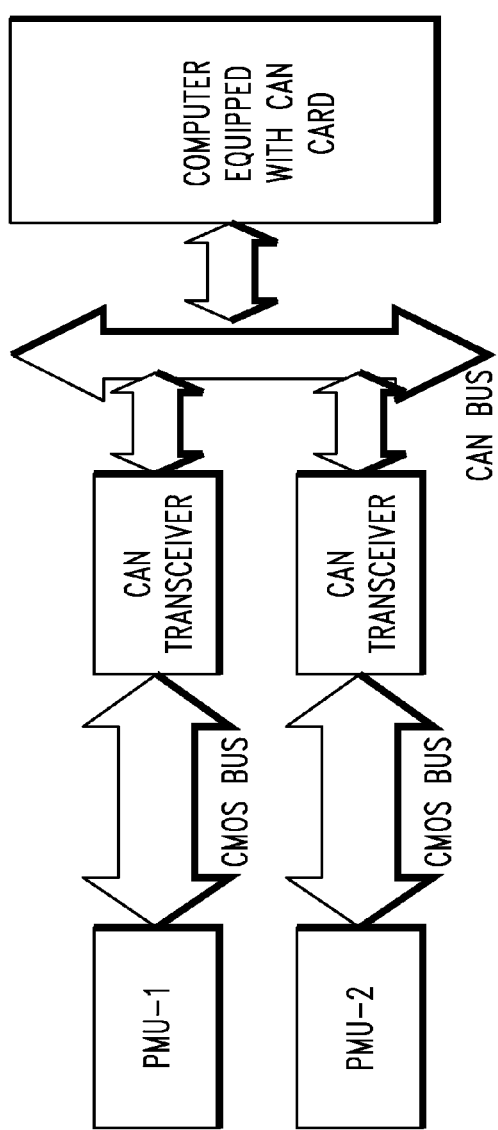
FIG. 78 is a block diagram showing communication between PMUs and the PC in the system illustrated in FIG. 72.

The circuit diagram is shown in FIG. 78.

Code for CAN Communication

CAN communication is implemented using PIC18F4580 chips. MCP2551 is used as CAN transceiver. The assembly code running on the PIC18F4580 for CAN communication is shown in Appendix D.

6.2.4. Revision of PMU Assembly Code for CAN

Overview

After successful testing of the functionality of Phasor Measurement Unit (PMU) with RS-232 interface, PMU with CAN bus interface had been developed as a final design. In this design two PMU units are connected to the PC via a CAN bus.

PMU sends calculated phasors to a CAN chip using Parallel Slave Port (PSP). We used PSP instead of serial posts to achieve fast data communication. The CAN chip sends this data to PC using CAN bus. A CAN transceiver is used between the CAN chip and the CAN bus to convert voltage levels. Synchronization between the PMUs is a challenging task in this project. To achieve proper synchronization, one PMU works as the master PMU and all others (in current case only one) are slave PMUs. The master PMU will send synchronization pulses to slave PMU and slave PMU will use this pulse for synchronization.

After analyzing data transmitted to PC, we can see good synchronization between both PMU. Results will be better after using filters.

Schematics

Figure 79:
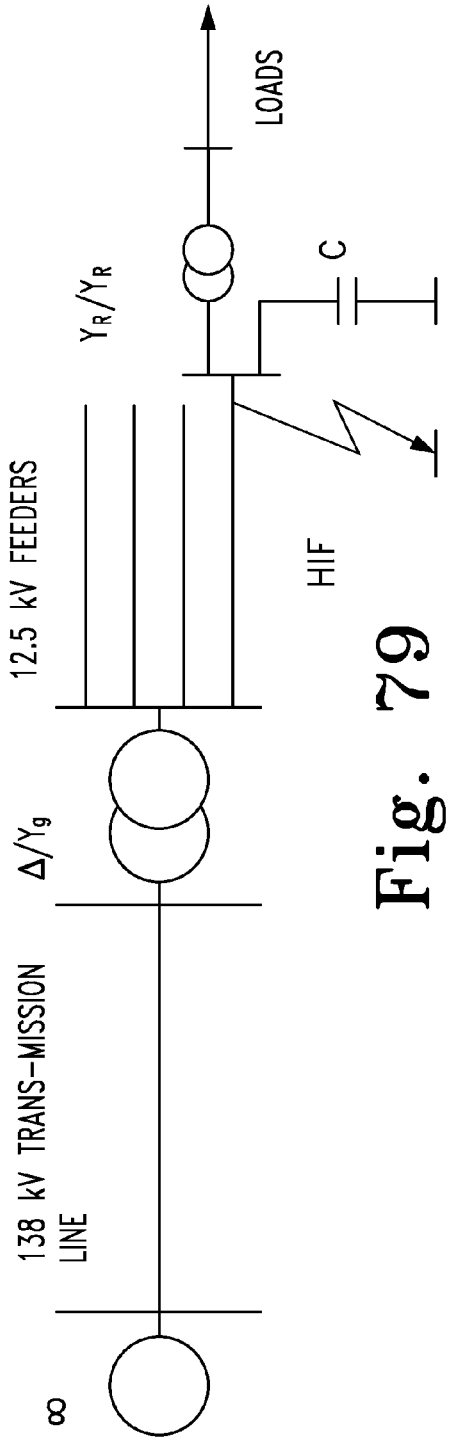
FIG. 79 is a one-line system diagram used to simulate high-impedance fault (HIF) detection techniques implemented in some embodiments of the disclosed system.

The circuit diagram is shown in FIG. 79.

Code

The current version is developed to address the practical CAN communication. Since more than one PMU shares the same CAN channel, the first revision is to incorporate an id number into the data each PMU sends to the computer. Therefore, the PC can distinguish and assemble data correctly. Since we also need to make all PMUs sample at substantially the same instant, the second revision is to introduce a master PMU and let all others be slave PMUs. The master PMU will send synchronization signals to slave PMUs to guarantee the substantial simultaneity of corresponding samples on all PMUs. This improves the operation of the UIC and other control functions. The code is attached in Appendix B.

6.2.5. Programming of UIC Functions in VC++

The UIC functions were programmed for simulation using Matlab, then were rewritten in VC++. The new version also generalized some cases and provided many default parameters. The code is in Appendix E.

6.2.6. Comparison of Compliance of Basler and Woodward Productions with IEEE 1574

One current system uses a Woodward EGCP-2 as the Genset controller and a Basler relay as the UIC. The newly developed integrated controller meets the IEEE 1574 requirements into the product.

The following table compares the Basler relay's characteristics and requirements of IEEE 1574.

| Requirement | IEEE 1547 Standard | Basler Relay |
|---|---|---|
| Synchronization | $\Delta f = 0.3$ Hz<br>$\Delta V = 10\%$<br>$\Delta\phi = 20$ degrees | $\Delta f = 0.01$-$0.5$ Hz<br>$\Delta V = 1$-$20$ V<br>$\Delta\phi = 1$-$45$ degrees |
| Voltage disturbances | $V < 160 \rightarrow 0.16$ sec<br>$60 < V < 106 \rightarrow 2$ sec<br>$132 < V < 144 \rightarrow 1$ sec<br>$144 < V \rightarrow 0.16$ sec | Pickup: 10-300 V<br>Time delay: 0.05-600 sec |
| Frequency disturbances | $F > 60.5 \rightarrow 0.16$ sec<br>$59.3 > F > 57.0 \rightarrow$ user<br>$F < 57 \rightarrow 0.16$ sec | Pick up: 40-70 Hz<br>Time delay: 0-600 sec |
| Disconnection of faults | Overcurrent protection and ground fault protection | Time overcurrent protection available with pick up to drop out ratio = 95% |
| Surge withstanding capability | Comply with conditions of ANSI C62.41 or IEEE C37.90.1 | Complies with IEEE C37.90.1 |
| Influence of EMI Prevention of unintentional islanding | Not influenced by EMI | Qualified to C37.90.2 Has a reverse power protection which can be used to prevent islanding |
| Inadvertent energization | Area EPS Voltage and frequency must be in the range 106 V-132 V and 59.3 Hz-60.5 Hz. Reconnection can be delayed up to 5 minutes after EPS has regained normalcy | Recloses between 100 milliseconds to 600 seconds |
| Measurement of Voltage current and Frequency | All the 3 phases need to be measured | All 3 phases are measured |

The following table shows the comparison of Woodward EGCP-2's characteristics and IEEE 1574

| Requirement | IEEE 1547 Standard | EGCP2 |
|---|---|---|
| Synchronization | $\Delta f = 0.3$ Hz<br>$\Delta V = 10\%$<br><br>$\Delta\phi = 20$ degrees | $\Delta f = 0.01$-$0.5$ Hz<br>Volt window = 0.1-10% V<br>Default Voltage: 10%<br>$\Delta\phi = 2$-$20$ degrees<br>Default $\Delta\phi = 10$ degrees |
| Voltage disturbances | $V < 160 \rightarrow 0.16$ sec<br>$60 < V < 106 \rightarrow 2$ sec<br>$132 < V < 144 \rightarrow 1$ sec<br>$144 < V \rightarrow 0.16$ sec | Pickup: 50-30000 V<br>Default<br>Pickup(high): 250 V<br>Default<br>Pickup(low): 200 V<br>Time delay: 0.1-30 sec<br>Default time delay: 5 sec<br>Gen volt Hi limit: 10% above rated<br>Gen volt low limit: 10% below rated |
| Frequency disturbances | $F > 60.5 \rightarrow 0.16$ sec<br>$59.3 > F > 57.0 \rightarrow$ user<br>$F < 57 \rightarrow 0.16$ sec | Pickup: 40-75 Hz<br>Time delay: ?<br>Default<br>Pickup(High): 65 Hz<br>Default Pickup(low): 55 Hz |
| Disconnection of faults | Overcurrent protection and ground fault protection | Pick up: 5-30000 A<br>Default pickup: 30 A<br>Delay: 0.1-20 sec<br>Default delay: 1 sec |
| Surge withstanding capability | Comply with conditions of ANSI C62.41 or IEEE C37.90.1 | Complies with IEEE C37.90.1 |
| Influence of EMI Prevention of unintentional islanding | Not influenced by EMI | Qualified to C37.90.2 No islanding feature |
| Measurement of Voltage current and | All the 3 phases need to be measured | Only 1 phase of the utility is measured and 3 |

| Requirement | IEEE 1547 Standard | EGCP2 |
|---|---|---|
| Frequency | | phases of the Genset is measured |
| Voltage Regulation | Must not degrade customer voltage beyond + or − 5% of nominal voltage | Does not degrade voltage beyond 2-5% of nominal voltage |

6.2.7. Test and Refinement of the UIC Functions

In this experimental embodiment, the overcurrent relay function has been integrated into our main UIC function. The development of ground fault detection function is being developed as a standalone relay function independent from main UIC functionality.

6.2.8 Development of HIF Detection Technology

High Impedance Fault (HIF) is a concern in the implementation of DG, even though it has not yet been officially addressed by the IEEE Standard 1547. An HIF condition occurs when a device (and, perhaps, a portion of the utility grid) becomes electrically isolated from the remainder of the grid. When the device (or portion of the grid) is not electrically isolated from the remainder of the grid, the device is in a "non-HIF" (non-high-impedance-fault) condition. For public safety and the potential huge expenses resulting from an energized downed conductor, DG operators should pay some attention to HIFs. We have developed a Decision Tree (DT) based technology that addresses this concern. It showed excellent performance in a simulation study. FIG. 80 shows a one-line system diagram based on which HIF-related simulations have been performed.

With the integrated controller, the Decision Tree (DT) based detection technology can use a simplified version of PMU to provide raw current data samples. DTs are typically trained off-line from simulated HIF and non-HIF data first, then are tested and trained using experimental data to further improve performance. The DT for use with the present system uses only current signals measured at Point of Common Coupling (PCC), though other electrical characteristics are used in alternative embodiments. Current harmonics are also used to train the DTs. The DTs apply the training to real data that characterizes the current (or other characteristic) at the PCC to determine whether or not a HIF condition exists, and provides an HIF Detection Output as a function of that determination. The DGSC receives the HIF Detection Output and modifies operation of the DG system accordingly, as discussed herein. Simulations of this subsystem were done with the aid of the Electromagnetic Transients Program (EMTP).

While the system and methods have been illustrated and described in detail in the drawings and accompanying description, they are to be considered as illustrative and not restrictive in character, it being understood that the preferred embodiment has been shown and described and that changes and modifications that come within the spirit of the invention are desired to be protected.

Appendix A to Part 2: Source code for CHECKING CONFORMANCE WITH IEEE 1547

```
% Function BTRIP implements IEEE 1547 requirements:
% over/under voltage relays, over/under frequency relays
% synchronization check relays, inadvertent energization relays
% Functions in Task 3.1 remain to be implemented
% reverse power relays, fault current detection relays % Function BTRIP is called every new sample
% Function BTRIP=1 means breaker ordered open
% Function BTRIP=0 means breaker permitted closed % input Vars:
% VMAREA, VMLOCAL (formerly V)
% FAREA, FLOCAL
% VPHAREA, VPHLOCAL
% IM, IPH
% BOPENSTAT (BOPENSTAT=1 means breaker open)
% output vars:
% BOPEN (BOPEN=1 means breaker ordered open)

% relay functions:
% over/under voltage relays   ----   VMLOCAL
% over/under frequency relays  ----  FLOCAL (use time-threshold table)
% reverse/min power relays ---- VMLOCAL, VPHLOCAL, IM, IPH   (threshold=0,
% time=0.5s)
% synchronization check relays ---- VM, F, VPH (both sides) (table,
time=0.1s)
% fault current detection relays ----- IM BTRIP(args)     % gets called every new sample
% args include all of above plus NEWSTART if (NEWSTART==1) % initialize counters
% casevd1=Voltage Disturbance, casefd1=Freq Disturbance
% casesc1=Synch Check, caseie1=Inadvertent Energization
casevd1=0; casevd2=0; casevd3=0; casevd4=0;
casefd1=0; casefd2=0; casefd3=0;
casesc1=0; caseia1=0;
end if (BOPENSTAT==0)  % breaker closed
%  check stuff, set BOPEN=1 if violation % OVER/UNDER VOLTAGE RELAY LOGIC
% Voltage Range (Volts-RMS value)    Clearing Time(sec.)
%    V<60                            0.16 % ten cycles (120 samples)
%    V<106                           2.0  % two cycles (1440 samples)
%    132<V<144                       1.0  % one cycle  (720 samples)
%    144=<V                          0.16
if (VMLOCAL<60)
    casevd1=casevd1+1;
else
    casevd1=0;
end if (VMLOCAL <106)
    casevd2=casevd2+1;
else
    casevd2=0;
end if (VMLOCAL >132 & VMLOCAL <144)
```

```
        casevd3=casevd3+1;
else
        casevd3=0;
end if (VMLOCAL >=144)
        casevd4=casevd4+1;
else
        casevd4=0;
end BOPEN=(casevd1>120 | casevd2>1440 | casevd3>720 | casevd4>120);

% OVER/UNDER FREQUENCY LOGIC
if (FLOCAL>57.0&FLOCAL<59.3)
        casefd1=casefd1+1;
else
        casefd1=0;
end if (FLOCAL>60.5)
        casefd2=casefd2+1;
else
        casefd2=0;
end if (FLOCAL<57.0)
        casefd3=casefd3+1;
else
        casefd3=0;
end BOPEN=(case1>120 | case2>120 | case3>120 | case4>120 | case5>120);

end if (BOPENSTAT==1)    % breaker open

% SYNCH CHECK AND INADVERTANT ENERGIZATION LOGIC
%   check synchronism and VMAREA, set BOPEN=0 if OK to close
%measure the voltage magnitude on both sides of Circuit breakers CB1, CB2 ...
%CB8
%let voltage magnitude measured on the EPS side be VMAREA and that measured
%on DG side be VMlocal
%Measure the Voltage Phase on both sides of Circuit breakers CB1,CB2....CB8
%let voltage phase measured on the EPS side be VPHAREA and that measured on
%DG side be VPHLOCAL
%To check for synchronisation we need to do the following:
% 1. (|VMLOCAL-VMAREA|/120)*100 must not be greater than 10
% 2. (|FLOCAL-FAREA|) must not be greater than 0.3
% 3. (|VPHLOCAL-VPHAREA| must not be greater than 20)
%It is checked if the parameters are maintained in the their respective
%ranges for 0.1 sec=72 samples
% VMAREA constraints for inadvertent energization also required for 72 samples
Vdiff=(abs(VMLOCAL-VMAREA)/120)*100;
VPHdiff=abs(VPHLOCAL-VPHAREA);
Fdiff=abs(FLOCAL-FAREA);

if (VMAREA>106 & VMAREA<132 & FAREA>59.5 & FAREA<60.5)
      caseie1 =min(caseie1+1,1000);
else
      caseie1=0;
```

```
end if (Vdiff<10 & VPHdiff<20 & Fdiff<0.3)
    casesc1 =min(casesc1+1,1000);
else
    casesc1=0;
end if(casesc1>72 & caseie1>72)
BOPEN=0;
end return BOPEN
```

Appendix B to Part 2: Source code of PMU

The current version is developed to address the practical CAN communication. Since there are more than one PMU sharing the same CAN channel, the first revision is to incorporate an id number into the data each PMU sends to the computer. Therefore, the PC can distinguish and assemble data correctly. Since we also need to make all PMUs sample at substantially the same instant, the second revision is to introduce a master PMU and let all others be slave PMUs. The master PMU will send synchronization signals to slave PMUs to guarantee the substantial simultaneity of all samples on all PMUs. This might be done, for example, in order to improve the operation of the UIC and other control functions.

The assembly code for a master PMU is as follows.

```
list            p=16c773            ; list directive to define processor
#include        <p16c773.inc>       ; processor specific variable
definitions __CONFIG        _CP_OFF & _WDT_ON & _BODEN_ON & _PWRTE_ON & _HS_OSC &
_LVP_OFF & _CPD_OFF ; '__CONFIG' directive is used to embed configuration data within .asm file.
; The lables following the directive are located in the respective .inc file.
; See respective data sheet for additional information on configuration word.

;***** VARIABLE DEFINITIONS

; Banks 0, 1, 2, and 3 share file registers: 0x70 to 0x7F, 0xF0 to 0xFF, 0x170
; to 0x17F, or 0x1F0 to 0x1FF.
        udata_shr
dbl1 res 2              ; long scratch variable 1 occupies 2 bytes
dbl2 res 2              ; long scratch variable 2 occupies 2 bytes
dbl3 res 2              ; long scratch variable 3 occupies 2 bytes
var1 res 1              ; short scratch variable 1 occupies 1 byte
var2 res 1              ; short scratch variable 2 occupies 1 byte
var3 res 1              ; short scratch variable 3 occupies 1 byte
vari res 1              ; short loop increment variable i occupies 1 byte
varj res 1              ; short loop increment variable j occupies 1 byte
vark res 1              ; short loop increment variable k occupies 1 byte
dbls res 2              ; long temporary sin var occupies 2 bytes
dblc res 2              ; long temporary cos var occupies 2 bytes ; Sum totals in Bank 0: 0x30 to 0x3B
        cblock 0x30
                Ysa:2   ; Ys for phase A occupies 2 bytes
                Yca:2   ; Yc for phase A occupies 2 bytes
                Ysb:2   ; Ys for phase B occupies 2 bytes
                Ycb:2   ; Yc for phase B occupies 2 bytes
                Ysc:2   ; Ys for phase C occupies 2 bytes
                Ycc:2   ; Yc for phase C occupies 2 bytes
        endc ; Sum totals in Bank 0: 0x20 to 0x2B for nonrecursive calculations
        cblock 0x20
                Ysan:2  ; Ys for phase A occupies 2 bytes
                Ycan:2  ; Yc for phase A occupies 2 bytes
                Ysbn:2  ; Ys for phase B occupies 2 bytes
                Ycbn:2  ; Yc for phase B occupies 2 bytes
                Yscn:2  ; Ys for phase C occupies 2 bytes
                Yccn:2  ; Yc for phase C occupies 2 bytes
```

```
delay1
        movlw      0xFF
        movwf      var3
loop2   NOP
        NOP
        NOP
        decfsz     var3,1    ;Subtract 1
        goto       loop2
        return END                        ; directive 'end of program'
```

The assembly code for a slave PMU is as follows.

```
        list              p=16c773              ; list directive to define
processor
        #include          <p16c773.inc>         ; processor specific variable
definitions __CONFIG    _CP_OFF & _WDT_ON & _BODEN_ON & _PWRTE_ON & _HS_OSC &
_LVP_OFF & _CPD_OFF ; '__CONFIG' directive is used to embed configuration data within .asm file.
; The lables following the directive are located in the respective .inc file.
; See respective data sheet for additional information on configuration word.

;***** VARIABLE DEFINITIONS

; Banks 0, 1, 2, and 3 share file registers: 0x70 to 0x7F, 0xF0 to 0xFF, 0x170
; to 0x17F, or 0x1F0 to 0x1FF.
        udata_shr
dbl1 res 2                 ; long scratch variable 1 occupies 2 bytes
dbl2 res 2                 ; long scratch variable 2 occupies 2 bytes
dbl3 res 2                 ; long scratch variable 3 occupies 2 bytes
var1 res 1                 ; short scratch variable 1 occupies 1 byte
var2 res 1                 ; short scratch variable 2 occupies 1 byte
var3 res 1                 ; short scratch variable 3 occupies 1 byte
vari res 1                 ; short loop increment variable i occupies 1 byte
varj res 1                 ; short loop increment variable j occupies 1 byte
vark res 1                 ; short loop increment variable k occupies 1 byte
dbls res 2                 ; long temporary sin var occupies 2 bytes
dblc res 2                 ; long temporary cos var occupies 2 bytes ; Sum totals in Bank 0: 0x30 to 0x3B
        cblock 0x30
                Ysa:2      ; Ys for phase A occupies 2 bytes
                Yca:2      ; Yc for phase A occupies 2 bytes
                Ysb:2      ; Ys for phase B occupies 2 bytes
                Ycb:2      ; Yc for phase B occupies 2 bytes
                Ysc:2      ; Ys for phase C occupies 2 bytes
                Ycc:2      ; Yc for phase C occupies 2 bytes
        endc ; Sum totals in Bank 0: 0x20 to 0x2B for nonrecursive calculations
        cblock 0x20
                Ysan:2     ; Ys for phase A occupies 2 bytes
                Ycan:2     ; Yc for phase A occupies 2 bytes
                Ysbn:2     ; Ys for phase B occupies 2 bytes
                Ycbn:2     ; Yc for phase B occupies 2 bytes
                Yscn:2     ; Ys for phase C occupies 2 bytes
                Yccn:2     ; Yc for phase C occupies 2 bytes
        endc
```

```
delay1
        movlw   0xFF
        movwf       var3
loop2 NOP
        NOP
        NOP
        decfsz      var3,1  ;Subtract 1
        goto        loop2
        return END ; directive 'end of program'
```

A program coded in VC++ running on the PC to convert data into the correct format for this embodiment is as follows.

```
// data_logger.cpp : Defines the entry point for the console application.
//#include "windows.h"
#include "stdafx.h"
#include "..\..\..\include\CanBus2.0.h"
#include "stdio.h"
#include "math.h"
#include <iostream>
#include <fstream>
using namespace std;

typedef struct
{
    UCHAR rtr;      //Remote Transmit Request
    ULONG id;

UCHAR dlen;

UCHAR data[8];

} CAN_MSG_T, *PCAN_MSG_T;

PCAN_MSG_T g_pData;
ULONG g_Index = 0;

int _tmain(int argc, _TCHAR* argv[])
{
      ofstream myfile;
      UINT m_DevNum ;
      UINT m_nBtr0 = 0x03;
      UINT m_nBtr1 = 0x1c; //baud rate = 125k
      UINT m_nAcpCode = 0;
      UINT m_nAcpMask = 0xff;
      UINT m_nOutCtrlCode = 250;
      UINT m_nIntMask = 0;
      UINT m_nPort;
      UINT m_nHostID;
      UINT m_nPreBaudRate;
      BOOL bReady = FALSE;
      unsigned int nData0;
      unsigned int nData1;
      unsigned int nData2;
      unsigned int nData3;
      int    sWord_A,cWord_A,sWord_B,cWord_B,sWord_C,cWord_C;
      double aSin;
      double aCos;
      long double  aAmp,aAng,bAmp,bAng,cAmp,cAng;
      std::cout <<   "Enter Device number 3 or 4 \n";
```

```
std::cin >> m_DevNum;
    myfile.open ("data.txt");

if (CANPortOpen(
      m_DevNum,
      (WORD *)&m_nPort,
      (WORD *) &m_nHostID,
      (WORD *) &m_nPreBaudRate) != SUCCESS)
{
    printf("Open port failed!\n");
    return 0;
} if (CANInit(
      m_nPort,
      m_nBtr0,
      m_nBtr1,
      (UCHAR) m_nIntMask) != SUCCESS)
{
    printf("Init can failed!\n");
    CANPortClose(m_nPort);
    return 0;
} if (CANSetOutCtrl(
      m_nPort,
      m_nOutCtrlCode) != SUCCESS)
{
    printf("Set out ctrl failed!\n");
    CANPortClose(m_nPort);
    return 0;
} if (CANSetAcp(
      m_nPort,
      m_nAcpCode,
      m_nAcpMask) != SUCCESS)
{
    printf("Set acp code failed!\n");
    CANPortClose(m_nPort);
    return 0;
} if (CANSetBaud(
      m_nPort,
      m_nBtr0,
      m_nBtr1) != SUCCESS)
{
    printf("Set baudrate failed!\n");
    CANPortClose(m_nPort);
    return 0;
} if (CANSetNormal(m_nPort) != SUCCESS)
{
    printf("Set normal failed!\n");
    CANPortClose(m_nPort);
    return 0;
}

CANEnableRxInt( m_nPort );      //enable receive interrupt
g_pData = ( PCAN_MSG_T )GlobalAlloc( GPTR, 10000*sizeof(CAN_MSG_T) );
if( g_pData == NULL )
{
```

```
        printf("Out of memory!\n");
        CANPortClose(m_nPort);
        return 0;
    }
    // lock the memory
    GlobalLock( g_pData );

CANSetBufferPtr( m_nPort, g_pData, 10000, &bReady );// set the receive
buffer
    if ( !bReady )
    {
        printf("Again CanSetBufferPtr failed!\n");
        CANPortClose(m_nPort);
        return 0;
    }
    CANSetCountPtr( m_nPort, &g_Index, &bReady );

if ( !bReady )
    {
        printf ("CAN set CountPtr error!");
    }

CANEnableEvent( m_nPort, TRUE ); //enable system event printf("Open port successful, Begin to receive data!\n");

bReady = FALSE;
    CANWaitForFIFOEvent( m_nPort, INFINITE, &bReady);// wait for the
messages
    if ( bReady )
    {
        printf("Receive Data Buffer half full!\n" );
    } bReady = FALSE;
    CANWaitForFIFOEvent( m_nPort, INFINITE, &bReady);
    if ( bReady )
    {
        printf( "Receive Data Finished!Below is data:\n");

for (int i = 0; i < 10000; i++ )
        {
        nData0=g_pData[i].data[0];
        nData1=g_pData[i].data[1];
        nData2=g_pData[i].data[2];
        nData3=g_pData[i].data[3];

if(g_pData[i].id == 419)
          { if(nData1 > 127)   // Negative Value
                sWord_A = -((255-nData1)*256+(255-nData0)+1);
            else
                // positive values
                sWord_A = nData1* 256 + nData0;

if(nData3 > 127)   // Negative Value
                cWord_A = -((255-nData3)*256+(255-nData2)+1);
            else
                // positive values
                cWord_A = nData3 * 256 + nData2;

aSin = static_cast<double>(sWord_A * 5)/ 4096 ;
        aCos = static_cast<double>(cWord_A * 5)/ 4096;
        aAmp = (sqrt( aSin*aSin + aCos*aCos ))/6;
```

```
            if (aCos == 0 )
                if (aSin >= 0 )
                aAng = 90;
                else
                aAng = -90;

else  if (aCos > 0)
            aAng = atan(aSin / aCos) * 180 / 3.14159265;
            else
                if (aSin >= 0)
                    aAng = 180 + atan(aSin / aCos) * 180 / 3.14159265;
                else
                    aAng = (atan(aSin / aCos) * 180 / 3.14159265) - 180;

cout << "amplitude of Phase A is " << aAmp << endl;
            cout << "angle of Phase A is " << aAng << endl;
            myfile << i <<" \t"<< "PMU1 amplitude" <<" " << aAmp << "\t" <<"
PMU1 angle" <<" "<< aAng<<"\n";
        // myfile << "\t" <<   nData0 << "\t" <<   nData1<< "\t" <<
nData2 << "\t" <<   nData3 << "\t" <<    sWord_A << "\t" <<   cWord_A << "\t"<<
aSin << "\t "<< aCos << "\t "<< aAmp<< "\n";
            }

//------------------ if(g_pData[i].id == 427)
        { if(nData1 > 127)  // Negative Value
                sWord_A = -((255-nData1)*256+(255-nData0)+1);
            else
                // positive values
                sWord_A = nData1* 256 + nData0;

if(nData3 > 127)  // Negative Value
                cWord_A = -((255-nData3)*256+(255-nData2)+1);
            else
                // positive values
                cWord_A = nData3 * 256 + nData2;

aSin = static_cast<double>(sWord_A * 5)/ 4096 ;
        aCos = static_cast<double>(cWord_A * 5)/ 4096;
        aAmp = (sqrt( aSin*aSin + aCos*aCos ))/6;

if (aCos == 0 )
            if (aSin >= 0 )
            aAng = 90;
            else
            aAng = -90;

else  if (aCos > 0)
        aAng = atan(aSin / aCos) * 180 / 3.14159265;
        else
        if (aSin >= 0)
            aAng = 180 + atan(aSin / aCos) * 180 / 3.14159265;
        else
            aAng = (atan(aSin / aCos) * 180 / 3.14159265) - 180;

cout << "amplitude of Phase A is " << aAmp << endl;
        cout << "angle of Phase A is " << aAng << endl;
        myfile << i <<" \t"<< "PMU2 amplitude" <<" " << aAmp << "\t" <<"
PMU2 angle" <<" "<< aAng<<"\n";
        // myfile << "\t" <<   nData0 << "\t" <<   nData1<< "\t" <<   nData2
<< "\t" <<   nData3 << "\t" <<    sWord_A << "\t" <<   cWord_A << "\t"<< aSin
<< "\t "<< aCos << "\t "<< aAmp<< "\n";
            }
```

```
            }
    }
    myfile.close();

CANPortClose(m_nPort);

return 0;
}
```

Appendix C to Part 2: Source code for calculating phasors and frequencies

```
Public gNum As Integer
Public dAng1 As Double
Public dAng2 As Double
Public dAng3 As Double
Public dAng4 As Double
Public dAng5 As Double
Public dAng6 As Double
Public gInd As Integer Private Sub cmdStop_Click()
Close #1
MsgBox "Stopped"
    Unload Me
End Sub Private Sub cmdStart_Click()

' Fire Rx Event Every Four Bytes
MSComm1.RThreshold = 4

' When Inputting Data, Input 4 Bytes at a time
MSComm1.InputLen = 4

' Optional settings: 9600 Baud, No Parity, 8 Data Bits, 1 Stop Bit
' Preferred settings: 115200 Baud, No Parity, 8 Data Bits, 1 Stop Bit
MSComm1.Settings = "115200,N,8,1"   'Set baud rate value for the chip.
'MSComm1.Settings = "9600,N,8,1"   'Set baud rate value for the chip.

' Disable DTR
MSComm1.DTREnable = False

' Open COM1
MSComm1.CommPort = 1
MSComm1.PortOpen = True
cmdStop.Enabled = True
Shape1.FillColor = vbRed ' Initialize gNum
gNum = 1

' Initialize gInd
gInd = 1

' Initialize angles
dAng1 = 0
dAng2 = 0
dAng3 = 0
dAng4 = 0
dAng5 = 0
dAng6 = 0

End Sub

Private Sub crtCommand_Click()

On Error GoTo FileOpenError

If txtFilename.Text = "" Then
    MsgBox "Please Enter the File name ."
Else
    Open "C:\pmu\vikram\" & txtFilename.Text & ".txt" For Output As #1
```

```
        cmdStart.Enabled = True
End If

Exit Sub
FileOpenError:
        MsgBox "There was a problem in creating the file."
        End
End Sub Private Sub MSComm1_OnComm()
Dim sData As String                             ' Holds incoming data
Dim sHighByte As Byte                           ' Holds sin HighByte
value
Dim sLowByte As Byte                            ' Holds sin LowByte
value
Dim sWord As Long                               ' Holds sin result
Dim cHighByte As Byte                           ' Holds cos HighByte
value
Dim cLowByte As Byte                            ' Holds cos LowByte
value
Dim cWord As Long                               ' Holds cos result
Dim sSin As Double                              ' Holds sin coeff
Dim cCos As Double                              ' Holds cos coeff
Dim sAmp As Double
Dim sAng As Double
Dim sFre As Double Select Case MSComm1.CommEvent
    ' Handle each event or error by placing
    ' code below each case statement ' Errors
        Case comEventBreak                      ' A Break was received.
           Write #1, Format(Now, "mm/dd/yyy - hh:mm:ss"), "Error: A Break was
received."

Case comEventFrame                      ' Framing Error
           Write #1, Format(Now, "mm/dd/yyy - hh:mm:ss"), "Error: Framing Error."

Case comEventOverrun                    ' Data Lost.
           Write #1, Format(Now, "mm/dd/yyy - hh:mm:ss"), "Error: Data Lost."

Case comEventRxOver                     ' Receive buffer
overflow.
           Write #1, Format(Now, "mm/dd/yyy - hh:mm:ss"), "Error: Receive buffer
overflow."

Case comEventRxParity                   ' Parity Error.
           Write #1, Format(Now, "mm/dd/yyy - hh:mm:ss"), "Error: Parity Error."

Case comEventTxFull                     ' Transmit buffer full.
           Write #1, Format(Now, "mm/dd/yyy - hh:mm:ss"), "Error: Transmit buffer
full."

Case comEventDCB                        ' Unexpected error
retrieving DCB
           Write #1, Format(Now, "mm/dd/yyy - hh:mm:ss"), "Error: Unexpected
error retrieving DCB."

' Events
        Case comEvCD                            ' Change in the CD line.
           Write #1, Format(Now, "mm/dd/yyy - hh:mm:ss"), "Event: Framing Error."
```

```
        Case comEvCTS                                   ' Change in the CTS
line.
            Write #1, Format(Now, "mm/dd/yyy - hh:mm:ss"), "Event: Change in the
CTS line."

Case comEvDSR                                   ' Change in the DSR
line.
            Write #1, Format(Now, "mm/dd/yyy - hh:mm:ss"), "Event: Change in the
DSR line."

Case comEvRing                                  ' Change in the Ring
Indicator.
            Write #1, Format(Now, "mm/dd/yyy - hh:mm:ss"), "Event: Change in the
Ring Indicator."

Case comEvReceive                               ' Received RThreshold #
of chars.

sData = MSComm1.Input                       ' Get data (4 bytes)

cHighByte = Asc(Mid$(sData, 4, 1))          ' get 1st byte ASCII
value
            cLowByte = Asc(Mid$(sData, 3, 1))           ' Get 2nd byte ASCII
value
            sHighByte = Asc(Mid$(sData, 2, 1))          ' get 3rd byte ASCII
value
            sLowByte = Asc(Mid$(sData, 1, 1))           ' Get 4th byte ASCII
value ' Combine bytes into a word for sin
            If sHighByte > 127 Then
                ' negative values
                sWord = -((255 - sHighByte) * 256 + (255 - sLowByte) + 1)
            Else
                ' positive values
                sWord = sHighByte * 256 + sLowByte
            End If ' Combine bytes into a word for cos
            If cHighByte > 127 Then
                ' negative values
                cWord = -((255 - cHighByte) * 256 + (255 - cLowByte) + 1)
            Else
                ' positive values
                cWord = cHighByte * 256 + cLowByte
            End If sSin = sWord * 5 / 4096
            cCos = cWord * 5 / 4096
            sAmp = (Sqr(sSin * sSin + cCos * cCos)) / 6
            If cCos = 0 Then
                If sSin >= 0 Then
                    sAng = 90
                Else
                    sAng = -90
                End If
            ElseIf cCos > 0 Then
                sAng = Atn(sSin / cCos) * 180 / 3.14159265
            Else
                If sSin >= 0 Then
                    sAng = 180 + Atn(sSin / cCos) * 180 / 3.14159265
                Else
                    sAng = Atn(sSin / cCos) * 180 / 3.14159265 - 180
                End If
```

```
        End If

' Calculate frequency
        If gInd = 1 Then
            sFre = 60 - (sAng - dAng1) / 3
            dAng1 = sAng
        ElseIf gInd = 2 Then
            sFre = 60 - (sAng - dAng2) / 3
            dAng2 = sAng
        ElseIf gInd = 3 Then
            sFre = 60 - (sAng - dAng3) / 3
            dAng3 = sAng
        ElseIf gInd = 4 Then
            sFre = 60 - (sAng - dAng4) / 3
            dAng4 = sAng
        ElseIf gInd = 5 Then
            sFre = 60 - (sAng - dAng5) / 3
            dAng5 = sAng
        Else
            sFre = 60 - (sAng - dAng6) / 3
            dAng6 = sAng
            gInd = 0
        End If
        gInd = gInd + 1

If gNum >= 12 Then
'            Write #1, Format(Now, "mm/dd/yyyy - hh:mm:ss"), Format(sAmp,
"0.000000"), Format(sAng, "000.0000"), Format(sFre, "000.00")
            Write #1, sFre
            gNum = 1
        Else
            gNum = gNum + 1
        End If Case comEvSend   ' There are SThreshold number of
                     ' characters in the transmit
                     ' buffer.
        Write #1, Format(Now, "mm/dd/yyy - hh:mm:ss"), "Event: There are
SThreshold number of characters in the transmit buffer."

Case comEvEOF    ' An EOF charater was found in
                     ' the input stream
        Write #1, Format(Now, "mm/dd/yyy - hh:mm:ss"), "Event: An EOF charater
was found in the input stream."

End Select

End Sub
```

Appendix D to Part 2: Code for CAN communication

CAN communication is implemented using PIC18F4580 chips. MCP2551 is used as CAN transceiver. The assembly code running on the PIC18F4580 for CAN communication is as follows.

```
list p=18f4580 list n=0                          ; list directive to define processor radix dec include <p18f4580.inc>           ; processor specific variable definitions

CONFIG   OSC=HS,PWRT=ON,BOR=OFF, BORV=20, WDT = OFF, WDTPS = 1,LVP =
OFF,STVREN = OFF,PBADEN=OFF

;* baudrate and other parameters

; READ DATA SHEET AND CAN DOCUMENTS FOR SETTINGS.

;DO NOT CHANGE THESE ,IF NOT SURE.

; Baud Rate 1 Mbits/sec

BRGCON1_CONST          EQU 0xc0;0x04; SJW = 1 Tq, BRP = 4
     BRGCON2_CONST          EQU 0x9a; Seg2 freely programmable,
                                        ;1 samples/bit,Ph1=7 Tq, Prop
seg = 6 Tq
     BRGCON3_CONST          EQU 0x01; Seg2 = 2 Tq  ---> Sample at 80%
     START_CAN                  EQU 0x03; request normal mode
       TXB0CON_SEND              EQU 0x0B; requests that TXB0 be sent on CAN bus
     DLC_CONST                   EQU 0x04; value for DLC field of message
     CIOCON_CONST            EQU 0x20; value to load into CIOCON
                         ; Drive TX pin to Vdd, no CAN Capture function on RC2
                         ;   Register Variables
         CBLOCK 0x020
         var1:1
           var2:1
           var3:1
         ENDC
     org 0000h              ;Reset Vector
     goto           Start
     org 0008h              ;interrupt vector
     goto int_ser Start
     LFSR 0, 100h
     clrf CCPR1H
     clrf CCPR1L
     clrf CCP1CON
     ;disable following feature to avoid conflict with CAN or PSP
     clrf ECCPR1H
     clrf ECCPR1L
     clrf ECCP1CON
     clrf ECCP1DEL
     clrf ECCP1AS
     movlw          0x07
     movwf          CMCON
     movlw          0x0f
     movwf          ADCON1
```

```
        movlw               b'11111011'            ; RB2 is output
(CANTX)
        movwf               TRISB
        movlw       0xFF
        movwf       TRISD           ;Set Port_D to all inputs
        CLRF        PORTD
        movlw       b'00010110'    ;Set RD, WR, and CS as
        movwf       TRISE           ; inputs, Enable Parallel Slave port bsf         LATE,0
        movlw       0x00
        movwf       TRISC           ;Set Port_C to all outputs
        CLRF        WDTCON
; initialize CAN for TX Buffer 0
        movlw       CIOCON_CONST
        movwf       CIOCON
        movlw       0x88            ;Configuration mode with buffer 0
selected.

movwf       CANCON
check1:
        btfss          CANSTAT, OPMODE2      ;select configuration mode
        bra            check1
        movlw       BRGCON1_CONST
        movwf       BRGCON1
        movlw       BRGCON2_CONST
        movwf       BRGCON2
        movlw       BRGCON3_CONST
        movwf       BRGCON3
        movlw       START_CAN
        movwf       CANCON         ; start CAN in Normal Mode ;Standard Identifiers 11-bits.
; set up TX Buffer 0 with Identifier for 301 H= 0x25, L = 0xA0; 201 H=0x19,
L=0x20; 101 H=0x0C, L=0xA0;
        BANKSEL TXB0CON
        movlw 0x19
        movff WREG, TXB0SIDH
        movlw 0x20
        movff WREG, TXB0SIDL
        movlw 0x08
        movff WREG, TXB0DLC ; set up TX Buffer 1  with identifier 302 H= 0x25, L = 0xC0; 202 H=0x19,
L=0x40; 102 H=0x0C, L=0xC0;
        BANKSEL TXB0CON
        movlw 0x19
        movff WREG, TXB1SIDH
        movlw 0x40
        movff WREG, TXB1SIDL
        movlw DLC_CONST
        movff WREG, TXB1DLC ; set up TX Buffer 2  with identifier 303 H= 0x25, L = 0xE0; 203 H=0x19,
L=0x60; 103 H=0x0C, L=0xE0;
        BANKSEL TXB0CON
        movlw 0x19
        movff WREG, TXB2SIDH
        movlw 0x60
        movff WREG, TXB2SIDL
        movlw DLC_CONST
        movff WREG, TXB2DLC
```

```
;CAN intiliasation finished
;***********************************************************************
    ;enable Parallel Slave Port
        movlw 0xFF
        movwf INTCON2
        movlw 0xC0
        movwf INTCON3
        bsf    INTCON,PEIE  ; Enable peripheral interrupts
        bsf    INTCON,GIE   ; Enable global interrupts
        bcf INTCON,RBIE
        bcf PIR1,PSPIF
        movlw      0x80
        movwf      IPR1
        bsf   PIE1,PSPIE
        movlw 0x0C
        movwf var1
loop  nop
        CLRF       WDTCON goto loop int_ser
        btfss PIR1,PSPIF                                          ;test if
interrupt due to PSP
        bra nothing
        bcf PIR1,PSPIF
        btfss TRISE,IBF
        bra finish
            call delay
            MOVFF   PORTD,LATC
        NOP
        NOP
            MOVF LATC,w
        MOVWF POSTINC0 ; store data into memory block
        DCFSNZ var1
        call CAN ; Call CAN subroutine to send data
            goto finish
nothing
            goto   $
finish
        bcf PIR1,PSPIF   ;clear PSP flag
            bcf TRISE,IBF
        retfie CAN                ;store data for CAN communication
                LFSR 0, 100h
                movlw 0x0C
                movwf  var1
                MOVF POSTINC0,w
                movwf   TXB0D0
                MOVF POSTINC0,w
                movwf   TXB0D1
                MOVF POSTINC0,w
                movwf   TXB0D2
                MOVF POSTINC0,w
                movwf   TXB0D3

;;Adding 8 bytes in one messege.*****************
                                MOVF POSTINC0,w
                movwf   TXB0D4
```

```
                MOVF  POSTINC0,w
                movwf TXB0D5
                MOVF  POSTINC0,w
                movwf TXB0D6
                MOVF  POSTINC0,w
                movwf TXB0D7
;****************************************************
                MOVF  POSTINC0,w
                movwf TXB1D0
                MOVF  POSTINC0,w
                movwf TXB1D1
                MOVF  POSTINC0,w
                movwf TXB1D2
                MOVF  POSTINC0,w
                movwf TXB1D3

; *************CAN MESSAGE SENDING****************************
                movlw     TXB0CON_SEND
                movff     WREG, TXB0CON    ; request sending TXB0 on
bus
                BTFSC TXB0CON, TXREQ ; Is it transmitted?
                BRA $-2 ; No. Continue to wait...
                movff     WREG, TXB1CON    ; request sending TXB0 on
bus
                BTFSC TXB1CON, TXREQ ; Is it transmitted?
                BRA $-2 ; No. Continue to wait...
                LFSR 0, 100h
                RETURN delay
        movlw  0x04
            movwf     var3
loop1 decfsz    var3,1          ;Subtract 1
            goto    loop1
            return end
```

Appendix E to Part 2: Code for UIC fuctions

The UIC functions were programmed for simulation using Matlab. Those functions have been rewritten in VC++. The new version also generalized some cases and provided many default parameters.

The header file is as follows:

```
#ifndef _UIC_
define _UIC_ class UIC {
public:
      UIC(
            double BaseVoltage = 120.0,
            double DGSize = 85.0,
            double AdjUFTripFrequency = 59.8,
            double AdjUFTripClearingTime = 300.0,
            double AggregateRatingofDGUnits = 100.0,
            double ReversePowerThreshold = 10.0,
            double OverCurrentRelayPickUpCurrent = 5.0,
            double OverCurrentRelaySettingA = 28.0,
            double OverCurrentRelaySettingB = 0.13
      ); // Constructor
      ~UIC(); // Destructor
      bool CBTrip(
            const bool CBStatus,
            const bool NewStart,
            const double VCurrentAreaEPS[3][2],
            const double ICurrentAreaEPS[3][2],
            const double VCurrentLocal[3][2],
         const double VOldLocal[3][2],
            const double VOldAreaEPS[3][2],
            const double ICurrentLocal[3][2]
      ); // Circuit Breaker Trip Function
      double Difference;
      double fAreaEPS; // frequency of Area EPS
      double fLocal; // frequency of DG
    double rPower; // Active power exchange with the utility,
                        // negative values mean output power to utility,
                        // and positive values mean input power from utility
      double xPower;

//Amplitude Filter Coeff
      double Y1oldGen[3]; double Y2oldGen[3];
      double Y3oldGen[3]; double Y4oldGen[3];
      double Y1newGen[3]; double Y2newGen[3];
      double Y3newGen[3]; double Y4newGen[3];
      double YdataGen[3]; double Y4PrimeGen[3];

double Y1oldGrid[3]; double Y2oldGrid[3];
      double Y3oldGrid[3]; double Y4oldGrid[3];
      double Y1newGrid[3]; double Y2newGrid[3];
      double Y3newGrid[3]; double Y4newGrid[3];
      double YdataGrid[3]; double Y4PrimeGrid[3];

// Angle Filter Coeff.
      double aY1oldGen[3]; double aY2oldGen[3];
      double aY3oldGen[3]; double aY4oldGen[3];
      double aY1newGen[3]; double aY2newGen[3];
      double aY3newGen[3]; double aY4newGen[3];
      double aYdataGen[3]; double aY4PrimeGen[3];
```

```
    double aY1oldGrid[3]; double aY2oldGrid[3];
    double aY3oldGrid[3]; double aY4oldGrid[3];
    double aY1newGrid[3]; double aY2newGrid[3];
    double aY3newGrid[3]; double aY4newGrid[3];
    double aYdataGrid[3]; double aY4PrimeGrid[3];

double CoeffAmpGenX[3][2];
    double CoeffAmpGenY[3][2];
    double CoeffAmpGenZ[3][2];

double CoeffAmpGridX[3][2];
    double CoeffAmpGridY[3][2];
    double CoeffAmpGridZ[3][2];

double CoeffAmpCurrX[3][2];
    double CoeffAmpCurrY[3][2];
    double CoeffAmpCurrZ[3][2];

bool GridFlag,GenFlag,first;
// Frequency Filter Coeff.
    double CoeffGridA[3][11];
    double CoeffGridB[3][11];
    double CoeffGridC[3][11];
       double CoeffGenA [3][11];
       double CoeffGenB [3][11];
       double CoeffGenC [3][11];
       int WindNumberGen[3];
    int WindNumberGrid,v;
       // Filter Coeff.
    double IAreaEPS[3][2];
    double ILocal[3][2];
       double VLocal[3][2];
    double VAreaEPS[3][2];// 3 phase voltages/current of Area EPS/Local,
                            // where, column 0 -> Amplitudes, and column 1
-> Angles;
                            // row 0 -> phase A, row 1 -> phase B, and row
2 -> phase C;
private:

// Variables
    double BaseVoltage; // Base voltage in Volts
    double DGSize; // DG size in kilo Watts
    double AdjUFTripFrequency; // Adjustable under-frequency trip settings
    double AdjUFTripClearingTime;
    double AggregateRatingofDGUnits; // Aggregate rating of DG units in kVA
    double ReversePowerThreshold; // Threshold of Reverse Power Relay in kW //double VAreaEPS[3][2];
    //double IAreaEPS[3][2]; // 3 phase currents of Area EPS
    //double VLocal[3][2]; // 3 phase voltages of DG
    double VLocalOld[3][2];
    //double ILocal[3][2]; // 3 phase currents of DG
    double Power;
    double ReactivePower;
    int CaseVoltageDisturbance[3][4]; // counters for 3 phase voltages under
4 circumstances
    int CaseFrequencyDisturbance[3]; // counters for frequency under 5
circumstances
                                     // 2 circumstances are for DG size <=
30 kW
                                     // 3 circumstances are for DG size > 30
kW
```

```
                                                          // First 2 case
counters are shared.
      int CaseSynchronizationCheck; // counters for sychronization check
      int CaseInadvertentEnergization; // counters for inadvertent
energization double AreaPreviousAngles[3][2]; // 3 phase area angle history of 100 ms
or 6 cycles
      double LocalPreviousAngles[3][72]; // 3 phase local angle history of 100
ms or 6 cycles
      int IndexOfPreviousAngles; // index showing which previous angle is
currently used in calculation double OverCurrentRelayPickUpCurrent; // Overcurrent relay pick up
current
      double OverCurrentRelaySettingA; // Overcurrent relay setting A
      double OverCurrentRelaySettingB; // Overcurrent relay setting B
      double CaseOverCurrentRelay[3]; // 3 phase overcurrent relay's induction
disk positions // Functions
      void ResetCounters(); // function to reset all counters
      void InitializePreviousAngles(); // function to initialize previous
angle array
      double FrequencyCalculation1(double V[3][2]);
      double FrequencyCalculation2(double V[3][2]);// Calculate frequency from
3 phase angle history
      double GetThreePhaseReActivePower();
      double GetThreePhaseActivePower();
    //double GetThreePhaseActivePower(); // Retrieve 3 phase active power
    bool RelayofOverUnderVoltage(); // Over/Under-voltage relay logic
      bool RelayofOverUnderFrequency(); // Over/Under-frequency relay logic
      bool RelayofSynchronizationCheckandInadvertentEnergization(); //
Sycnroniztion check and inadvertent energization relay logic
      bool RelayofReversePower(); // Reverse power relay logic
      bool RelayofOverCurrent(); // Overcurrent relay logic
      bool RelayofGroundFaultDetection(); // Ground fault detection relay
logic
      void InitializeCaseOverCurrentRelay(); // Initialize induction disk
positions

};

#endif
```

The implementation file is as follows:

```
#include "stdafx.h"
#include "UIC.h"
#include "globals.h"
include <cmath> define PI 3.14159265359
define DELTA_T 1.0 / 720
#define CONSTANT 5*2*3.14159265
#define SAMPLE_CONSTANT 0.0013888 //(1/720)

extern Variables allStatus;

UIC::UIC(double BV, double DGS, double AUFTF,
         double AUFTCT, double ARoDGU, double RPT,
         double OCRPUC, double OCRSA, double OCRSB)
         : BaseVoltage(BV), DGSize(DGS), AdjUFTripFrequency(AUFTF),
```

```
        AdjUFTripClearingTime(AUFTCT), AggregateRatingofDGUnits(ARoDGU),
            ReversePowerThreshold(RPT),
OverCurrentRelayPickUpCurrent(OCRPUC),
            OverCurrentRelaySettingA(OCRSA), OverCurrentRelaySettingB(OCRSB)
{
    ResetCounters();
    InitializePreviousAngles();
    IndexOfPreviousAngles = 0;
    InitializeCaseOverCurrentRelay();
}

UIC::~UIC() {
} double UIC::GetThreePhaseReActivePower() {
double ReactivePower3 = 0.0;

// Calculate 3 phase active power
    for(int i=0;i<3;i++)
        ReactivePower3 += VLocal[i][0] * ILocal[i][0] * sin((VLocal[i][1]
- ILocal[i][1]) * PI / 180);

ReactivePower = ReactivePower3;

return ReactivePower;
} double UIC::GetThreePhaseActivePower() {
double RealPower3 = 0.0;

// Calculate 3 phase active power
    for(int i=0;i<3;i++)
        RealPower3 += VLocal[i][0] * ILocal[i][0] * cos((VLocal[i][1] -
ILocal[i][1]) * PI / 180);

Power = RealPower3;

return Power;
} void UIC::ResetCounters() { for(int i=0;i<4;i++)
        for(int j=0;j<3;j++)
            CaseVoltageDisturbance[i][j] = 0;
    for(int i=0;i<5;i++)
        CaseFrequencyDisturbance[i] = 0;
    CaseSynchronizationCheck = 0;
    CaseInadvertentEnergization = 0;

return;
} void UIC::InitializePreviousAngles() { first = 0;
        v =0;
            GridFlag=0;
         GenFlag =0;
for(int i=0;i<3;i++)
{
    Y1oldGen[i]= 0;   Y2oldGen[i]= 0;
    Y3oldGen[i]= 0;   Y4oldGen[i]= 0;
    Y1newGen[i]= 0;   Y2newGen[i]= 0;
```

```
    Y3newGen[i]= 0;   Y4newGen[i]= 0;
    YdataGen[i]= 0;   Y4PrimeGen[i]= 0;

Y1oldGrid[i]= 0; Y2oldGrid[i]= 0;
    Y3oldGrid[i]= 0; Y4oldGrid[i]= 0;
    Y1newGrid[i]= 0; Y2newGrid[i]= 0;
    Y3newGrid[i]= 0; Y4newGrid[i]= 0;

YdataGrid[i]= 0; Y4PrimeGrid[i]= 0;

aY1oldGen[i]= 0;  aY2oldGen[i]= 0;
    aY3oldGen[i]= 0;  aY4oldGen[i]= 0;
    aY1newGen[i]= 0;  aY2newGen[i]= 0;
    aY3newGen[i]= 0;  aY4newGen[i]= 0;
    aYdataGen[i]= 0;  aY4PrimeGen[i]= 0;

aY1oldGrid[i]= 0; aY2oldGrid[i]= 0;
    aY3oldGrid[i]= 0; aY4oldGrid[i]= 0;
    aY1newGrid[i]= 0; aY2newGrid[i]= 0;
    aY3newGrid[i]= 0; aY4newGrid[i]= 0;
    aYdataGrid[i]= 0; aY4PrimeGrid[i]= 0;

for(int j=0;j<2;j++)
{//Initialize Generator voltage Amp Filter coeff.
    CoeffAmpGenX[i][j] = 0;
    CoeffAmpGenY[i][j] = 0;
    CoeffAmpGenZ[i][j] = 0;
//Initialize Grid Voltage Amp Filter coeff.
    CoeffAmpGridX[i][j] =0;
    CoeffAmpGridY[i][j] =0;
    CoeffAmpGridZ[i][j] =0;
//Initialize Current Amp Filter coeff.
    CoeffAmpCurrX[i][j]= 0;
    CoeffAmpCurrY[i][j]= 0;
    CoeffAmpCurrZ[i][j]= 0;
}
}
   for(int i=0;i<3;i++)
            for(int j=0;j<11;j++) {
                    CoeffGenA[i][j] = 0;
                    CoeffGenB[i][j] = 0;
            CoeffGenC[i][j] = 0;
                    CoeffGridA[i][j] = 0;
            CoeffGridB[i][j] = 0;
            CoeffGridC[i][j] = 0;

} return;
}
void UIC::InitializeCaseOverCurrentRelay(){ for(int i=0;i<3;i++)
            CaseOverCurrentRelay[i] = 0.0;

return;
} bool UIC::RelayofOverUnderVoltage() {

// Over/Under-voltage relay logic
        // Sampling rate is 720 samples per second for a 60 Hz system.
        // Based on Table 1 of IEEE 1547 (p8).
```

```
        // Voltage Range (% of base voltage - rms)            Clearing Time
        //      V < 50                            0.16 s /  10 cycles /  120
samples
        //   50 <= V < 88                         2.00 s / 120 cycles / 1440
samples
        //  110 < V < 120                         1.00 s /  60 cycles /  720
samples
        //      V >= 120                          0.16 s /  10 cycles /  120
samples for(int i=0;i<3;i++) { // 3 phase
            if(VAreaEPS[i][0] < 0.5*BaseVoltage) {
                if(++CaseVoltageDisturbance[i][0] >= 120)
                    return 1;
            }
            else
                CaseVoltageDisturbance[i][0] = 0;

if(VAreaEPS[i][0] < 0.88*BaseVoltage) {
                if(++CaseVoltageDisturbance[i][1] >= 1440)
                    return 1;
            }
            else
                CaseVoltageDisturbance[i][1] = 0;

if(VAreaEPS[i][0] > 1.1*BaseVoltage) {
                if(++CaseVoltageDisturbance[i][2] >= 720)
                    return 1;
            }
            else
                CaseVoltageDisturbance[i][2] = 0;

if(VAreaEPS[i][0] >= 1.2*BaseVoltage) {
                if(++CaseVoltageDisturbance[i][3] >= 120)
                    return 1;
            }
            else
                CaseVoltageDisturbance[i][3] = 0;
        }
        return 0;
} bool UIC::RelayofOverUnderFrequency() {

// Over/Under-frequecny relay logic
        // Sampling rate is 720 samples per second for a 60 Hz system.
        // Based on Table 2 of IEEE 1547 (p9).

if(DGSize <= 30.0) {

// For DGs of size <= 30 kW
            // Frequency Range (Hz)              Clearing Time
            //      f < 59.3           0.16 s / 10 cycles / 120 samples
            //      f > 60.5           0.16 s / 10 cycles / 120 samples if(fLocal < 59.3) {
                if(++CaseFrequencyDisturbance[0] >= 120)
                    return 1;
            }
            else
                CaseFrequencyDisturbance[0] = 0;

if(fLocal > 60.5) {
```

```
                    if(++CaseFrequencyDisturbance[1] >= 120)
                            return 1;
            }
            else
                    CaseFrequencyDisturbance[1] = 0;
    }
    else {
            // For DGs of size > 30 kW
            // Frequency Range (Hz)             Clearing Time
            //      f < 57.0           0.16 s / 10 cycles / 120 samples
            //   57.0 < f <= 59.8      Adjustable 0.16 s / 10 cycles / 120
samples
            //                         to 300 s / 18000 cycles / 216000
samples
            //      f > 60.5           0.16 s / 10 cycles / 120 samples if(fLocal < 57.0) {
                    if(++CaseFrequencyDisturbance[0] >= 120)
                            return 1;
            }
            else
                    CaseFrequencyDisturbance[0] = 0;

if(fLocal < AdjUFTripFrequency) {
                    if(++CaseFrequencyDisturbance[1] >=
720*AdjUFTripClearingTime)
                            return 1;
            }
            else
                    CaseFrequencyDisturbance[1] = 0;

if(fLocal > 60.5) {
                    if(++CaseFrequencyDisturbance[2] >= 120)
                            return 1;
            }
            else
                    CaseFrequencyDisturbance[2] = 0;
    }
    return 0;
} bool UIC::RelayofSynchronizationCheckandInadvertentEnergization() {

// double MaxVAmplitudeDifference = 0.0;
    double MaxVAngleDifference = 0.0;
    double MaxVAmplitudeAreaEPS = 0.0;

for(int i=0;i<3;i++) {

// Get the maximum difference of voltage amplitudes in 3 phases
            double temp = abs(VAreaEPS[i][0] - VLocal[i][0])/BaseVoltage*100;
            if(MaxVAmplitudeDifference < temp)
                    MaxVAmplitudeDifference= temp;

// Get the maximum difference of voltage angles in 3 phases
            temp = abs(VAreaEPS[i][1] - VLocal[i][1]);
            if(MaxVAngleDifference < temp)
                    MaxVAngleDifference = temp;

// Get the maximum Area EPS voltage in 3 phases
            temp = VAreaEPS[i][0];
```

```
            if(MaxVAmplitudeAreaEPS < temp)
                    MaxVAmplitudeAreaEPS = temp;
    }

//MaxVAngleDifference = abs(VAreaEPS[0][1] - VLocal[0][1]);

double fDifference = abs(fAreaEPS-fLocal);

if(MaxVAmplitudeAreaEPS > 0.88 * BaseVoltage
                && MaxVAmplitudeAreaEPS < 1.1 *BaseVoltage
                && fLocal > 59.3
                && fLocal < 60.5) {
                if(++CaseInadvertentEnergization > 300000)
                        CaseInadvertentEnergization = 300000;
                }
        else
                CaseInadvertentEnergization = 0;

double fDifferenceTolerance, VAmplitudeDifferenceTolerance,
VAngleDifferenceTolerance;

if(AggregateRatingofDGUnits <= 500) {
                fDifferenceTolerance = 0.5;
                VAmplitudeDifferenceTolerance = 10;
                VAngleDifferenceTolerance = 20;
        }
        else if(AggregateRatingofDGUnits <= 1500) {
                fDifferenceTolerance = 0.2;
                VAmplitudeDifferenceTolerance = 5;
                VAngleDifferenceTolerance = 15;
        }
        else {
                fDifferenceTolerance = 0.1;
                VAmplitudeDifferenceTolerance = 3;
                VAngleDifferenceTolerance = 10;
        } if(fDifference < fDifferenceTolerance
                && MaxVAmplitudeDifference < VAmplitudeDifferenceTolerance
                && MaxVAngleDifference < VAngleDifferenceTolerance) {
                if(++CaseSynchronizationCheck > 1000)
                        CaseSynchronizationCheck = 1000;
                }
        else
                CaseSynchronizationCheck = 0;

if(CaseInadvertentEnergization > 21600 && CaseSynchronizationCheck >
720)
                return 0;

return 1;
}
bool UIC::RelayofReversePower() { double RealPower3 = 0.0;

// Calculate 3 phase active power
        for(int i=0;i<3;i++)
                RealPower3 += VAreaEPS[i][0] * IAreaEPS[i][0] *
cos((VAreaEPS[i][1] - IAreaEPS[i][1]) * PI / 180);

Power = RealPower3;
```

```
        if(RealPower3 < ReversePowerThreshold * 1000)
            return 1;
        else
         return 0;

} bool UIC::RelayofOverCurrent() { for(int i=0;i<3;i++) { // Update induction disk positions for each phase

// Define two temperary variables
            double ApplitudeMultiplier1 =
IAreaEPS[i][0]/OverCurrentRelayPickUpCurrent;
            double ApplitudeMultiplier2 =
ApplitudeMultiplier1*ApplitudeMultiplier1 - 1;

// If phase current is greater than or equal to pick up current,
position increases
            if(IAreaEPS[i][0]>=OverCurrentRelayPickUpCurrent) {
                    CaseOverCurrentRelay[i] +=
1/((OverCurrentRelaySettingA/ApplitudeMultiplier2)+OverCurrentRelaySettingB)*D
ELTA_T;
                    // Return trip if the phase's induction disk position is
great than 1
                    if(CaseOverCurrentRelay[i]>1.0)
                            return 1;
            }
            // If phase current is less than pick up curren, postion decreases
            else {
                    CaseOverCurrentRelay[i] +=
1/(OverCurrentRelaySettingA/ApplitudeMultiplier2)*DELTA_T;
                    // Stop decreasing if the phase's induction disk position is
less than 0
                    if(CaseOverCurrentRelay[i]<0.0)
                            CaseOverCurrentRelay[i]=0.0;
            }
    } return 0;
} bool UIC::RelayofGroundFaultDetection() { return 0;
} bool UIC::CBTrip(const bool CBStatus,
                        const bool NewStart,
                    const double VCurrentAreaEPS[3][2],
                            const double ICurrentAreaEPS[3][2],
                            const double VCurrentLocal[3][2],
                    const double VOldLocal[3][2],
                            const double VOldAreaEPS[3][2],
                            const double ICurrentLocal[3][2]
                            )
{
//Filter Coeff
    float a3 = 280.0;
    float a2 = 34400.0;
    float a1 = 2072000.0;
    float a0 = 54760000.0;

// Localize all measurements.
```

```
        for(int i=0;i<3;i++)
              for(int j=0;j<2;j++)
              {
                      VAreaEPS[i][j] = VCurrentAreaEPS[i][j];
                      IAreaEPS[i][j] = ICurrentAreaEPS[i][j];
                      VLocal[i][j] = VCurrentLocal[i][j];
                  VLocalOld[i][j]= VOldLocal[i][j];
                      ILocal[i][j] = ICurrentLocal[i][j];
                      AreaPreviousAngles[i][j] = VOldAreaEPS[i][j];
              }

// Calculate area frequency, Local Freq, Real Power and Reactive Power
      fAreaEPS = FrequencyCalculation2(VAreaEPS);
      fLocal = FrequencyCalculation1(VAreaEPS);
//double  Const = 5*2*3.14159265;
        if(first){
            first = 1;
    for(int i=0;i<3;i++)
    {
        Y1oldGrid[i]= VAreaEPS[i][0];
        Y1oldGen[i]= VLocal[i][0];
    }
    } for(int i=0;i<3;i++)
      {
              YdataGen[i] = VLocal[i][0];
        YdataGrid[i] = VAreaEPS[i][0];

Y1newGen[i]= Y1oldGen[i]+SAMPLE_CONSTANT*Y2oldGen[i];
        Y2newGen[i]= Y2oldGen[i]+SAMPLE_CONSTANT*Y3oldGen[i];
        Y3newGen[i]= Y3oldGen[i]+SAMPLE_CONSTANT*Y4oldGen[i];
        Y4PrimeGen[i]=a0*(YdataGen[i]-Y1oldGen[i])-a1*Y2oldGen[i]-
a2*Y3oldGen[i]-a3*Y4oldGen[i];
        Y4newGen[i]= Y4oldGen[i]+SAMPLE_CONSTANT*Y4PrimeGen[i];

Y1newGrid[i]= Y1oldGrid[i]+SAMPLE_CONSTANT*Y2oldGrid[i];
        Y2newGrid[i]= Y2oldGrid[i]+SAMPLE_CONSTANT*Y3oldGrid[i];
        Y3newGrid[i]= Y3oldGrid[i]+SAMPLE_CONSTANT*Y4oldGrid[i];
        Y4PrimeGrid[i]=a0*(YdataGrid[i]-Y1oldGrid[i])-a1*Y2oldGrid[i]-
a2*Y3oldGrid[i]-a3*Y4oldGrid[i];
        Y4newGrid[i]= Y4oldGrid[i]+SAMPLE_CONSTANT*Y4PrimeGrid[i];

VLocal[i][0]  =  Y1newGen[i];
            VAreaEPS[i][0]=  Y1newGrid[i];
    //     ILocal[i][0]  = CoeffAmpCurrZ[i][1];
     //    IAreaEPS[i][0]= CoeffAmpCurrZ[i][1];

allStatus.FilteredPMU.VLocal[i][0] =  Y1newGen[i];
        allStatus.FilteredPMU.VLocal[i][1] = VCurrentLocal[i][1];
        allStatus.FilteredPMU.VAreaEPS[i][0] = Y1newGrid[i];
        allStatus.FilteredPMU.VAreaEPS[i][1] = VCurrentAreaEPS[i][1];

Y1oldGen[i] = Y1newGen[i];
        Y2oldGen[i] = Y2newGen[i];
        Y3oldGen[i] = Y3newGen[i];
        Y4oldGen[i] = Y4newGen[i];

Y1oldGrid[i] = Y1newGrid[i];
        Y2oldGrid[i] = Y2newGrid[i];
```

```
        Y3oldGrid[i] = Y3newGrid[i];
        Y4oldGrid[i] = Y4newGrid[i];
    } allStatus.FilteredPMU.FLocal = fLocal;
rPower = GetThreePhaseActivePower();
    xPower = GetThreePhaseReActivePower();
    allStatus.UIC.rPower = rPower;
    allStatus.UIC.xPower = xPower;

// Initialize counters if necessary
    if(NewStart == 1)
         ResetCounters();

if(CBStatus ==0)
         // Circuit breaker is closed.
         return  RelayofOverUnderVoltage();/* ||
RelayofOverUnderFrequency()|| RelayofReversePower()
              || RelayofReversePower() || RelayofOverCurrent() ||
RelayofGroundFaultDetection();*/
    else
         // Circuit breaker is open.
         return RelayofSynchronizationCheckandInadvertentEnergization();
} double UIC::FrequencyCalculation2( double V[3][2]) { double freq[3] = {0.0};
    double Freq,diff1,diff2;

//Filter Coeff
float a3 = 120.0;
float a2 = 5600.0;
float a1 = 120000.0;
float a0 = 1000000.0;
// Start Looping here//
    if(GridFlag == 0){
     GridFlag =1;
      for(int i=0;i<3;i++)
       {
       aY1oldGrid[i]= V[i][1];
      // aY1oldGen[i]= VLocal[i][1];
        }
    }
     for(int i=0;i<3;i++)
    {
         //aYdataGen[i] = VLocal[i][1];
         aYdataGrid[i] = V[i][1];
         /* diff1 =  abs(aYdataGen[i] - aY1oldGen[i] - 360);
            diff2 =  abs(aYdataGen[i] - aY1oldGen[i] + 360);*/
          diff1 =  abs(aYdataGrid[i] - aY1oldGrid[i] - 360);
            diff2 =  abs(aYdataGrid[i] - aY1oldGrid[i] + 360);
            double PhaseShift = 0.0;
         if ( diff1 < 180.0 )
            PhaseShift = 360.0;
         else if ( diff2 < 180.0 )
            PhaseShift = -360.0;

aY1oldGrid[i] = aY1oldGrid[i] + PhaseShift;

aY1newGrid[i]= aY1oldGrid[i]+SAMPLE_CONSTANT*aY2oldGrid[i];
        aY2newGrid[i]= aY2oldGrid[i]+SAMPLE_CONSTANT*aY3oldGrid[i];
```

```
        aY3newGrid[i]= aY3oldGrid[i]+SAMPLE_CONSTANT*aY4oldGrid[i];
        aY4PrimeGrid[i]=a0*(aYdataGrid[i] - aY1oldGrid[i]) - a1*aY2oldGrid[i] -
a2*aY3oldGrid[i] - a3*aY4oldGrid[i];
        aY4newGrid[i]= aY4oldGrid[i]+SAMPLE_CONSTANT*aY4PrimeGrid[i];

freq[i] = 60.0 + (aY2newGrid[i]/360.00);

aY1oldGrid[i] = aY1newGrid[i];
         aY2oldGrid[i] = aY2newGrid[i];
         aY3oldGrid[i] = aY3newGrid[i];
         aY4oldGrid[i] = aY4newGrid[i];
    }

Freq = (freq[0]);//+freq[1]+freq[2])/3;

return Freq;
}
double UIC::FrequencyCalculation1(double V[3][2]) {
       double freq[3] = {0.0};
       double New,Freq,Diff1,Diff2, PhaseShift;

// Start Looping here//
    for(int i=0;i<1;i++){

New = V[i][1];
      if(GenFlag == 0){
        GenFlag =1;
      for(int j=0;j<9;j++){
          CoeffGenB[i][j]= New;}
    }

Diff1 = abs(New - CoeffGenB[i][0] - 360.0);
    Diff2 = abs(New - CoeffGenB[i][0] + 360.0);
    PhaseShift = 0.0;
    if(Diff1 < 180.0)
        PhaseShift = 360.0;
    else if (Diff2 < 180.0)
        PhaseShift = -360.0;

for(int j=0;j<9;j++){
        CoeffGenB[i][j]= CoeffGenB[i][j]+ PhaseShift;}

CoeffGenA[i][0]= CONSTANT*(New - CoeffGenB[i][0]);
    CoeffGenC[i][0] = CoeffGenB[i][0] + SAMPLE_CONSTANT* CoeffGenA[i][0];

for(int j =1 ; j <9; j++){
        CoeffGenA[i][j] = CONSTANT*(CoeffGenB[i][j-1]-CoeffGenB[i][j]);
        CoeffGenC[i][j] = CoeffGenB[i][j]+ SAMPLE_CONSTANT*CoeffGenA[i][j];
    } freq[i] = 60 + (CoeffGenA[i][8]/360.0);
         for(int j=0;j< 9;j++){
          CoeffGenB[i][j]=CoeffGenC[i][j];}
    }//Finish Looping here//
            Freq = (freq[0]);

return Freq;
}
```

One UIC implementation software file in the illustrated embodiment is:

```cpp
// DG.cpp : Defines the entry point for the console application.
//
#include <iostream>
#include <fstream>
#include <cmath>
#include <time.h>
#include <stdio.h>
#include <conio.h>
#include <string.h>
include <sys/timeb.h> include "UIC.h"
include "Protection.h"
#include "DGIO.h"
#include "stdafx.h"
#include "Globals.h"
#include "Control.h"
#include "debugging.h"

#define PI 3.14159265359

PCAN_MSG_T z;
PMUDatafromCAN *PMU1;
UIC *uic;

static DGIO *myio;
Protection *protect;
Control *dgControl;
Debugging *debug;
Variables allStatus;
Settings setting;

bool SyncCheckLoop;
bool GPMControlLoop;
bool perturbationLoop;

using namespace std;

int initPMU ();
void UICCheck ();
void menu ();
int interactive ();
void SyncCheckPIDControl ();
void GPMPIDControl ();
double PIDOutput (double error, PIDData& pid);
void allStatusReset ();
double perturbation (double Amplitude);
void PerturbationLoop ();

int _tmain(int argc, _TCHAR* argv[])
{
    printf ("Start initialization ...\n");
        debug = new Debugging (57600, true);
        allStatusReset ();
    initPMU ();
    myio = new DGIO(2, 4);
    if (myio->errorCode != 1000)
    {
        printf ("IO cards initialization error!!!\n");
        getch ();
```

```
        exit (0);
    }
    protect = new Protection ();
    dgControl = new Control ();

uic = new UIC(277.,85.,59.8,300.,100.,0.1,5.,28.,0.13); // Define an
instance of UIC printf ("Initialization completed...\n");
    menu ();
    int loop = 1;
    int counter1 = 0;
    int counter2 = 0;
    SyncCheckLoop = false;
    GPMControlLoop = false;
    perturbationLoop = false;
    while (loop)
    { loop = interactive ();
        counter1 ++;
        counter2 ++;
        if (counter1 >= 100)
        {
            myio->readInputs ();
            counter1 = 0;
        }

PMU1->CANUpdateStatus(); // Check for PMU status

// If data is there get values, otherwise skip.
        if (PMU1->bReady)
            PMU1->getData(allStatus.PMU.Data); // Read all data in buffer*/
        UICCheck ();

////      protect->doEvents ();
        dgControl->doEvents ();
        if (counter2 >= 20)
        {
            counter2 = 0;
            if (perturbationLoop == true)
                PerturbationLoop ();
            if (SyncCheckLoop == true)
                SyncCheckPIDControl ();
            if (GPMControlLoop == true)
                GPMPIDControl ();
            debug->recording (allStatus);
                myio->writeOutputs ();
        }
        if (debug->reachLimit ())
            loop = 0;
    } struct tm *newtime;
    struct __timeb64 timebuffer;

_ftime64(&timebuffer);
    newtime = _gmtime64(&timebuffer.time);

char fileName[30];
    sprintf (fileName, "%02d%02d%02d%02d", newtime->tm_mon+1, newtime-
>tm_mday,newtime->tm_hour-5, newtime->tm_min);
    debug->writeFile (fileName);
}
```

```c
void menu ()
{
    printf ("\n--------------- Menu -------------------\n");
    printf ("e: exit\n");
    printf ("z: syncControl\n");
    printf ("x: GPM Power Control\n");
    printf ("t: Test Mode\n");
    printf ("b: perturbation GIM mode\n");
     printf ("u: CB Status, power, frequencies\n");
    printf ("i: IO values\n");
    printf ("y: Sync Check\n");
    printf ("p: PMU values\n");
    printf ("s: start or stop recording\n");
    printf ("enter a command: ");
}
int interactive ()
{
    char c;
    if (_kbhit ())
    {
        c = _getch ();
        switch (c)
        {
            case 'z':
                printf ("\nSync Control Mode:\n");
                debug->recording ();
                SyncCheckLoop = true;
                GPMControlLoop = false;
                break;
            case 'x':
                printf ("GPM Power Control Model: \n");
                debug->recording ();
                SyncCheckLoop = false;
                GPMControlLoop = true;
                break;
            case 't':
                printf ("\nTest Mode:\n");
                allStatusReset ();
                SyncCheckLoop = false;
                GPMControlLoop = false;
                break;
            case 'b':
                perturbationLoop = true;
                break;
            case 'd':
                setting.RealLoadReference -= 2000;
                if (setting.RealLoadReference < 0)
                    setting.RealLoadReference = 0;
                printf ("RealLoadReference: %f\n", setting.RealLoadReference);
                break;
            case 'e':
                return 0;
                break;
            case 's':
                debug->startRecording = ! debug->startRecording;
                if (debug->startRecording == true)
                    printf ("start recording data...");
                else
                    printf ("Stop recording data!");
                break;
                case 'u':
                printf ("\nPower: CB status %d\n",
allStatus.IO.digitalOut.genBreaker);
```

```
                printf ("Real Power: %f\n", allStatus.UIC.rPower);
                printf ("Reactive Power: %f\n", allStatus.UIC.xPower);
                printf ("Frequencies: Grid: %f, Local: %f\n", uic->fAreaEPS, uic-
>fLocal);
                break;
            case 'y':
                printf ("\nSync Check: \n");
                printf ("SpeedBias:%4.2f, %4.2f\n",
allStatus.IO.analogMonitoring.speedBias, allStatus.IO.analogOut.speedBias);
                printf ("VoltageBias:%4.2f, %4.2f\n",
allStatus.IO.analogMonitoring.voltageBias,
allStatus.IO.analogOut.voltageBias);
                printf ("%4.2f,", allStatus.PMU.Data[3].Phase-
allStatus.PMU.Data[6].Phase);
                printf ("%4.2f,", allStatus.PMU.Data[4].Phase-
allStatus.PMU.Data[7].Phase);
                printf ("%4.2f,", allStatus.PMU.Data[5].Phase-
allStatus.PMU.Data[8].Phase);
                printf ("\n");
                break;
            case 'p':
                printf ("\nPMU reading:\n");
                printf ("Current All   (A, B, C): ");
                for (int i =0; i < 3; i ++)
                    printf ("%6.4f(%4.2f),", 0.0335*4*allStatus.PMU.Data[i].Amp,
allStatus.PMU.Data[i].Phase);
                printf ("\nVoltage Grid (A, B, C): ");
                for (int i =0; i < 3; i ++)
                    printf ("%6.4f(%4.2f),",  uic->VAreaEPS[i][0],
allStatus.PMU.Data[3+i].Phase);
                printf ("\nVoltage Gen  (A, B, C): ");
                for (int i =0; i < 3; i ++)
                    printf ("%6.4f(%4.2f),",uic->VLocal[i][0],
allStatus.PMU.Data[6+i].Phase);
                printf ("\n");
                break;
            case 'i':
                printf ("\nDigital Inputs:   ");
                for (int i = 0; i < DIGITAL_IN; i ++)
                {
                    printf ("%ld", allStatus.IO.digitalIn.value[i]);
                }
                printf ("\n");
                printf ("Digital Outputs: ");
                for (int i = 0; i < DIGITAL_OUT; i ++)
                {
                    printf ("%ld", allStatus.IO.digitalOut.value[i]);
                }
                printf ("\n");
                printf ("Analog Inputs:   Coolant %7.2f C, Oil %7.2f PSI, MPU %7.2f
rpm\n",
                    allStatus.IO.analogIn.CoolantTemp,
                    allStatus.IO.analogIn.OilPressure,
                    allStatus.IO.analogIn.MPUSpeed);
                printf ("Analog Output:   SPD_BIAS %7.2f, VOL_BIAS %7.2f",
allStatus.IO.analogOut.speedBias, allStatus.IO.analogOut.voltageBias);
                break;
            default:
                printf ("wrong input\n");
                break;
        }
        menu ();
    }
    return 1;
```

```
} int initPMU ()
{
   UINT x =0 ;
   bool y = false;

z = ( PCAN_MSG_T )GlobalAlloc( GPTR, BUFFER*sizeof(CAN_MSG_T) );
    if( z == NULL )
    {
       cout<<"Out of memory!"<<endl;
          CANPortClose(x);
          return -1;
    }
   PMU1 = new PMUDatafromCAN(x,y,z);
   PMU1->CANOpen(1);
   return 0;
} void UICCheck ()
{
   double VCurrentAreaEPS[3][2], ICurrentAreaEPS[3][2]; // Area EPS or grid
voltage and current
   double VCurrentLocal[3][2],ICurrentLocal[3][2]; // Local or gen voltage and
current
    double VOldLocal[3][2],VOldAreaEPS[3][2];
    double GridFactor[3];
    double GenFactor[3];
    GenFactor[0]= 0.2336;GenFactor[1]= 0.2331;GenFactor[2]= 0.2323;
    GridFactor[0]=0.2391;;GridFactor[1]=0.2379;;GridFactor[2]=0.2382;
   bool NewStart = 0;

// The status of the circuit breaker should be a digital input.
   // 1 means CB is open, and 0 indicates CB is closed.
   bool CBStatus;

//check if the logic is consistant with egcp2 board if (allStatus.IO.digitalIn.genCBAuxSwitch==0)
      CBStatus = 0;
   else
      CBStatus = 0;

for(int j=0;j<3;j++)
   {
      // 3 phase current either Area EPS (grid) or Local (gen)
      ICurrentAreaEPS[j][0]= 0.0335*4*allStatus.PMU.Data[j].Amp;
      ICurrentAreaEPS[j][1]= allStatus.PMU.Data[j].Phase;
      ICurrentLocal[j][0]= 0.0335*4*allStatus.PMU.Data[j].Amp;
      ICurrentLocal[j][1]= allStatus.PMU.Data[j].Phase;
      // 3 phase voltage for Area EPS (grid)
      VCurrentAreaEPS[j][0]= GridFactor[j]*allStatus.PMU.Data[3+j].Amp;
      VCurrentAreaEPS[j][1]=allStatus.PMU.Data[3+j].Phase;
      // 3 phase voltage for Local (gen)
      VCurrentLocal[j][0]= GenFactor[j]*allStatus.PMU.Data[6+j].Amp;
      VCurrentLocal[j][1]=allStatus.PMU.Data[6+j].Phase;
   }

// Call UIC functions by Yong Sheng
   bool trip=uic->CBTrip(CBStatus, NewStart, VCurrentAreaEPS, ICurrentAreaEPS,
VCurrentLocal,VOldLocal,VOldAreaEPS, ICurrentLocal);
   //check the following logic !!!!
   allStatus.UIC.freqGrid = uic->fAreaEPS;
   allStatus.UIC.freqLocal = uic->fLocal;
```

```cpp
      //allStatus.IO.digitalOut.genBreakerTrip = trip;
      if(trip==1 && CBStatus==0) // Trip CB if it is closed initially.
      {
          allStatus.IO.digitalOut.genBreakerTrip = 1; //          cout<<" Trip the circuit breaker!"<<endl;
          allStatus.IO.digitalOut.genBreaker = 1;
            allStatus.IO.digitalOutChanged = 1;
          //  CBStatus = 1;

}
      else if(trip==0 && CBStatus==1) // Close CB if it is open initially.
  // else if(trip==0 && CBStatus==0) original code from Sheng, changed CBStatus from 0 to 1 in the code.
      {

CBStatus = 0;
          allStatus.IO.digitalOut.genBreaker = 0; //          cout<<" Close the circuit breaker!"<<endl;
          allStatus.IO.digitalOut.genBreakerTrip = 0; //          cout<<" Close the circuit breaker!"<<endl;
      }
} void SyncCheckPIDControl ()
{
    //Phase sync
    double error = allStatus.FilteredPMU.VAreaEPS[0][1] -
allStatus.FilteredPMU.VLocal[0][1];
// double error = allStatus.PMU.voltageLocalA.Phase -
allStatus.PMU.voltageGridA.Phase;
    if (error > 180)
        error -= 360.0;
    if (error < -180.0)
        error += 360.0;
    double speedBias = PIDOutput (error, setting.PID.syncCheckSpeedBiasPID);
    speedBias = speedBias *4/10.0+2.50;
    if (speedBias > 3.5)
        speedBias = 3.5;
    if (speedBias < 1.5)
        speedBias = 1.5;
    if (speedBias != allStatus.IO.analogOut.speedBias)
    {
        allStatus.IO.analogOut.speedBias = speedBias;
        allStatus.IO.analogOutChanged = true;
    }

//voltage Bias
    error = allStatus.FilteredPMU.VAreaEPS[0][0]-
allStatus.FilteredPMU.VLocal[0][0];
    double voltageBias = PIDOutput (error,
setting.PID.syncCheckVoltageBiasPID);
    voltageBias = voltageBias *4.5/20.0+4.50;
    if (voltageBias > 9.0)
        voltageBias = 9.0;
    if (voltageBias < 0.0)
        voltageBias = 0.0;
    if (voltageBias != allStatus.IO.analogOut.voltageBias)
    {
        allStatus.IO.analogOut.voltageBias = voltageBias;
        allStatus.IO.analogOutChanged = true;
    }
} void GPMPIDControl ()
```

```
{
   //realPower Control
   double error = setting.RealLoadReference-allStatus.UIC.rPower;
   if (error > 20000.0)
      error = 20000.0;
   if (error < -20000.0)
      error = -20000.0;
   error /= 1000;
   double speedBias = PIDOutput (error, setting.PID.realPowerPID);
   speedBias = speedBias+2.50;
   if (speedBias > 4.5)
      speedBias = 4.5;
   if (speedBias < 0.5)
      speedBias = 0.5;
// speedBias += perturbation(0.1);
   if (speedBias != allStatus.IO.analogOut.speedBias)
   {
      allStatus.IO.analogOut.speedBias = speedBias;
      allStatus.IO.analogOutChanged = true;
   } double voltageBias;
   //voltage Bias
   error = setting.ReactiveLoadReference-allStatus.UIC.xPower;
   error /= 1000;
   if (error > 20.0)
      error = 20.0;
   if (error < -20.0)
      error = -20.0;
   voltageBias = PIDOutput (error, setting.PID.reactivePowerPID);
   voltageBias = voltageBias+4.50;
   if (voltageBias > 7.5)
      voltageBias = 7.5;
   if (voltageBias < 1.5)
      voltageBias = 1.5;
   if (voltageBias != allStatus.IO.analogOut.voltageBias)
   {
      allStatus.IO.analogOut.voltageBias = voltageBias;
      allStatus.IO.analogOutChanged = true;
   }
} double PIDOutput (double error, PIDData& pid)
{
   double proportional = error*pid.Gains.p;
   double derivative = (error - pid.lastError)* pid.Gains.d;
   pid.lastError = error;
   pid.accumulatedError += error;
   double accumulated = pid.accumulatedError*pid.Gains.i;
   double output = proportional+derivative+accumulated;
   return output;
} void allStatusReset ()
{
   allStatus.IO.analogOut.speedBias = 2.50;
   allStatus.IO.analogOut.voltageBias = 4.50;

setting.RealLoadReference = 20000.0;
   setting.ReactiveLoadReference = 0.0;

setting.PID.syncCheckSpeedBiasPID.accumulatedError = 0;
   setting.PID.syncCheckSpeedBiasPID.lastError = 0;
   setting.PID.syncCheckSpeedBiasPID.Gains.p = 0.005;
```

```
    setting.PID.syncCheckSpeedBiasPID.Gains.i = 0.0005;
    setting.PID.syncCheckSpeedBiasPID.Gains.d = 0.01;

setting.PID.syncCheckVoltageBiasPID.accumulatedError = 0;
    setting.PID.syncCheckVoltageBiasPID.lastError = 0;
    setting.PID.syncCheckVoltageBiasPID.Gains.p = 0.08;
    setting.PID.syncCheckVoltageBiasPID.Gains.i = 0.0008;
    setting.PID.syncCheckVoltageBiasPID.Gains.d = 0.01;

setting.PID.realPowerPID.accumulatedError = 0;
    setting.PID.realPowerPID.lastError = 0;
    setting.PID.realPowerPID.Gains.p = 0.05;
    setting.PID.realPowerPID.Gains.i = 0.002;
    setting.PID.realPowerPID.Gains.d = 0.02;

setting.PID.reactivePowerPID.accumulatedError = 0;
    setting.PID.reactivePowerPID.lastError = 0;
    setting.PID.reactivePowerPID.Gains.p = 0.06;
    setting.PID.reactivePowerPID.Gains.i = 0.004;
    setting.PID.reactivePowerPID.Gains.d = 0.1;
} double perturbation (double Amplitude)
{
    struct __timeb64 tstruct;
    _ftime64( &tstruct );
    double msec = tstruct.millitm;
    double results = Amplitude*sin (msec*PI/500.0);
    return results;
} void PerturbationLoop ()
{
    double speedBias = 2.50 + perturbation (0.1);
    if (speedBias != allStatus.IO.analogOut.speedBias)
    {
        allStatus.IO.analogOut.speedBias = speedBias;
        allStatus.IO.analogOutChanged = true;
    }
}
```

Appendix F to Part 2: Code for Protection and PLC functions

A header file in an exemplary embodiment is:

```
class Protection
{
   private:
        double OilPressSensorInput,CoolTempSensorInput,EngineSpeedSensorInput;
        bool
e_stop_cre,EmergencyStop,auto_on_ss1,test_on_ss2,run_with_load_ss3,voltage_inc
rease_ss4,voltage_decrease_ss4;
        bool
speed_increase_ss6,speed_decrease_ss6,process_on_ss8,egcp2_engine_fuel_sol_on,
egcp2_fuel_sol21,egcp2_engine_crank;
        bool ecm_idle_rated_output,egcp2_visual_alarm,egcp2_idle_rated;
        bool egcp2_generator_cb_close,egcp2_generator_cb_trip;
        bool
egcp2_mains_cb_close,egcp2_mains_cb_trip,generator_cb_aux,mains_cb_aux;
        bool ecm_warning,ecm_fault_cr103,protective_relay_cr102;
        bool
crankcase_high_press_ps11,chp_coolant_pump_on_m401,chp_coolant_normal_flow_fls
32,chp_box_high_temp_ts;
        bool
system_fault,egcp2_auto_mode,egcp2_test_mode,egcp2_run_w_load_mode,egcp2_proce
ss_mode;
        bool egcp2_voltage_raise_mode,egcp2_voltage_lower_mode;
        bool egcp2_speed_raise_mode,egcp2_speed_lower_mode;
        bool generator_cb_close_cr24,generator_cb_trip_cr25,
egcp2_generator_cb_aux;
        bool mains_cb_close,mains_cb_trip, egcp2_mains_cb_aux;
        bool ecm_key_on_cr28, undelayed_ecm_key_on_cr28,
ecm_crank_cr29,idle_rated_delay;
        bool chp_box_vent_blower_fault, undelayed_chp_box_vent_blower_fault;
        bool chp_coolant_low_flow_fault,chp_coolant_pump_fault;
        bool egcp2_remote_fault_1,egcp2_remote_fault_2;
        bool ecm_warning_fault,undelayed_ecm_warning_fault;
        bool oil_level_low_fault,undelayed_oil_level_low_fault;
        bool protective_relay_fault,undelayed_protective_relay_fault;
        bool
protective_cb107_alarm_fault,undelayed_protective_cb107_alarm_fault;
        bool
ecm_fault,undelayed_ecm_fault,inlet_gas_low_psi_fault,undelayed_inlet_gas_low_
psi_fault;
        bool crankcase_high_psi_fault,undelayed_crankcase_high_psi_fault;
        bool
undelayed_chp_coolant_pump_fault,undelayed_chp_coolant_low_flow_fault;
        bool chp_box_high_temp_flt,undelayed_chp_box_high_temp_flt;
        bool visual_alarm,reset_faults,last_egcp2_visual_alarm_status;

void ModifyingCtrlInputs ();
        void hardShutdown();
        void softShutdown();
        bool ResetFault();

public:
        Protection();
        ~Protection ();
        void doEvents ();
        //need to change following functions.
        bool timerFunction_p2sec(bool q);
        bool timerFunction_1sec(bool q);
        bool timerFunction_2sec(bool q);
        bool timerFunction_3sec(bool q);
        bool timerFunction_5sec(bool q);
        bool timerFunction_10sec(bool q);
```

};

An implementation file is:

```cpp
#include "Protection.h"
#include "Globals.h"
using <mscorlib.dll> using namespace System;
extern Variables allStatus;
extern Settings setting;
Protection::Protection()
{
}

Protection::~Protection()
{
} void Protection::doEvents ()
{
    ModifyingCtrlInputs();
    hardShutdown ();
    softShutdown ();
} void Protection::ModifyingCtrlInputs ()
{ auto_on_ss1 = Convert::ToBoolean(allStatus.IO.digitalIn.manualAutoSwitch);
    test_on_ss2 = Convert::ToBoolean(allStatus.IO.digitalIn.testEngineSwitch);
    run_with_load_ss3 =
Convert::ToBoolean(allStatus.IO.digitalIn.runWithLoadSwitch);
    voltage_increase_ss4 =
Convert::ToBoolean(allStatus.IO.digitalIn.voltageRaiseSwitch);
    voltage_decrease_ss4 =
Convert::ToBoolean(allStatus.IO.digitalIn.voltageLowerSwitch);
    speed_increase_ss6 =
Convert::ToBoolean(allStatus.IO.digitalIn.speedRaiseSwitch);
    speed_decrease_ss6 =
Convert::ToBoolean(allStatus.IO.digitalIn.speedLowerSwitch);
    generator_cb_aux =
Convert::ToBoolean(allStatus.IO.digitalIn.genCBAuxSwitch);
    mains_cb_aux = Convert::ToBoolean(allStatus.IO.digitalIn.mainsCBAuxSwitch);
    process_on_ss8 =
Convert::ToBoolean(allStatus.IO.digitalIn.ProcessModeSwitch);
    egcp2_remote_fault_1 =
Convert::ToBoolean(allStatus.IO.digitalIn.remoteFault1);
    egcp2_remote_fault_2 =
Convert::ToBoolean(allStatus.IO.digitalIn.remoteFault2);
    EmergencyStop = Convert::ToBoolean(allStatus.IO.digitalIn.remoteFault3);
    e_stop_cre = !EmergencyStop;
    egcp2_mains_cb_close =
Convert::ToBoolean(allStatus.IO.digitalOut.mainsBreaker);
    egcp2_mains_cb_trip =
Convert::ToBoolean(allStatus.IO.digitalOut.mainsBreakerTrip);
    egcp2_generator_cb_close =
Convert::ToBoolean(allStatus.IO.digitalOut.genBreaker);
    egcp2_generator_cb_trip =
Convert::ToBoolean(allStatus.IO.digitalOut.genBreakerTrip);
    egcp2_engine_fuel_sol_on =
Convert::ToBoolean(allStatus.IO.digitalOut.fuelSolenoid);
    egcp2_engine_crank =
Convert::ToBoolean(allStatus.IO.digitalOut.engineCrank);
```

```
    egcp2_idle_rated =
Convert::ToBoolean(allStatus.IO.digitalOut.idleRatedSwitch);

egcp2_auto_mode = (e_stop_cre & (!system_fault)) & auto_on_ss1;
    egcp2_test_mode = (e_stop_cre & (!system_fault)) & test_on_ss2;
    egcp2_run_w_load_mode = (e_stop_cre & (!system_fault)) & run_with_load_ss3;
    egcp2_process_mode = (e_stop_cre & (!system_fault)) & process_on_ss8;
    egcp2_voltage_raise_mode = (e_stop_cre & (!system_fault)) &
voltage_increase_ss4;
    egcp2_voltage_lower_mode = (e_stop_cre & (!system_fault)) &
voltage_decrease_ss4;
    egcp2_speed_raise_mode = (e_stop_cre & (!system_fault)) &
speed_increase_ss6;
    egcp2_speed_lower_mode = (e_stop_cre & (!system_fault)) &
speed_decrease_ss6;
    generator_cb_close_cr24 = e_stop_cre & egcp2_generator_cb_close;
    generator_cb_trip_cr25 = egcp2_generator_cb_trip;
    egcp2_generator_cb_aux = generator_cb_aux;
    mains_cb_close = e_stop_cre & egcp2_mains_cb_close;
    mains_cb_trip = egcp2_mains_cb_trip;
    egcp2_mains_cb_aux= mains_cb_aux;
    egcp2_fuel_sol21=e_stop_cre & egcp2_engine_fuel_sol_on;
    ecm_key_on_cr28 = timerFunction_3sec(egcp2_fuel_sol21);
    ecm_crank_cr29 = e_stop_cre & egcp2_engine_crank;
    ecm_idle_rated_output=egcp2_idle_rated;
    idle_rated_delay = timerFunction_5sec(ecm_idle_rated_output);
    system_fault = egcp2_remote_fault_1 || egcp2_remote_fault_2;

allStatus.IO.digitalIn.manualAutoSwitch =
Convert::ToInt16(egcp2_auto_mode);
    allStatus.IO.digitalIn.testEngineSwitch =
Convert::ToInt16(egcp2_test_mode);
    allStatus.IO.digitalIn.runWithLoadSwitch =
Convert::ToInt16(egcp2_run_w_load_mode);
    allStatus.IO.digitalIn.ProcessModeSwitch =
Convert::ToInt16(egcp2_process_mode);
    allStatus.IO.digitalIn.voltageRaiseSwitch =
Convert::ToInt16(egcp2_voltage_raise_mode);
    allStatus.IO.digitalIn.voltageLowerSwitch =
Convert::ToInt16(egcp2_voltage_lower_mode);
    allStatus.IO.digitalIn.speedRaiseSwitch =
Convert::ToInt16(egcp2_speed_raise_mode);
    allStatus.IO.digitalIn.speedLowerSwitch =
Convert::ToInt16(egcp2_speed_lower_mode);
    allStatus.IO.digitalIn.genCBAuxSwitch =
Convert::ToInt16(egcp2_generator_cb_aux);
    allStatus.IO.digitalIn.mainsCBAuxSwitch =
Convert::ToInt16(egcp2_mains_cb_aux);

allStatus.IO.digitalOut.genBreaker =
Convert::ToInt16(generator_cb_close_cr24);
    allStatus.IO.digitalOut.genBreakerTrip =
Convert::ToInt16(generator_cb_trip_cr25);
    allStatus.IO.digitalOut.mainsBreaker = Convert::ToInt16(mains_cb_close);
    allStatus.IO.digitalOut.mainsBreakerTrip = Convert::ToInt16(mains_cb_trip);
    allStatus.IO.digitalOut.fuelSolenoid = Convert::ToInt16(ecm_key_on_cr28);
    allStatus.IO.digitalOut.engineCrank = Convert::ToInt16(ecm_crank_cr29);
    allStatus.IO.digitalOut.idleRatedSwitch =
Convert::ToInt16(idle_rated_delay);
}
void Protection::hardShutdown()
{
    CoolTempSensorInput =allStatus.IO.analogIn.CoolantTemp;
    EngineSpeedSensorInput = allStatus.IO.analogIn.MPUSpeed;
```

```
    EmergencyStop = Convert::ToBoolean(allStatus.IO.digitalIn.remoteFault3);
    egcp2_fuel_sol21 =
Convert::ToBoolean(allStatus.IO.digitalOut.fuelSolenoid);
    idle_rated_delay =
Convert::ToBoolean(allStatus.IO.digitalOut.idleRatedSwitch);
    e_stop_cre = (!EmergencyStop);
    ecm_fault_cr103 =
Convert::ToBoolean(allStatus.IO.digitalIn.remoteFault1);//Remote_Fault_1
    crankcase_high_press_ps11 =
Convert::ToBoolean(allStatus.IO.digitalIn.remoteFault3);//Emergency_stop
connected in series
    chp_coolant_pump_on_m401 =
Convert::ToBoolean(allStatus.IO.digitalIn.remoteFault5);//R_F_6
    chp_coolant_normal_flow_fls32 =
Convert::ToBoolean(allStatus.IO.digitalIn.remoteFault6);//R_F_6 if (CoolTempSensorInput > setting.ProtectionLimits.CoolTempMaxLimit)
    {
        allStatus.Alarms.limitsErrorCode = 1;
        allStatus.Alarms.hardShutdown = true;
    }
    if (EngineSpeedSensorInput > setting.ProtectionLimits.EngineSpeedMaxLimit)
    {
        allStatus.Alarms.limitsErrorCode = 2;
        allStatus.Alarms.hardShutdown = true;
    }
    if (Convert::ToBoolean(EmergencyStop) == true)
    {
        allStatus.Alarms.limitsErrorCode = 3;
        allStatus.Alarms.hardShutdown = true;
    }
    reset_faults = ResetFault();

egcp2_remote_fault_2 = ecm_fault || inlet_gas_low_psi_fault ||
crankcase_high_psi_fault || chp_coolant_pump_fault ||
chp_coolant_low_flow_fault || chp_box_high_temp_flt;
    if (egcp2_remote_fault_2 == true)
        {
            allStatus.Alarms.limitsErrorCode = 4;
            allStatus.Alarms.hardShutdown = true;
        }
        undelayed_ecm_fault = (ecm_fault || ((!ecm_fault_cr103) &
egcp2_fuel_sol21)) & (!reset_faults);
        ecm_fault = timerFunction_1sec(undelayed_ecm_fault);
        if ( ecm_fault == true)
        {
            allStatus.Alarms.limitsErrorCode = 5;
            allStatus.Alarms.hardShutdown = true;
        }
        undelayed_inlet_gas_low_psi_fault = (inlet_gas_low_psi_fault ||
egcp2_fuel_sol21) & (!reset_faults);
        inlet_gas_low_psi_fault =
timerFunction_p2sec(undelayed_inlet_gas_low_psi_fault);
        if ( inlet_gas_low_psi_fault == true)
        {
            allStatus.Alarms.limitsErrorCode = 6;
            allStatus.Alarms.hardShutdown = true;
        }
        undelayed_crankcase_high_psi_fault = (crankcase_high_psi_fault ||
((!crankcase_high_press_ps11 ) & egcp2_fuel_sol21)) & (!reset_faults);
        crankcase_high_psi_fault =
timerFunction_5sec(undelayed_crankcase_high_psi_fault);
        if ( crankcase_high_psi_fault == true)
        {
```

```
            allStatus.Alarms.limitsErrorCode = 7;
            allStatus.Alarms.hardShutdown = true;
        } undelayed_chp_coolant_pump_fault = (chp_coolant_pump_fault) &
(!reset_faults);
        chp_coolant_pump_fault =
timerFunction_10sec(undelayed_chp_coolant_pump_fault);
        if ( chp_coolant_pump_fault == true)
        {
            allStatus.Alarms.limitsErrorCode = 8;
            allStatus.Alarms.hardShutdown = true;
        }
        undelayed_chp_coolant_low_flow_fault = (chp_coolant_low_flow_fault ||
(!chp_coolant_normal_flow_fls32)) & (!reset_faults);
        chp_coolant_low_flow_fault =
timerFunction_10sec(undelayed_chp_coolant_low_flow_fault);
        if ( chp_coolant_low_flow_fault == true)
        {
            allStatus.Alarms.limitsErrorCode = 9;
            allStatus.Alarms.hardShutdown = true;
        }
        undelayed_chp_box_high_temp_flt = (chp_box_high_temp_flt ||
(!chp_box_high_temp_ts)) & (!reset_faults);
        chp_box_high_temp_flt =
timerFunction_5sec(undelayed_chp_box_high_temp_flt);
        if ( chp_box_high_temp_flt == true)
        {
            allStatus.Alarms.limitsErrorCode = 10;
            allStatus.Alarms.hardShutdown = true;
        }
        allStatus.IO.digitalIn.remoteFault2 =
Convert::ToInt16(egcp2_remote_fault_2);
    }
void Protection::softShutdown()
{
   OilPressSensorInput =allStatus.IO.analogIn.OilPressure;
   egcp2_fuel_sol21 =
Convert::ToBoolean(allStatus.IO.digitalOut.fuelSolenoid);
   idle_rated_delay =
Convert::ToBoolean(allStatus.IO.digitalOut.idleRatedSwitch);
   EmergencyStop = Convert::ToBoolean(allStatus.IO.digitalIn.remoteFault3);
   e_stop_cre = (!EmergencyStop);

protective_relay_cr102 =
Convert::ToBoolean(allStatus.IO.digitalIn.remoteFault4);//R_F_4 if  ((OilPressSensorInput > setting.ProtectionLimits.OilPressMaxLimit) ||
       (OilPressSensorInput < setting.ProtectionLimits.OilPressMinLimit))
   {
      allStatus.Alarms.limitsErrorCode = 11;
      allStatus.Alarms.softShutdown = true;
   }
   reset_faults = ResetFault();

egcp2_remote_fault_1 =  ecm_warning_fault || oil_level_low_fault ||
protective_relay_fault || protective_cb107_alarm_fault ||
chp_box_vent_blower_fault;
   if (egcp2_remote_fault_1 == true)
   {
      allStatus.Alarms.limitsErrorCode = 13;
      allStatus.Alarms.softShutdown = true;
   }
```

```
   undelayed_ecm_warning_fault = (ecm_warning_fault || (egcp2_fuel_sol21 &
ecm_warning)) & (!reset_faults);
   ecm_warning_fault = timerFunction_2sec(undelayed_ecm_warning_fault);
   if (ecm_warning_fault == true)
   {
      allStatus.Alarms.limitsErrorCode = 14;
      allStatus.Alarms.softShutdown = true;
   }
   undelayed_oil_level_low_fault = (oil_level_low_fault) & (!reset_faults);
   oil_level_low_fault = timerFunction_2sec(undelayed_oil_level_low_fault);
   if (oil_level_low_fault == true)
   {
      allStatus.Alarms.limitsErrorCode = 15;
      allStatus.Alarms.softShutdown = true;
   }
   undelayed_protective_relay_fault = (protective_relay_fault ||
protective_relay_cr102) & (!reset_faults);
   protective_relay_fault =
timerFunction_2sec(undelayed_protective_relay_fault);
   if (protective_relay_fault == true)
   {
      allStatus.Alarms.limitsErrorCode = 16;
      allStatus.Alarms.softShutdown = true;
   } undelayed_protective_cb107_alarm_fault = (protective_cb107_alarm_fault ) &
(!reset_faults);
   protective_cb107_alarm_fault =
timerFunction_2sec(undelayed_protective_cb107_alarm_fault);
   if ( protective_cb107_alarm_fault == true)
   {
      allStatus.Alarms.limitsErrorCode = 17;
      allStatus.Alarms.softShutdown = true;
   } undelayed_chp_box_vent_blower_fault = chp_box_vent_blower_fault &
(!reset_faults);
   chp_box_vent_blower_fault =
timerFunction_10sec(undelayed_chp_box_vent_blower_fault);
   if ( chp_box_vent_blower_fault == true)
   {
      allStatus.Alarms.limitsErrorCode = 18;
      allStatus.Alarms.softShutdown = true;
   }
   allStatus.IO.digitalIn.remoteFault1 =
Convert::ToInt16(egcp2_remote_fault_1);
}
bool Protection::ResetFault()
{
         egcp2_visual_alarm = allStatus.Alarms.hardShutdown ||
allStatus.Alarms.softShutdown;

if (reset_faults == false)
         {
            if (egcp2_visual_alarm == false && last_egcp2_visual_alarm_status
== false)

reset_faults = true;
         }
         else
         {
            if (egcp2_visual_alarm == true && last_egcp2_visual_alarm_status
== false)
                reset_faults = false;
```

```
        }
        last_egcp2_visual_alarm_status = egcp2_visual_alarm;
        return reset_faults;
    }
bool Protection::timerFunction_p2sec(bool q)

{
        int counter = 0;
        while (q == true)
        {
            counter ++;
            if (counter >= 720*0.2)
            {
                q = false;
                return true;
            }
        }
        return false;
    }
bool Protection::timerFunction_1sec(bool q)
    {
        int counter = 0;
        while (q == true)
        {
            counter ++;
            if (counter >= 720)
            {
                q = false;
                return true;
            }
        }
        return false;
    }
bool Protection::timerFunction_2sec(bool q)
    {
        int counter = 0;
        while (q == true)
        {
            counter ++;
            if (counter >= 720*2)
            {
                q = false;
                return true;
            }
        }
        return false;
    }
bool Protection::timerFunction_3sec(bool q)
    {
        //This timer is a TOF type timer function; therefore, the output of
the function is different than the others.
        int counter = 0;

while (q == true)
        {
            counter ++;
            if (counter >= 720*3)
            {
                q = false;
                return false;
            }
        }
        return true;
    }
```

```
bool Protection::timerFunction_5sec(bool q)
    {
        int counter = 0;
        while (q == true)
        {
            counter ++;
            if (counter >= 720*5)
            {
                q = false;
                return true;
            }
        }
        return false;
    }
bool Protection::timerFunction_10sec(bool q)
    {
        int counter = 0;
        while (q == true)
        {
            counter ++;
            if (counter >= 720*10)
            {
                q = false;
                return true;
            }
        }
        return false;
    }
```

Appendix G to Part 2: Code for Engine and Generator Control

```
Class Control
{
      public:
            Control ();
            ~Control ();
            int doEvents ();
            void speedBias ();
            void voltageBias ();
};
#include "Globals.h"
#include "Control.h"

#define SPEED_BIAS_CONSTANT 2.50
define VOLTAGE_BIAS_CONSTANT 4.50 extern Variables allStatus;

Control::Control ()
{
      allStatus.IO.analogOut.speedBias = SPEED_BIAS_CONSTANT;
      allStatus.IO.analogOut.voltageBias = VOLTAGE_BIAS_CONSTANT;
      allStatus.IO.analogOutChanged = true;

for (int i = 0; i < DIGITAL_OUT; i ++)
            allStatus.IO.digitalOut.value[i] = 0;
      allStatus.IO.digitalOut.audibleAlarm = 0;
      allStatus.IO.digitalOut.engineCrank = 0;
      allStatus.IO.digitalOut.genBreakerTrip = 0;
      allStatus.IO.digitalOutChanged = true;
}

Control::~Control ()
{
} int Control::doEvents ()
{
      voltageBias ();
//    speedBias();
      return 0;
} void Control::voltageBias ()
{
      double voltageBias = 0.0;
      double Range = 10.0;
      double Limit = 2.0;
      double tolerance = 6.0;
      double p = 0.1;
      if (!allStatus.Modes.GPM)
      {
            return;
      }
      else
      {
            if (allStatus.Modes.SyncCheck)
            {
                  voltageBias = allStatus.PMU.voltageGridA.Amp-allStatus.PMU.voltageLocalA.Amp;
                  if (voltageBias < tolerance && voltageBias > -1.0*tolerance)
                  {
                        return;
```

```
                }
                else
                {
                        voltageBias = voltageBias * p;
                }
            }
        } if (voltageBias > Range) voltageBias = Range;
        if (voltageBias < -1.0*Range) voltageBias = -1*Range;

voltageBias = voltageBias * Limit/Range;
        allStatus.IO.analogOut.voltageBias = voltageBias;
} void Control::speedBias ()
{
/*      double speedBias = SPEED_BIAS_CONSTANT;
        double error = 0;
        double Range = 10.0;
        double Limit = 2.0;
        if (allStatus.Status.GPM)
        {
                if (allStatus.Status.SyncCheck)
                {
                        error = allStatus.PMU.voltageGridA.Phase-
allStatus.PMU.voltageLocalA.Phase;
                        double proportional =
error*allStatus.Data.PowerLoopPID.Gains.p ;
                        double derivative = (error -
allStatus.Data.PowerLoopPID.lastError)* allStatus.Data.PowerLoopPID.Gains.d;
                        allStatus.Data.PowerLoopPID.lastError = error;
                        allStatus.Data.PowerLoopPID.accumulatedError += error;
                        double accumulated =
allStatus.Data.PowerLoopPID.accumulatedError*allStatus.Data.PowerLoopPID.Gains
.i;
                        speedBias = proportional+derivative+accumulated;
                }
        }
        if (speedBias > Range) speedBias = Range;
        if (speedBias < -1.0*Range) speedBias = -1*Range;

speedBias = speedBias * Limit/Range+2.50;
        allStatus.IO.analogOut.speedBias = speedBias;*/
}
```

```
                endc

; 12 samples in Bank 1: 0xA0 to 0xE7
        cblock 0xA0
                Ya0:2       ; Y0 for phase A occupies 2 bytes
                Yb0:2       ; Y0 for phase B occupies 2 bytes
                Yc0:2       ; Y0 for phase C occupies 2 bytes
                Ya1:2       ; Y1 for phase A occupies 2 bytes
                Yb1:2       ; Y1 for phase B occupies 2 bytes
                Yc1:2       ; Y1 for phase C occupies 2 bytes
                Ya2:2       ; Y2 for phase A occupies 2 bytes
                Yb2:2       ; Y2 for phase B occupies 2 bytes
                Yc2:2       ; Y2 for phase C occupies 2 bytes
                Ya3:2       ; Y3 for phase A occupies 2 bytes
                Yb3:2       ; Y3 for phase B occupies 2 bytes
                Yc3:2       ; Y3 for phase C occupies 2 bytes
                Ya4:2       ; Y4 for phase A occupies 2 bytes
                Yb4:2       ; Y4 for phase B occupies 2 bytes
                Yc4:2       ; Y4 for phase C occupies 2 bytes
                Ya5:2       ; Y5 for phase A occupies 2 bytes
                Yb5:2       ; Y5 for phase B occupies 2 bytes
                Yc5:2       ; Y5 for phase C occupies 2 bytes
                Ya6:2       ; Y6 for phase A occupies 2 bytes
                Yb6:2       ; Y6 for phase B occupies 2 bytes
                Yc6:2       ; Y6 for phase C occupies 2 bytes
                Ya7:2       ; Y7 for phase A occupies 2 bytes
                Yb7:2       ; Y7 for phase B occupies 2 bytes
                Yc7:2       ; Y7 for phase C occupies 2 bytes
                Ya8:2       ; Y8 for phase A occupies 2 bytes
                Yb8:2       ; Y8 for phase B occupies 2 bytes
                Yc8:2       ; Y8 for phase C occupies 2 bytes
                Ya9:2       ; Y9 for phase A occupies 2 bytes
                Yb9:2       ; Y9 for phase B occupies 2 bytes
                Yc9:2       ; Y9 for phase C occupies 2 bytes
                Ya10:2      ; Y10 for phase A occupies 2 bytes
                Yb10:2      ; Y10 for phase B occupies 2 bytes
                Yc10:2      ; Y10 for phase C occupies 2 bytes
                Ya11:2      ; Y11 for phase A occupies 2 bytes
                Yb11:2      ; Y11 for phase B occupies 2 bytes
                Yc11:2      ; Y11 for phase C occupies 2 bytes
        endc ; New samples in Bank 1: 0xEA to 0xEF
        cblock 0xEA
                Yanew:2     ; Yanew occupies 2 bytes
                Ybnew:2     ; Ybnew occupies 2 bytes
                Ycnew:2     ; Ycnew occupies 2 bytes
        endc ; transient monitor in Bank 2: 0x20 to 0x6F ; specify amount to wait before next A/D
countH  equ 0x1B            ; should be 27 dec = 0x1B ;

;***** MACRO DEFINATIONS

Bank0           MACRO       ; Select bank 0 for both indirect
        bcf     STATUS, IRP ;   and direct addressing.
        bcf                 STATUS, RP1
        bcf                 STATUS, RP0
                endm Bank1           MACRO                       ; Select bank 1 for both indirect
        bcf                 STATUS, IRP     ; and direct addressing.
```

```
            bcf             STATUS, RP1
            bsf             STATUS, RP0
                endm Bank2       MACRO                           ; Select bank 2 for both indirect
            bsf             STATUS, IRP     ; and direct addressing.
            bsf             STATUS, RP1
            bcf             STATUS, RP0
                endm Bank3       MACRO                           ; Select bank 3 for both indirect
            bsf             STATUS, IRP     ; and direct addressing.
            bsf             STATUS, RP1
            bsf             STATUS, RP0
                endm ;**********************************************************************
RST         CODE            0x0             ; processor reset vector
            pagesel         main            ; jump to the location labelled
            goto            main            ; go to beginning of program PGM         CODE                            ; begining of the code section
main
            banksel         OPTION_REG
            bcf             OPTION_REG, T0CS ; T0 internal instr cycle, no scale ; Initialize A/D: ADFM = right just, ref = AVDD & AVSS, Chan 00-02 Analog
            banksel         ADCON1
            movlw           0x82            ; ADCON1 = 1000 0010
            movwf           ADCON1

; Initialize I/O ports
            banksel         TRISA
            clrf            TRISA           ; PORTA output
            comf            TRISA, 1        ; PORTA input
            banksel         TRISB
            clrf            TRISB           ; PORTB output
            banksel         PORTB
            clrf            PORTB           ; Initialize all pin values of port b to 0 banksel         TRISC
            movlw           0x10
            movwf           TRISC           ; PORTC output banksel         PORTC
            movlw           0xff            ; Initialize all pin values of port c to 1
            movwf           PORTC ; Initialize timers
            banksel         T1CON
            bcf             T1CON, TMR1CS   ; count source is instr cycle
            bsf             T1CON, TMR1ON   ; enable TMR1 banksel         TMR1H           ; clear TMR1
            clrf            TMR1H
            banksel         TMR1L
            clrf            TMR1L ; Initialize memory space
            call            clear           ; clear unshared GPRs
            call            delay1
            call            delay1
            call            delay1
            call            delay1
```

```
              call         delay1
start movlw        0x0C              ; 12 sample loop
              movwf        varj              ; loop increment variable loopj
              call         wait              ; .. until counter expires
              banksel      TMR1H
              clrf         TMR1H
              banksel      TMR1L
              clrf         TMR1L
              banksel      PORTC
              bcf          PORTC,2           ; output 0 at pin 1 of port c to give a start
signal
              bcf          PORTC,3
              NOP
              NOP
              NOP
              NOP
              NOP
              NOP
              NOP
              NOP
              NOP
              NOP
              NOP
              bsf          PORTC,2
              bsf          PORTC,3

; output 0 at pin 0 of port c to end the transmission
; read and store A/D for all channels in Yanew, etc
              call         readAD movlw        0x03              ; set count to update three phases
              movwf        vari loopi                                        ; For each channel ; change # movlw        Yanew
              movwf        FSR               ; FSR points to Yanew at 0xEA
              call         fsr2i             ; FSR = FSR + 2 * (3 - vari)

banksel      Yanew
              movf         INDF, 0           ; move new samples to dbl1
              movwf        dbl1              ; move low byte
              incf         FSR, 1
              movf         INDF, 0           ; move high byte
              movwf        dbl1+1            ; dbl1 = Yanew ; Calculate coefficients without substracting old samples.
              ; This leads to correct results every 12 iteretions.
              ; They will be used in eliminating accumulated errors.

movlw        Ysan
              movwf        FSR               ; FSR points to Ysan at 0x20
              call         fsr4i             ; FSR = FSR + 4 * (3 - vari)

banksel      Ysan
              movf         INDF, 0           ; move old Ysan to dbls
              movwf        dbls              ; move low byte
              incf         FSR, 1
              movf         INDF, 0           ; move high byte
```

```
        movwf       dbls+1      ; dbls = Yasn
        incf        FSR, 1
        movf        INDF, 0     ; move old Ycan to dblc
        movwf       dblc        ; move low byte
        incf        FSR, 1
        movf        INDF, 0     ; move high byte
        movwf       dblc+1      ; dblc = Yacn call        sccoeffs    ; sin and cos coeffs movf        dblc+1, 0   ; move dblc back to Ycan
        movwf       INDF        ; move high byte
        decf        FSR, 1
        movf        dblc, 0     ; move low byte
        movwf       INDF        ; Ycan = dblc
        decf        FSR, 1
        movf        dbls+1, 0   ; move dbls back to Ysan
        movwf       INDF        ; move high byte
        decf        FSR, 1
        movf        dbls, 0     ; move low byte
        movwf       INDF        ; Ysan = dbls ; Calculate coefficients using recersive method.
; Old samples will be substracted from the new ones.

movlw       Ya0
        movwf       FSR         ; FSR points to Ya0 at 0xA0
        call        fsr6j2i     ; FSR = FSR + 6 * (12 - varj) + 2 * (3 - vari)

banksel     Ya0
        movf        INDF, 0     ; move old samples to dbl2
        movwf       dbl2        ; move low byte
        movf        dbl1, 0     ; move new samples to replace old ones
        movwf       INDF        ; move low byte
        incf        FSR, 1
        movf        INDF, 0     ; move high byte
        movwf       dbl2+1      ; dbl2 = Ya0
        movf        dbl1+1, 0   ; move new samples to replace old ones
        movwf       INDF        ; move high byte call        invdbl2     ; dbl2 = -Ya0
        call        adddbl2to1  ; dbl1 = dbl1 + dbl2 = Yanew - Ya0 movlw       Ysa
        movwf       FSR         ; FSR points to Ysa at 0x30
        call        fsr4i       ; FSR = FSR + 4 * (3 - vari)

banksel     Ysa
        movf        INDF, 0     ; move old Ysa to dbls
        movwf       dbls        ; move low byte
        incf        FSR, 1
        movf        INDF, 0     ; move high byte
        movwf       dbls+1      ; dbls = Yas
        incf        FSR, 1
        movf        INDF, 0     ; move old Yca to dblc
        movwf       dblc        ; move low byte
        incf        FSR, 1
        movf        INDF, 0     ; move high byte
        movwf       dblc+1      ; dblc = Yac call        sccoeffs    ; sin and cos coeffs movf        dblc+1, 0   ; move dblc back to Yca
        movwf       INDF        ; move high byte
```

```
        decf      FSR, 1
        movf      dblc, 0     ; move low byte
        movwf     INDF        ; Yca = dblc
        decf      FSR, 1
        movf      dbls+1, 0   ; move dbls back to Ysa
        movwf     INDF        ; move high byte
        decf      FSR, 1
        movf      dbls, 0     ; move low byte
        movwf     INDF        ; Ysa = dbls decfsz    vari, 1
        goto      loopi       ; change channel # call      W2PB        ; output data via parallel communication decfsz    varj, 1
        goto      loopj       ; change window #

; Copy nonrecursive results to replace recursive results every 12 iteretions.
        movlw     0x0C        ; set count to update three phases each with
two bytes.
        movwf     vark movlw     Ysan
        movwf     FSR         ; FSR points to Ysan at 0x20 banksel   Ysan loopk movf      INDF, 0     ; move it to replace Ysa at 0x30
        movwf     var1        ; move it temperarily to var1
        clrf      INDF        ; clear Ysan
        movlw     0x10
        addwf     FSR, 1      ; FSR = FSR + 16
        movf      ar1, 0      ; move it from temperar place to destination
        movwf     INDF        ; Ysa = Ysan
        movlw     0x0F
        subwf     FSR, 1      ; FSR = FSR - 15
        decfsz    vark, 1
        goto      loopk clrwdt                ; clear watchdog timer goto      start       ; startover ;subroutines clear                         ; clear three times 80 Byte memory Bank2                 ; specify register bank 2
        movlw     0x50
        movwf     vari        ; var 1 is hex for 80 decimal
        movlw     0x20
        movwf     FSR         ; FSR points to first file register clrf      INDF        ; clear byte in address FSR
        incf      FSR, 1      ; increment address pointer
        decfsz    vari, 1
        goto      $-3

Bank1                 ; specify register bank 1
        movlw     0x50
        movwf     vari        ; var 1 is hex for 80 decimal
```

```
                movlw       0xA0
                movwf       FSR         ; FSR points to first file register clrf        INDF        ; clear byte in address FSR
                incf        FSR, 1      ; increment address pointer
                decfsz      vari, 1
                goto        $-3

Bank0                   ; specify register bank 0
                movlw       0x50
                movwf       vari        ; var 1 is hex for 80 decimal
                movlw       0x20
                movwf       FSR         ; FSR points to first file register clrf        INDF        ; clear byte in address FSR
                incf        FSR, 1      ; increment address pointer
                decfsz      vari, 1
                goto        $-3 clrf        dbls        ; clear shared sin and cos variables
                clrf        dbls+1
                clrf        dblc
                clrf        dblc+1 return wait                        ; 20 MHz oscillator, 5 MHz instruction execution speed
                            ; 1/720 second = 6944.44 = 6944 = 217 * 32 = 27*256 + 32
                            ; 27 dec = 0x1B , 32 dec = 0010 0000
                movlw       countH
                movwf       var1        ; var1 = countM
                banksel     TMR1H
                movf        TMR1H, 0
                subwf       var1, 1     ; subtract TMR1H (MSB) from var1  --> var1
                btfss       STATUS, Z   ; return (skip goto) if var1 = zero
                goto        wait ; previous equality test only works for TMR1H (MSB) because it
; remains constant for 256 instruction counter clock cycles
; Previous test will not work for TMR1L (LSB)

banksel     TMR1L
                btfss       TMR1L, 4    ; detect if TMR1L (LSB) > 16 dec
                goto        $-1

; Delay for 5 operations
                nop
                nop
                nop
                nop
                nop return readAD                      ;  read in samples, store in Yanew etc.
                movlw       0x03        ;  set count to read three phases
                movwf       vari
                movlw       Yanew       ; load FSR with address of Yanew
                movwf       FSR ; TAD = FOSC/32 , channel = 00 , GO = 0 , ADON = 1
                movlw       0x81        ; ADCON0 = 1000 0001 loopAD                                  ; For vari = 3, 2, 1  sample/hold convert
```

```
            banksel     ADCON0
            movwf       ADCON0      ; start sample (ADON = 1 always)

; Wait 3 TAD for acquisition;
; TAD = 8 instructions; (3+1) x 8 = 32 instr is fine
            banksel     TMR0
            clrf        TMR0
            btfss       TMR0, 5     ;   2^5 = 32
            goto        $-1 bsf         ADCON0, GO  ; start conversion
            btfsc       ADCON0, GO  ; poll for it to be cleared
            goto        $-1 banksel     ADRESL
            movf        ADRESL, 0
            banksel     Yanew
            movwf       INDF        ; low byte to low byte
            incf        FSR, 1      ; FSR points to same channel high byte banksel     ADRESH
            movf        ADRESH, 0
            banksel     Yanew
            movwf       INDF        ; high byte to high byte
            incf        FSR, 1      ; FSR points to next channel low byte banksel     ADCON0
            MOVF        ADCON0, 0   ; update A/D channel
            addlw       0x08        ; bit 3 is the LSB of channel select bits decfsz      vari, 1
            goto        loopAD return fsr6j2i                 ; makes FSR = FSR + 6 * (12 - varj) + 2 * (3 - vari)
            call        fsr2i       ; FSR = FSR + 2 * (3 - vari)
            movf        varj, 0     ; move varj to W
            sublw       0x0C        ; subtract W from 0x0C
            movwf       var1        ; var1 = 12 - varj
            bcf         STATUS, C
            rlf         var1, 1     ; var1 = 2 * (12 - varj)
            movf        var1, 0     ; W = 2 * (12 - varj)
            rlf         var1, 1     ; var1 = 4 * (12 - varj)
            addwf       var1, 0     ; W = 6 * (12 - varj)
            addwf       FSR, 1      ; FSR = FSR + 6 * (12 - varj) + 2 * (3 - vari)
            return fsr2i                   ; makes FSR = FSR + 2 * (3 - vari)
            movf        vari, 0     ; move vari to W
            sublw       0x03        ; subtract W from 0x03
            movwf       var1        ; var1 = 3 - vari
            bcf         STATUS, C
            rlf         var1, 1     ; var1 = 2 * (3 - vari)
            movf        var1, 0     ; move var1 to W
            addwf       FSR, 1      ; FSR = FSR + 2 * (3 - vari)
            return fsr4i                   ; makes FSR = FSR + 4 * (3 - vari)
            movf        vari, 0     ; move vari to W
            sublw       0x03        ; subtract W from 0x03
            movwf       var1        ; var1 = 3 - vari
            bcf         STATUS, C
            rlf         var1, 1     ; var1 = 2 * (3 - vari)
```

```
        rlf         var1, 1     ; var1 = 4 * (3 - vari)
        movf        var1, 0     ; move var1 to W
        addwf       FSR, 1      ; FSR = FSR + 4 * (3 - vari)
        return invdbl2                         ; performs twos complement negative of dbl2
; ones complement
        comf        dbl2, 1     ; complement low byte
        comf        dbl2+1, 1   ; complement high byte
; increment two-byte number var01
        movlw       0x01
        addwf       dbl2, 1     ; low byte + 1
        btfsc       STATUS, C
        incf        dbl2+1, 1   ; increment high byte if carry
        return adddbl2to1                      ; performs dbl1 = dbl1 + dbl2
        movf        dbl2, 0     ; move low byte of dbl2 to W
        addwf       dbl1, 1     ; add W and low byte of dbl1, result in dbl1
        btfsc       STATUS, C
        incf        dbl1+1, 1   ; increment high byte of dbl1 if carry
        movf        dbl2+1, 0   ; move high byte of dbl2 to W
        addwf       dbl1+1, 1   ; add W and high byte of dbl2, result in dbl1
        return sccoeffs                        ; calculate sin and cos coefficients
        movf        varj, 0     ; move varj to W
        sublw       0x0C        ; subtract W from 0x0C
        movwf       vark        ; vark = 12 - varj, the window index btfss       vark, 3     ; Check bit 3
        call        sc0to7      ; coeffs 0-7 if clear
        btfsc       vark, 3
        call        sc8to11     ; coeffs 8-11 if set
        return sc0to7                          ; calculate coefficients for Y0 to Y7
        btfss       vark, 2     ; Check bit 2
        call        sc0to3      ; coeffs 0-3 if clear
        btfsc       vark, 2
        call        sc4to7      ; coeffs 4-7 if set
        return sc0to3                          ; calculate coefficients for Y0 to Y3
        btfss       vark, 1     ; Check bit 1
        call        sc0to1      ; coeffs 0-1 if clear
        btfsc       vark, 1
        call        sc2to3      ; coeffs 2-3 if set
        return sc4to7                          ; calculate coefficients for Y4 to Y7
        btfss       vark, 1     ; Check bit 1
        call        sc4to5      ; coeffs 4-5 if clear
        btfsc       vark, 1
        call        sc6to7      ; coeffs 6-7 if set
        return sc8to11                         ; calculate coefficients for Y8 to Y11
        btfss       vark, 1     ; Check bit 1
        call        sc8to9      ; coeffs 8-9 if clear
        btfsc       vark, 1
        call        sc10to11    ; coeffs 10-11 if set
        return
```

```
sc0to1                                  ; calculate coefficients for Y0 to Y1
        btfss       vark, 0             ; Check bit 0
        call        sc0                 ; coeff 0 if clear
        btfsc       vark, 0
        call        sc1                 ; coeff 1 if set
        return sc2to3                                  ; calculate coefficients for Y2 to Y3
        btfss       vark, 0             ; Check bit 0
        call        sc2                 ; coeff 2 if clear
        btfsc       vark, 0
        call        sc3                 ; coeff 3 if set
        return sc4to5                                  ; calculate coefficients for Y4 to Y5
        btfss       vark, 0             ; Check bit 0
        call        sc4                 ; coeff 4 if clear
        btfsc       vark, 0
        call        sc5                 ; coeff 5 if set
        return sc6to7                                  ; calculate coefficients for Y6 to Y7
        btfss       vark, 0             ; Check bit 0
        call        sc6                 ; coeff 6 if clear
        btfsc       vark, 0
        call        sc7                 ; coeff 7 if set
        return sc8to9                                  ; calculate coefficients for Y8 to Y9
        btfss       vark, 0             ; Check bit 0
        call        sc8                 ; coeff 8 if clear
        btfsc       vark, 0
        call        sc9                 ; coeff 9 if set
        return sc10to11                                ; calculate coefficients for Y10 to Y11
        btfss       vark, 0             ; Check bit 0
        call        sc10                ; coeff 10 if clear
        btfsc       vark, 0
        call        sc11                ; coeff 11 if set
        return sc0                                     ; calculate Y0's coefficients: 0, 1

; sin coeff is 0
                                        ; dbls = dbls
                                        ; Ysa = Ysa + (Yanew - Ya0) * 0

; cos coeff is 1
        call        movdbl1to2          ; dbl2 = Yanew - Ya0
        call        adddbl2toc          ; dblc = dblc + dbl2
        return                          ; Yca = Yca + (Yanew - Ya0) * 1 sc1                                     ; calculate Y1's coefficients: 0.5, 0.866

; sin coeff is 0.5
        call        movdbl1to2          ; dbl2 = Yanew - Ya1
        call        dbl2_half           ; dbl2 = (Yanew - Ya1) * 0.5
        call        adddbl2tos          ; Ysa = Ysa + (Yanew - Ya1) * 0.5

; cos coeff is 0.866
        call        movdbl1to2          ; dbl2 = Yanew - Ya1
        call        dbl2_866            ; dbl2 = (Yanew - Ya1) * 0.866
        call        adddbl2toc          ; dblc = dblc + dbl2
```

```
          return              ; Yca = Yca + (Yanew - Ya1) * 0.866 sc2                           ; calculate Y2's coefficients: 0.866, 0.5

; sin coeff is 0.866
          call    movdbl1to2  ; dbl2 = Yanew - Ya2
          call    dbl2_866    ; dbl2 = (Yanew - Ya2) * 0.866
          call    adddbl2tos  ; Ysa = Ysa + (Yanew - Ya2) * 0.866

; cos coeff is 0.5
          call    movdbl1to2  ; dbl2 = Yanew - Ya2
          call    dbl2_half   ; dbl2 = (Yanew - Ya2) * 0.5
          call    adddbl2toc  ; dblc = dblc + dbl2
          return              ; Yca = Yca + (Yanew - Ya2) * 0.5 sc3                           ; calculate Y3's coefficients: 1, 0

; sin coeff is 1
          call    movdbl1to2  ; dbl2 = Yanew - Ya3
          call    adddbl2tos  ; Ysa = Ysa + (Yanew - Ya3) * 1

; cos coeff is 0
                              ; dblc = dblc
          return              ; Yca = Yca + (Yanew - Ya3) * 0 sc4                           ; calculate Y4's coefficients: 0.866, - 0.5

; sin coeff is 0.866
          call    movdbl1to2  ; dbl2 = Yanew - Ya4
          call    dbl2_866    ; dbl2 = (Yanew - Ya4) * 0.866
          call    adddbl2tos  ; Ysa = Ysa + (Yanew - Ya4) * 0.866

; cos coeff is - 0.5
          call    movdbl1to2  ; dbl2 = Yanew - Ya4
          call    invdbl2     ; dbl2 = - (Yanew - Ya4)
          call    dbl2_half   ; dbl2 = - (Yanew - Ya4) * 0.5
          call    adddbl2toc  ; dblc = dblc + dbl2
          return              ; Yca = Yca - (Yanew - Ya4) * 0.5 sc5                           ; calculate Y5's coefficients: 0.5, - 0.866

; sin coeff is 0.5
          call    movdbl1to2  ; dbl2 = Yanew - Ya5
          call    dbl2_half   ; dbl2 = (Yanew - Ya5) * 0.5
          call    adddbl2tos  ; Ysa = Ysa + (Yanew - Ya5) * 0.5

; cos coeff is - 0.866
          call    movdbl1to2  ; dbl2 = Yanew - Ya5
          call    invdbl2     ; dbl2 = - (Yanew - Ya5)
          call    dbl2_866    ; dbl2 = - (Yanew - Ya5) * 0.866
          call    adddbl2toc  ; dblc = dblc + dbl2
          return              ; Yca = Yca - (Yanew - Ya5) * 0.866 sc6                           ; calculate Y6's coefficients: 0, - 1

; sin coeff is 0
                              ; dbls = dbls
                              ; Ysa = Ysa + (Yanew - Ya6) * 0

; cos coeff is - 1
          call    movdbl1to2  ; dbl2 = Yanew - Ya6
          call    invdbl2     ; dbl2 = - (Yanew - Ya6)
          call    adddbl2toc  ; dblc = dblc + dbl2
          return              ; Yca = Yca - (Yanew - Ya6) * 1
```

```
sc7                                     ; calculate Y7's coefficients: - 0.5, - 0.866
; sin coeff is - 0.5
        call        movdbl1to2          ; dbl2 = Yanew - Ya7
        call        invdbl2             ; dbl2 = - (Yanew - Ya7)
        call        dbl2_half           ; dbl2 = - (Yanew - Ya7) * 0.5
        call        adddbl2tos          ; Ysa = Ysa - (Yanew - Ya7) * 0.5
; cos coeff is - 0.866
        call        movdbl1to2          ; dbl2 = Yanew - Ya7
        call        invdbl2             ; dbl2 = - (Yanew - Ya7)
        call        dbl2_866            ; dbl2 = - (Yanew - Ya7) * 0.866
        call        adddbl2toc          ; dblc = dblc + dbl2
        return                          ; Yca = Yca - (Yanew - Ya7) * 0.866 sc8                                     ; calculate Y8's coefficients: - 0.866, - 0.5
; sin coeff is - 0.866
        call        movdbl1to2          ; dbl2 = Yanew - Ya8
        call        invdbl2             ; dbl2 = - (Yanew - Ya8)
        call        dbl2_866            ; dbl2 = - (Yanew - Ya8) * 0.866
        call        adddbl2tos          ; Ysa = Ysa - (Yanew - Ya8) * 0.866
; cos coeff is - 0.5
        call        movdbl1to2          ; dbl2 = Yanew - Ya8
        call        invdbl2             ; dbl2 = - (Yanew - Ya8)
        call        dbl2_half           ; dbl2 = - (Yanew - Ya8) * 0.5
        call        adddbl2toc          ; dblc = dblc + dbl8
        return                          ; Yca = Yca - (Yanew - Ya8) * 0.5 sc9                                     ; calculate Y9's coefficients: - 1, 0
; sin coeff is - 1
        call        movdbl1to2          ; dbl2 = Yanew - Ya9
        call        invdbl2             ; dbl2 = - (Yanew - Ya9)
        call        adddbl2tos          ; Ysa = Ysa - (Yanew - Ya9) * 1
; cos coeff is 0
                                        ; dblc = dblc
        return                          ; Yca = Yca + (Yanew - Ya9) * 0 sc10                                    ; calculate Y10's coefficients: - 0.866, 0.5
; sin coeff is - 0.866
        call        movdbl1to2          ; dbl2 = Yanew - Ya10
        call        invdbl2             ; dbl2 = - (Yanew - Ya10)
        call        dbl2_866            ; dbl2 = - (Yanew - Ya10) * 0.866
        call        adddbl2tos          ; Ysa = Ysa - (Yanew - Ya10) * 0.866
; cos coeff is 0.5
        call        movdbl1to2          ; dbl2 = Yanew - Ya10
        call        dbl2_half           ; dbl2 = (Yanew - Ya10) * 0.5
        call        adddbl2toc          ; dblc = dblc + dbl2
        return                          ; Yca = Yca + (Yanew - Ya10) * 0.5 sc11                                    ; calculate Y11's coefficients: - 0.5, 0.866
; sin coeff is - 0.5
        call        movdbl1to2          ; dbl2 = Yanew - Ya11
        call        invdbl2             ; dbl2 = - (Yanew - Ya11)
        call        dbl2_half           ; dbl2 = - (Yanew - Ya11) * 0.5
        call        adddbl2tos          ; Ysa = Ysa - (Yanew - Ya11) * 0.5
```

```
; cos coeff is 0.866
        call        movdbl1to2     ; dbl2 = Yanew - Ya11
        call        dbl2_866       ; dbl2 = (Yanew - Ya11) * 0.866
        call        adddbl2toc     ; dblc = dblc + dbl2
        return                     ; Yca = Yca + (Yanew - Ya11) * 0.866 movdbl1to2                         ; copy dbl1 to dbl2
        movf        dbl1, 0
        movwf       dbl2
        movf        dbl1+1, 0
        movwf       dbl2+1
        return adddbl2toc                         ; performs dblc = dblc + dbl2
        movf        dbl2, 0        ; move low byte of dbl2 to W
        addwf       dblc, 1        ; add W and low byte of dblc, result in dblc
        btfsc       STATUS, C
        incf        dblc+1, 1      ; increment high byte of dblc if carry
        movf        dbl2+1, 0      ; move high byte of dbl2 to W
        addwf       dblc+1, 1      ; add W and high byte of dblc, result in dblc
        return adddbl2tos                         ; performs dbls = dbls + dbl2
        movf        dbl2, 0        ; move low byte of dbl2 to W
        addwf       dbls, 1        ; add W and low byte of dbls, result in dbls
        btfsc       STATUS, C
        incf        dbls+1, 1      ; increment high byte of dbls if carry
        movf        dbl2+1, 0      ; move high byte of dbl2 to W
        addwf       dbls+1, 1      ; add W and high byte of dbls, result in dbls
        return dbl2_half                          ; performs dbl2 = dbl2 * 0.5
        btfss       dbl2+1, 7      ; check MSB of dbl2
        call        dbl2_rr        ; right rotate if positive
        btfss       dbl2+1, 7
        return                     ; positive return
        call        invdbl2        ; inverse dbl2 to positive
        call        dbl2_rr        ; right rotate
        call        invdbl2        ; inverse dbl2 back to negative
        return                     ; negative return dbl2_rr                            ; right rotate dbl2
        bcf         STATUS, C      ; clear carry
        rrf         dbl2+1, 1      ; rotate right high byte via carry
        rrf         dbl2, 1        ; rotate right low byte via carry
        return dbl2_866                           ; performs dbl2 = dbl2 *0.866
        clrf        dbl3           ; dbl3 acts as an accumulator
        clrf        dbl3+1
        call        dbl2_half      ; get dbl2 / 2
        call        adddbl2to3     ; add it to the accumulator
        call        dbl2_half      ; get dbl2 / 4
        call        adddbl2to3     ; add it to the accumulator
        call        dbl2_half      ; get dbl2 / 8
        call        adddbl2to3     ; add it to the accumulator
        call        dbl2_half      ; get dbl2 / 16
        call        dbl2_half      ; get dbl2 / 32
        call        dbl2_half      ; get dbl2 / 64
        call        dbl2_half      ; get dbl2 / 128
        call        invdbl2        ; get - dbl2 / 128
        call        adddbl2to3     ; add it to the accumulator
        call        dbl2_half      ; get - dbl2 / 256
        call        dbl2_half      ; get - dbl2 / 512
```

```
        call      dbl2_half     ; get - dbl2 / 1024
        call      adddbl2to3    ; add it to the accumulator
        call      movdbl3to2    ; dbl2 = dbl2 * 0.866
        return adddbl2to3                      ; performs dbl3 = dbl3 + dbl2
        movf      dbl2, 0       ; move low byte of dbl2 to W
        addwf     dbl3, 1       ; add W and low byte of dbl3, result in dbl3
        btfsc     STATUS, C
        incf      dbl3+1, 1     ; increment high byte of dbl3 if carry
        movf      dbl2+1, 0     ; move high byte of dbl2 to W
        addwf     dbl3+1, 1     ; add W and high byte of dbl3, result in dbl3
        return movdbl3to2                      ; copy dbl3 to dbl2
        movf      dbl3, 0
        movwf     dbl2
        movf      dbl3+1, 0
        movwf     dbl2+1
        return W2PB                            ; do parallel communication ; Transmit sin and cos coefficients of all three phases
        movlw     0x0C          ; set count to read 12 bytes
        movwf     vari
        movlw     Ysa           ; load FSR with address of Ysa
        movwf     FSR ; Signal to indicate the start of transmisson loop_coef
        banksel   Ysa
        movf      INDF, 0       ; move one byte to W
        banksel   PORTB
        movwf     PORTB         ; move it to port b
        incf      FSR, 1
        NOP
        NOP                     ; increment FSR
        banksel   PORTC
        bcf       PORTC, 0 ; output 0 at pin 0 of port c to give a start
signal
        bcf       PORTC,1   ;output 0 at pin 1 of port c to give a start
signal
        NOP
        NOP
        NOP
        NOP
        bsf       PORTC, 1 ; output 0 at pin 0 of port c to end the
transmission
        bsf       PORTC,0
        call      delay
        decfsz    vari, 1
        goto      loop_coef
        ; clrf    PORTB
        return delay
        movlw     0x09
        movwf     var3
loop1   NOP
        decfsz    var3,1        ;Subtract 1
        goto      loop1
        return
```

```
; 12 samples in Bank 1: 0xA0 to 0xE7
        cblock 0xA0
                Ya0:2       ; Y0 for phase A occupies 2 bytes
                Yb0:2       ; Y0 for phase B occupies 2 bytes
                Yc0:2       ; Y0 for phase C occupies 2 bytes
                Ya1:2       ; Y1 for phase A occupies 2 bytes
                Yb1:2       ; Y1 for phase B occupies 2 bytes
                Yc1:2       ; Y1 for phase C occupies 2 bytes
                Ya2:2       ; Y2 for phase A occupies 2 bytes
                Yb2:2       ; Y2 for phase B occupies 2 bytes
                Yc2:2       ; Y2 for phase C occupies 2 bytes
                Ya3:2       ; Y3 for phase A occupies 2 bytes
                Yb3:2       ; Y3 for phase B occupies 2 bytes
                Yc3:2       ; Y3 for phase C occupies 2 bytes
                Ya4:2       ; Y4 for phase A occupies 2 bytes
                Yb4:2       ; Y4 for phase B occupies 2 bytes
                Yc4:2       ; Y4 for phase C occupies 2 bytes
                Ya5:2       ; Y5 for phase A occupies 2 bytes
                Yb5:2       ; Y5 for phase B occupies 2 bytes
                Yc5:2       ; Y5 for phase C occupies 2 bytes
                Ya6:2       ; Y6 for phase A occupies 2 bytes
                Yb6:2       ; Y6 for phase B occupies 2 bytes
                Yc6:2       ; Y6 for phase C occupies 2 bytes
                Ya7:2       ; Y7 for phase A occupies 2 bytes
                Yb7:2       ; Y7 for phase B occupies 2 bytes
                Yc7:2       ; Y7 for phase C occupies 2 bytes
                Ya8:2       ; Y8 for phase A occupies 2 bytes
                Yb8:2       ; Y8 for phase B occupies 2 bytes
                Yc8:2       ; Y8 for phase C occupies 2 bytes
                Ya9:2       ; Y9 for phase A occupies 2 bytes
                Yb9:2       ; Y9 for phase B occupies 2 bytes
                Yc9:2       ; Y9 for phase C occupies 2 bytes
                Ya10:2      ; Y10 for phase A occupies 2 bytes
                Yb10:2      ; Y10 for phase B occupies 2 bytes
                Yc10:2      ; Y10 for phase C occupies 2 bytes
                Ya11:2      ; Y11 for phase A occupies 2 bytes
                Yb11:2      ; Y11 for phase B occupies 2 bytes
                Yc11:2      ; Y11 for phase C occupies 2 bytes
        endc ; New samples in Bank 1: 0xEA to 0xEF
        cblock 0xEA
                Yanew:2     ; Yanew occupies 2 bytes
                Ybnew:2     ; Ybnew occupies 2 bytes
                Ycnew:2     ; Ycnew occupies 2 bytes
        endc ; transient monitor in Bank 2: 0x20 to 0x6F ; specify amount to wait before next A/D
countH  equ     0x1B        ; should be 27 dec = 0x1B ;

;***** MACRO DEFINATIONS

Bank0   MACRO               ; Select bank 0 for both indirect
        bcf     STATUS, IRP ; and direct addressing.
        bcf     STATUS, RP1
        bcf     STATUS, RP0
        endm Bank1   MACRO               ; Select bank 1 for both indirect
        bcf     STATUS, IRP ; and direct addressing.
        bcf     STATUS, RP1
        bsf     STATUS, RP0
```

```
                endm

Bank2   MACRO                   ; Select bank 2 for both indirect
        bsf     STATUS, IRP     ; and direct addressing.
        bsf     STATUS, RP1
        bcf     STATUS, RP0
        endm Bank3   MACRO                   ; Select bank 3 for both indirect
        bsf     STATUS, IRP     ; and direct addressing.
        bsf     STATUS, RP1
        bsf     STATUS, RP0
        endm ;************************************************************************
RST     CODE    0x0             ; processor reset vector
        pagesel main            ; jump to the location labelled
        goto    main            ; go to beginning of program PGM     CODE                    ; begining of the code section
main
        banksel OPTION_REG
        bcf     OPTION_REG, T0CS ; T0 internal instr cycle, no scale ; Initialize A/D: ADFM = right just, ref = AVDD & AVSS, Chan 00-02 Analog
        banksel ADCON1
        movlw   0x82            ; ADCON1 = 1000 0010
        movwf   ADCON1

; Initialize I/O ports
        banksel TRISA
        clrf    TRISA           ; PORTA output
        comf    TRISA, 1        ; PORTA input
        banksel TRISB
        clrf    TRISB           ; PORTB output
        banksel PORTB
        clrf    PORTB           ; Initialize all pin values of port b to 0 banksel TRISC
        movlw   0x04
        movwf   TRISC           ; PORTC output except pin 3.

banksel PORTC
        movlw   0xFF            ; Initialize all pin values of port c to 0
        movwf   PORTC ; Initialize timers
        banksel T1CON
        bcf     T1CON, TMR1CS   ; count source is instr cycle
        bsf     T1CON, TMR1ON   ; enable TMR1 banksel TMR1H           ; clear TMR1
        clrf    TMR1H
        banksel TMR1L
        clrf    TMR1L ;       banksel PORTC
;       NOP
;               NOP
;               btfsc       PORTC,2
;               goto        $-1
;               NOP
;               NOP
; Initialize memory space
```

```
        call    clear                   ; clear unshared GPRs
            call delay1
            call delay1 start movlw   0x0C                    ; 12 sample loop
        movwf   varj                    ; loop increment
variable loopj ;       call    wait                    ; .. until counter
expires
;       banksel TMR1H
;       clrf    TMR1H
;       banksel TMR1L
;       clrf    TMR1L ; output 0 at pin 0 of port c to end the transmission
; read and store A/D for all channels in Yanew, etc
        banksel PORTC
        NOP
        NOP
        btfsc   PORTC,2
        goto    $-1
        NOP
        NOP call    readAD movlw   0x03    ;   set count to update three phases
        movwf   vari loopi                           ; For each channel ; change # movlw   Yanew
        movwf   FSR     ; FSR points to Yanew at 0xEA
        call    fsr2i   ; FSR = FSR + 2 * (3 - vari)

banksel Yanew
        movf    INDF, 0  ; move new samples to dbl1
        movwf   dbl1     ; move low byte
        incf    FSR, 1
        movf    INDF, 0  ; move high byte
        movwf   dbl1+1   ; dbl1 = Yanew ; Calculate coefficients without substracting old samples.
        ; This leads to correct results every 12 iterations.
        ; They will be used in eliminating accumulated errors.

movlw   Ysan
        movwf   FSR     ; FSR points to Ysan at 0x20
        call    fsr4i   ; FSR = FSR + 4 * (3 - vari)

banksel Ysan
        movf    INDF, 0  ; move old Ysan to dbls
        movwf   dbls     ; move low byte
        incf    FSR, 1
        movf    INDF, 0  ; move high byte
        movwf   dbls+1   ; dbls = Yasn
        incf    FSR, 1
        movf    INDF, 0  ; move old Ycan to dblc
```

```
movwf       dblc        ; move low byte
incf        FSR, 1
movf        INDF, 0     ; move high byte
movwf       dblc+1      ; dblc = Yacn call        sccoeffs    ; sin and cos coeffs movf        dblc+1, 0   ; move dblc back to Ycan
movwf       INDF        ; move high byte
decf        FSR, 1
movf        dblc, 0     ; move low byte
movwf       INDF        ; Ycan = dblc
decf        FSR, 1
movf        dbls+1, 0   ; move dbls back to Ysan
movwf       INDF        ; move high byte
decf        FSR, 1
movf        dbls, 0     ; move low byte
movwf       INDF        ; Ysan = dbls ; Calculate coefficients using recursive method.
; Old samples will be substracted from the new ones.

movlw       Ya0
movwf       FSR         ; FSR points to Ya0 at 0xA0
call        fsr6j2i     ; FSR = FSR + 6 * (12 - varj) + 2 * (3 - vari)

banksel     Ya0
movf        INDF, 0     ; move old samples to dbl2
movwf       dbl2        ; move low byte
movf        dbl1, 0     ; move new samples to replace old ones
movwf       INDF        ; move low byte
incf        FSR, 1
movf        INDF, 0     ; move high byte
movwf       dbl2+1      ; dbl2 = Ya0
movf        dbl1+1, 0   ; move new samples to replace old ones
movwf       INDF        ; move high byte call        invdbl2     ; dbl2 = -Ya0
call        adddbl2to1  ; dbl1 = dbl1 + dbl2 = Yanew - Ya0 movlw       Ysa
movwf       FSR         ; FSR points to Ysa at 0x30
call        fsr4i       ; FSR = FSR + 4 * (3 - vari)

banksel     Ysa
movf        INDF, 0     ; move old Ysa to dbls
movwf       dbls        ; move low byte
incf        FSR, 1
movf        INDF, 0     ; move high byte
movwf       dbls+1      ; dbls = Yas
incf        FSR, 1
movf        INDF, 0     ; move old Yca to dblc
movwf       dblc        ; move low byte
incf        FSR, 1
movf        INDF, 0     ; move high byte
movwf       dblc+1      ; dblc = Yac call        sccoeffs    ; sin and cos coeffs movf        dblc+1, 0   ; move dblc back to Yca
movwf       INDF        ; move high byte
decf        FSR, 1
movf        dblc, 0     ; move low byte
movwf       INDF        ; Yca = dblc
```

```
        decf      FSR, 1
        movf      dbls+1, 0    ; move dbls back to Ysa
        movwf     INDF         ; move high byte
        decf      FSR, 1
        movf      dbls, 0      ; move low byte
        movwf     INDF         ; Ysa = dbls decfsz    vari, 1
        goto      loopi        ; change channel # call      W2PB         ; output data via parallel communication decfsz    varj, 1
        goto      loopj        ; change window #

; Copy nonrecursive results to replace recursive results every 12 iteretions.
        movlw     0x0C ;  set count to update three phases each with two
bytes.
        movwf     vark movlw     Ysan
        movwf     FSR  ; FSR points to Ysan at 0x20 banksel   Ysan loopk
        movf      INDF, 0      ; move it to replace Ysa at 0x30
        movwf     var1         ; move it temperarily to var1
        clrf      INDF         ; clear Ysan
        movlw     0x10
        addwf     FSR, 1       ; FSR = FSR + 16
        movf      var1, 0      ; move it from temperar place to destination
        movwf     INDF         ; Ysa = Ysan
        movlw     0x0F
        subwf     FSR, 1       ; FSR = FSR - 15
        decfsz    vark, 1
        goto      loopk clrwdt                 ; clear watchdog timer goto      start        ; startover ;subroutines clear                          ; clear three times 80 Byte memory Bank2                  ; specify register bank 2
        movlw     0x50
        movwf     vari         ; var 1 is hex for 80 decimal
        movlw     0x20
        movwf     FSR          ; FSR points to first file register clrf      INDF         ; clear byte in address FSR
        incf      FSR, 1       ; increment address pointer
        decfsz    vari, 1
        goto      $-3

Bank1                  ; specify register bank 1
        movlw     0x50
        movwf     vari         ; var 1 is hex for 80 decimal
        movlw     0xA0
        movwf     FSR          ; FSR points to first file register
```

```
            clrf       INDF          ; clear byte in address FSR
            incf       FSR, 1        ; increment address pointer
            decfsz     vari, 1
            goto       $-3

Bank0                    ; specify register bank 0
            movlw      0x50
            movwf      vari          ; var 1 is hex for 80 decimal
            movlw      0x20
            movwf      FSR           ; FSR points to first file register clrf       INDF          ; clear byte in address FSR
            incf       FSR, 1        ; increment address pointer
            decfsz     vari, 1
            goto       $-3 clrf       dbls          ; clear shared sin and cos variables
            clrf       dbls+1
            clrf       dblc
            clrf       dblc+1 return wait                   ; 20 MHz oscillator, 5 MHz instruction execution speed
                       ; 1/720 second = 6944.44 = 6944 = 217 * 32 = 27*256 + 32
                       ; 27 dec = 0x1B , 32 dec = 0010 0000
            movlw      countH
            movwf      var1          ; var1 = countM
            banksel    TMR1H
            movf       TMR1H, 0
            subwf      var1, 1       ; subtract TMR1H (MSB) from var1 --> var1
            btfss      STATUS, Z     ; return (skip goto) if var1 = zero
            goto       wait ; previous equality test only works for TMR1H (MSB) because it
; remains constant for 256 instruction counter clock cycles
; Previous test will not work for TMR1L (LSB)

banksel    TMR1L
            btfss      TMR1L, 4      ; detect if TMR1L (LSB) > 16 dec
            goto       $-1

; Delay for 5 operations
            nop
            nop
            nop
            nop
            nop return readAD                               ; read in samples, store in Yanew etc.

movlw      0x03          ; set count to read three phases
            movwf      vari
            movlw      Yanew         ; load FSR with address of Yanew
            movwf      FSR ; TAD = FOSC/32 , channel = 00 , GO = 0 , ADON = 1
            movlw      0x81          ; ADCON0 = 1000 0001 loopAD                               ; For vari = 3, 2, 1  sample/hold convert
            banksel    ADCON0
            movwf      ADCON0        ; start sample (ADON = 1 always)
```

```
;   Wait 3 TAD for acquisition;
;   TAD = 8 instructions;   (3+1) x 8 = 32 instr is fine
        banksel     TMR0
        clrf        TMR0
        btfss       TMR0, 5     ;   2^5 = 32
        goto        $-1 bsf         ADCON0, GO  ; start conversion
        btfsc       ADCON0, GO  ; poll for it to be cleared
        goto        $-1 banksel     ADRESL
        movf        ADRESL, 0
        banksel     Yanew
        movwf       INDF        ; low byte to low byte
        incf        FSR, 1      ; FSR points to same channel high byte banksel     ADRESH
        movf        ADRESH, 0
        banksel     Yanew
        movwf       INDF        ; high byte to high byte
        incf        FSR, 1      ; FSR points to next channel low byte banksel     ADCON0
        MOVF        ADCON0, 0   ; update A/D channel
        addlw       0x08        ; bit 3 is the LSB of channel select bits decfsz      vari, 1
        goto        loopAD return fsr6j2i                         ; makes FSR = FSR + 6 * (12 - varj) + 2 * (3
- vari)
        call        fsr2i       ; FSR = FSR + 2 * (3 - vari)
        movf        varj, 0     ; move varj to W
        sublw       0x0C        ; subtract W from 0x0C
        movwf       var1        ; var1 = 12 - varj
        bcf         STATUS, C
        rlf         var1, 1     ; var1 = 2 * (12 - varj)
        movf        var1, 0     ; W = 2 * (12 - varj)
        rlf         var1, 1     ; var1 = 4 * (12 - varj)
        addwf       var1, 0     ; W = 6 * (12 - varj)
        addwf       FSR, 1      ; FSR = FSR + 6 * (12 - varj) + 2 * (3 -
vari)
        return fsr2i                           ; makes FSR = FSR + 2 * (3 - vari)
        movf        vari, 0     ; move vari to W
        sublw       0x03        ; subtract W from 0x03
        movwf       var1        ; var1 = 3 - vari
        bcf         STATUS, C
        rlf         var1, 1     ; var1 = 2 * (3 - vari)
        movf        var1, 0     ; move var1 to W
        addwf       FSR, 1      ; FSR = FSR + 2 * (3 - vari)
        return fsr4i                           ; makes FSR = FSR + 4 * (3 - vari)
        movf        vari, 0     ; move vari to W
        sublw       0x03        ; subtract W from 0x03
        movwf       var1        ; var1 = 3 - vari
        bcf         STATUS, C
        rlf         var1, 1     ; var1 = 2 * (3 - vari)
```

```
              rlf       var1, 1      ; var1 = 4 * (3 - vari)
              movf      var1, 0      ; move var1 to W
              addwf     FSR, 1       ; FSR = FSR + 4 * (3 - vari)
              return invdbl2                              ; performs twos complement negative of dbl2
; ones complement
              comf      dbl2, 1      ; complement low byte
              comf      dbl2+1, 1    ; complement high byte
; increment two-byte number var01
              movlw     0x01
              addwf     dbl2, 1      ; low byte + 1
              btfsc     STATUS, C
              incf      dbl2+1, 1    ; increment high byte if carry
              return adddbl2to1                           ; performs dbl1 = dbl1 + dbl2
              movf      dbl2, 0      ; move low byte of dbl2 to W
              addwf     dbl1, 1      ; add W and low byte of dbl1, result in dbl1
              btfsc     STATUS, C
              incf      dbl1+1, 1    ; increment high byte of dbl1 if carry
              movf      dbl2+1, 0    ; move high byte of dbl2 to W
              addwf     dbl1+1, 1    ; add W and high byte of dbl2, result in dbl1
              return sccoeffs                             ; calculate sin and cos coefficients
              movf      varj, 0      ; move varj to W
              sublw     0x0C         ; subtract W from 0x0C
              movwf     vark         ; vark = 12 - varj, the window index btfss     vark, 3      ; Check bit 3
              call      sc0to7       ; coeffs 0-7 if clear
              btfsc     vark, 3
              call      sc8to11      ; coeffs 8-11 if set
              return sc0to7                               ; calculate coefficients for Y0 to Y7
              btfss     vark, 2      ; Check bit 2
              call      sc0to3       ; coeffs 0-3 if clear
              btfsc     vark, 2
              call      sc4to7       ; coeffs 4-7 if set
              return sc0to3                               ; calculate coefficients for Y0 to Y3
              btfss     vark, 1      ; Check bit 1
              call      sc0to1       ; coeffs 0-1 if clear
              btfsc     vark, 1
              call      sc2to3       ; coeffs 2-3 if set
              return sc4to7                               ; calculate coefficients for Y4 to Y7
              btfss     vark, 1      ; Check bit 1
              call      sc4to5       ; coeffs 4-5 if clear
              btfsc     vark, 1
              call      sc6to7       ; coeffs 6-7 if set
              return sc8to11                              ; calculate coefficients for Y8 to Y11
              btfss     vark, 1      ; Check bit 1
              call      sc8to9       ; coeffs 8-9 if clear
              btfsc     vark, 1
              call      sc10to11     ; coeffs 10-11 if set
              return
```

```
sc0to1                                  ; calculate coefficients for Y0 to Y1
        btfss       vark, 0             ; Check bit 0
        call        sc0                 ; coeff 0 if clear
        btfsc       vark, 0
        call        sc1                 ; coeff 1 if set
        return sc2to3                                  ; calculate coefficients for Y2 to Y3
        btfss       vark, 0             ; Check bit 0
        call        sc2                 ; coeff 2 if clear
        btfsc       vark, 0
        call        sc3                 ; coeff 3 if set
        return sc4to5                                  ; calculate coefficients for Y4 to Y5
        btfss       vark, 0             ; Check bit 0
        call        sc4                 ; coeff 4 if clear
        btfsc       vark, 0
        call        sc5                 ; coeff 5 if set
        return sc6to7                                  ; calculate coefficients for Y6 to Y7
        btfss       vark, 0             ; Check bit 0
        call        sc6                 ; coeff 6 if clear
        btfsc       vark, 0
        call        sc7                 ; coeff 7 if set
        return sc8to9                                  ; calculate coefficients for Y8 to Y9
        btfss       vark, 0             ; Check bit 0
        call        sc8                 ; coeff 8 if clear
        btfsc       vark, 0
        call        sc9                 ; coeff 9 if set
        return sc10to11                                ; calculate coefficients for Y10 to Y11
        btfss       vark, 0             ; Check bit 0
        call        sc10                ; coeff 10 if clear
        btfsc       vark, 0
        call        sc11                ; coeff 11 if set
        return sc0                                     ; calculate Y0's coefficients: 0, 1

; sin coeff is 0
                                        ; dbls = dbls
                                        ; Ysa = Ysa + (Yanew - Ya0) * 0

; cos coeff is 1
        call        movdbl1to2          ; dbl2 = Yanew - Ya0
        call        adddbl2toc          ; dblc = dblc + dbl2
        return                          ; Yca = Yca + (Yanew - Ya0) * 1 sc1                                     ; calculate Y1's coefficients: 0.5, 0.866

; sin coeff is 0.5
        call        movdbl1to2          ; dbl2 = Yanew - Ya1
        call        dbl2_half           ; dbl2 = (Yanew - Ya1) * 0.5
        call        adddbl2tos          ; Ysa = Ysa + (Yanew - Ya1) * 0.5

; cos coeff is 0.866
        call        movdbl1to2          ; dbl2 = Yanew - Ya1
        call        dbl2_866            ; dbl2 = (Yanew - Ya1) * 0.866
        call        adddbl2toc          ; dblc = dblc + dbl2
```

```
               return              ; Yca = Yca + (Yanew - Ya1) * 0.866 sc2                                ; calculate Y2's coefficients: 0.866, 0.5

; sin coeff is 0.866
        call        movdbl1to2     ; dbl2 = Yanew - Ya2
        call        dbl2_866       ; dbl2 = (Yanew - Ya2) * 0.866
        call        adddbl2tos     ; Ysa = Ysa + (Yanew - Ya2) * 0.866

; cos coeff is 0.5
        call        movdbl1to2     ; dbl2 = Yanew - Ya2
        call        dbl2_half      ; dbl2 = (Yanew - Ya2) * 0.5
        call        adddbl2toc     ; dblc = dblc + dbl2
        return                     ; Yca = Yca + (Yanew - Ya2) * 0.5 sc3                                ; calculate Y3's coefficients: 1, 0

; sin coeff is 1
        call        movdbl1to2     ; dbl2 = Yanew - Ya3
        call        adddbl2tos     ; Ysa = Ysa + (Yanew - Ya3) * 1

; cos coeff is 0
 ; dblc = dblc
        return ; Yca = Yca + (Yanew - Ya3) * 0 sc4 ; calculate Y4's coefficients: 0.866, - 0.5

; sin coeff is 0.866
        call        movdbl1to2 ; dbl2 = Yanew - Ya4
        call        dbl2_866 ; dbl2 = (Yanew - Ya4) * 0.866
        call        adddbl2tos ; Ysa = Ysa + (Yanew - Ya4) * 0.866

; cos coeff is - 0.5
        call        movdbl1to2 ; dbl2 = Yanew - Ya4
        call        invdbl2 ; dbl2 = - (Yanew - Ya4)
        call        dbl2_half ; dbl2 = - (Yanew - Ya4) * 0.5
        call        adddbl2toc ; dblc = dblc + dbl2
        return ; Yca = Yca - (Yanew - Ya4) * 0.5 sc5 ; calculate Y5's coefficients: 0.5, - 0.866

; sin coeff is 0.5
        call        movdbl1to2 ; dbl2 = Yanew - Ya5
        call        dbl2_half ; dbl2 = (Yanew - Ya5) * 0.5
        call        adddbl2tos ; Ysa = Ysa + (Yanew - Ya5) * 0.5

; cos coeff is - 0.866
        call        movdbl1to2 ; dbl2 = Yanew - Ya5
        call        invdbl2 ; dbl2 = - (Yanew - Ya5)
        call        dbl2_866 ; dbl2 = - (Yanew - Ya5) * 0.866
        call        adddbl2toc ; dblc = dblc + dbl2
        return ; Yca = Yca - (Yanew - Ya5) * 0.866 sc6 ; calculate Y6's coefficients: 0, - 1

; sin coeff is 0
 ; dbls = dbls
 ; Ysa = Ysa + (Yanew - Ya6) * 0

; cos coeff is - 1
        call        movdbl1to2 ; dbl2 = Yanew - Ya6
        call        invdbl2 ; dbl2 = - (Yanew - Ya6)
        call        adddbl2toc ; dblc = dblc + dbl2
        return ; Yca = Yca - (Yanew - Ya6) * 1
```

```
sc7 ; calculate Y7's coefficients: - 0.5, - 0.866

; sin coeff is - 0.5
        call        movdbl1to2 ; dbl2 = Yanew - Ya7
        call        invdbl2 ; dbl2 = - (Yanew - Ya7)
        call        dbl2_half ; dbl2 = - (Yanew - Ya7) * 0.5
        call        adddbl2tos ; Ysa = Ysa - (Yanew - Ya7) * 0.5

; cos coeff is - 0.866
        call        movdbl1to2 ; dbl2 = Yanew - Ya7
        call        invdbl2 ; dbl2 = - (Yanew - Ya7)
        call        dbl2_866 ; dbl2 = - (Yanew - Ya7) * 0.866
        call        adddbl2toc ; dblc = dblc + dbl2
        return ; Yca = Yca - (Yanew - Ya7) * 0.866 sc8 ; calculate Y8's coefficients: - 0.866, - 0.5

; sin coeff is - 0.866
        call        movdbl1to2 ; dbl2 = Yanew - Ya8
        call        invdbl2 ; dbl2 = - (Yanew - Ya8)
        call        dbl2_866 ; dbl2 = - (Yanew - Ya8) * 0.866
        call        adddbl2tos ; Ysa = Ysa - (Yanew - Ya8) * 0.866

; cos coeff is - 0.5
        call        movdbl1to2 ; dbl2 = Yanew - Ya8
        call        invdbl2 ; dbl2 = - (Yanew - Ya8)
        call        dbl2_half ; dbl2 = - (Yanew - Ya8) * 0.5
        call        adddbl2toc ; dblc = dblc + dbl8
        return ; Yca = Yca - (Yanew - Ya8) * 0.5 sc9 ; calculate Y9's coefficients: - 1, 0

; sin coeff is - 1
        call        movdbl1to2 ; dbl2 = Yanew - Ya9
        call        invdbl2 ; dbl2 = - (Yanew - Ya9)
        call        adddbl2tos ; Ysa = Ysa - (Yanew - Ya9) * 1

; cos coeff is 0
 ; dblc = dblc
        return ; Yca = Yca + (Yanew - Ya9) * 0 sc10 ; calculate Y10's coefficients: - 0.866, 0.5

; sin coeff is - 0.866
        call        movdbl1to2 ; dbl2 = Yanew - Ya10
        call        invdbl2 ; dbl2 = - (Yanew - Ya10)
        call        dbl2_866 ; dbl2 = - (Yanew - Ya10) * 0.866
        call        adddbl2tos ; Ysa = Ysa - (Yanew - Ya10) * 0.866

; cos coeff is 0.5
        call        movdbl1to2 ; dbl2 = Yanew - Ya10
        call        dbl2_half ; dbl2 = (Yanew - Ya10) * 0.5
        call        adddbl2toc ; dblc = dblc + dbl2
        return ; Yca = Yca + (Yanew - Ya10) * 0.5 sc11 ; calculate Y11's coefficients: - 0.5, 0.866

; sin coeff is - 0.5
        call        movdbl1to2 ; dbl2 = Yanew - Ya11
        call        invdbl2 ; dbl2 = - (Yanew - Ya11)
        call        dbl2_half ; dbl2 = - (Yanew - Ya11) * 0.5
        call        adddbl2tos ; Ysa = Ysa - (Yanew - Ya11) * 0.5
```

```
; cos coeff is 0.866
        call        movdbl1to2 ; dbl2 = Yanew - Yall
        call        dbl2_866 ; dbl2 = (Yanew - Yall) * 0.866
        call        adddbl2toc ; dblc = dblc + dbl2
        return ; Yca = Yca + (Yanew - Yall) * 0.866 movdbl1to2 ;  copy dbl1 to dbl2
        movf        dbl1, 0
        movwf       dbl2
        movf        dbl1+1, 0
        movwf       dbl2+1
        return adddbl2toc ; performs dblc = dblc + dbl2
        movf        dbl2, 0 ; move low byte of dbl2 to W
        addwf       dblc, 1 ; add W and low byte of dblc, result in dblc
        btfsc       STATUS, C
        incf        dblc+1, 1 ; increment high byte of dblc if carry
        movf        dbl2+1, 0 ; move high byte of dbl2 to W
        addwf       dblc+1, 1 ; add W and high byte of dblc, result in dblc
        return adddbl2tos ; performs dbls = dbls + dbl2
        movf        dbl2, 0 ; move low byte of dbl2 to W
        addwf       dbls, 1 ; add W and low byte of dbls, result in dbls
        btfsc       STATUS, C
        incf        dbls+1, 1 ; increment high byte of dbls if carry
        movf        dbl2+1, 0 ; move high byte of dbl2 to W
        addwf       dbls+1, 1 ; add W and high byte of dbls, result in dbls
        return dbl2_half ; performs dbl2 = dbl2 * 0.5
        btfss       dbl2+1, 7 ; check MSB of dbl2
        call        dbl2_rr ; right rotate if positive
        btfss       dbl2+1, 7
        return ; positive return
        call        invdbl2 ; inverse dbl2 to positive
        call        dbl2_rr ; right rotate
        call        invdbl2 ; inverse dbl2 back to negative
        return ; negative return dbl2_rr ; right rotate dbl2
        bcf         STATUS, C ; clear carry
        rrf         dbl2+1, 1 ; rotate right high byte via carry
        rrf         dbl2, 1 ; rotate right low byte via carry
        return dbl2_866 ; performs dbl2 = dbl2 *0.866
        clrf        dbl3 ; dbl3 acts as an accumulator
        clrf        dbl3+1
        call        dbl2_half ; get dbl2 / 2
        call        adddbl2to3 ; add it to the accumulator
        call        dbl2_half ; get dbl2 / 4
        call        adddbl2to3 ; add it to the accumulator
        call        dbl2_half ; get dbl2 / 8
        call        adddbl2to3 ; add it to the accumulator
        call        dbl2_half ; get dbl2 / 16
        call        dbl2_half ; get dbl2 / 32
        call        dbl2_half ; get dbl2 / 64
        call        dbl2_half ; get dbl2 / 128
        call        invdbl2 ; get - dbl2 / 128
        call        adddbl2to3 ; add it to the accumulator
        call        dbl2_half ; get - dbl2 / 256
        call        dbl2_half ; get - dbl2 / 512
```

```
        call        dbl2_half ; get - dbl2 / 1024
        call        adddbl2to3 ; add it to the accumulator
        call        movdbl3to2 ; dbl2 = dbl2 * 0.866
        return adddbl2to3 ; performs dbl3 = dbl3 + dbl2
        movf        dbl2, 0 ; move low byte of dbl2 to W
        addwf       dbl3, 1 ; add W and low byte of dbl3, result in dbl3
        btfsc       STATUS, C
        incf        dbl3+1, 1 ; increment high byte of dbl3 if carry
        movf        dbl2+1, 0 ; move high byte of dbl2 to W
        addwf       dbl3+1, 1 ; add W and high byte of dbl3, result in dbl3
        return movdbl3to2 ; copy dbl3 to dbl2
        movf        dbl3, 0
        movwf       dbl2
        movf        dbl3+1, 0
        movwf       dbl2+1
        return W2PB ; do parallel communication ; Transmit sin and cos coefficients of all three phases
        movlw       0x0C ;  set count to read 12 bytes
        movwf       vari
        movlw       Ysa ; load FSR with address of Ysa
        movwf       FSR ; Signal to indicate the start of transmisson loop_coef
        banksel         Ysa
        movf            INDF, 0 ; move one byte to W
        banksel         PORTB
        movwf           PORTB ; move it to port b
        incf            FSR, 1
        NOP
        NOP ; increment FSR
        banksel         PORTC
        bcf             PORTC, 0 ; output 0 at pin 0 of port c to give a start signal
        bcf             PORTC,1 ;output 0 at pin 1 of port c to give a start signal
        NOP
        NOP
        NOP
        NOP
        bsf             PORTC, 1 ; output 0 at pin 0 of port c to end the transmission
        bsf             PORTC,0
        call            delay
        decfsz      vari, 1
        goto        loop_coef
        clrf        PORTB
        return delay
        movlw   0x09
        movwf       var3
loop1 NOP
        decfsz      var3,1 ;Subtract 1
        goto        loop1
        return
```

What is claimed is:

1. A distributed power generation system adapted to interface with an electric utility distribution system at a point of common coupling, comprising:
   a plurality of distributed power generation resources, collectively having an aggregate output rating; and
   a controller;
   wherein the distributed power generation resources export power at a first time to the electric utility distribution system, and
   wherein, if a first portion of the electric utility distribution system that includes the distributed power generation resources becomes electrically disconnected from the remainder of the electric utility distribution system, the controller causes the distributed power generation resources to export power to the first portion of the electric utility distribution system for not more than about two seconds.

2. The system of claim 1, wherein the distributed power generation system complies with IEEE Standard 1547, section 4.4.

3. The system of claim 1 wherein, while the first portion of the electric utility distribution system is electrically disconnected from the remainder of the electric utility distribution system, the controller prevents the distributed power generation resources from beginning to export power to the first portion of the electric utility distribution system.

4. The system of claim 1, further comprising:
   a decision tree that is trained at least in part on training data characterizing the electrical characteristics during HIF and non-HIF conditions at the point of common coupling, then configured to accept real data characterizing the electrical characteristics at the point of common coupling and provide an HIF detection output; and
   a control system that modifies the operation of the distributed power generation system based on the HIF detection output.

5. The system of claim 4, wherein the training data and real data are measurements of one or more currents at the point of common coupling.

6. A distributed generation subsystem that detects islanding of the subsystem, comprising:
   a plurality of generators that produce AC output power for a load, in parallel with a power grid that has a first frequency characteristic; and
   a controller that controls the output level of each of a plurality of generators using one or more control signals;
   wherein the controller superimposes a perturbation signal on the control signals,
   the controller detects the frequency characteristic of the AC output power;
   the effect of the perturbation on the AC output power has a second frequency characteristic that is detectably different from the first frequency characteristic;
   the controller produces a first signal if the detected frequency characteristic is sufficiently like the first frequency characteristic, and a second signal if the detected frequency characteristic is sufficiently like the second frequency characteristic;
   in response to the first signal, the controller allows export of power from the generators to the power grid; and
   in response to the second signal, the controller
     ceases export of power from the generators to the power grid, if such export is occurring when the second signal begins to be produced, and
     prevents export of power from the generators to the power grid while the second signal is being produced.

7. The subsystem of claim 6, wherein the cessation of the export of power from the generators to the power grid occurs within two seconds of the time at which the second signal begins to be produced.

8. The subsystem of claim 6, wherein the cessation of the export of power from the generators to the power grid occurs within two seconds of the time at which the frequency characteristic sufficiently like the second frequency characteristic begins to be detected.

9. The subsystem of claim 6, wherein the controller comprises a supervisory controller and, for each generator, a subordinate controller that receives control signals from the supervisory controller and controls the output level of that generator.

* * * * *

UNITED STATES PATENT AND TRADEMARK OFFICE
CERTIFICATE OF CORRECTION

| | | |
|---|---|---|
| PATENT NO. | : 8,190,299 B2 | Page 1 of 1 |
| APPLICATION NO. | : 12/355972 | |
| DATED | : May 29, 2012 | |
| INVENTOR(S) | : Steven M. Rovnyak et al. | |

It is certified that error appears in the above-identified patent and that said Letters Patent is hereby corrected as shown below:

Title Page, item (76); Inventor name "Pahis" is corrected to read --Pahls--.

Title Page, item (73); please insert Assignee;
--Indiana University Research and Technology Corporation--.

Signed and Sealed this
Fourth Day of September, 2012

David J. Kappos
*Director of the United States Patent and Trademark Office*